US008627206B2

(12) United States Patent
Ogikubo

(10) Patent No.: US 8,627,206 B2
(45) Date of Patent: Jan. 7, 2014

(54) IMAGE PROCESSING DEVICE AND IMAGE PROCESSING METHOD FOR DISPLAYING IMAGES IN A SPIRAL FORM

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1405 days.

(21) Appl. No.: 11/913,677

(22) PCT Filed: Mar. 14, 2007

(86) PCT No.: PCT/JP2007/055789
§ 371 (c)(1),
(2), (4) Date: Nov. 6, 2007

(87) PCT Pub. No.: WO2007/111206
PCT Pub. Date: Oct. 4, 2007

(65) Prior Publication Data
US 2010/0013757 A1      Jan. 21, 2010

(30) Foreign Application Priority Data
Mar. 14, 2006   (JP) ................................. 2006-070055

(51) Int. Cl.
*G06F 3/00* (2006.01)
*G06F 3/048* (2013.01)
*H04N 5/445* (2011.01)
*G06F 3/0481* (2013.01)

(52) U.S. Cl.
CPC ........ *G06F 3/04815* (2013.01); *H04N 5/44543* (2013.01)
USPC ........... 715/719; 715/835; 715/838; 715/848; 345/184

(58) Field of Classification Search
USPC .......... 715/716–726, 771, 768, 773, 810–845
See application file for complete search history.

(56) References Cited

U.S. PATENT DOCUMENTS 5,977,974 A   11/1999   Hatori et al.
6,025,833 A * 2/2000   Duff .............................. 345/159
(Continued)

FOREIGN PATENT DOCUMENTS

EP    0 954 168 A2    11/1999
JP    6-46366         2/1994
(Continued)

OTHER PUBLICATIONS

U.S. Appl. No. 12/756,810, filed Apr. 8, 2010, Ogikubo.
(Continued)

*Primary Examiner* — Tadeese Hailu
*Assistant Examiner* — James T Durkin
(74) *Attorney, Agent, or Firm* — Oblon, Spivak, McClelland, Maier & Neustadt, L.L.P.

(57) ABSTRACT

An image processing apparatus and method that include generating display video data of a plurality of images to be displayed respectively in a plurality of image display sections on a display screen from image data, determining display types indicating display modes of displaying the images of the image data on a picture by picture basis or GOP by GOP basis according to variations expressing extents of change of the image data, altering the display parameters or the reproduction parameters corresponding to the display video data according to the type information expressing the display types on a picture by picture basis or GOP by GOP basis as determined, and displaying the images to be displayed in the form of moving image on the display screen with time lags in the display sequence, using the display parameters or the reproduction parameters altered.

32 Claims, 102 Drawing Sheets

(56) References Cited

U.S. PATENT DOCUMENTS

| | | |
|---|---|---|
| 6,154,601 A | 11/2000 | Yaegashi et al. |
| 6,577,807 B1 | 6/2003 | Yaegashi et al. |
| RE38,401 E * | 1/2004 | Goldberg et al. ............. 715/720 |
| 6,788,878 B1 | 9/2004 | Fujii et al. |
| 6,931,595 B2 * | 8/2005 | Pan et al. ...................... 715/723 |
| 6,973,628 B2 * | 12/2005 | Asami .......................... 715/838 |
| 7,428,710 B2 * | 9/2008 | Robbins ........................ 715/848 |
| 2002/0041752 A1 | 4/2002 | Abiko et al. |
| 2002/0054157 A1 * | 5/2002 | Hayashi et al. ............... 345/838 |
| 2002/0080162 A1 | 6/2002 | Pan et al. |
| 2003/0156824 A1 | 8/2003 | Lu |
| 2004/0150657 A1 | 8/2004 | Wittenburg et al. |
| 2004/0263533 A1 * | 12/2004 | Yamamoto et al. ........... 345/619 |
| 2005/0160377 A1 * | 7/2005 | Sciammarella et al. ...... 715/838 |
| 2005/0228849 A1 * | 10/2005 | Zhang ........................... 709/200 |
| 2006/0005924 A1 | 1/2006 | Hase et al. |
| 2006/0020970 A1 * | 1/2006 | Utsuki et al. .................... 725/39 |
| 2006/0224940 A1 * | 10/2006 | Lee ............................. 715/500.1 |
| 2007/0198931 A1 | 8/2007 | Ono et al. |

FOREIGN PATENT DOCUMENTS

| | | |
|---|---|---|
| JP | 06-46366 A | 2/1994 |
| JP | 11-65802 | 3/1999 |
| JP | 11 85450 | 3/1999 |
| JP | 11-112872 | 4/1999 |
| JP | 11-112872 A | 4/1999 |
| JP | 2000-165815 | 6/2000 |
| JP | 2000-165815 A | 6/2000 |
| JP | 2000 251451 | 9/2000 |
| JP | 2001-78123 | 3/2001 |
| JP | 2001-78123 A | 3/2001 |
| JP | 2001 313886 | 11/2001 |
| JP | 2002-74322 | 3/2002 |
| JP | 2004-274171 | 9/2004 |
| WO | WO 00/33572 | 6/2000 |
| WO | WO 00/33572 A1 | 6/2000 |
| WO | WO 2005/043373 A1 | 5/2005 |

OTHER PUBLICATIONS

Extended European Search Report issued Jul. 16, 2012 in Patent Application No. 07739232.2.

Office Action issued Dec. 6, 2011, in Japanese Patent Application No. 2008-507450 with English translation.

Japanese Office Action issued Feb. 21, 2012, in Japan Patent Application No. 2008-507450 (with English Translation).

* cited by examiner

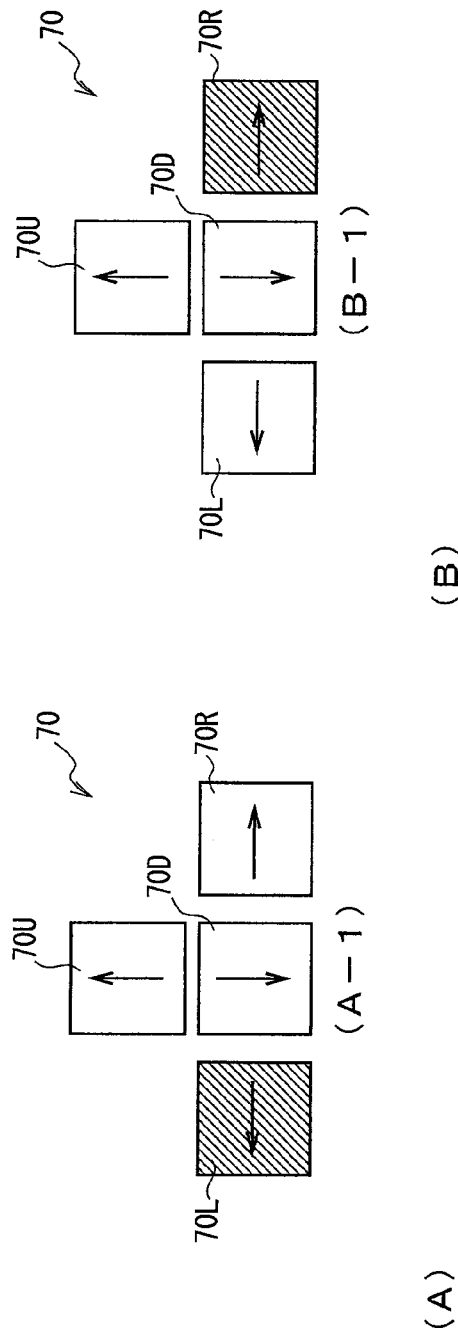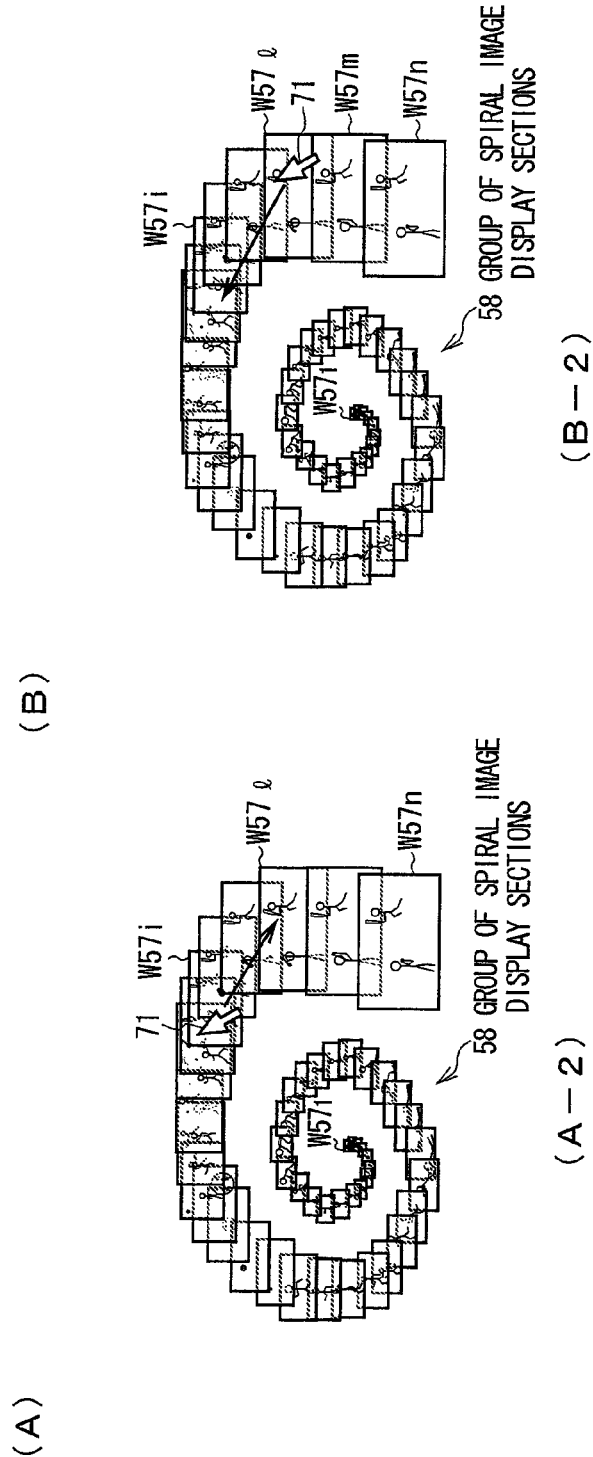
FIG. 14

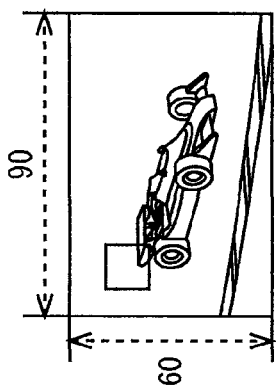
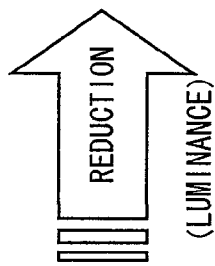
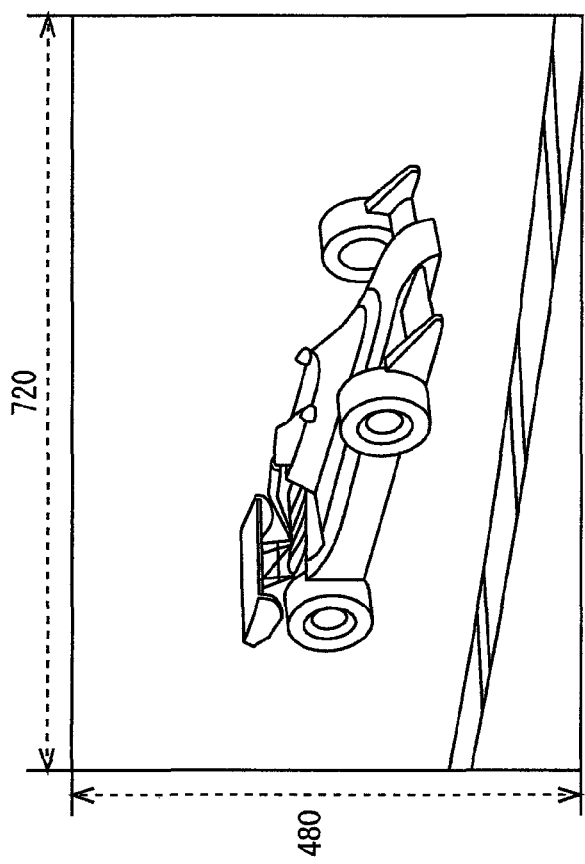
FIG. 36

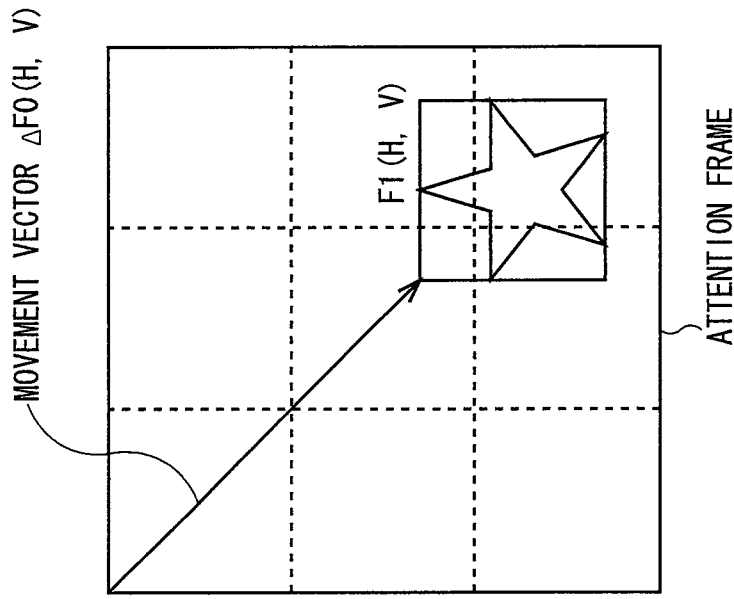
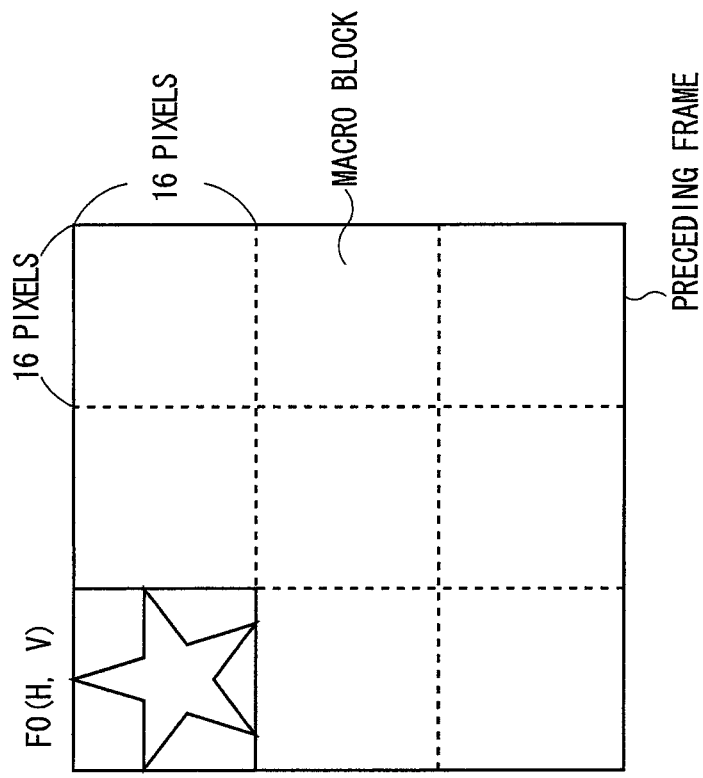
FIG. 41

| DISPLAY TYPE | DISPLAY MODE |
|---|---|
| V1 (STILL IMAGE TYPE) | TO BE DISPLAYED AS STILL IMAGE |
| V2 (ORDINARY TYPE) | TO BE DISPLAYED AT DISPLAY RATE (ORDINARY RATE) SAME AS FRAME RATE AND WITH RESOLUTION OF MAIN LINE IMAGE (ORDINARY RESOLUTION) |
| V3 (HIGH DISPLAY RATE/LOW RESOLUTION TYPE) | TO BE DISPLAYED AT DISPLAY RATE HIGHER THAN ORDINARY RATE AND WITH RESOLUTION LOWER THAN THE ORDINARY RESOLUTION |

FIG. 49

| FRAME NO. | TIME CODE | VARIATION (MOVEMENT INFORMATION) | DISPLAY TYPE |
|---|---|---|---|
| 1frame | 00:00:01 | 3 | $V_2$ |
| 2frame | 00:00:02 | 3 | $V_2$ |
| 3frame | 00:00:03 | 3 | $V_2$ |
| 4frame | 00:00:04 | 2 | $V_2$ |
| 5frame | 00:00:05 | 1 | $V_1$ |
| 6frame | 00:00:06 | 1 | $V_1$ |
| 7frame | 00:00:07 | 0 | $V_1$ |
| 8frame | 00:00:08 | 1 | $V_1$ |
| 9frame | 00:00:09 | 1 | $V_1$ |
| 10frame | 00:00:10 | 3 | $V_2$ |
| 11frame | 00:00:11 | 5 | $V_2$ |
| 12frame | 00:00:12 | 4 | $V_2$ |
| 13frame | 00:00:13 | 3 | $V_2$ |
| 14frame | 00:00:14 | 5 | $V_3$ |
| 15frame | 00:00:15 | 5 | : |
| 16frame | 00:00:16 | 5 | |
| 17frame | 00:00:17 | 6 | |
| 18frame | 00:00:18 | 6 | |
| 19frame | 00:00:19 | 5 | |
| : | | | : |
| 50frame | 00:00:20 | 5 | $V_3$ |
| 51frame | 00:00:11 | 4 | $V_2$ |
| 52frame | 00:00:12 | 4 | $V_2$ |
| 53frame | 00:00:13 | 3 | $V_2$ |
| 54frame | 00:00:14 | 3 | $V_2$ |
| 55frame | 00:00:15 | 2 | $V_2$ |
| 56frame | 00:00:16 | 2 | $V_2$ |
| 57frame | 00:00:17 | 1 | $V_1$ |
| 58frame | 00:00:18 | 0 | $V_1$ |
| 59frame | 00:00:19 | 0 | $V_1$ |
| 60frame | 00:00:20 | 0 | $V_1$ |
| : | | | |

Fy FILE

FIG. 55

| DISPLAY TYPE | DISPLAY MODE |
|---|---|
| $V_{11}$ (STILL IMAGE TYPE) | TO BE DISPLAYED AS STILL IMAGE |
| $V_{12}$ (ORDINARY TYPE) | TO BE DISPLAYED AT DISPLAY RATE (ORDINARY RATE) SAME AS FRAME RATE AND WITH RESOLUTION OF MAIN LINE IMAGE (ORDINARY RESOLUTION) |
| $V_{13}$ (HIGH DISPLAY RATE/ORDINARY RESOLUTION TYPE) | TO BE DISPLAYED AT DISPLAY RATE TWICE AS HIGH AS FRAME RATE AND WITH ORDINARY RESOLUTION |
| $V_{14}$ (SUPER HIGH DISPLAY RATE/LOW RESOLUTION TYPE) | TO BE DISPLAYED AT DISPLAY RATE THREE TIMES AS HIGH AS FRAME RATE AND WITH RESOLUTION OF PROXY IMAGE |
| $V_{15}$ (ULTRA HIGH DISPLAY RATE/LOW RESOLUTION TYPE) | TO BE DISPLAYED AT DISPLAY RATE FOUR TIMES AS HIGH AS FRAME RATE AND WITH RESOLUTION OF PROXY IMAGE |

FIG. 56

| DISPLAY TYPE | DISPLAY MODE |
|---|---|
| $C_1$ (LOW RESOLUTION/ ORDINARY DISPLAY RATE TYPE) | TO BE DISPLAYED AT DISPLAY RATE SAME AS THE FRAME RATE (ORDINARY RATE) AND WITH RESOLUTION LOWER THAN RESOLUTION OF MAIN LINE IMAGE |
| $C_2$ (ORDINARY TYPE) | TO BE DISPLAYED AT ORDINARY RATE AND WITH ORDINARY RESOLUTION |
| $C_3$ (ORDINARY RESOLUTION/ LOW DISPLAY RATE TYPE) DISPLAY MODE | TO BE DISPLAYED AT DISPLAY RATE LOWER THAN ORDINARY RATE AND WITH ORDINARY RESOLUTION |

FIG. 60

| FRAME NO. | TIME CODE | MOVEMENT INFORMATION | FINENESS INFORMATION | DISPLAY TYPE (BASED ON MOVEMENT INFORMATION) | DISPLAY TYPE (BASED ON FINENESS INFORMATION) |
|---|---|---|---|---|---|
| 1frame | 00:00:01 | D1 | K1 | Sm1 | Sa1 |
| 2frame | 00:00:02 | D2 | K2 | Sm2 | Sa2 |
| 3frame | 00:00:03 | D3 | K3 | Sm3 | Sa3 |
| 4frame | 00:00:04 | D4 | K4 | Sm4 | Sa4 |
| 5frame | 00:00:05 | D5 | K5 | Sm5 | Sa5 |
| 6frame | 00:00:06 | D6 | K6 | Sm6 | Sa6 |
| 7frame | 00:00:07 | D7 | K7 | Sm7 | Sa7 |
| 8frame | 00:00:08 | D8 | K8 | Sm8 | Sa8 |
| 9frame | 00:00:09 | D9 | K9 | Sm9 | Sa9 |
| 10frame | 00:00:10 | D10 | K10 | Sm10 | Sa10 |
| 11frame | 00:00:11 | D11 | K11 | Sm11 | Sa11 |
| 12frame | 00:00:12 | D12 | K12 | Sm12 | Sa12 |
| 13frame | 00:00:13 | D13 | K13 | Sm13 | Sa13 |
| 14frame | 00:00:14 | D14 | K14 | Sm14 | Sa14 |
| 15frame | 00:00:15 | D15 | | | |
| 16frame | 00:00:16 | D16 | | | |
| 17frame | 00:00:17 | D17 | | | |
| 18frame | 00:00:18 | D18 | | | |
| 19frame | 00:00:19 | D19 | | | |
| ... | | | | | |
| 50frame | 00:00:20 | D50 | K50 | Sm50 | Sa50 |
| 51frame | 00:00:11 | D51 | K51 | Sm51 | Sa51 |
| 52frame | 00:00:12 | D52 | K52 | Sm52 | Sa52 |
| 53frame | 00:00:13 | D53 | K53 | Sm53 | Sa53 |
| 54frame | 00:00:14 | D54 | K54 | Sm54 | Sa54 |
| 55frame | 00:00:15 | D55 | K55 | Sm55 | Sa55 |
| 56frame | 00:00:16 | D56 | K56 | Sm56 | Sa56 |
| 57frame | 00:00:17 | D57 | K57 | Sm57 | Sa57 |
| 58frame | 00:00:18 | D58 | K58 | Sm58 | Sa58 |
| 59frame | 00:00:19 | D59 | K59 | Sm59 | Sa59 |
| 60frame | 00:00:20 | D60 | K60 | Sm60 | Sa60 |
| ... | | | | | |

~ Fy FILE

FIG. 64

| FRAME NO. | TIME CODE | MOVEMENT INFORMATION | FINENESS INFORMATION |
|---|---|---|---|
| 1frame | 00:00:01 | D1 | K1 |
| 2frame | 00:00:02 | D2 | K2 |
| 3frame | 00:00:03 | D3 | K3 |
| 4frame | 00:00:04 | D4 | K4 |
| 5frame | 00:00:05 | D5 | K5 |
| 6frame | 00:00:06 | D6 | K6 |
| 7frame | 00:00:07 | D7 | K7 |
| 8frame | 00:00:08 | D8 | K8 |
| 9frame | 00:00:09 | D9 | K9 |
| 10frame | 00:00:10 | D10 | K10 |
| 11frame | 00:00:11 | D11 | K11 |
| 12frame | 00:00:12 | D12 | K12 |
| 13frame | 00:00:13 | D13 | K13 |
| 14frame | 00:00:14 | D14 | K14 |
| 15frame | 00:00:15 | D15 | : |
| 16frame | 00:00:16 | D16 | |
| 17frame | 00:00:17 | D17 | |
| 18frame | 00:00:18 | D18 | |
| 19frame | 00:00:19 | D19 | |
| : | | | : |
| 50frame | 00:00:20 | D50 | K50 |
| 51frame | 00:00:11 | D51 | K51 |
| 52frame | 00:00:12 | D52 | K52 |
| 53frame | 00:00:13 | D53 | K53 |
| 54frame | 00:00:14 | D54 | K54 |
| 55frame | 00:00:15 | D55 | K55 |
| 56frame | 00:00:16 | D56 | K56 |
| 57frame | 00:00:17 | D57 | K57 |
| 58frame | 00:00:18 | D58 | K58 |
| 59frame | 00:00:19 | D59 | K59 |
| 60frame | 00:00:20 | D60 | K60 |
| : | | | |

Fy FILE

FIG. 65

| FRAME NO. | TIME CODE | DISPLAY TYPE (BASED ON MOVEMENT INFORMATION) | DISPLAY TYPE (BASED ON FINENESS INFORMATION) |
|---|---|---|---|
| 1frame | 00:00:01 | Sm1 | Sa1 |
| 2frame | 00:00:02 | Sm2 | Sa2 |
| 3frame | 00:00:03 | Sm3 | Sa3 |
| 4frame | 00:00:04 | Sm4 | Sa4 |
| 5frame | 00:00:05 | Sm5 | Sa5 |
| 6frame | 00:00:06 | Sm6 | Sa6 |
| 7frame | 00:00:07 | Sm7 | Sa7 |
| 8frame | 00:00:08 | Sm8 | Sa8 |
| 9frame | 00:00:09 | Sm9 | Sa9 |
| 10frame | 00:00:10 | Sm10 | Sa10 |
| 11frame | 00:00:11 | Sm11 | Sa11 |
| 12frame | 00:00:12 | Sm12 | Sa12 |
| 13frame | 00:00:13 | Sm13 | Sa13 |
| 14frame | 00:00:14 | Sm14 | Sa14 |
| 15frame | 00:00:15 | : | : |
| 16frame | 00:00:16 | | |
| 17frame | 00:00:17 | | |
| 18frame | 00:00:18 | | |
| 19frame | 00:00:19 | | |
| : | | : | : |
| 50frame | 00:00:20 | Sm50 | Sa50 |
| 51frame | 00:00:11 | Sm51 | Sa51 |
| 52frame | 00:00:12 | Sm52 | Sa52 |
| 53frame | 00:00:13 | Sm53 | Sa53 |
| 54frame | 00:00:14 | Sm54 | Sa54 |
| 55frame | 00:00:15 | Sm55 | Sa55 |
| 56frame | 00:00:16 | Sm56 | Sa56 |
| 57frame | 00:00:17 | Sm57 | Sa57 |
| 58frame | 00:00:18 | Sm58 | Sa58 |
| 59frame | 00:00:19 | Sm59 | Sa59 |
| 60frame | 00:00:20 | Sm60 | Sa60 |
| : | | | |

Fy FILE

FIG. 66

| DISPLAY TYPE | DISPLAY MODE |
|---|---|
| VC1 (STILL IMAGE TYPE) | TO BE DISPLAYED AS STILL IMAGE |
| VC2 (ORDINARY TYPE) | TO BE DISPLAYED AT DISPLAY RATE (ORDINARY RATE) SAME AS FRAME RATE AND WITH RESOLUTION OF MAIN LINE IMAGE (ORDINARY RESOLUTION) |
| VC3 (HIGH DISPLAY RATE/LOW RESOLUTION TYPE) | TO BE DISPLAYED AT DISPLAY RATE HIGHER THAN ORDINARY RATE AND WITH RESOLUTION OF PROXY IMAGE (LOW RESOLUTION) |
| VC4 (ORDINARY DISPLAY RATE/LOW RESOLUTION TYPE) | TO BE DISPLAYED AT ORDINARY RATE AND WITH LOW RESOLUTION |

FIG. 67

| FRAME NO. | TIME CODE | MOVEMENT INFORMATION | FINENESS INFORMATION | DISPLAY TYPE (BASED ON MOVEMENT INFORMATION AND FINENESS INFORMATION) |
|---|---|---|---|---|
| 1frame | 00:00:01 | D1 | K1 | Sma1 |
| 2frame | 00:00:02 | D2 | K2 | Sma2 |
| 3frame | 00:00:03 | D3 | K3 | Sma3 |
| 4frame | 00:00:04 | D4 | K4 | Sma4 |
| 5frame | 00:00:05 | D5 | K5 | Sma5 |
| 6frame | 00:00:06 | D6 | K6 | Sma6 |
| 7frame | 00:00:07 | D7 | K7 | Sma7 |
| 8frame | 00:00:08 | D8 | K8 | Sma8 |
| 9frame | 00:00:09 | D9 | K9 | Sma9 |
| 10frame | 00:00:10 | D10 | K10 | Sma10 |
| 11frame | 00:00:11 | D11 | K11 | Sma11 |
| 12frame | 00:00:12 | D12 | K12 | Sma12 |
| 13frame | 00:00:13 | D13 | K13 | Sma13 |
| 14frame | 00:00:14 | D14 | K14 | Sma14 |
| 15frame | 00:00:15 | D15 | : | : |
| 16frame | 00:00:16 | D16 | | |
| 17frame | 00:00:17 | D17 | | |
| 18frame | 00:00:18 | D18 | | |
| 19frame | 00:00:19 | D19 | | |
| : | | : | : | : |
| 50frame | 00:00:20 | D50 | K50 | Sma50 |
| 51frame | 00:00:11 | D51 | K51 | Sma51 |
| 52frame | 00:00:12 | D52 | K52 | Sma52 |
| 53frame | 00:00:13 | D53 | K53 | Sma53 |
| 54frame | 00:00:14 | D54 | K54 | Sma54 |
| 55frame | 00:00:15 | D55 | K55 | Sma55 |
| 56frame | 00:00:16 | D56 | K56 | Sma56 |
| 57frame | 00:00:17 | D57 | K57 | Sma57 |
| 58frame | 00:00:18 | D58 | K58 | Sma58 |
| 59frame | 00:00:19 | D59 | K59 | Sma59 |
| 60frame | 00:00:20 | D60 | K60 | Sma60 |
| : | | | | |

Fy FILE

FIG. 70

| FRAME NO. | TIME CODE | VARIATION (MOVEMENT INFORMATION) | DISPLAY TYPE | |
|---|---|---|---|---|
| 1frame | 00:00:01 | 3 | V2 | ⌐ ---/ V2 |
| 2frame | 00:00:02 | 3 | V2 | |
| 3frame | 00:00:03 | 3 | V2 | |
| 4frame | 00:00:04 | 2 | V2 | |
| 5frame | 00:00:05 | 1 | V1 | |
| 6frame | 00:00:06 | 1 | V1 | |
| 8frame | 00:00:08 | 1 | V1 | |
| 9frame | 00:00:09 | 1 | V1 | |
| 10frame | 00:00:10 | 3 | V2 | |
| 11frame | 00:00:11 | 5 | V2 | |
| 12frame | 00:00:12 | 4 | V2 | |
| 13frame | 00:00:13 | 3 | V2 | |
| 14frame | 00:00:14 | 5 | V3 | |
| 15frame | 00:00:15 | 5 | V3 | |
| 16frame | 00:00:16 | 5 | V3 | |
| 17frame | 00:00:17 | 6 | V3 | ---/ V3 |
| 18frame | 00:00:18 | 6 | V3 | |
| 19frame | 00:00:19 | 5 | V3 | |
| : | | | | |
| 50frame | 00:00:20 | 5 | V3 | |
| 51frame | 00:00:11 | 4 | V2 | |
| 52frame | 00:00:12 | 4 | V2 | |
| 53frame | 00:00:13 | 3 | V2 | |
| 54frame | 00:00:14 | 3 | V2 | |
| 55frame | 00:00:15 | 2 | V2 | |
| 56frame | 00:00:16 | 2 | V2 | |
| 57frame | 00:00:17 | 1 | V1 | |
| 58frame | 00:00:18 | 0 | V1 | |
| 59frame | 00:00:19 | 0 | V1 | |
| 60frame | 00:00:20 | 0 | V1 | |
| : | | | | |

Fy FILE

FIG. 97

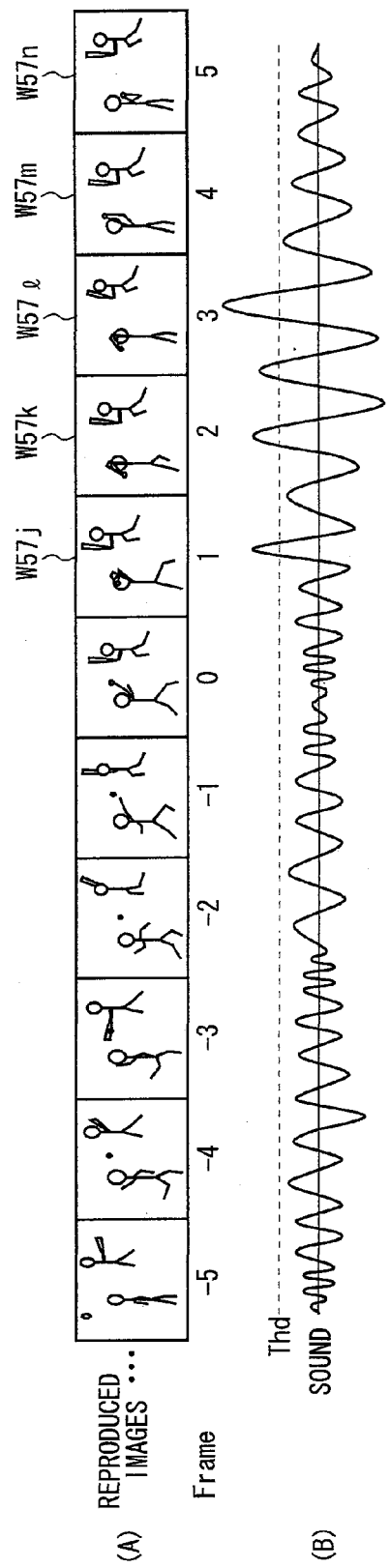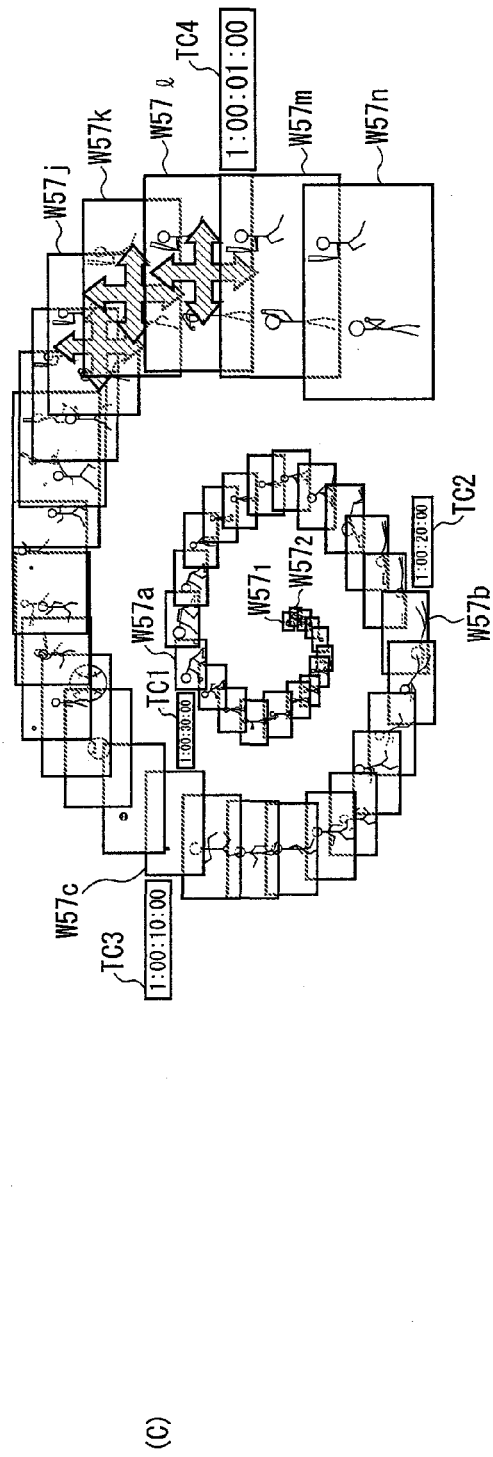
FIG. 101

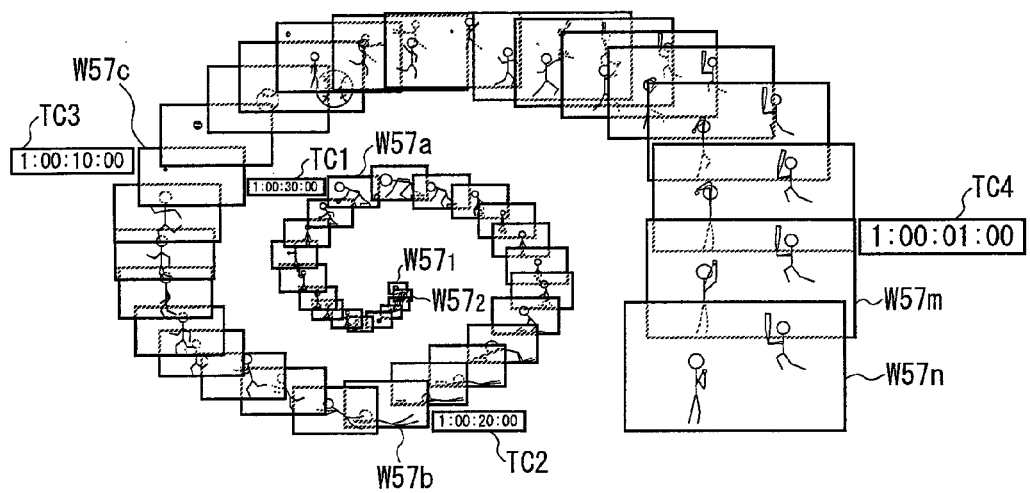
(A)
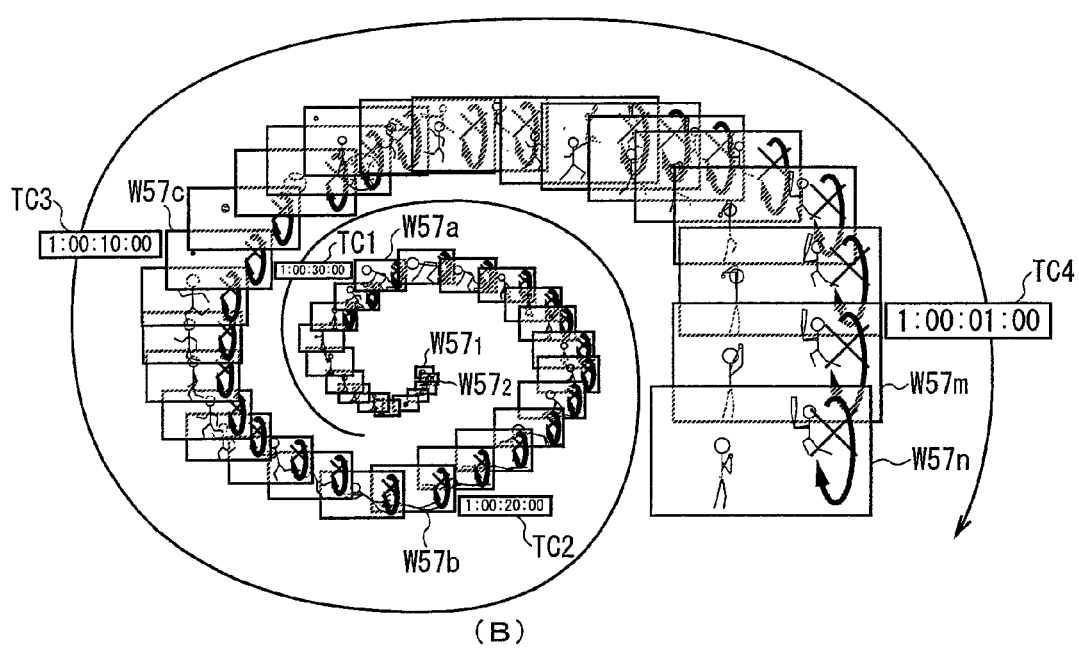
(B)
FIG. 103

IMAGE PROCESSING DEVICE AND IMAGE PROCESSING METHOD FOR DISPLAYING IMAGES IN A SPIRAL FORM

TECHNICAL FIELD

The present invention relates to an image processing apparatus and an image processing method, and can suitably find applications in the field of video browsers for identifying a specific scene from an editing apparatus for editing video materials or the contents of video materials, for example.

BACKGROUND ART

Conventionally, it is an ordinary practice on the contents production site of television broadcasting stations and other production companies to cut out part of an audio visual materials (to be referred to as clip hereinafter) obtained by shooting a scene by means of a video camera to prepare a new clip and produces a set of contents by linking a plurality of clips prepared at the same time (see, for example, Patent Document 1).

FIG. 104 of the accompanying drawings schematically illustrates an example of a GUI (Graphical User Interface) image that can be displayed on the display unit of an editing apparatus adapted to such editing operations (to be referred to as editing image hereinafter). As clearly shown in FIG. 104, editing image 2001 includes a clip synopsis display section 2002, a monitor section 2003, a story board section 2004, a timeline section 2005 and effect information display sections 2006A through 2006C.

The clip synopsis display section 2002 is designed to select a desired bin or file from the various bins and files registered in the editing apparatus and display a synopsis of the clips contained in the bin or file.

The operator of the apparatus can select a desired clip from the clips that are synoptically displayed in the clip synopsis display section 2002 and drag and drop it to the monitor section 2003 so as to have the leading image of the clip displayed in the monitor section 2003.

Then, the operator can start replaying the dragged and dropped clip and have the reproduced image displayed in the monitor section 2003 by clicking the start button in the group of buttons 2007 displayed in a lower part of the monitor section 2003 under this condition. Additionally, the operator can fast-forward or rewind the clip by clicking the corresponding one of the buttons. Furthermore, the operator can move left or right the scrub cursor 2008 displayed above the group of buttons 2007 to indicate the position of the image that is being currently displayed out of the entire clip by operating the mouse of the apparatus in order to have the monitor section 2003 display the image that corresponds to the position of the scrub cursor 2008.

In this way, the operator can search for the desired frame by operating the replay button in the group of buttons 2007 and/or the scrub cursor 2008, visually confirming the image reproduced and displayed in the monitor section 2003. Then, the operator can specify the starting point (to be referred to as in point hereinafter) and the ending point (to be referred to as out point hereinafter) of the video/audio part to be cut out from the clip by clicking respectively an in point button $2009_{IN}$ and an out point button $2009_{OUT}$ arranged in a lower part of the monitor section 2003, while having the image of the frame displayed in the monitor section 2003.

Thus, the operator can paste the video/audio part of the clip sandwiched between the in point and the out point that he or she specified on the story board section 2004 by means of a drag and drop operation. The operator arranges the clips to be used for the current editing operation in the story board section 2004 of the editing image 2001 in the above-described manner so that he or she can imagine the results of the editing operation with ease. Note that a thumbnail and detailed information of a representative image, which may be the leading image, of each of the clips that are pasted are also displayed in the story board section 2004.

Then, the operator sequentially drags and drops the clips pasted on the story board section 2004 and pastes them on respective video tracks 2010V in the timeline section 2005. At this time, a band 2012V having a length that corresponds to the material length of each of the pasted clips is displayed on the video track 2010V of the clip according to the time scale 2011 that is also shown in the timeline section 2005. If any of the clips contain sound, a band 2012A having a length equal to that of the corresponding band 2012V is displayed at the same position on the corresponding audio track 2010A according to the time scale 2011.

A band 2012V that is displayed on a video track 2010V of the timeline section 2005 with or without a band 2012A displayed on an audio track 2010A tells that the image of the clip that corresponds to the band 2012V is displayed with or without, whichever appropriate, the sound of the clip that corresponds to the band 2012A at the time shown on the time scale 2011 in an operation of outputting the edited images and sounds. Thus, with the above-described process, it is possible to prepare an editing list that sequentially specifies the images that are to be displayed as edited images and sounds that are to be output as edited sounds.

When preparing such an editing list and if the operator wants to execute a video special effect process at the time, for example, when the image of the first clip is switched to the image of the second clip, the operator pastes by a drag and drop operation an icon 13 that corresponds to the video special effect (to be referred to as effect icon hereinafter) out of the effects listed and displayed in an effect list display section 6C of the effect information display sections 2006A through 2006C on the position of a transition track 2010T of the timeline section 2005 same as the position for switching from the first clip to the second clip on the transition track 2010T of the timeline section 2005 according to the time scale 2011.

Then, as a result, it is possible to input a command to execute the video special effect that corresponds to the effect icon 13 pasted on the transition track 2010 at the position linking the image of the first clip and the image of the second clip in the to-be-edited images.

Patent Document 1: Jpn. Pat. Appln. Laid-Open Publication No. 2000-251451

In an editing operation using an editing image 2001 as described above, the operation of searching for a frame in order to specify an in point and an out point is an operation of reproducing the image of the selected clip at high speed by repeating a fast forward winding action and a rewinding action for a number of times or by a scrubbing action of moving left and right the scrub cursor 2008 by means of a mouse in order to detect the desired frame.

However, such an operation of searching for a desired frame (to be referred to an image searching operation whenever appropriate hereinafter), which is an operation of reproducing the image of the selected clip at high speed by repeating a fast forward winding action and a rewinding action for a number of times or by a scrubbing action of moving left and right the scrub cursor by means of a mouse as described above, is time consuming unless the operator is trained well and has an excellent skill in such operations. Additionally, there can be cases where the video/audio material to be handled is subjected to compression coding in the long GOP format conforming to the so-called MPEG (Motion Picture Expert Group) Standards, which is a format where each GOP (Group Of Pictures) has a plurality of frames for the purpose of raising the compression efficiency, or in an open GOP format where the video/audio material is compressed by using preceding and succeeding GOP data. Then, a plurality of frames and a GOP have to be processed for decoding in order to decode the frame to make it difficult to randomly reproduce an image at high speed. Thus, the displayed image will be poorly responsive to further make the image searching operation a difficult one.

Furthermore, a so-called cut editing operation of linking clips has hitherto been conducted by pasting clips to the video tracks 2010V and the audio tracks 2010A of the timeline section 2005 in the editing image 201 and the image before the in point and the image after the out point have been confirmed by subsequent replays and scrubs. Therefore, the above-described operation steps have been required for a cut editing operation to make the operation a cumbersome one.

Additionally, while the operator needs to recognize the images and the sounds to be edited in an editing operation, he or she is required to rely on the sound being output from a speaker, visually confirming the corresponding image or check the levels and the waveform of the sound being displayed on the corresponding audio track 2010A in the timeline section 2005 of the editing image 2001 (see, for example, the audio track 2010A of "audio 3" in the timeline section 2005 in FIG. 104). Thus, it has been difficult to do an editing operation, coordinating images and sounds.

DISCLOSURE OF THE INVENTION

In view of the above identified circumstances, it is therefore an object of the present invention to propose an image processing apparatus and that facilitates the image searching operation of confirming a scene being edited or a specific scene and also the entire editing operation.

In an aspect of the present invention, the above object is achieved by providing an image processing apparatus characterized by including: an image generating means for generating display video data of a plurality of images to be displayed respectively in a plurality of image display sections on a display screen from video data; a display type determining means for determining display types indicating display modes of displaying the pictures of the video data on a picture by picture basis or GOP by GOP basis according to variations expressing extents of change of each image data of the video data; a parameter altering means for altering the display parameters or the reproduction parameters corresponding to the display video data according to the type information expressing the display types on a picture by picture basis or GOP by GOP basis as determined by the display type determining means; and an image processing means for displaying the images to be displayed in the form of moving image on the display screen with time lags in the display sequence, using the display parameters or the reproduction parameters altered by the parameter altering means.

With the above-described arrangement, the sequence of displaying a plurality of images to be displayed is provided with time lags and a plurality of image display sections for displaying a moving image are displayed in an image processing apparatus. Therefore, it is possible to present a reproduced image not only in each of the image display sections but also according to the flow of the time series of the entire image display sections, while each of the reproduced images displayed in all the image display sections is displayed in a differentiated display mode or reproduction mode on a picture by picture basis or GOP by GOP basis as a function of the variation of the image so that it is possible to visually present the difference in the variations of images. Thus, the image processing apparatus allows the operator to intuitively recognize the position in a reproduced image where a change is taking place and to do the operation of searching for the desired image parts from a series of images according to the video data of the images to be displayed and also the operation of editing them with ease.

In another aspect, there is provided an image processing method characterized by including: an image generating step of generating display video data of a plurality of images to be displayed respectively in a plurality of image display sections on a display screen from video data; a display type determining step of determining display types indicating display modes of displaying the images of the video data on a picture by picture basis or GOP by GOP basis according to variations expressing extents of change of the video data; a parameter altering step of altering the display parameters or the reproduction parameters corresponding to the display video data according to the type information expressing the display types on a picture by picture basis or GOP by GOP basis as determined in the display type determining step; and an image processing step of displaying the images to be displayed in the form of moving image on the display screen with time lags in the display sequence, using the display parameters or the reproduction parameters altered in the parameter altering step.

With the above-described arrangement, the sequence of displaying a plurality of images to be displayed is provided with time lags and a plurality of image display sections for displaying a moving image are displayed. Therefore, it is possible to present a reproduced image not only in each of the image display sections but also according to the flow of the time series of the entire image display sections, while each of the reproduced images displayed in all the image display sections is displayed in a differentiated display mode or reproduction mode on a picture by picture basis or GOP by GOP basis as a function of the variation of the image so that it is possible to visually present the difference in the variations of images. Thus, the image processing method allows the operator to intuitively recognize the position in a reproduced image where a change is taking place and to do the operation of searching for the desired image parts from a series of images according to the video data of the images to be displayed and also the operation of editing them with ease.

Thus, according to the present invention, it is possible to realize an image processing apparatus and image processing method that can visually present the difference in the variations of images and allow the operator to intuitively recognize the position in a reproduced image where a change is taking place by way of a combination of such presentations and do the operation of searching for the desired image parts from a series of images according to the video data of the images to be displayed and also the editing operation with ease.

BRIEF DESCRIPTION OF THE DRAWINGS

FIG. 14 is a schematic illustration of an extending operation (1) in the display section.

FIG. 36 is a schematic illustration of the process of the data reducing section.

FIG. 41 is a schematic illustration of the process of the move information determining section.

FIG. 49 is a schematic illustration of display types.

FIG. 55 is a schematic illustration of example (1) of Fy file.

FIG. 56 is a schematic illustration of example (1) of display types.

FIG. 60 is a schematic illustration of example (2) of display types.

FIG. 64 is a schematic illustration of example (2) of Fy file.

FIG. 65 is a schematic illustration of example (3) of Fy file.

FIG. 66 is a schematic illustration of example (4) of Fy file.

FIG. 67 is a schematic illustration of example (3) of display type.

FIG. 70 is a schematic illustration of example (5) of Fy file.

FIG. 97 is a schematic illustration of the process for determining the display type of each frame of 1 GOP.

FIG. 101 is a schematic illustration of the method of displaying reproduced images according to a second embodiment of the invention.

FIG. 103 is a schematic illustration of a move of the image display section of another embodiment in a low speed replay operation.

BEST MODE FOR CARRYING OUT THE INVENTION

Now, an embodiment of the present invention will be described in detail by referring to the accompanying drawings.

(1) Configuration of Editing System Formed by Using this Embodiment

Figure 1:
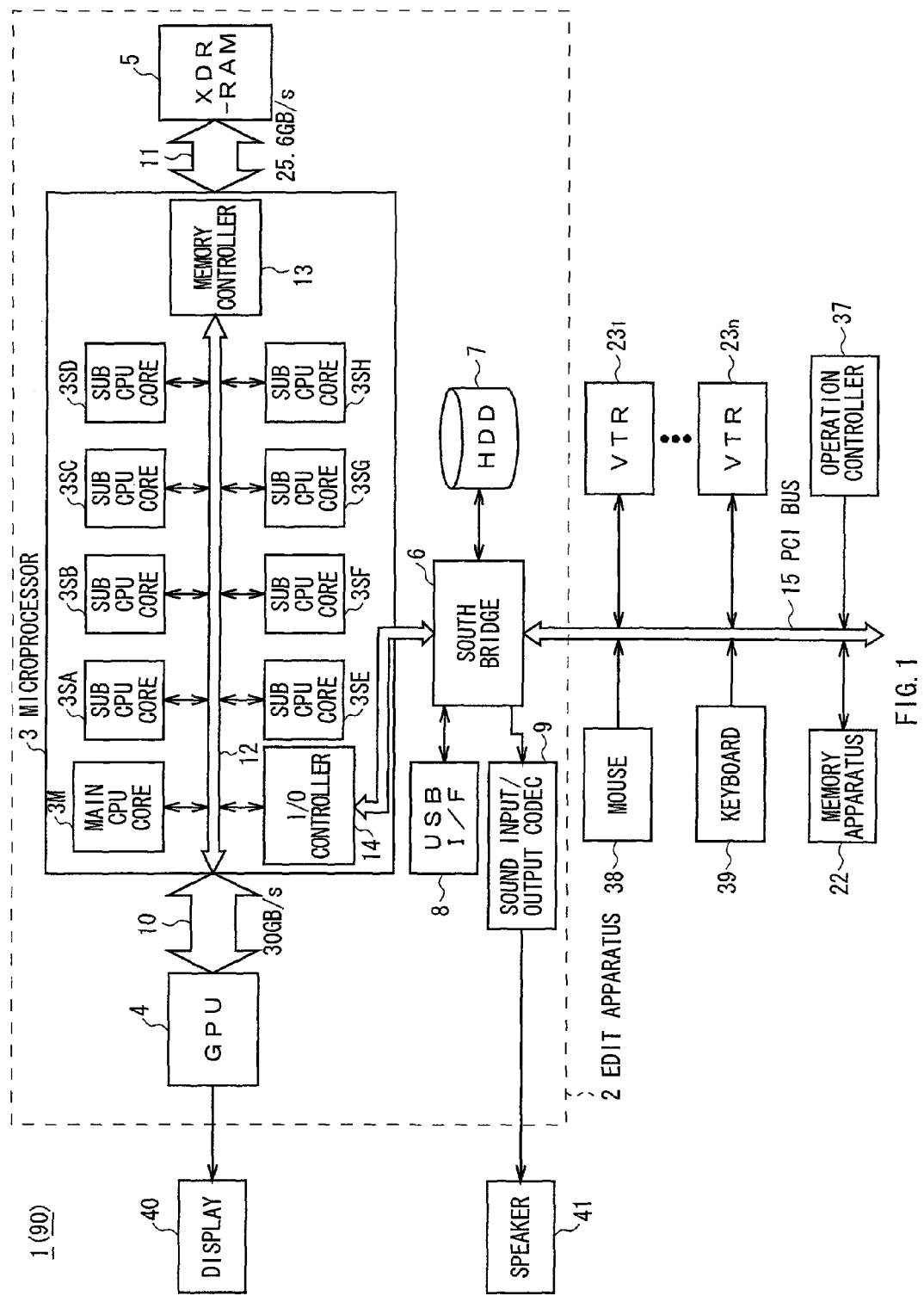
FIG. 1 is a schematic block diagram of an editing system according to the present invention, illustrating the configuration thereof.

Referring to FIG. 1, 1 generally denotes an editing system formed by using this embodiment, which comprises an editing apparatus 2, a memory apparatus 22 and a plurality of video tape recorders $23_1$ through $23_n$ as principal components.

With this editing system 1, the operator can take part or all of the images/sounds recorded on a video tape into the large capacity memory apparatus 22 having RAID (Redundant Arrays of Independent Disks) as one or more than one clips by way of the editing apparatus 2.

With this editing system 1, the operator can prepare an editing list specifying the editing breakdowns for obtaining desired edited images/sounds by linking the clips taken into the memory apparatus 22 in a desired manner and actually execute an editing process according to the prepared editing list. Additionally, the operator can accumulate the editing images and the edited sounds that are obtained as a result in the memory apparatus 22 and also record in video tapes by way of any of the video tape recorders $23_1$ through $23_n$.

In the editing apparatus 1, GPU 4, XDR (Extreme Data Rate)-RAM 5 and south bridge 6 are connected to microprocessor 3, while hard disk drive 7, USB interface 8 and sound input/output codec 9 are connected to the south bridge 6. Speaker 41 is connected to the sound input/output codec 9.

Mouse 38, keyboard 30, video tape recorders $23_1$ through $23_n$, the memory apparatus 22 and operation controller 37 are connected to the south bridge 6 by way of PCI bus 15. Display 40 is connected to the GPU 4.

Meanwhile, the microprocessor 3 has a multi-core structure where a general purpose main CPU core 3M for executing basic programs such as an OS (Operating System), a plurality of (eight in the case of FIG. 1) RISC (Reduced Instruction Set Computer) type signal processors (to be referred to as sub CPU cores hereinafter) 3SA through 3SH connected to the main CPU core 3M by way of internal bus 12, a memory controller 13 for controlling the memory of the XDR-RAM 5, which may typically have a capacity of 256 [Mbyte] and I/O (In/Out) controller 14 for managing the inputs from and the outputs to the south bridge 6, are integrally arranged in a single chip and can operate typically with an operating frequency of 4 [GHz].

The microprocessor 3 of the editing apparatus 1 mainly takes the role of codec such as MPEG decoder, JPEG2000, H.264/AVC (Advanced Video Coding) and so on and is adapted to executions of data transfers for the reproduced images obtained by decoding to GPU4, shifts of reproduction speed v (which will be described hereinafter) and physical arithmetic operations.

Particularly, each of the eight sub CPU cores 3SA through 3SH takes the role of a decoder in the microprocessor 3 and the eight sub CPU cores 3SA through 3SH can concurrently decode reproduced HD (High Definition) images in parallel.

The main CPU core 3M is adapted to execute processes and management jobs other than those that the eight sub CPU cores 3SA through 3SH do. It receives a command from the mouse 38, the keyboard 39 or the operation controller 37 by way of the south bridge 6 and executes one or more than one processes according to the command.

As pointed out above, the eight sub CPU cores 3SA through 3SH of the microprocessor 3 can concurrently decode reproduced HD (High Definition) images in parallel and transfer data between the microprocessor 3 and the GPU 4 at a maximum transfer rate of 30 [Gbyte/sec] by way of bus 10 having a large bandwidth so that it is possible to decode a large number of reproduced high definition images and transfer them in a short period of time.

More specifically, each of the eight sub CPU cores 3SA through 3SH can typically decode two reproduced HD images. In other words, the microprocessor 3 can transfer (in this case) sixteen reproduced high definition images to the GPU 4 at a time. Note, however, that the number of HD images that each of the sub CPU cores 3SA through 3SH can decode simultaneously is not limited to three and may be so adapted as to decode more reproduced images.

On the other hand, the GPU 4 has functional features of executing coordinate conversion arithmetic processes, processes for enlarging/reducing reproduced images and so on in addition to ultimate rendering processes relating to texture mapping and so on when moving reproduced images to be displayed on the display 40.

In fact, the microprocessor 3 reads out the necessary software stored in the hard disk drive 7 according to the control program stored in the hard disk drive 7 at each starting time and develops it on the XDR-RAM 5. Subsequently, the microprocessor 3 executes necessary control processes according to the software and the operations performed by the operator.

As a command for displaying a clip-take-in-window for taking in an image/sound recorded on a video tape into the memory apparatus 22 is input as a result of an operation using the mouse 38, the keyboard 39 or the operation controller 37, the microprocessor 3 controls the hard disk drive 7 to have it read out the corresponding image data in response and, at the same time, also controls the GPU 4 to have it display the clip-take-in-window on the display 40 for the image data.

Additionally, as a command for a replay operation is input to any of the video tape recorders $23_1$ through $23_n$ as a result of an operation using the mouse 38, the keyboard 39 or the operation controller 37, the microprocessor 3 controls the video tape recorders $23_1$ through $23_n$ in response and have the related one or more than one of the video tape recorder or recorders to operate for reproducing the specified video/audio signals of the specified clip.

Then, as a result, the video/audio signals reproduced from video tape mounted on the related one or more than one of the video tape recorder $23_1$ through $23_n$ is output and the video signals are applied to the GPU 4 sequentially by way of the PCI bus 15, the south bridge 66 and the microprocessor 3.

Then, under the control of the microprocessor 3, the GPU 4 executes a predetermined signal process on the video signals to be supplied and sends out the video signals obtained as a result of the signal process to the display 40 so that the images based on the video signals are displayed at a predetermined position in the clip-take-in-window. Meanwhile, the microprocessor 3 has the speaker 41 output sounds based on the audio signals by sending out the audio signals extracted from the video/audio signals to the speaker 41 by way of the sound input/output codec 9.

Then, consequently, the operator can specify the desired part of the sounds and images with use of the mouse 38, the keyboard 39 or the operation controller 37 based on the videos displayed on the display 40 and the sound output from the speaker 41 and further can register the management information such as a time code and material length of the in point and the out point by making the sound and video part clip, clip ID, clip name, time and date of shooting of the sound and video, time and date of creating the clip as meta data. Then, the management information of the clip registered as the meta data is registered in the clip management information database in the hard disk drive 7 under the control of the microprocessor 3.

Thereafter, the microprocessor 3 executes a replay operation of the videos and sounds of the specified clip by controlling the video tape recorders $23_1$ through $23_n$ as a result of an operation using the mouse 38, the keyboard 39 or the operation controller 37, and a command for taking in the clip is input.

Then, as a result, the video/audio signals of the clip reproduced from video tape is output from the video tape recorders $23_1$ through $23_n$ and the video signals are applied to the GPU 4 sequentially by way of the PCI bus 15, the south bridge 6, the microprocessor 3 and the bus 10. Additionally, the microprocessor 3 controls the GPU 4 and the memory apparatus 22 to store the video/audio signals of the clip applied from the video tape recorders $23_1$ the $23_n$ in the memory apparatus 22 by way of the GPU 4.

Thus, it is possible to reproduce the images and the sounds of a clip that are specified and take them into the memory apparatus 22 of the editing system 1.

On the other hand, the operator can have the editing system 1 display images to be edited (which will be described hereinafter) on the display 40 by way of a predetermined operation using the mouse 38, the keyboard 39 or the operation controller 37 and prepares an editing list specifying the breakdowns of the editing process telling which clip is to be linked to which clip in what manner by using the images to be edited. Additionally, the operator can check any of the images to be edited and the sounds to be edited on the editing list after or while preparing the editing list.

When a command for registering the editing list is input by the operator operating at the mouse 38 after the preparation of the editing list, the microprocessor 3 files all the editing data specified on the editing list by the operator and registers them in the editing list database in the hard disk drive 7.

Additionally, when a command for reproducing an image/sound to be edited on the editing list is input by the operator operating the mouse 38, the keyboard 39 or the operation controller 37 after or while preparing the editing list, the microprocessor 3 controls the memory apparatus 22 in response so as to have the memory apparatus 22 read out the necessary video/audio signals of the related clip.

Of the video/audio signals read out from the memory apparatus 22 in this way, the video signals are applied to the GPU 4 sequentially by way of the PCI bus 15, the south bridge 6, the microprocessor 3 and the bus 10. Thereafter, if necessary, the video signals are subjected to a special effect process at the GPU 4 under the control of the microprocessor 3.

Then, the GPU 4 executes a predetermined signal process on the signals to be edited obtained by executing a special effect process on the supplied video signals and sends out the video signals obtained as a result of the signal process to the display 40 under the control of the microprocessor 3.

Meanwhile, the microprocessor 3 executes a sound mixing process on the audio signals out of the video/audio signals and sends out the audio signals to be edited that are obtained as a result to the speaker 41 by way of the sound input/output codec 9.

Then, consequently, the image to be edited is displayed at a predetermined position in the editing image and the corresponding sound to be edited is output from the speaker 41. In this way, the operator can proceeds with an editing operation by means of the editing system 1, checking the images to be edited and the sound to be edited on the editing list.

Additionally, as the operator inputs a command for executing an editing process by operating the mouse 38, the keyboard 39 or the operation controller 37 after the preparation of the editing list, the microprocessor 3 controls the memory apparatus 22 in response so as to have the memory apparatus 22 read out the video/audio signals of clips to be used for the editing process and send them out to the GPU 4 by way of the PCI bus 15, the south bridge 6 and the bus 10.

At this time, if necessary, the GPU 4 executes a special effect process and a sound mixing process on the video/audio signals of each of the clips supplied to it as in the above-described reproduction mode and sends out the video signals to be edited that are obtained as a result to the memory apparatus 22 or the corresponding one of the video tape recorders $23_1$ through $23_n$ sequentially by way of the bus 10, the microprocessor 3, the south bridge 6, and the PCI bus 15 under the control of the microprocessor 3.

Then, the memory apparatus 22 stores the supplied video/audio signals at the position of the specified address under the control of the microprocessor 3. The corresponding one of the video tape recorders $23_1$ through $23_n$ records the supplied video/audio signals to be edited at the specified position of a video tape under the control of the microprocessor 3.

In this way, the specified image/sound of clip is edited and/or processed to a specified state and accumulated in the memory apparatus 22 or recorded in a video tape according to the editing data prepared in advance in the editing system 1.

Therefore, the operator can display images obtained as a result of execution of a special effect process on the reproduced images in the editing image displayed on the display 40 and also execute various extending operations and editing operations by means of the microprocessor 3 and the GPU 4 of the editing apparatus 2 of the editing system 1.

Meanwhile, the plurality of reproduced images that are decoded concurrently by the eight sub CPU cores 3SA through 3SH of the microprocessor 3 in parallel are transferred to the GPU 4 as data at a transfer rate that is maximally 30 [Gbyte/sec] so that complex images that are reproduced and subjected to a special effect process can be transferred smoothly at high speed.

Figure 2:
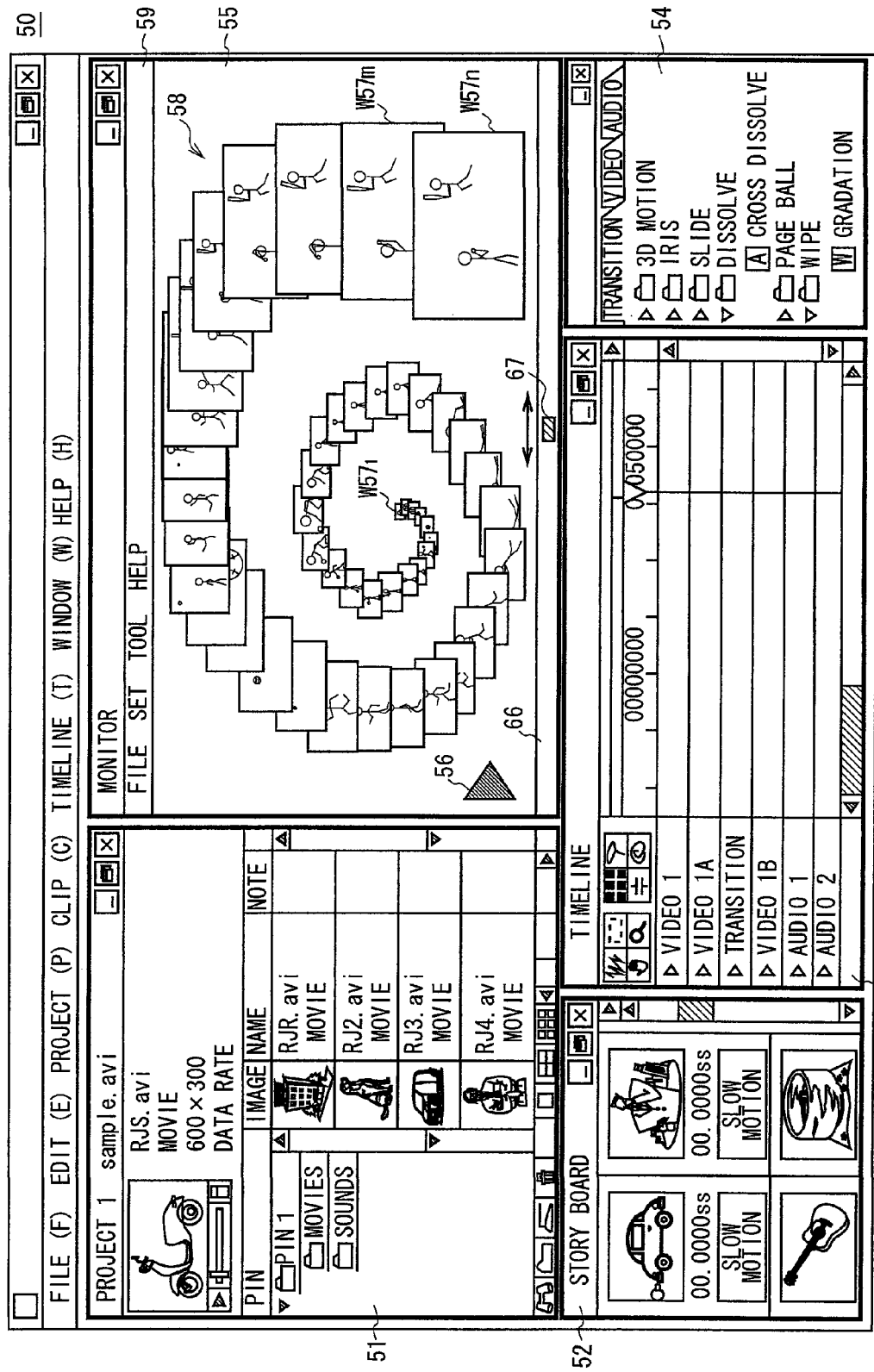
FIG. 2 is a schematic illustration of an editing image according to an embodiment of the present invention.

(2) Sequence of Operation on Editing Image (2-1) Method of Displaying Reproduced Images in Editing Image As the operator operates the mouse 38, the keyboard 39 or the operation controller 37 to input a command for displaying the editing image, the microprocessor 3 controls the hard disk drive 7 and the GPU 4 so as to have them display an editing image 50 as shown in FIG. 2 on the display 40.

Figure 104:
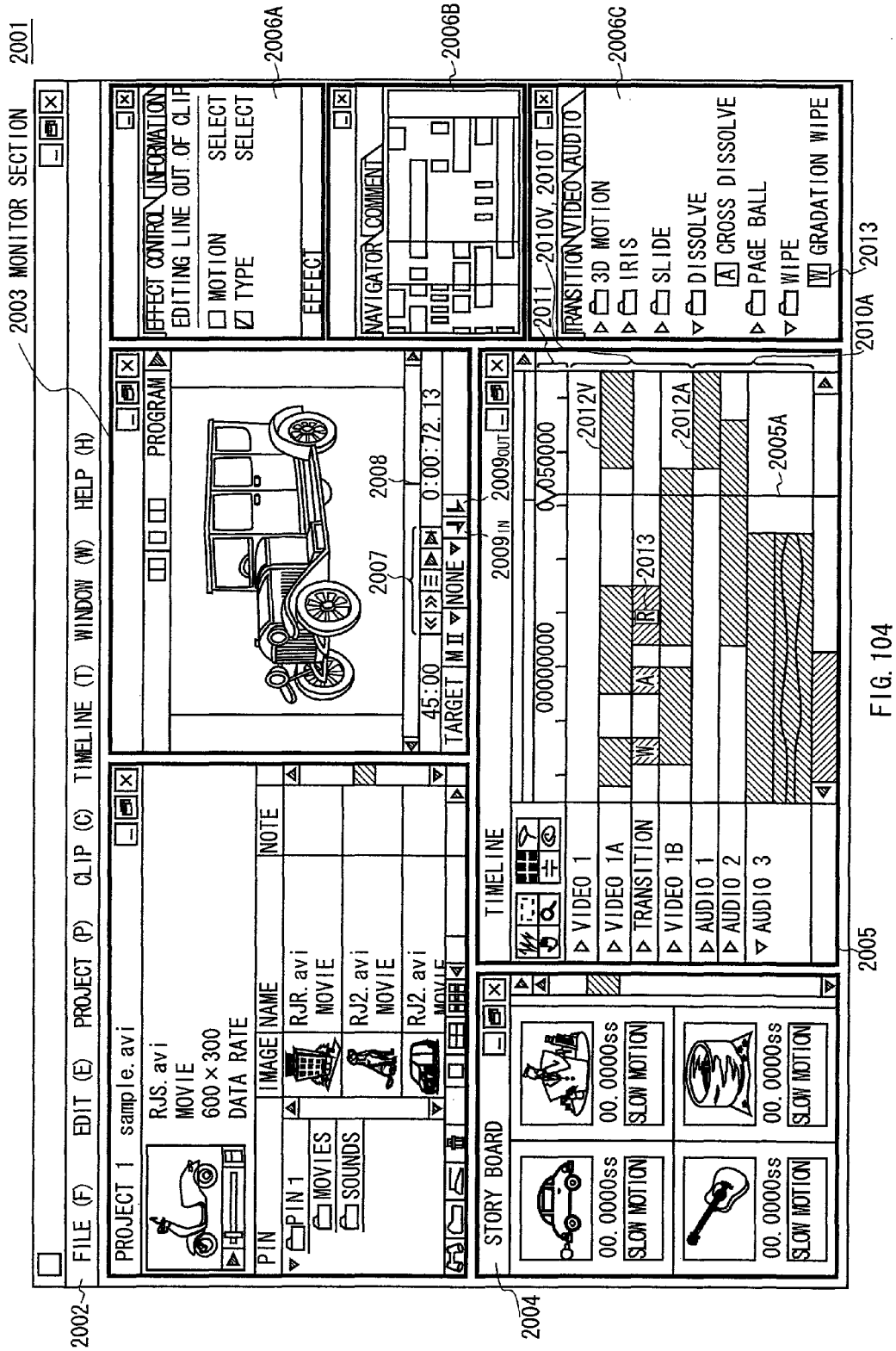
FIG. 104 is a schematic illustration of a conventional editing image, showing the configuration thereof.

The editing image 50 includes a clip synopsis display section 51, a story board section 52, a timeline section 53 and an effect information display section 54, which are same as the clip synopsis display section 2002, the story board section 2004, the timeline section 2005 and the effect information display sections 2006A through 2006C of the editing image 2001 described earlier by referring to FIG. 104, as well as a display section 55 having a functional feature specific to the editing image 50. Since editing operations are performed mainly by using the display section 55 of the editing image 50 as will be described hereinafter, the story board section 52 and the timeline section 53 are provided only as auxiliary sections.

Figure 3:
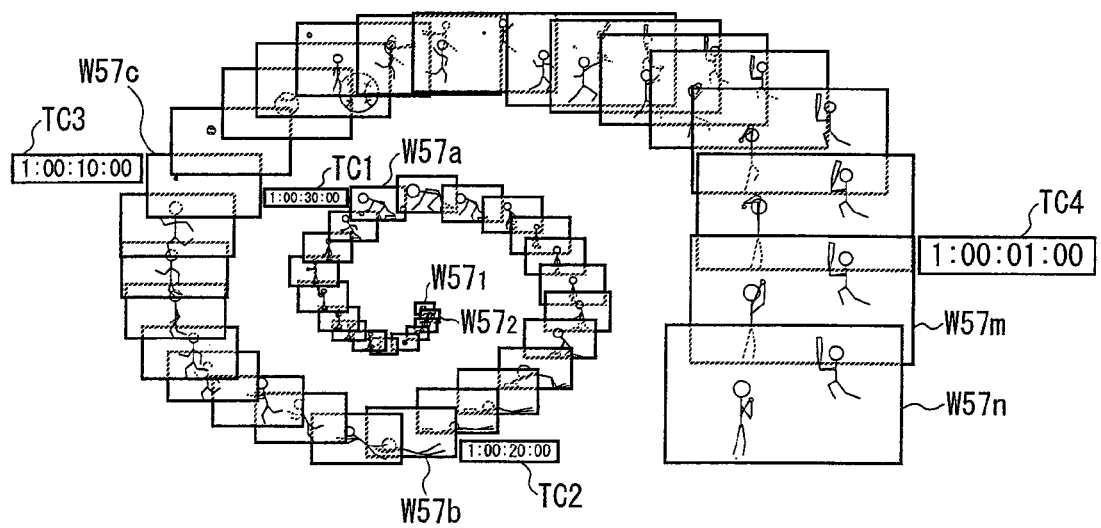
FIG. 3 is a schematic illustration of a group of spiral image display sections.

With respect to the display section 55 of the editing image 50, as shown in FIG. 3, the microprocessor 3 can display a group of spiral image display sections 58 formed by sequentially helically arranging a plurality of image display sections $W57_1$ through $W57_n$ suitable for displaying reproduced images of a clip of moving images typically showing a continuously moving flow from the backside of the image (to be referred to as distal side hereinafter) toward the foreside of the image (to be referred to as proximal side hereinafter).

Note that the image display sections $W57_1$ through $W57_n$ of the group of spiral image display sections 58 are arranged in such a way that the image display section $57_n$ located at the most proximal side of the image has the largest area and operates as reference image display section and the remaining image display sections have respective areas that gradually become smaller toward the distal end of the spirally arranged display sections and, when an image display section W57 located relatively at the proximal side and an image display section W57 located immediately behind it partly overlap each other, the overlapping part of the hind side image display section W57 is hidden by the corresponding part of the proximal side image display section W57.

However, translucent reproduced images are displayed in the respective image display sections $W57_1$ through $W57_n$ of the group of spiral image display sections 58 and hence, for example, the operator can visually confirm the part (indicated by broken lines) of the image display section $W57_m$ located immediately behind and partly hidden by the image display section $W57_n$ located at the most proximal side as a translucent image.

The microprocessor 3 acquires display information including the display sizes and the positions on the display section 55 of the plurality of image display sections $W57_1$ through $W57_n$ from the hard disk drive 7 and generates data of the images to be displayed respectively in the plurality of image display sections $W57_1$ through $W57_n$ by processing the reproduced images by means of the GPU 4 according to the display information. Note that the display positions of the plurality of image display sections $W57_1$ through $W57_n$ arranged in the display image are fixed in principle. In other words, the respective positions of the image display sections $W57_1$ through $W57_n$ to be viewed do not change so that the operator's view is not forced to stray and hence the operator can enjoy a remarkably comfortable visibility.

Figure 5:
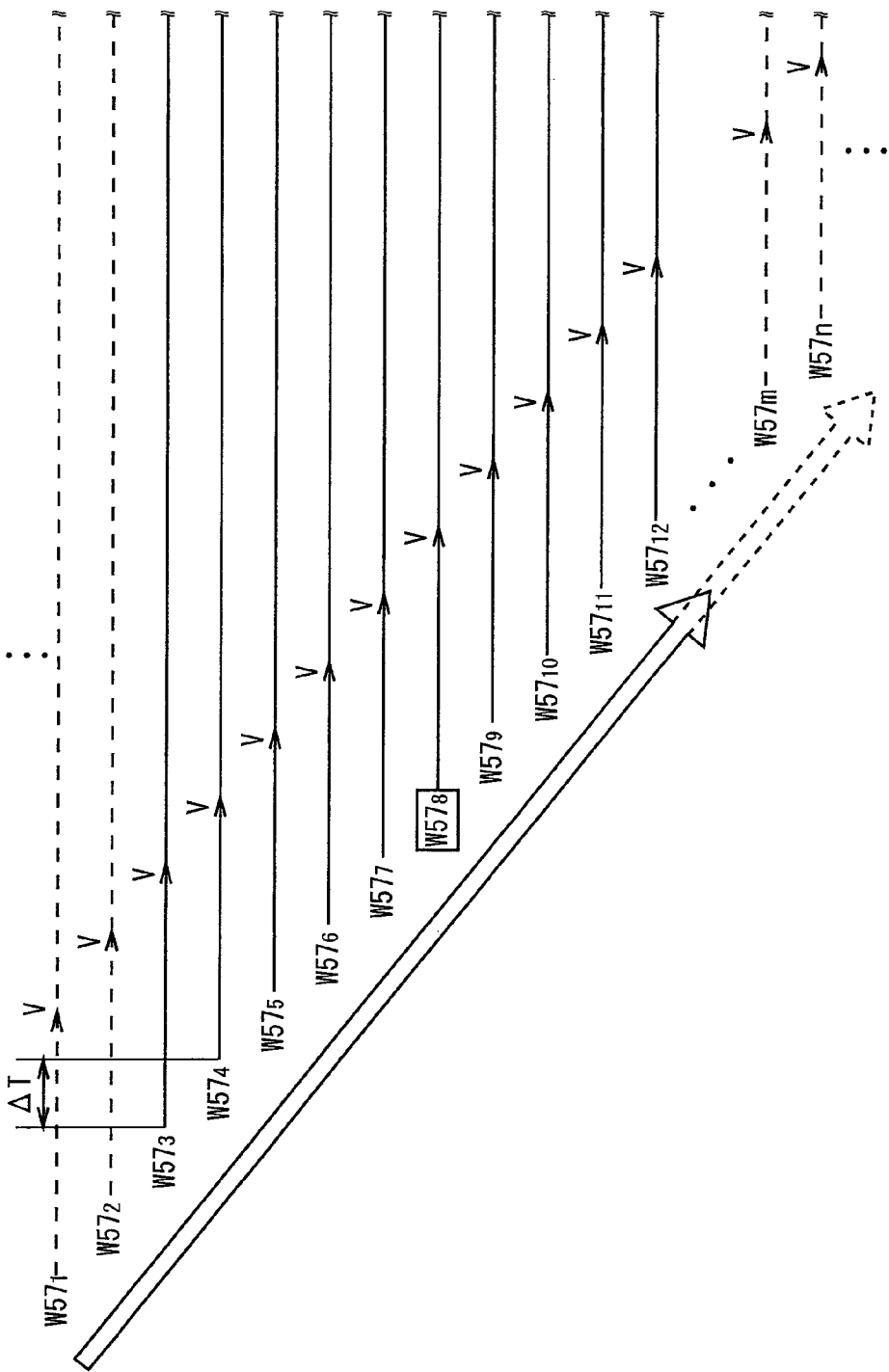
FIG. 5 is a timing chart illustrating the reproduction time lags of the reproduced images to be displayed in the respective image display sections.

In the editing image 50 (FIG. 2), for example, the clip that the operator wants may be moved out of the clips that are collectively being displayed in the clip synopsis display section 51 into the display section 55 in response to a drag and drop operation of the operator. Thereafter, as the microprocessor 3 recognizes that the replay button 56 displayed at the left bottom corner of the display section 55 is clicked, it reproduces images from the clip and displays them sequentially in the image display sections $W57_1$ through $W57_n$ of the group of spiral image display sections 58, starting from the image display section $W57_1$ located at the most distal side all the way through the adjacent image display sections located at the proximal side thereof $W57_2$, $W57_3$, ..., $W57_m$, $W57_n$ at predetermined time lags, or predetermined time intervals, (to be referred to reproduction time lags hereinafter) $\Delta T$ as shown in FIG. 5.

Figure 4:
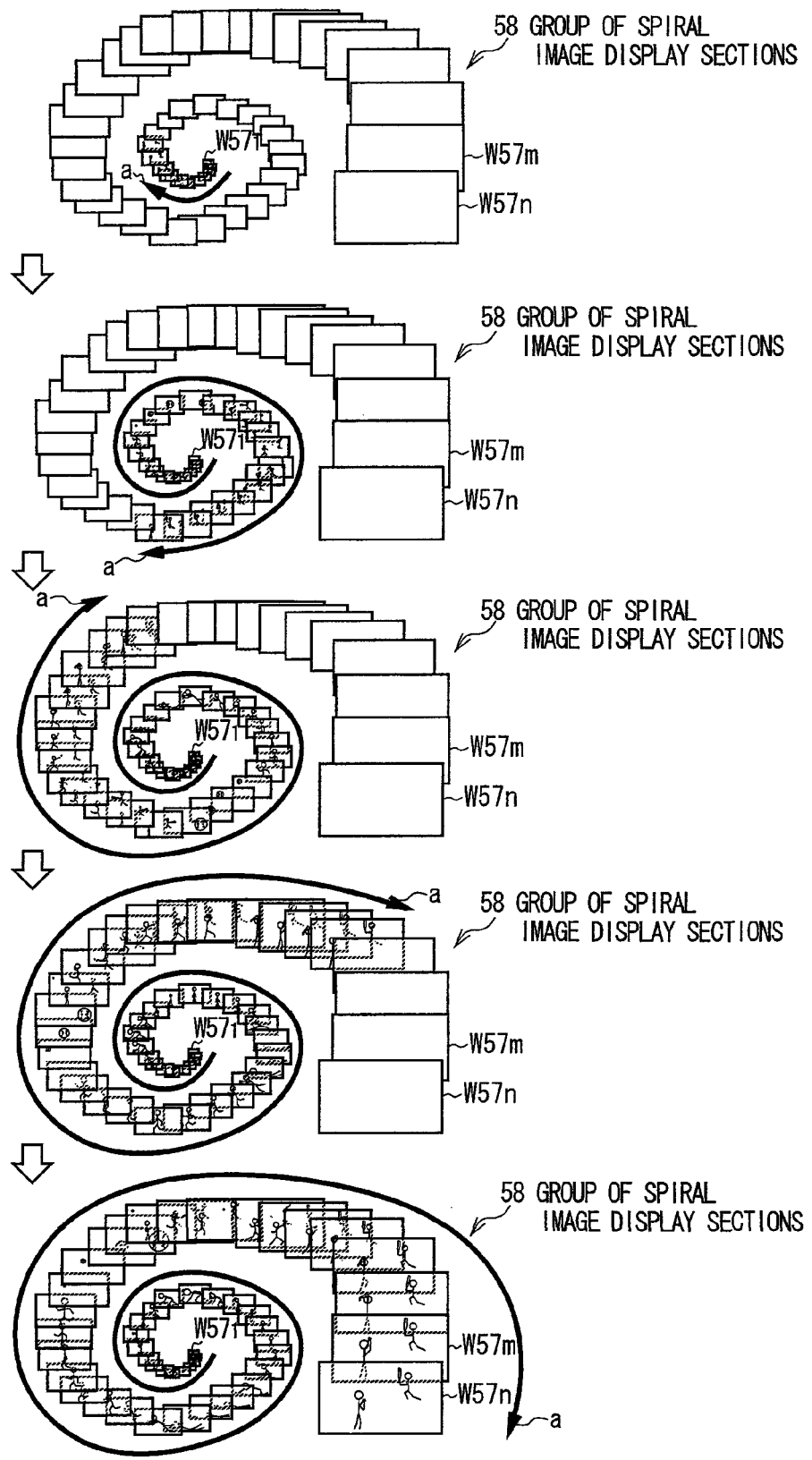
FIG. 4 is a schematic conceptual illustration of the order of reproduction for the image display sections of a group of spiral image display sections.

In other words, the reproduced images of the clip are displayed sequentially from the leading image, which is displayed first in the image display section $W57_n$ located at the most distal side and then, when a reproduction time lag $\Delta T$ elapses, the next image is displayed in the image display section $W57_2$ located next at the proximal side. When another reproduction time lag $\Delta T$ elapses, the next image is displayed in the image display section $W57_3$ located next further at the proximal side. In this way, the reproduced images are displayed sequentially in the image display sections $W57_1$ through $W57_n$ in the direction of arrows a (FIG. 4) as a flow along the time series.

Therefore, the microprocessor 3 can have the plurality of image display sections $W57_1$ through $W57_n$ sequentially display reproduced images of a clip in a coordinated and interlocked manner with reproduction time lags $\Delta T$ so as to make them to be viewed as a moving image as a whole in the plurality of image display sections $W57_1$ through $W57_n$ of the group of spiral image display sections 58.

Therefore, the operator who is visually checking the plurality of image display sections of the group of spiral image display sections 58 can view the reproduced images that are displayed with reproduction time lags $\Delta T$ so as to have an impression as if the images were drawing closer from the center of the spiral at the distal side toward the proximal side of the display screen and, at the same time, as if the operator him- or herself is moving toward the center of the spiral and hence toward the distal side of the display screen because the reproduced images being displayed at the distal side are temporally advanced relative to the reproduced image being displayed at the proximal side.

Thus, with the editing apparatus 2, if the operator misses the desired scene displayed in the image display section $W57_1$ of the plurality of $W57_1$ through $W57_n$ of the group of spiral image display sections 58, the desired scene is displayed without fail in the image display section $W57_2$ and the succeeding image display sections that appear sequentially from the proximal side of the display screen. Therefore, the operator is not compelled to do a cumbersome operation of rewinding the reproduced images that were once displayed in the image display sections $W57_1$ through $W57_n$ in order to search for the desired scene and may simply wait instead. In short, operations of searching for a scene and editing operations are remarkably facilitated.

The images of a clip that are displayed in the respective image display sections $W57_1$ through $W57_n$ of the group of spiral image display sections 58 are displayed at a predefined image updating rate, or a predefined image reproduction speed v. If the defined value v of the reproduction speed is large, the reproduced images are displayed on the image display sections $W57_1$ through $W57_n$ so as to make them appear as if moving at a high uniform speed. If, on the other hand, the defined value of the reproduction speed is small, the reproduced images are displayed on the image display sections $W57_1$ through $W57_n$ so as to make them appear as if moving at a slow uniform speed.

Particularly, since the image display sections $W57_1$ through $W57_n$ of the group of spiral image display sections 58 (FIG. 3) display reproduced images with reproduction time lags $\Delta T$, time code notification frames TC1 through TC4 are displayed at predetermined intervals of the image display sections $W57_1$ through $W57_n$ of the group of spiral image display sections 58 in order to notify the operator of the elapsed reproduction time of each of the image display sections $W57_1$ through $W57_n$ and assist the operator for the ongoing image searching operation and current editing operation. Note that, in the editing apparatus 2, it is possible to selectively display time code notification frames TC1 through TC4 for all the image display sections $W57_1$ through $W57_n$ or totally wipe them away when the operator does not need them.

Figure 7:
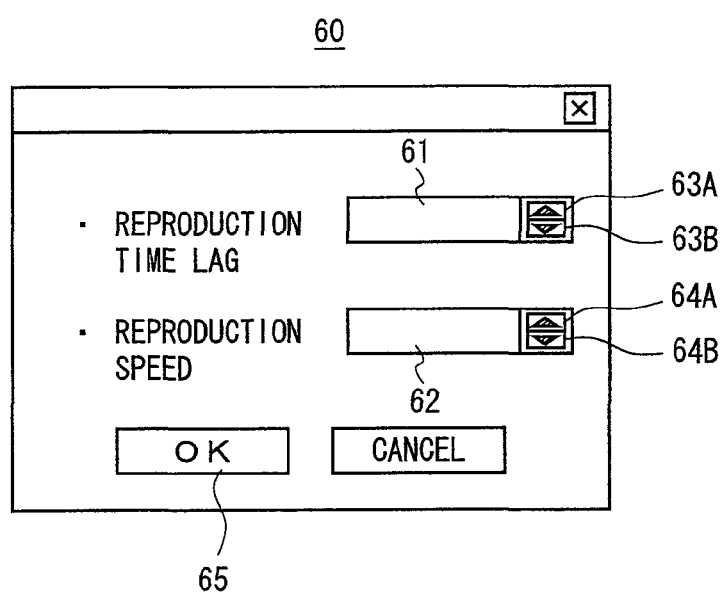
FIG. 7 is a schematic illustration of a dialog for specifying the reproduction time lag and the reproduction speed.

The initial value of reproduction time lag $\Delta T$ and that of reproduction speed v can be defined by using reproduction time lag/reproduction speed defining dialog 60 as shown in FIG. 7 that is displayed when the operator selects "reproduction time lag/reproduction speed" from the context menu (not shown) that is displayed when "setting" of the tool bar 59 being displayed in an upper part of the display section 55 is clicked.

When the operator actually defines the initial value of reproduction time lag $\Delta T$ and that of reproduction speed v, the operator simply needs to change the numerical value of the reproduction time lag $\Delta$ and that of the reproduction speed v shown respectively in the text boxes 61, 62 arranged in the reproduction time lag/reproduction speed dialog 60 to the ones he or she wants by clicking the corresponding ones of the up/down keys 63A, 63B, 64A, 64B or directly input the numerical values he or she wants by means of the keyboard 39 and subsequently click an "OK" button 65. Then, the numerical values displayed in the text boxes 61, 62 are set as the initial values of reproduction time lag $\Delta T$ and reproduction speed v respectively.

With this arrangement, for example, the microprocessor 3 of the editing apparatus 2 can have reproduced images displayed in the image display sections $W57_1$ through $W57_n$ with small reproduction time lags $\Delta T$ and a low reproduction speed v of the reproduced images and thus can display images of a narrow range of the clip as the group of spiral image display sections 58 or have reproduced image displayed in the image display sections $W57_1$ through $W57_n$ with large reproduction time lags $\Delta T$ and a low reproduction speed v of the reproduced images and thus can display images of a wide range of the clip as the group of spiral image display sections 58.

Figure 6:
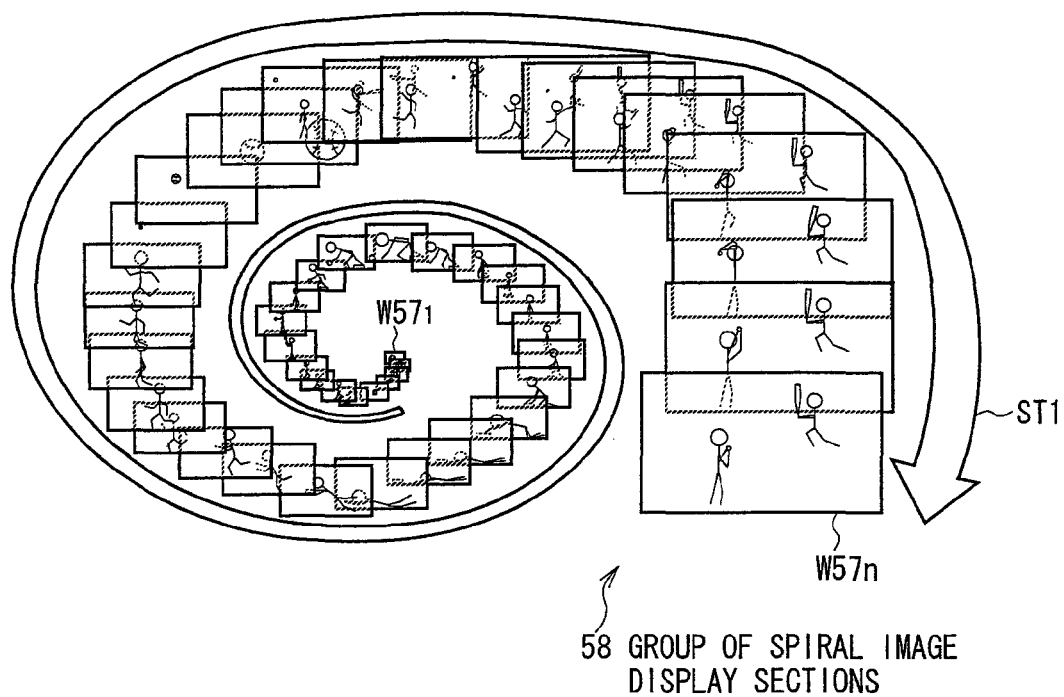
FIG. 6 is a schematic illustration of displaying images flowing in the forward direction.

In actuality, the reproduced images that are displayed in the image display sections $W57_1$ through $W57_n$ of the group of spiral image display sections 58 as shown in FIG. 6 may be displayed with a variable speed as the reproduction speed v is changed and/or may be displayed with arbitrarily selected time lags as the reproduction time lag $\Delta T$ is changed. Therefore, as a whole, the reproduced images are displayed with a variable speed in an interlocked manner like a vortex extending from a central part of the display screen and from the distal side toward the proximal side as indicated by thick arrow ST1.

Of the image display sections $W57_1$ through $W57_n$ of the group of spiral image display sections 58, the image display section $W57_1$ located at the center of the display screen and at the most distal side displays the image that is reproduced earliest, whereas the image display section $W57_n$ located at the most proximal side displays the image that is reproduced latest. Therefore, the operator can intuitively recognize that the reproduced images are being displayed in the progressing direction from the distal side toward the proximal side of the display screen in time series just like a vortex.

Figure 8:
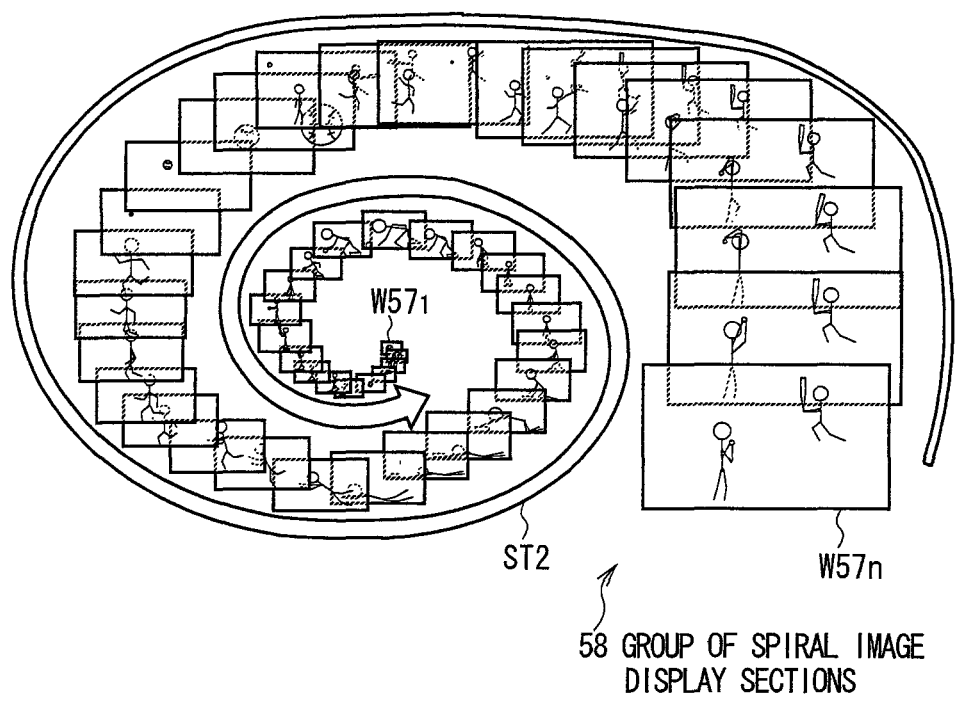
FIG. 8 is a schematic illustration of displaying images flowing in the reverse direction.

If −v is variable defined for the reproduction speed, the reproduced images that are displayed in the image display sections $W57_1$ through $W57_n$ are displayed in the regressing direction at a variable speed with arbitrarily selected time lags that may be changed according to the reproduction time lag ΔT that may also be variably defined as shown in FIG. 8. Therefore, as a whole, the reproduced images are displayed with a variable speed in an interlocked manner like a spiral extending from the proximal side toward the distal side of the screen as indicated by thick arrow ST2.

Additionally, when one or more than one groups of spiral image display sections 58 are already shown in the editing image 50 and another clip that is being displayed in the clip synopsis display section 51 is dragged and dropped, the editing apparatus 2 can display a group of spiral image display sections 58 that corresponds to the newly dragged and dropped clip in the display section 55 in addition to the one or more than one groups of spiral image display sections 58 that are already shown in the display section 55.

Conversely, in the editing image 50, when one or more than one groups of spiral image display sections 58 are already shown in the display section 55 and one or more than one groups of spiral image display sections 58 are selected and dragged and dropped into the clip synopsis display section 51, the editing apparatus 2 can delete the selected one or more than one groups of spiral image display sections 58 from the one or more than one groups of spiral image display sections 58 that are being displayed in the display sections 58. Alternatively, when the operator selects one or more than one groups of spiral image display sections 58 in the display section 55 and depresses the delete key, the editing apparatus 2 deletes the selected one or more than one groups of spiral image display sections 58.

Then, when a plurality of groups of spiral image display sections 58 are being displayed in the display section 55 and the operator selects a group of spiral image display sections 58 by operating the mouse and clicks the replay button 56, the editing apparatus 2 can display the reproduced images of a corresponding clip in the image display sections $W57_1$ through $W57_n$ of the group of spiral image display sections 58 at respective timings. Note that the initial value of reproduction time lag ΔT and that of reproduction speed v are those that are defined by means of the above-described reproduction time lag/reproduction speed defining dialog 60.

Now, the parallel decoding process sequence of the editing system 1 for decoding processes that are executed concurrently in parallel by means of the eight sub CPU cores 3SA through 3SH arranged in the microprocessor 3 of the editing apparatus 2 will be described below.

Figure 9:
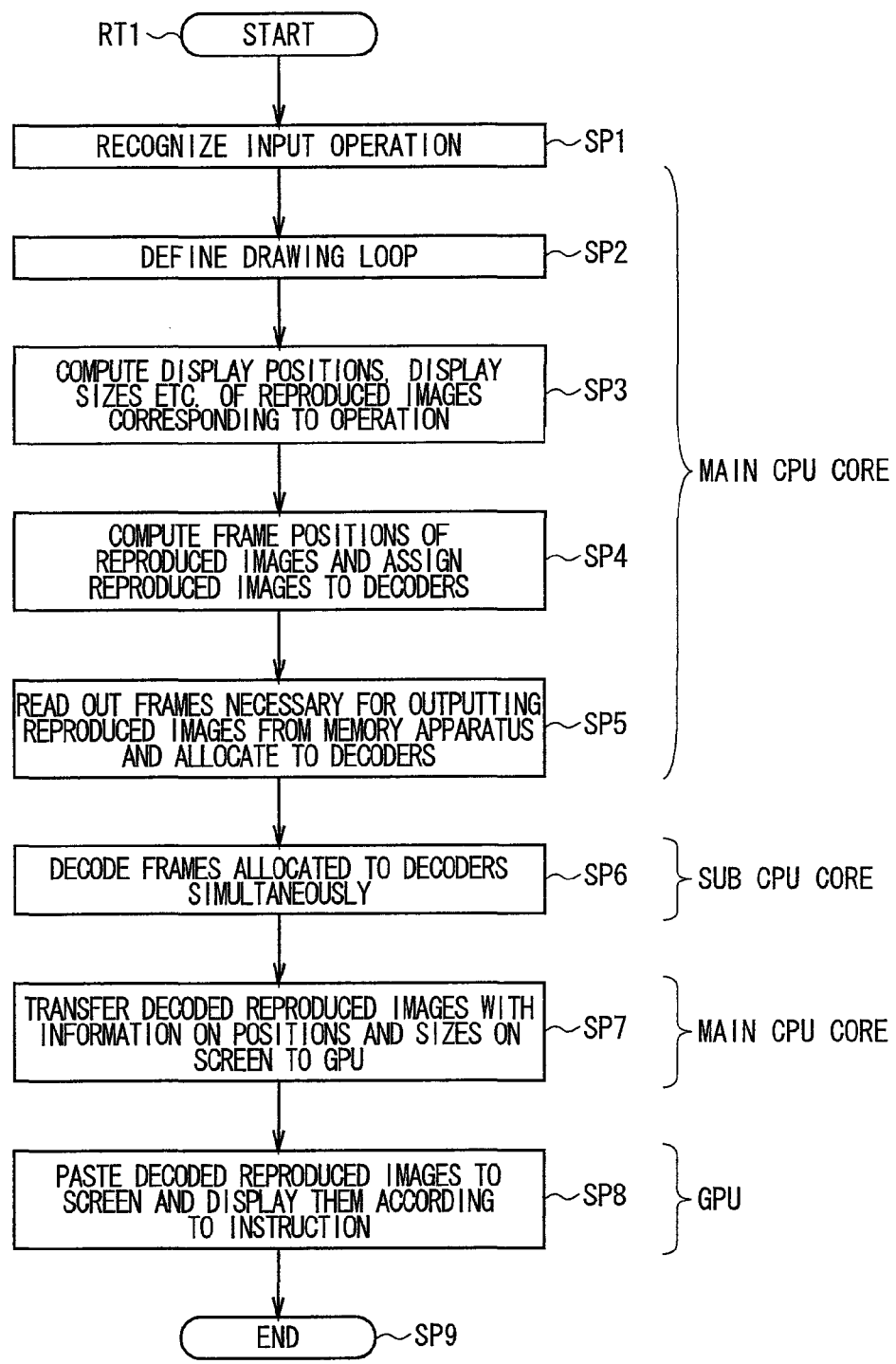
FIG. 9 is a flowchart, illustrating the parallel decoding process.

Referring to FIG. 9, the microprocessor 3 of the editing apparatus 2 moves to the starting step of routine RT1 and proceeds to Step SP1, where it takes the control signal input from the mouse 38 or the keyboard 39 into itself, or the microprocessor 3, by way of the south bridge 6. Upon recognizing the control signal by means of the main CPU core 3M, it moves to the next step, or Step SP2.

In Step SP2, if the control signal it recognizes in Step SP1 is a command for identifying the clip to be displayed in the image display sections $W57_1$ through $W57_n$, the microprocessor 3 of the editing apparatus 2 defines the drawing loop of the clip to be displayed on the image display sections $W57_1$ through $W57_n$ by means of the main CPU core 3M and then moves to the next step, or Step SP3.

In Step SP3, the microprocessor 3 of the editing apparatus 2 performs various physical arithmetic operations including those of defining the display positions and the display sizes of the reproduced images of the clip by means of the main CPU core 3M and then moves to the next step, or Step SP4.

In Step SP4, the microprocessor 3 of the editing apparatus 2 computes the positions of the frames of the reproduced images of the clip that constitute the drawing loop by means of the main CPU core 3M and also allocates the reproduced images of the clip to be displayed in the image display sections $W57_1$ through $W57_n$ to the sub CPU cores 3SA through 3SH for decoding before it moves to the next step, or Step SP5.

In Step SP5, the microprocessor 3 of the editing apparatus 2 reads out the frames necessary for outputting the reproduced images from the memory apparatus 22 and assigns them to the sub CPU cores 3SA through 3SH to which the reproduced images are allocated in Step SP4 before it moves to the next step, or Step SP6.

In Step SP6, the microprocessor 3 of the editing apparatus 2 concurrently decodes the frames allocated in Step SP5 in parallel by means of the eight sub CPU cores 3SA through 3SH that take the role of decoders and then moves to the next step, or Step SP7.

In Step SP7, the microprocessor 3 of the editing apparatus 2 transfers the plurality of reproduced images that are decoded in Step SP6 along with the display information (display sizes and display positions) of the positions and the sizes of the reproduced images to be displayed in the display section 55 on the display screen by high speed data transfer by means of the main CPU core 3M and then moves to the next step, or Step SP8.

In Step SP8, the microprocessor 3 of the editing apparatus 2 has the GPU 4 paste and display the plurality of reproduced images transferred from the main CPU core 3M on the predetermined positions of the image display sections $W57_1$ through $W57_n$ according to the display information (the display sizes and the display positions) and then moves to Step SP9 to end the process.

In this way, in the microprocessor 3 of the editing apparatus 2, the eight sub CPU cores 3SA through 3SH take the role of decoders for the reproduced images to be displayed on the image display sections $W57_1$ through $W57_n$ and concurrently decode the reproduced images in parallel and the microprocessor 3 transfers the reproduced and decoded images to the GPU 4 by way of the bus 10 of a broad band width for a high speed transfer typically at a maximum transfer rate of 30 [Gbyte/sec].

Thus, the microprocessor 3 of the editing apparatus 2 can decode a large number of reproduced high definition images and transfer them to the GPU 4 by a data transfer in a short period of time so that it can have the display section 55 highly responsively display the reproduced images with time lags in an interlocked manner in the group of spiral image display sections 58 so as to make them appear as a smoothly moving image as a whole.

On the other hand, when "setting" of the tool bar 59 being displayed in an upper part of the display section 55 is clicked and "sound output mode" is selected from the context menu (not shown) that is displayed accordingly in the editing image 50 (FIG. 2), the microprocessor 3 can select one of the sound output modes, for example either "main sound output mode" or "all sound output mode", for the reproduced image of a clip being displayed in the display section 55.

If "main sound output mode" is selected as sound output mode, only the reproduced sound accompanying to the reproduced image displayed in the image display section $W57_n$ located at the most proximal side of the group of spiral image display sections 58 that is currently being operated is output from the speaker 41. If, on the other hand, "all sound output mode" is selected as sound output mode, all the reproduced sounds accompanying to the reproduced images displayed in the image display sections $W57_1$ through $W57_n$ of the group of spiral image display sections 58 are output from the speaker 41 in such a way that the volume of the sound of a reproduced image displayed in a distal side image display section, which may be one of the image display sections $W57_m, \ldots, W57_1$, is reduced as a function of the distance from the image display section $W57_n$ located at the most proximal side.

However, if "all sound output mode" is selected as sound output mode and a predetermined extent of sound mixing is predictable because the reproduction time lag $\Delta T$ of the reproduced images displayed in the image display sections $W57_1$ through $W57_n$ is increased or because a change of scene is detected, the output sounds are automatically adjusted in such a way that the sounds of the reproduced images that are displayed in the most proximal image display section $W57_n$ and several image display sections $W57_m, \ldots$, located close to the former image display section are output from the speaker 41. With this arrangement, the microprocessor 3 can output sounds that are in a good condition and comfortably audible to the operator even in the "all sound output mode".

Figure 10:
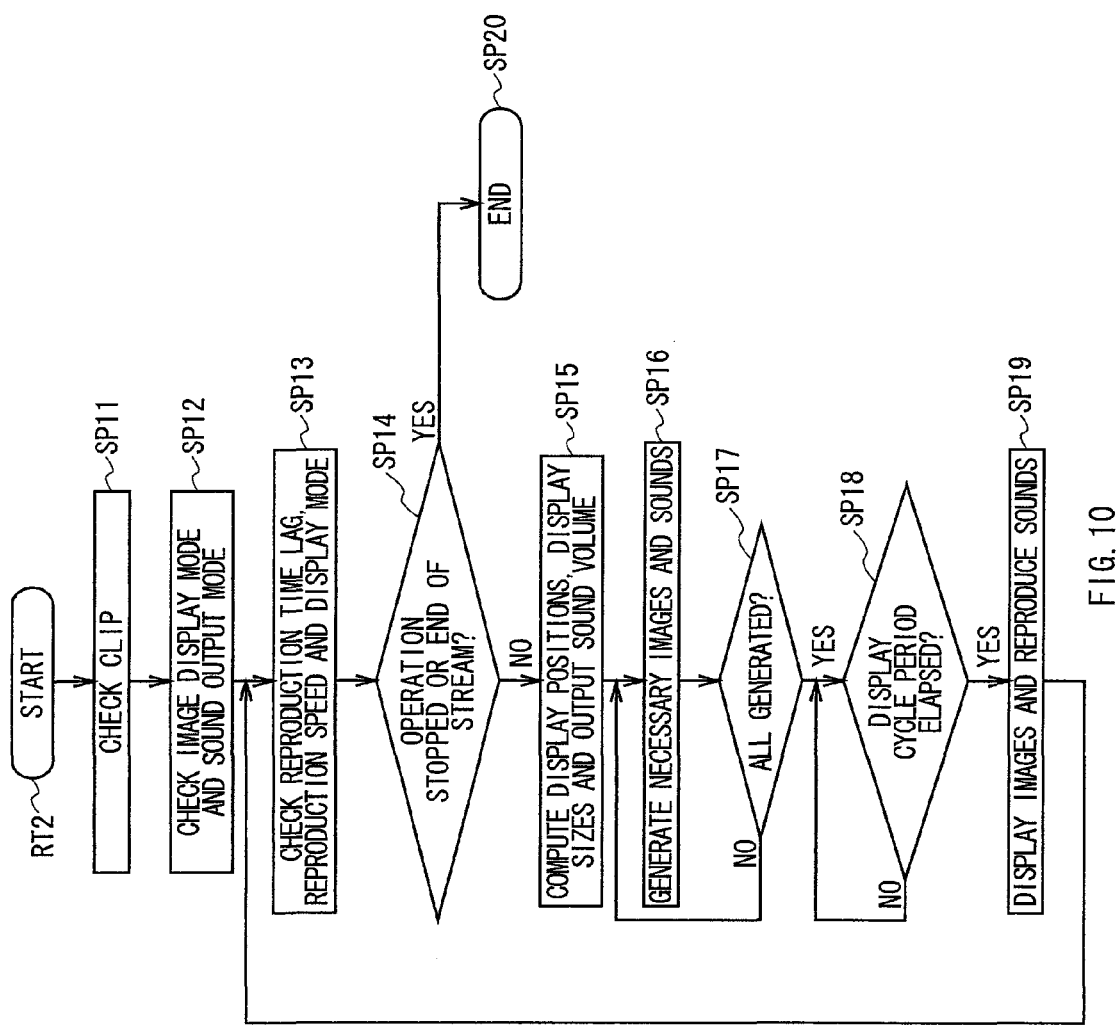
FIG. 10 is a flowchart illustrating the reproduction process sequence (display alternation process sequence).

(2-2) Process of Microprocessor Relating to Displaying Reproduced Images in Editing Image The microprocessor 3 is adapted to execute various processes relating to displaying reproduced images in the image display sections $W57_1$ through $W57_n$ of the group of spiral image display sections 58 and outputting reproduced sounds as described above according to a control program stored in the hard disk drive 7 (FIG. 1), following the reproduction process sequence RT2 illustrated in FIG. 10.

Namely, one of the clips in the clip synopsis display section 51 of the editing image 50 is dragged and dropped to the display section 55 and subsequently the replay button 56 (when a plurality of groups of spiral image display sections 58 are displayed in the display section 55, one of the groups of spiral image display sections 58 is selected and subsequently the replay button 56 is clicked) is clicked, the microprocessor 3 moves to the reproduction process sequence RT2 and in the next step, or Step SP11, it checks the clip ID of the clip corresponding to the group of spiral image display sections 58.

Thereafter, in Step SP12, the microprocessor 3 checks the initial value of the reproduction speed v (or −v) and that of the reproduction time lag $\Delta T$ of the reproduced images that are defined along with the selected sound output mode and then moves to the next step, or Step SP13, where it checks the reproduction speed v (or −v), the reproduction time lag $\Delta T$ and the display mode that may have been defined by means of the mouse 38, the keyboard 39 or the operation controller 37.

Then, in Step SP14, the microprocessor 3 determines if the operation is stopped or the stream of the clip has ended or not. If the answer to this question is positive, the microprocessor 3 moves to the next step, or Step SP20, where it suspends the updating process for the image display sections $W57_1$ through $W57_n$ of the group of spiral image display sections 58. If, on the other hand, the answer to the question is negative, the microprocessor 3 proceeds to the next step, or Step SP15.

In Step SP15, the microprocessor 3 computationally determines the display positions and the sizes of the reproduced images to be displayed respectively in the image display sections $W57_1$ through $W57_n$ of the group of spiral image display sections 58 and the output volumes of the sounds accompanying to the reproduced images.

Then, the microprocessor 3 moves to the next step, or Step SP16, where it controls the memory apparatus 22 according to the clip ID of the clip checked in Step SP11 so as to read out the video/audio signals of the clip at the defined reproduction speed v that has checked in Step SP12 and, if necessary, decodes the video/audio signals. As for the reproduced images of the video/audio signals, it also generates video signals necessary for displaying the reproduced images at the display positions and with the display sizes computationally determined in Step SP15 and then it temporarily accumulates them in a memory in the GPU 4.

Additionally, the microprocessor 3 generates the audio signals of the reproduced sounds accompanying to the reproduced images that correspond to the video signals with the volume level of the output sounds computationally determined for the reproduced images in Step SP15 and then it temporarily accumulates the audio signals in a memory in the sound input/output codec 9.

In Step SP17, the microprocessor 3 judges if the reproduced images and the reproduced sounds necessary to be output to all the image display sections $W57_1$ through $W57_n$ are ready or not. The microprocessor 3 returns to Step SP16 when the answer to the question is negative, whereas the microprocessor 3 proceeds to the next step, or Step SP18 when the answer to the question is positive.

In Step SP18, the microprocessor 3 monitors the elapse of the image display cycle time (reproduction time lag $\Delta T$) of the image display sections $W57_1$ through $W57_n$ and, when the image display cycle time has elapsed, it moves to the next step, or Step SP19, where it displays the group of spiral image display sections 58 by outputting reproduced images to the image display sections $W57_1$ through $W57_n$ and outputs the reproduced sounds accompanying to the reproduced images from the speaker 41 with the predetermined volume before it returns to Step SP13 to prepare the next reproduced images and the next reproduced sounds for the image display sections $W57_1$ through $W57_n$.

Note that the microprocessor 3 is adapted to reuse the video signals of the reproduced images that are reproduced before and left in the memory in the GPU 4 and generate only the video signals not found there to overwrite the data accumulated in the memory in the GPU 4, starting from the oldest data with the generated video signals.

(2-3) Various Operation Methods of Display Section of Editing Image

Now, the various operation methods that can be used for the display section 55 of the editing image 50 will be described below.

(2-3-1) Basic Operations

Figure 11:
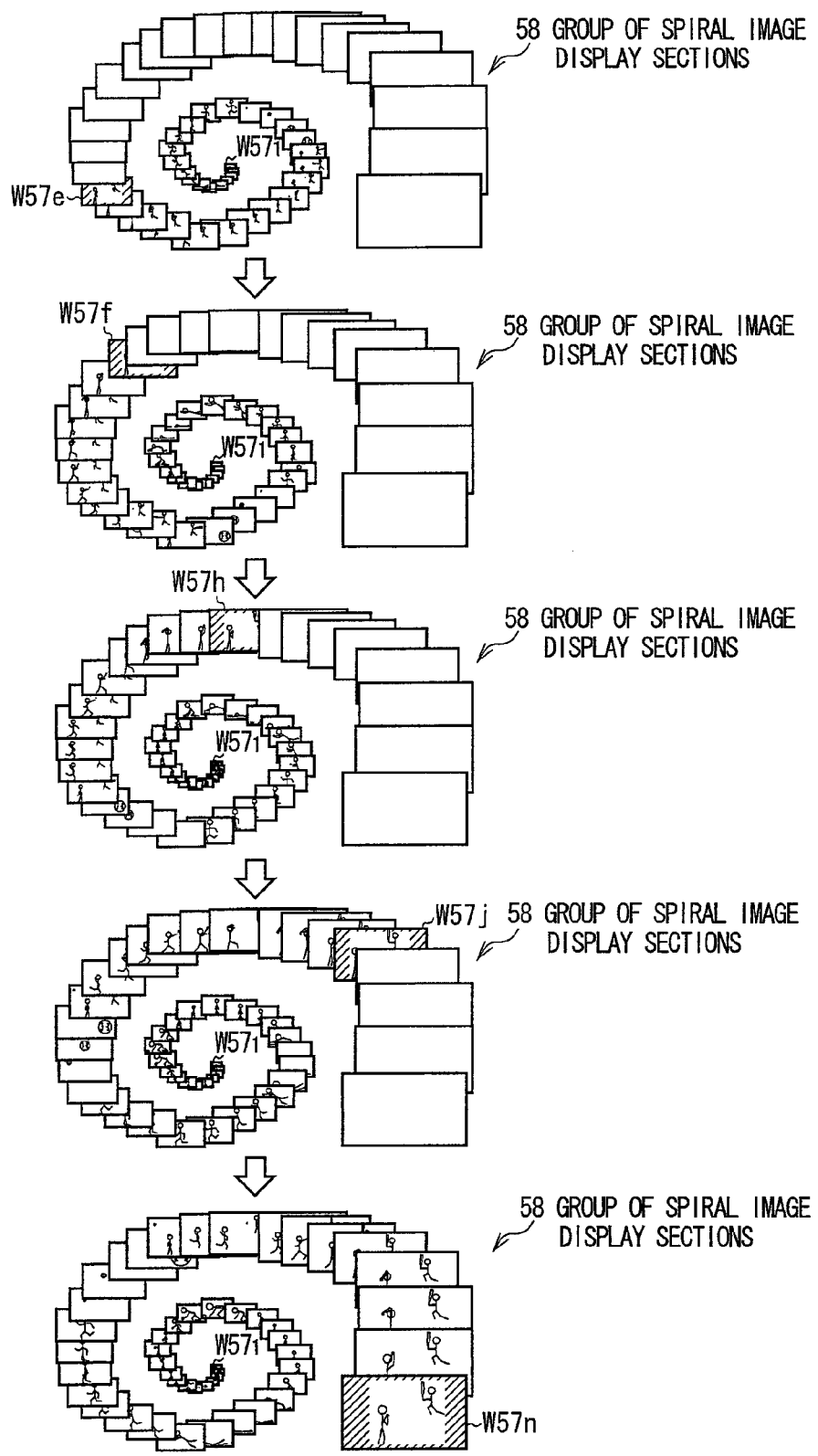
FIG. 11 is a schematic illustration of the basic operation (1) in the display section.

When, for example, the image display section $W57_e$ that is displaying the desired scene is clicked by the operator out of the reproduced images being displayed in the image display sections $W57_1$ through $W57_n$ of the group of spiral image display sections 58 (image display section $W57_e$ is clicked first) in the display section 55 of the editing image 50 as shown in FIG. 11, the microprocessor 3 displays the image display section $W57_e$ in an emphasized manner by coloring it in a predetermined color (hatched in FIG. 11) to indicate that the image display section $W57_e$ showing the reproduced image corresponds to the editing position in the editing operation.

Figure 12:
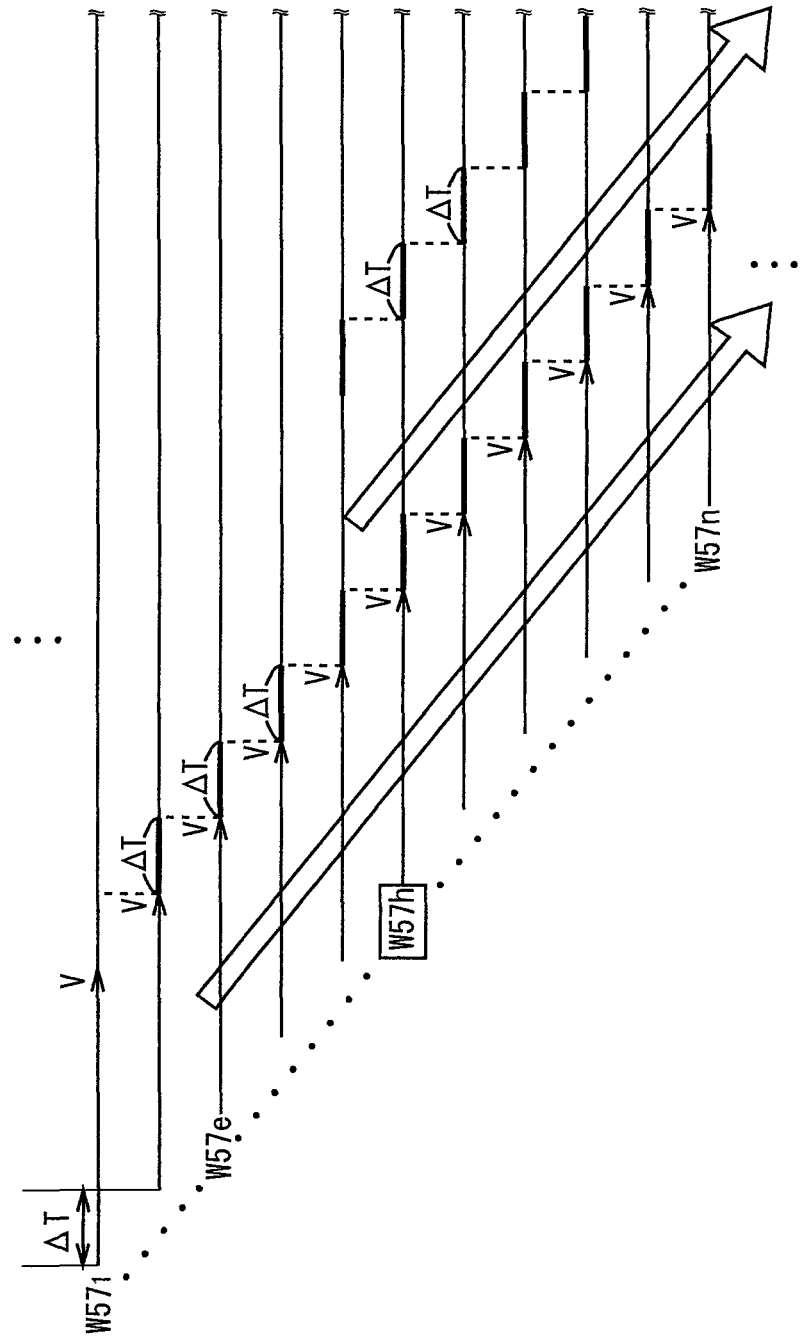
FIG. 12 is a timing chart of the flow of operation of a colored image display section.

Then, the microprocessor 3 moves the emphasized one of the image display sections $W57_1$ through $W57_n$, or the image display section $W57_e$, of the group of spiral image display sections 58 sequentially toward the image display sections $W57_h$, $W7_j$, ..., $W57_n$ that are located at the proximal side of the image display section $W57_e$ with the reproduction time lag $\Delta T$ according to the flow of the scene (flow of the time series of the reproduced image) in the group of spiral image display sections 58 as shown in FIGS. 11 and 12.

With this arrangement, the operator can instantaneously visually confirm one of the image display sections $W57_1$ through $W57_n$ that is currently displaying the desired scene on the basis of the flow of the emphasized display in the image display sections $W57_1$ through $W57_n$ of the group of spiral image display sections 58.

In other words, the emphasized display in the image display sections $W57_1$ through $W57_n$ of the group of spiral image display sections 58 is provided for the scene that the operator noticed first and corresponds to the editing position for the editing operation (e.g., image display section $W57_e$) and the emphasized display is continued if it is moved as the image display section reproducing the scene is changed sequentially to the image display sections $W57_h$, ..., $W57_j$, ..., $W57_n$. Therefore, the operator can instantaneously and intuitively recognize the scene it noticed first due to the emphasized display while the images are being displayed in the image display sections $W57_1$ through $W57_n$ so as to appear as if they are flowing in the direction indicated by the long and thick arrow in FIG. 12.

If the scene that the operator noticed first and corresponds to the editing position for the editing operation is the image display section $W57_h$ as indicated by the short and thick arrow in FIG. 12, the scene that the operator noticed is emphatically displayed so that the operator have an impression that the flow start there.

Figure 13:
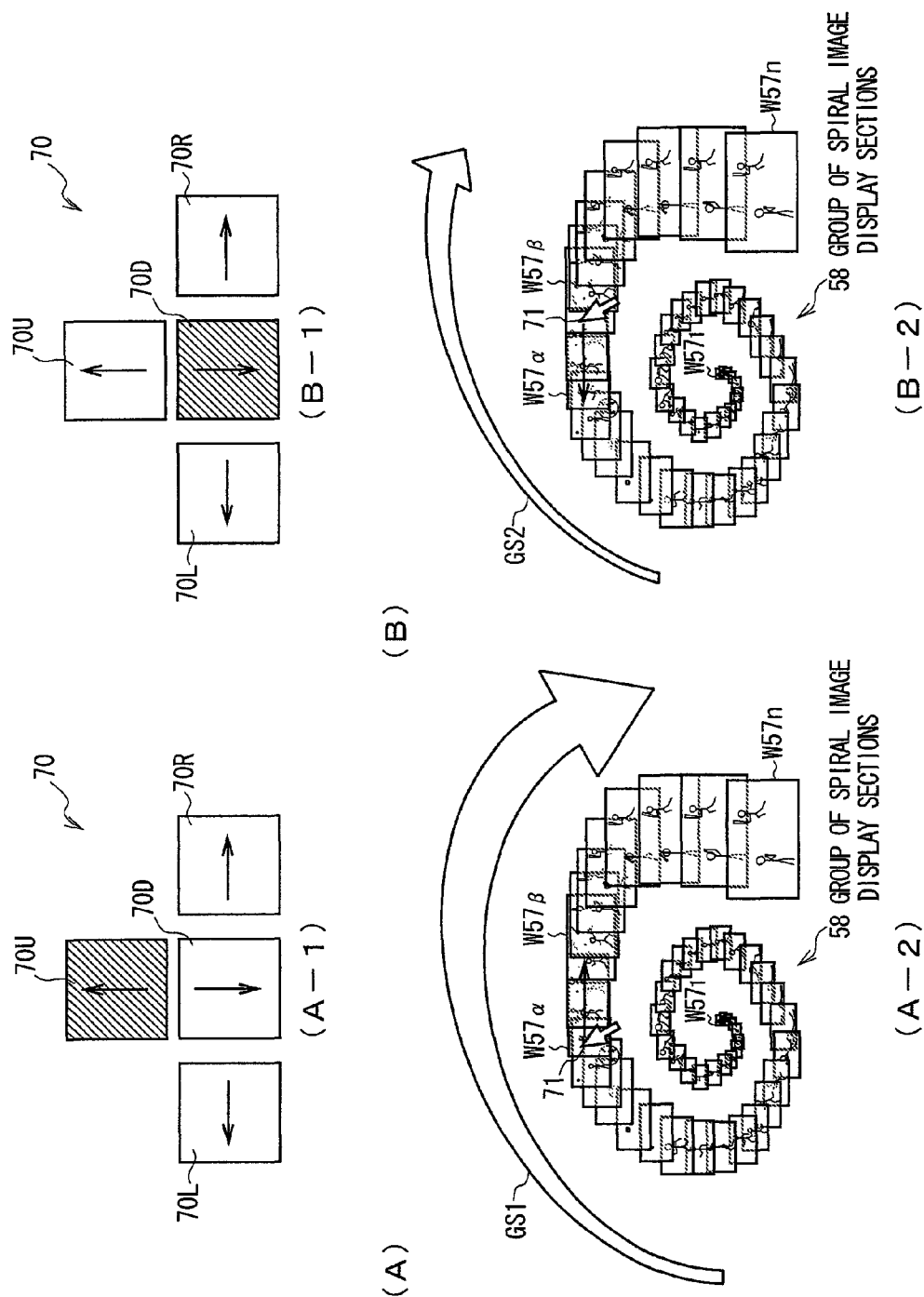
FIG. 13 is a schematic illustration of the basic operation (2) in the display section.

Referring to FIG. 13(A), when, for example, "up (↑)" key 70U that corresponds to the upward direction in the direction keys 70 of the keyboard 39 is depressed (FIG. 13(A-1)) or the cursor 71 is moved along, for example, the image display sections $W57_\alpha$ through $W57_\beta$ that are part of the image display sections $W57_1$ through $W57_n$ for a display operation input (FIG. 13(A-2)) while the right button of the mouse 38 is held depressed, the microprocessor 3 of the editing apparatus 2 can raise the image display speed of the clip.

More specifically, the microprocessor 3 acquires display state change information corresponding to the display operation input made by the mouse 38 by way of the PCI bus 15 and then raises the image display speed of the clip according to the contents of the display state change information.

The expression "raise the display speed of the images of the clip" as used herein means that the reproduction speed v of the reproduced images to be displayed in the image display sections $W57_1$ through $W57_n$ of the group of spiral image display sections 58 is increased and the reproduction time lag $\Delta T$ of the reproduced images between adjacent ones of the image display sections $W57_1$ through $W57_n$ is also increased in a coordinated manner accordingly.

The magnitude of the change in "the display speed of the reproduced images" is greater when the time during which the "up (↑) key" 70U is depressed or the cursor is driven to move along the image display sections $W57_1$ through $W57_n$ of the group of spiral image display sections 58 by a mouse operation is long. The longer the time, the greater the increase of both the reproduction speed v and the reproduction time lag $\Delta T$ so that the display speed of all the images of the clip (flow of each scene of the reproduced images) appears to be raised.

In other words, when the time during which the "up (↑) key" 70U is depressed or the cursor 71 is driven to move along the image display sections $W57_1$ through $W57_n$ of the group of spiral image display sections 58 by a mouse operation is prolonged, the display acceleration GS1 of the reproduced images displayed in the image display sections $W57_1$ through $W57_n$ of the group of spiral image display sections 58 is increased accordingly. Note that it may be alternatively so arranged that the display acceleration GS1 of the reproduced images is increased by the display section 55 as a function of the number of times by which the "up (↑) key" 70U is depressed instead of using the time.

Referring to FIG. 13(B), when, for example, "down (↓)" key 70D that corresponds to the downward direction in the direction keys 70 of the keyboard 39 is depressed (FIG. 13(B-1)) or the cursor 71 is moved along, for example, the image display sections $W57_\beta$ through $W57_\alpha$ that are part of the image display sections $W57_1$ through $W57_n$ for a display operation input (FIG. 13(B-2)) while the right button of the mouse 38 is held depressed, the microprocessor 3 of the editing apparatus 2 can reduce the image display speed of the clip.

More specifically, the microprocessor 3 acquires display state change information corresponding to the display operation input made by the mouse 38 by way of the PCI bus 15 and then reduces the image display speed of the clip according to the contents of the display state change information.

The expression "reduce the display speed of the images of the clip" as used herein means that the reproduction speed v of the reproduced images to be displayed in the image display sections $W57_1$ through $W57_n$ of the group of spiral image display sections 58 is decreased and the reproduction time lag $\Delta T$ of the reproduced images between adjacent ones of the image display sections $W57_1$ through $W57_n$ is also decreased in a coordinated manner accordingly.

The magnitude of the change in "the display speed of the reproduced images" is greater when the time during which the "down (↓) key" 70D of the keyboard 39 is depressed or the cursor 71 is driven to move along the image display sections $W57_1$ through $W57_n$ of the group of spiral image display sections 58 by a mouse operation is long. The longer the time, the greater the decrease of both the reproduction speed v and the reproduction time lag $\Delta T$ so that the display speed of all the images of the clip appears to be reduced.

In other words, when the time during which the "down (↓) key" 70D of the keyboard 39 is depressed or the cursor 71 is driven to move along the image display sections $W57_1$ through $W57_n$ of the group of spiral image display sections 58 by a mouse operation is prolonged, the display acceleration GS2 of the reproduced images displayed in the image display sections $W57_1$ through $W57_n$ of the group of spiral image display sections 58 is decreased accordingly. Note that it may be alternatively so arranged that the display acceleration GS2 of the reproduced images is decreased by the display section 55 as a function of the number of times by which the "down (↓) key" 70D of the keyboard 39 is depressed instead of using the time.

The reproduction speed v and the reproduction time lag $\Delta T$ fall (increase in the negative direction after the reproduction speed v or the reproduction time lag $\Delta T$ is reduced to become equal to "0"). In this case, the flow of the scenes of the reproduced images from the distal side toward the proximal side of the display screen in the group of spiral image display sections 58 gradually becomes slow and eventually stops and thereafter the flow is directed reversely from the proximal side toward the distal side of the vortex for reverse reproduction and the speed appears to be gradually rising.

Therefore, the operator who is visually checking the plurality of image display sections $W57_1$ through $W57_n$ of the group of spiral image display sections 58 has an impression that the reproduced images in the image display sections $W57_1$ through $W57_n$ are running away toward the center of the vortex, in other words, the operator him- or herself is moving away from the center of the vortex to the proximal side, due to the reproduced images for which reproduction time lags ΔT are provided to make them appear to progressively move from the proximal side toward the distal side of the vortex.

Additionally, when the cursor 71, which is being displayed so as to be able to freely move on the display section 55 of the editing image 50 in response to a mouse operation in a state where the left button of the mouse 38 is held depressed, is operated to press part of the group of spiral image display sections 58 at a same position for more than 1 second, for instance, the microprocessor 3 of the editing apparatus 2 stops the images of the clip. The expression "stop the images of the clip" as used herein means to display still images in the image display sections $W57_1$ through $W57_n$ of the group of spiral image display sections 58 in a state where the reproduction time lag ΔT is maintained.

(2-3-2) Extending Operations (2-3-2-1) Operation for Changing Reproduction Time Lag and Reproduction Speed In addition to the above-described basic operations, when an operation to "raise the display speed of the images of the clip" is performed and hence the "up (↑) key" 70U in the direction keys 70 of the keyboard 39 is depressed while the "shift" key of the keyboard 39 is held depressed or when the cursor 71 is moved along part of the reproduced images displayed in the group of spiral image display sections 58 by means of the cursor 71 so as to follow the flow of the group of spiral image display sections 58 from the distal side toward the proximal side of the display screen while the right button of the mouse 38 is held depressed, the microprocessor 3 of the editing apparatus 2 increases the reproduction time lag ΔT of the reproduced images displayed in adjacent ones of the image display sections $W57_1$ through $W57_n$, while holding the reproduction speed v of the reproduced images displayed in the image display sections $W57_1$ through $W57_n$ of the group of spiral image display sections 58 to a fixed value.

In this case, the microprocessor 3 acquires display state change information corresponding to the display operation input made by the keyboard 39 or the mouse 38 by way of the PCI bus 15 and then increases the reproduction time lag ΔT of the reproduced images displayed in the image display sections $W57_1$ through $W57_n$, while holding the reproduction speed v of the reproduced images displayed in the image display sections to a fixed value according to the contents of the display state change information.

Then, while the continuity of the reproduced images displayed in adjacent ones of the image display sections $W57_1$ through $W57_n$ may be reduced, it is possible to display reproduced images over an extended temporal range in the group of spiral image display sections as a whole.

On the other hand, when an operation to "reduce the display speed of the images of the clip" is performed and hence the "down (↓) key" 70D in the direction keys 70 of the keyboard 39 is depressed while the "shift" key of the keyboard 39 is held depressed or when the cursor 71 is moved along part of the reproduced images displayed in the group of spiral image display sections 58 by means of the cursor 71 so as to follow the flow of the group of spiral image display sections 58 from the distal side toward the proximal side of the display screen while the right button of the mouse 38 is held depressed, the microprocessor 3 of the editing apparatus 2 decreases the reproduction time lag ΔT of the reproduced images displayed in adjacent ones of the image display sections $W57_1$ through $W57_n$, while holding the reproduction speed v of the reproduced images displayed in the image display sections $W57_1$ through $W57_n$ of the group of spiral image display sections 58 to a fixed value.

In this case, the microprocessor 3 acquires display state change information corresponding to the display operation input made by the keyboard 39 or the mouse 38 by way of the PCI bus 15 and then decreases the reproduction time lag ΔT of the reproduced images displayed in the image display sections $W57_1$ through $W57_n$, while holding the reproduction speed v of the reproduced images displayed in the image display sections to a fixed value according to the contents of the display state change information.

Then, while images within a narrow time range are displayed in the group of spiral image display sections 58 as a whole, the continuity of the reproduced images displayed in the image display sections $W57_1$ through $W57_n$ is high and the reproduced images are sequentially displayed in the image display sections $W57_1$ through $W57_n$ with reduced reproduction time lags ΔT to make them appear as if flowing from the distal side toward the proximal side of the display screen in the group of spiral image display sections 58. The flow appears to be high when the reproduction time lags ΔT of the images displayed in adjacent ones of the image display sections $W57_1$ through $W57_n$ are reduced.

When, for example, an operation to "raise the display speed of the images of the clip" is performed while both the "shift" key and the "ALT" key of the keyboard 39 are held depressed, the microprocessor 3 of the editing apparatus 2 increases the reproduction speed v of the reproduced images displayed in the image display sections $W57_1$ through $W57_n$, while holding the reproduction time lags ΔT of the reproduced images displayed in adjacent ones of the image display sections $W57_1$ through $W57_n$ to a fixed value.

In this case again, the microprocessor 3 acquires display state change information corresponding to the display operation input made by the keyboard 39 or the mouse 38 by way of the PCI bus 15 and then increases the reproduction speed v of the reproduced images, while holding the reproduction time lags ΔT of the reproduced images to a fixed value according to the contents of the display state change information.

Then, as a result, the microprocessor 3 can make the flow of the scenes of the reproduced images in the group of spiral image display sections 58 faster, while displaying the reproduced images of a narrow time range relative to all the images of the clip in the group of spiral image display sections 58. Then, the continuity of the reproduced images displayed in adjacent ones of the image display sections $W57_1$ through $W57_n$ is raised.

When, for example, an operation to "reduce the display speed of the images of the clip" is performed while both the "shift" key and the "ALT" key of the keyboard 39 are held depressed, the microprocessor 3 of the editing apparatus 2 decreases the reproduction speed v of the reproduced images displayed in the image display sections $W57_1$ through $W57_n$, while holding the reproduction time lags ΔT of the reproduced images displayed in adjacent ones of the image display sections $W57_1$ through $W57_n$ to a fixed value.

In this case again, the microprocessor 3 acquires display state change information corresponding to the display operation input made by the keyboard 39 or the mouse 38 by way of the PCI bus 15 and then decreases the reproduction speed v of the reproduced images, while holding the reproduction time lags ΔT of the reproduced images to a fixed value according to the contents of the display state change information.

Then, as a result, it is possible to make the flow of the scenes of the reproduced images in the group of spiral image display sections 58 slower, while displaying the reproduced images of a narrow time range relative to all the images of the clip in the group of spiral image display sections 58. Then, the continuity of the reproduced images displayed in adjacent ones of the image display sections $W57_1$ through $W57_n$ is reduced.

(2-3-2-2) Instantaneous Forward Winding or Rewinding Operation of Reproduced Images When a display selecting operation of selectively displaying (grasping) part of the reproduced images being displayed in the group of spiral image display sections 58 (in the image display section $W57_i$) is performed within a second by means of the cursor 71, and the cursor 71 is moved to the image display section $W57_1$ from the distal side toward the proximal side of the display screen along the group of spiral image display sections 58 (FIG. 14(A-2)), as an operation of moving the group of spiral image display sections in a state where the "left (←)" key 70L in the direction keys 70 of the keyboard 39 is depressed (FIG. 14(A-1)) or the left button of the mouse 38 is depressed as shown in FIG. 14(A), the microprocessor 3 of the editing apparatus 2 in response moves the display positions of the image display sections $W57_1$ through $W57_n$ of the group of spiral image display sections 58 integrally with the cursor 71 in the direction in which the cursor 71 traces (in the direction from the distal side toward the proximal side of the display screen) along the group of spiral image display sections 58, while holding both the reproduction speed v of the reproduced images displayed in the group of spiral image display sections 58 and the reproduction time lags ΔT of the reproduced images of adjacent ones of the image display sections $W57_1$ through $W57_n$ to respective fixed values.

While the display positions where the image display sections $W57_1$ through $W57_n$ of the group of spiral image display sections 58 are arranged in the display screen are fixed in the above description, the microprocessor 3 of the editing apparatus 2 can move the display positions of the image display sections $W57_1$ through $W57_n$ in the display screen when an extending operation such as instantaneous forward winding operation or an instantaneous rewinding operation is conducted.

In this case, the microprocessor 3 acquires display state change information that corresponds to the operation of moving the group of spiral image display sections 58 by means of the keyboard 39 or the mouse 38 by way of the PCI bus 15 and moves the display positions of the image display sections $W57_1$ through $W57_n$ of the group of spiral image display sections 58 integrally with the cursor 71 from the distal side toward the proximal side of the display screen along the group of spiral image display sections 58, while holding both the reproduction speed v and the reproduction time lag ΔT of the reproduced images to respective fixed values according to the contents of the display state change information.

Figure 15:
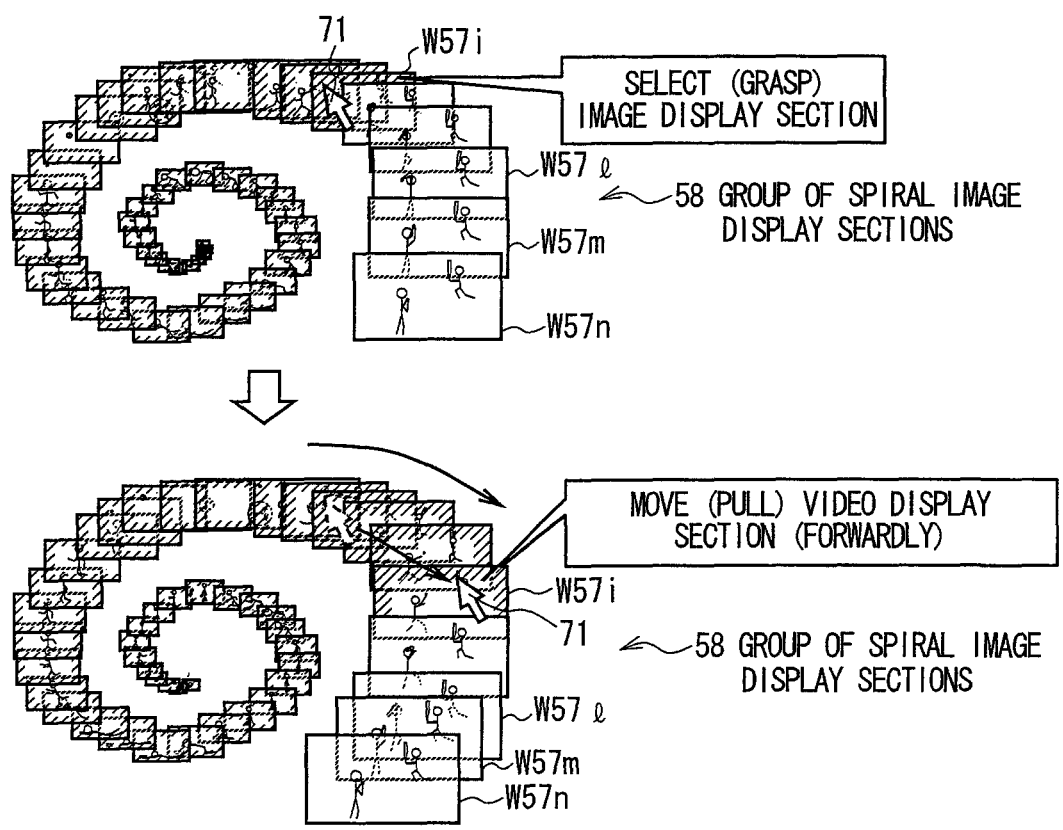
FIG. 15 is a schematic illustration of move (1-1) of an image display section by an extending operation.
Figure 16:
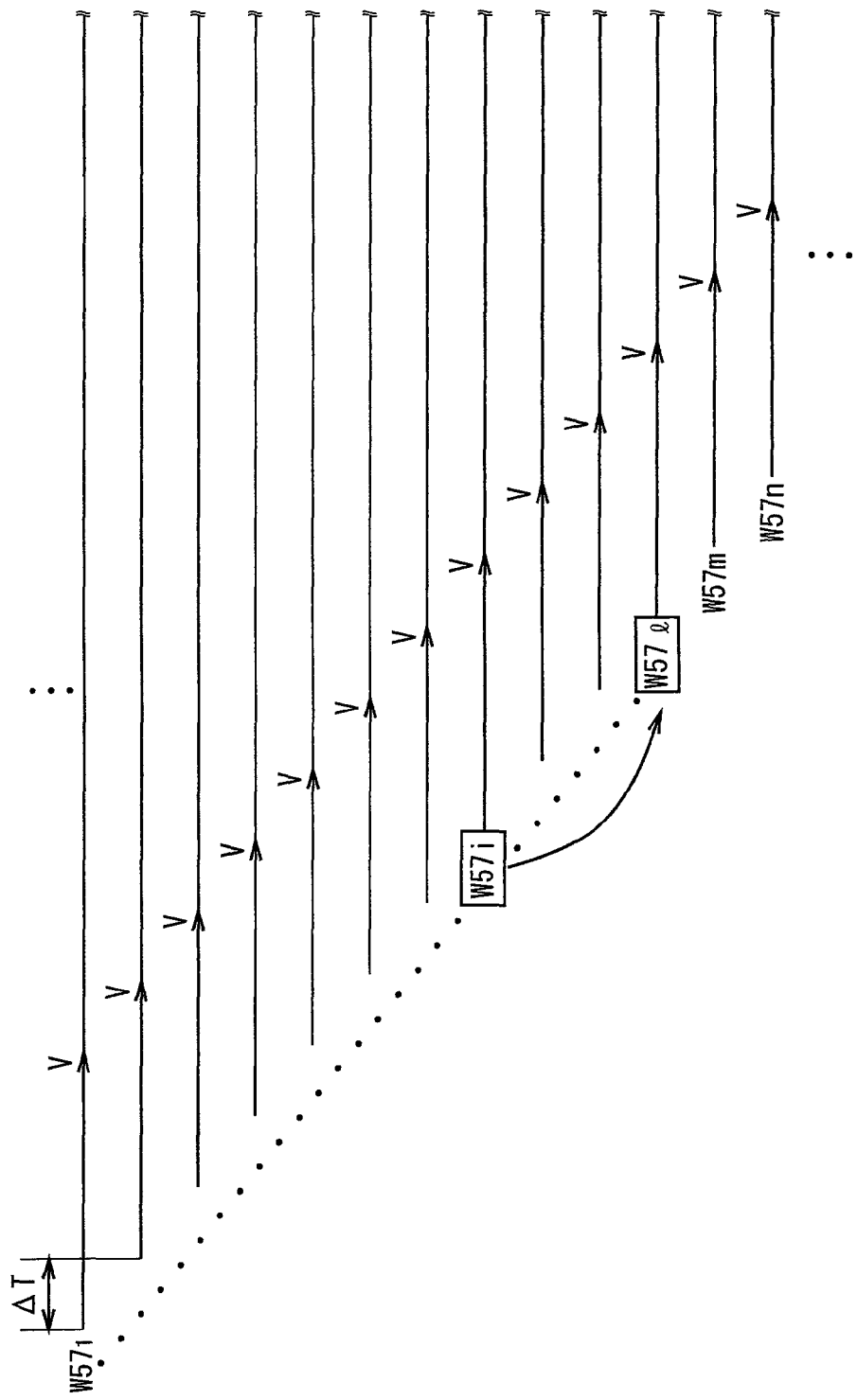
FIG. 16 is a timing chart of move (1-2) of an image display section by an extending operation.

At this time, the image display sections $W57_1$ through $W57_n$ of the group of spiral image display sections 58 that are displaying the reproduced images are shifted to and displayed at the positions traced by the cursor 71 as shown in FIG. 16. Then, accordingly, the image display sections $W57_1$ through $W57_n$ that are displayed at the respective positions are entirely shifted toward the proximal side by the amount of movement of the cursor 71 along the spiral and the sizes of displaying the shifted image display sections $W57_n$, $W57_m$, . . . are slightly enlarged (FIG. 15).

When a display selecting operation is performed for image display section $W57_i$ (FIG. 15), the microprocessor 3 emphatically displays the image display section $W57_i$ (part surrounded by broken lines) and also sequentially emphatically displays the image display sections W57, . . . that precede the image display section $W57_i$ in the order of display to make the operator intuitively recognize the flow to the move starting point of the image display section $W57_i$.

At this time, the microprocessor 3 temporarily and instantaneously suspends (holds) the image data of the image being displayed in the image display section $W57_1$ or the image data of all the images being displayed in the image display sections $W57_1$ through $W57_n$ to keep the current condition and makes the operator to visually confirm that condition.

As for the reproduced sounds accompanying to the reproduced images being displayed in the image display sections $W57_1$ through $W57_n$, only the reproduced sound accompanying to the reproduced image that is being displayed in the image display section $W57_n$ located at the most proximal side (FIG. 14(A-2)) at this time is output when a main sound output mode is selected as sound output mode, whereas the output volumes of the reproduced sounds are adjusted in such a way that the volume of the reproduced sound accompanying to the reproduced image being displayed in each of the image display sections $W57_m$, $W57_l$, $W57_k$, . . . that are remote from the image display section $W57_n$ located at the most proximal position on the three-dimensional spiral is reduced as a function of the distance from the image display section $W57_n$, when an all sound output mode is selected.

When a display selection release operation is performed as input operation to release a display selection operation for the image display section $W57_i$, the microprocessor 3 releases the image data of the image to be displayed in the image display section $W57_i$ or the video of all the images to be displayed in the image display sections $W57_1$ through $W57_n$ and once again have the plurality of image display sections $W57_1$ through $W57_n$ display the images in the proper order in a coordinated manner so as to make them appear as if a moving image in the group of spiral image display sections 58.

When, on the other hand, an operation of selectively displaying (grasping) part of the reproduced images being displayed in the group of spiral image display sections 58 (in the image display section $W57_1$) is performed within a second by means of the cursor 71, and the cursor 71 is moved to the image display section $W57_i$ from the distal side toward the proximal side of the display screen along the group of spiral image display sections 58 (FIG. 14(B-2)) as an operation of moving the group of spiral image display sections in a state where the "right (→)" key 70R in the direction keys 70 of the keyboard 39 is depressed (FIG. 14(B-1)) or the left button of the mouse 38 is depressed as shown in FIG. 14(B), the microprocessor 3 of the editing apparatus 2 in response moves the display positions of the image display sections $W57_1$ through $W57_n$ of the group of spiral image display sections 58 integrally with the cursor 71 in the direction in which the cursor 71 traces (in the direction from the proximal side toward the distal side of the display screen) along the group of spiral image display sections 58, while holding both the reproduction speed v of the reproduced images displayed in the group of spiral image display sections 58 and the reproduction time lags $\Delta T$ of the reproduced images of adjacent ones of the image display sections $W57_1$ through $W57_n$ to respective fixed values.

In this case, the microprocessor 3 acquires display state change information that corresponds to the operation of moving the group of spiral image display sections 58 by means of the keyboard 39 or the mouse 38 by way of the PCI bus 15 and moves the display positions of the image display sections $W57_1$ through $W57_n$ of the group of spiral image display sections 58 integrally with the cursor 71 from the proximal side toward the distal side of the display screen along the group of spiral image display sections 58, while holding both the reproduction speed v and the reproduction time lag $\Delta T$ of the reproduced images to respective fixed values according to the contents of the display state change information.

Figure 17:
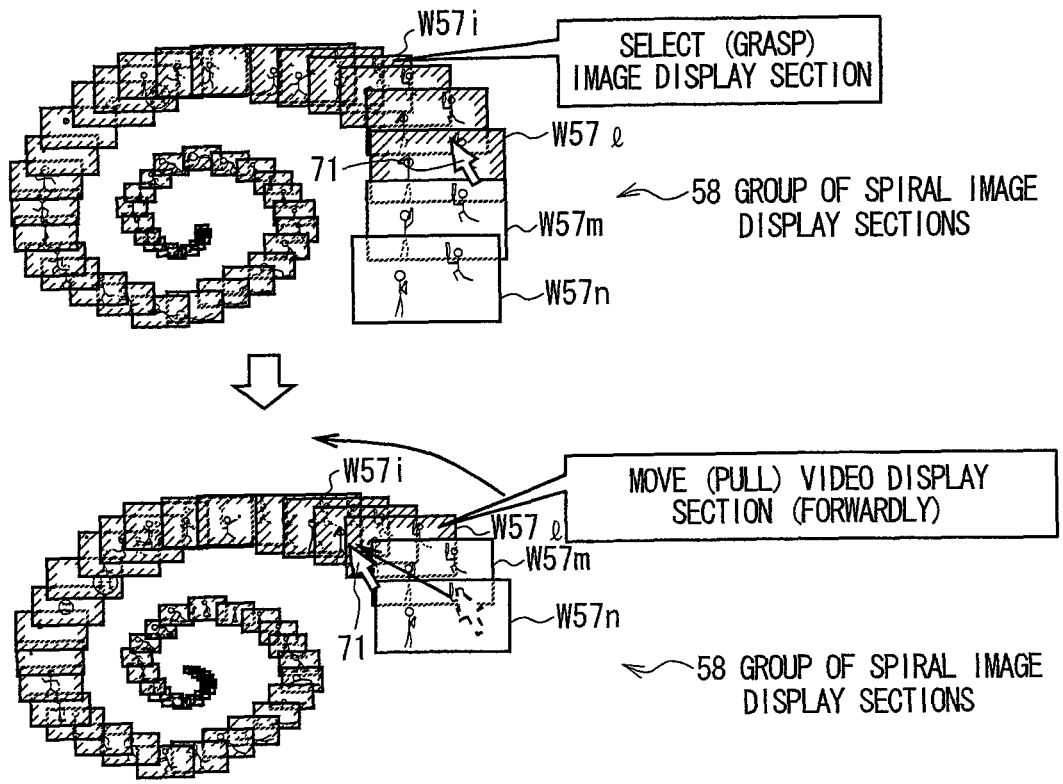
FIG. 17 is a schematic illustration of move (2-1) of an image display section by an extending operation.
Figure 18:
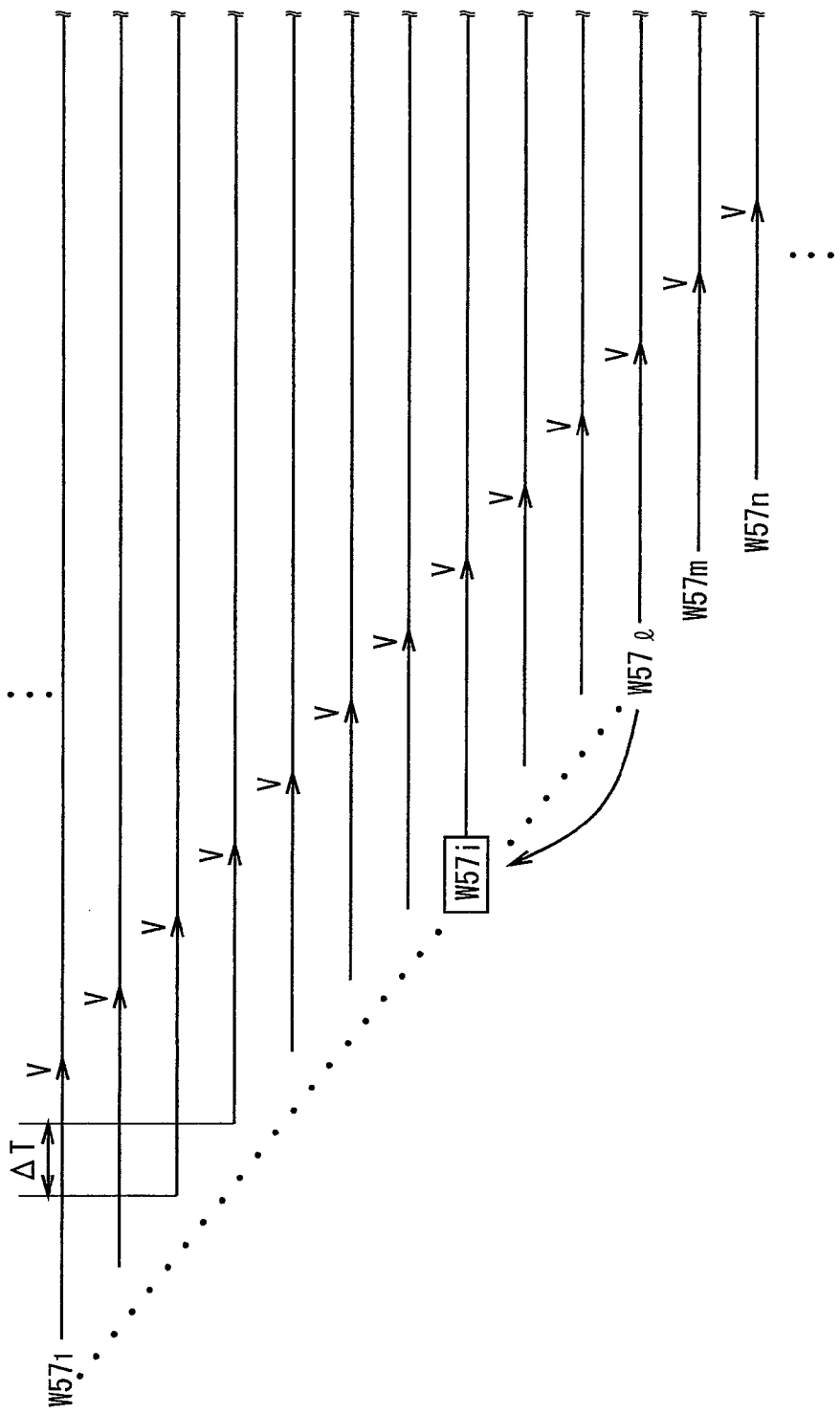
FIG. 18 is a timing chart of move (2-2) of an image display section by an extending operation.

At this time, the image display sections $W57_1$ through $W57_n$ of the group of spiral image display sections 58 that are displaying the reproduced images are shifted to and displayed at the positions traced by the cursor 71 as shown in FIG. 18. Then, accordingly, the image display sections $W57_1$ through $W57_n$ that are displayed at the respective positions are entirely shifted toward the distal side by the amount of movement of the cursor 71 along the spiral and the sizes of displaying the shifted image display sections $W57_n$, $W57_m$, ... are slightly reduced (FIG. 17).

When a display selecting operation is performed for image display section $W57_i$ (FIG. 17), the microprocessor 3 emphatically displays the image display section $W57_i$ (part surrounded by broken lines) and also sequentially emphatically displays the image display sections $W57$, ... that precede the image display section $W57_i$ in the order of display to make the operator intuitively recognize the flow to the move starting point of the image display section $W57_i$.

With this arrangement, the display section 55 can instantaneously move the display positions of the image display sections $W57_1$ through $W57_n$ backward in response to an operation of moving the group of spiral image display sections in a state where the images are reproduced in the image display sections $W57_1$ through $W57_n$ so as to make them appear as if flowing forward so that there does not arise any problem of a deteriorated responsiveness of the displayed images as in the case where a reverse relay operation is performed in the long GOP format of the MPEG system. In other words, a past scene can be redisplayed immediately.

Again, when a display selecting operation is performed for image display section $W57_i$ (FIG. 17), the microprocessor 3 emphatically displays the image display section $W57_i$ (part surrounded by broken lines) and also sequentially emphatically displays the image display sections $W57$, ... that precede the image display section $W57_i$ in the order of display to make the operator intuitively recognize the flow to the move starting point of the image display section $W57_i$.

At this time, the microprocessor 3 temporarily and instantaneously suspends (holds) the image data of the image being displayed in the image display section $W57_i$ or the image data of all the images being displayed in the image display sections $W57\_1$ through $W57\_n$ to keep the current condition and makes the operator to visually confirm that condition.

When a display selection release operation is performed as input operation to release a display selection operation for the image display section $W57_i$, the microprocessor 3 releases the image data of the image to be displayed in the image display section $W57_i$ or the video of all the images to be displayed in the image display sections $W57_1$ through $W57_n$ and once again have the plurality of image display sections $W57_1$ through $W57_n$ display the images in the proper order in a coordinated manner so as to make them appear as if a moving image in the group of spiral image display sections 58.

As for the reproduced sounds accompanying to the reproduced images being displayed in the image display sections $W57_1$ through $W57_n$, only the reproduced sound accompanying to the reproduced image that is being displayed in the image display section $W57_n$ located at the most proximal side at this time is output when a main sound output mode is selected as sound output mode, whereas the output volumes of the reproduced sounds are adjusted in such a way that the volume of the reproduced sound accompanying to the reproduced image being displayed in each of the image display sections $W57_m$, $W57_l$, $W57_k$, ... that are remote from the image display section $W57_n$ located at the most proximal position on the three-dimensional spiral is reduced as a function of the distance from the image display section $W57_n$, when an all sound output mode is selected.

(2-3-3) Process of Microprocessor for Various Basic and Extending Operation Inputs The microprocessor 3 executes a process for any of the above-described various basic and extending operation inputs according to the control program stored in the hard disk drive 7 (FIG. 1), following the display change process sequence RT1 illustrated in FIG. 9.

For example, if the operation the microprocessor 3 recognizes in Step SP1 is "raise the display speed of the images of the clip", it controls the memory apparatus 2 and selects and generates the images to be displayed in the image display sections $W57_1$ through $W57_n$ according to the reproduction speed v of the reproduced images to be displayed in the image display sections $W57_1$ through $W57_n$ of the group of spiral image display sections 58.

At this time, the microprocessor 3 raises the reproduction speed v of the reproduced images to be displayed in the image display sections $W57_1$ through $W57_n$ and increases the reproduction time lags $\Delta T$ of the reproduced images of adjacent ones of the image display sections $W57_1$ through $W57_n$ by extending the intervals of the reproduction frames among the image display sections $W57_1$ through $W57_n$ and also raising the display/replay speed in the image display sections $W57_1$ through $W57_n$.

If, on the other hand, the operation the microprocessor 3 recognizes in Step SP1 is "reduce the display speed of the images of the clip", it controls the memory apparatus 22 and selects and generates the images to be displayed in the image display sections $W57_1$ through $W57_n$ according to the reproduction speed v of the reproduced images to be displayed in the image display sections $W57_1$ through $W57_n$ of the group of spiral image display sections 58.

At this time, the microprocessor 3 reduces the reproduction speed v of the reproduced images to be displayed in the image display sections $W57_1$ through $W57_n$ and decreases the reproduction time lags $\Delta T$ of the reproduced images of adjacent ones of the image display sections $W57_1$ through $W57_n$ by narrowing the intervals of the reproduction frames among the image display sections $W57_1$ through $W57_n$ and also reducing the display/replay speed in the image display sections $W57_1$ through $W57_n$.

If the operation the microprocessor 3 recognizes in Step SP1 is "stop the images of the clip", it controls the memory apparatus 2 and stops the replay of the reproduced images to be displayed in the image display sections W57$_1$ through W57$_n$ of the group of spiral image display sections 58 and, at the same time, it causes the image display sections W57$_1$ through W57$_n$ of the group of spiral image display sections 58 to keep on displaying the frames they respectively have when the replay is stopped. As a result, the image display sections W57$_1$ through W57$_n$ display the corresponding still images, maintaining the original reproduction time lags ΔT.

If the operation the microprocessor 3 recognizes in Step SP1 is "stop the images of the clip", keeping on depressing the "shift" key of the keyboard 39" or some other extending operation, it controls the memory apparatus 22 and the GPU 4 so as to change the reproduced images to be displayed in the group of spiral image display section 58 of the display section 55 and displayed image of the group of spiral image display sections 58 itself according to the extending operation.

Thus, in Step SP8, the microprocessor 3 changes the reproduced images to be displayed in the group of spiral image display sections 58 of the display section 55 and displayed image of the group of spiral image display sections 58 itself according to the operation input.

(3) Method of Changing Viewpoint Relative to Group of Spiral Image Display Section

(3-1) Display Modes of Group of Spiral Image Display Sections

The microprocessor 3 of the editing apparatus 2 can show the viewpoint from which the operator is visually checking the group of spiral image display sections 58 being displayed in the display section 55 of the editing image 50 to the operator him- or herself. It also can appropriately shift the viewpoint and display the group of spiral image display sections 58 in the display section 55 in a display mode that corresponds to the shifted viewpoint.

Note that the group of spiral image display sections 58 is generated as a result of a rendering process executed in a 3D space on the internal memory by the GPU 4 according to predetermined three-dimensional image generation software and has a spiral structure where a plurality of image display sections W57$_1$ through W57$_n$ are sequentially arranged around a virtual time axis TP virtually generated on the 3D space so as to be wound around the virtual time axis TP in such a way that the diameter of the circle formed by the image display sections W57$_1$ through W57$_n$ gradually increases as a function of the progress of the virtual time axis TP.

Therefore, the display mode of the group of spiral image display sections 58 to be displayed in the display section 55 that is defined as default may be the one illustrated in FIG. 3 where the group of spiral image display sections 58 is displayed three-dimensionally in such a way that the circle drawn by the plurality of image display sections W57$_1$ through W57$_n$ gradually increases provided that the operator's viewpoint EP1 is located at the end of the progressing side of the virtual time axis TP.

Thus, when the group of spiral image display sections 58 is displayed in the display section 55, the microprocessor 3 of the editing apparatus 2 can have the operator visually see the spiral structure where the circle formed by the image display sections W57$_1$ through W57$_n$ that are sequentially around a virtual time axis TP gradually increases as a function of the progress of the virtual time axis TP so that all the image display sections W57$_1$ through W57$_n$ are presented and none of them is hidden.

In the group of spiral image display sections 58, the image display sections gradually and sequentially appear around the virtual time axis TP in the order of the image display section W57$_1$, the image display section W57$_2$, the image display section W57$_3$, ..., the image display section W57$_m$, the image display section W57$_n$ and reproduced images start to be displayed in the order of appearance of the image display sections W57$_1$ through W57$_n$.

Therefore, at the timing when a predetermined period of time has elapsed since the start of displaying reproduced images in the image display sections W57$_1$ through W57$_n$ of the group of spiral image display sections 58, the image display section W57$_1$ that is located at the most distal side of the spiral in the image of the display section 55 displays the temporally latest reproduced image, while the image display section W57$_n$ that is located at the most proximal side of the spiral displays the temporally earliest reproduced image.

Differently stated, the front end side image display section W57$_n$ located at the most advance position of the virtual time axis TP displays the temporally earlier reproduced image, while the rear end side image display section W57$_1$ closest to the starting point of the virtual time axis TP displays the temporally latest reproduced image so that the progressing direction of the virtual time axis TP is opposite to the advancing direction of the reproduction process of the image display sections W57$_1$ through W57$_n$.

Figure 20:
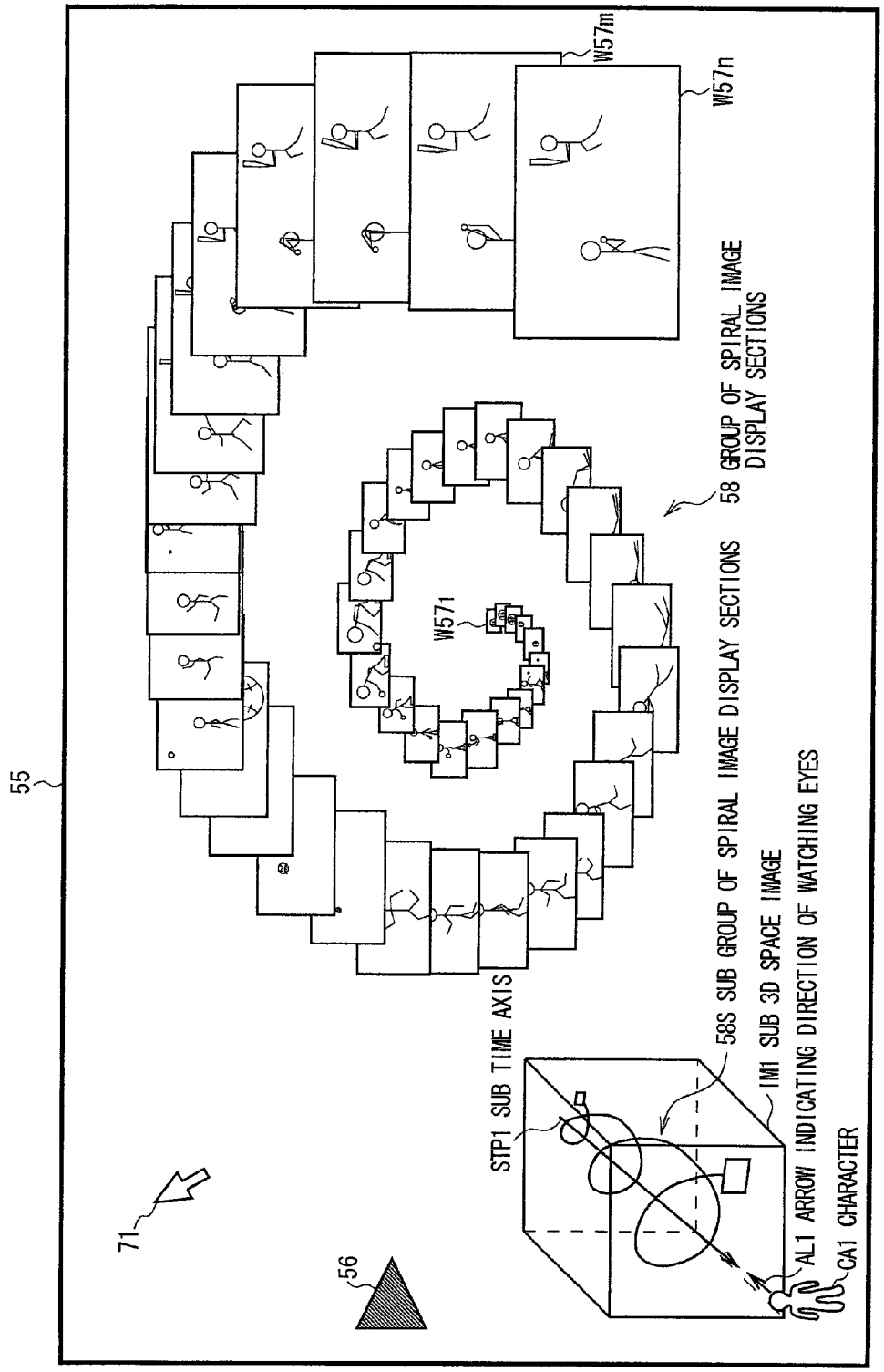
FIG. 20 is a schematic illustration of a sub 3D space image indicating a viewpoint.

As shown in FIG. 20, the editing apparatus 2 visually indicates the viewpoint from which the operator is viewing the group of spiral image display sections 58 and the direction of the watching eyes of the operator by means of sub 3D space image IM1 and character CA1 displayed in the display section 55 while the group of spiral image display sections 58 is being displayed in the display section 55 of the editing image 50. Sub group of spiral image display sections 58S and sub time axis STP1 are displayed in the sub 3D space image IM1 in a display mode same as that of the group of spiral image display sections 58.

Thus, the 3D spatial coordinates of the sub group of spiral image display sections 58S displayed in the sub 3D space image IM1 and the 3D spatial coordinates of the group of spiral image display sections 58 generated in the 3D space on the internal memory of the GPU 4 are basically same and identical because they show an enlarged-reduced relationship as 3D spaces.

Actually, as the microprocessor 3 of the editing apparatus 2 recognizes that the operator selects a desired clip from the clip synopsis display section 51 of the editing image 50 and subsequently drags and drops it to the display section 55, it has the GPU 4 display a group of spiral image display sections 58 that corresponds to the clip and, at the same time, also has the GPU 4 generate a sub 3D space image IM1 that includes a sub group of spiral image display sections 58S that corresponds to the group of spiral image display sections 58 and a sub time axis STP1 that corresponds to the virtual time axis TP and display it with the group of spiral image display sections 58.

As the character CA1 located near the sub 3D space image IM1 is selected by way of the cursor 71 of the display section 55 and a drag operation is performed, the microprocessor 3 of the editing apparatus 2 moves the character CA1 in the direction in which the drag operation is performed and generates viewpoint coordinates data for the viewpoint coordinates (checking position) of the position of the moved character CA1 in the sub 3D space image IM1. Then, it has the GPU 4 display the group of spiral image display sections 58 in the display section 55 in a display mode corresponding to the sub group of spiral image display sections 58S that may appear when viewed from the checking position in the angle of the direction of the watching eyes as indicated by arrow AL1.

In this way, the editing apparatus 2 visually presents the viewpoint relative to the group of spiral image display sections 58 to the operator according to the checking position (viewpoint coordinates) of the character CA1 displayed near the sub 3D space image IM1 for the sub group of spiral image display sections 58S. It also visually presents the angle of the direction of the watching eyes of the operator from the viewpoint relative to the sub group of spiral image display sections 58S as indicated by arrow AL1. Thus, with this arrangement, the operator can intuitively recognize the viewpoint and the direction of the watching eyes of the operator him- or herself relative to the group of spiral image display sections 58 in the display section 55.

Figure 21:
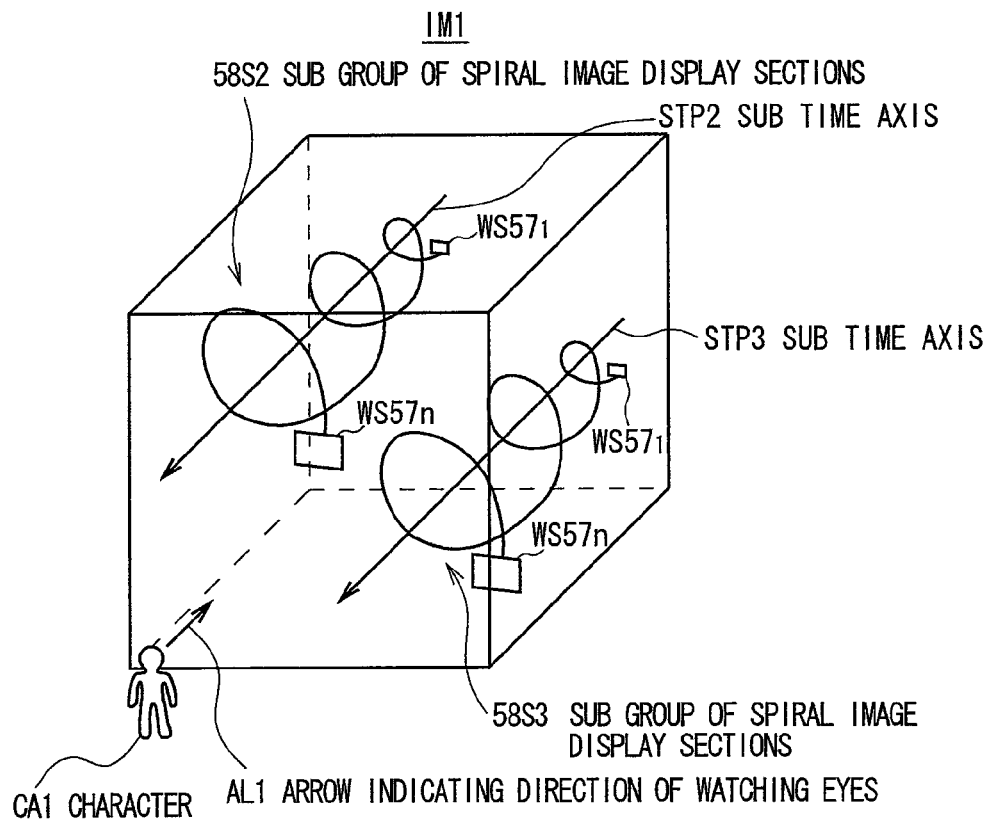
FIG. 21 is a schematic illustration of a group of a plurality of sub spiral image display sections.
Figure 22:
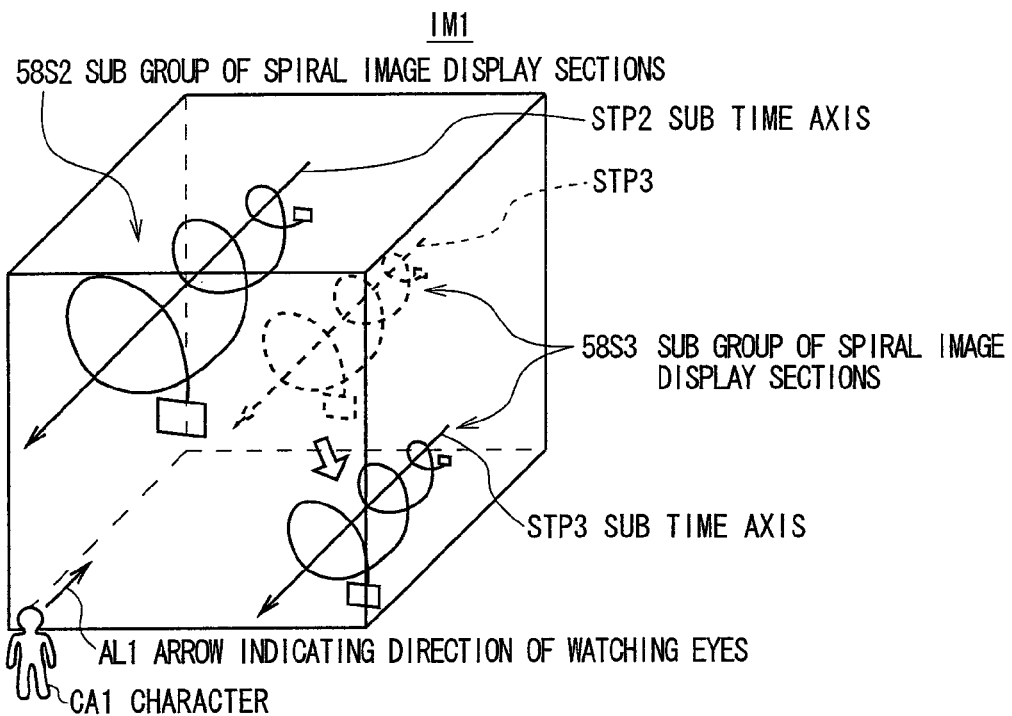
FIG. 22 is a schematic illustration of a move of a group of a plurality of sub spiral image display sections.

Additionally, as the microprocessor 3 of the editing apparatus 2 recognizes that the operator selects a plurality of desired clips from the clip synopsis display section 51 of the editing image 50 and subsequently drags and drops them to the display section 55, it has the GPU 4 display a plurality of groups of spiral image display sections 58 that correspond to the clips in the display section 55 and, at the same time, also has the GPU 4 generate and display a sub 3D space image IM1 that includes a sub group of spiral image display sections 58S2, a sub time axis STP2, a sub group of spiral image display sections 58S3, a sub time axis STP3 and so on that correspond respectively to the plurality of groups of spiral image display sections 58 as shown in FIG. 21.

When time code information is added to the reproduced images to be displayed in the image display sections W57$_1$ through W57$_n$ of the plurality of groups of spiral image display sections 58, the microprocessor 3 of the editing apparatus 2 displays the sub group of spiral image display sections 58S2 and the sub group of spiral image display sections 58S3 in a synchronized manner according to the time code information.

When the length of the sub time axis STP2 of the sub group of spiral image display sections 58S2 and that of the sub time axis STP3 of the sub group of spiral image display sections 58S3 differ from each other, the microprocessor 3 of the editing apparatus 2 displays the sub time axis STP3 (or the sub time axis STP2, whichever shorter) after making it match the sub time axis STP2 (or the sub time axis STP3, whichever appropriate and longer).

With this arrangement, the editing apparatus 2 can display can display the sub 3D space image IM1 in a state where it contains all the sub image display sections WS57$_1$ through WS57$_n$ of the sub group of spiral image display sections 58S2 and all the sub image display sections WS57$_1$ through WS57$_n$ of the sub group of spiral image display sections 58 so that the operator can visually confirm the entire image of the sub group of spiral image display sections 58S2 and the sub group of spiral image display sections 58S3.

Still additionally, as the microprocessor 3 of the editing apparatus 2 recognizes that the operator performs a drag operation in a state where a sub 3D space image IM1 that contains a plurality of sub groups of spiral image display sections including a sub group of spiral image display sections 58S2 and a sub group of spiral image display sections 58S3 is being displayed in the display section 55, it can move the position of the sub group of spiral image display sections 58S2 and that of the sub group of spiral image display sections 58S3 and can also move the positions of the plurality of groups of spiral image display sections 58 being displayed in the display section 55 in a manner interlocked with the positions of the sub group of spiral image display sections 58S2 and the sub group of spiral image display sections 58S3 after the move.

At this time, the microprocessor 3 of the editing apparatus 2 can also move the sub group of spiral image display sections 58S2 and the sub group of spiral image display sections 58S3 in the longitudinal direction of the sub time axes STP2, STP3 (in the temporally later direction or in the temporally earlier direction) so as to make the editing process easier.

Figure 23:
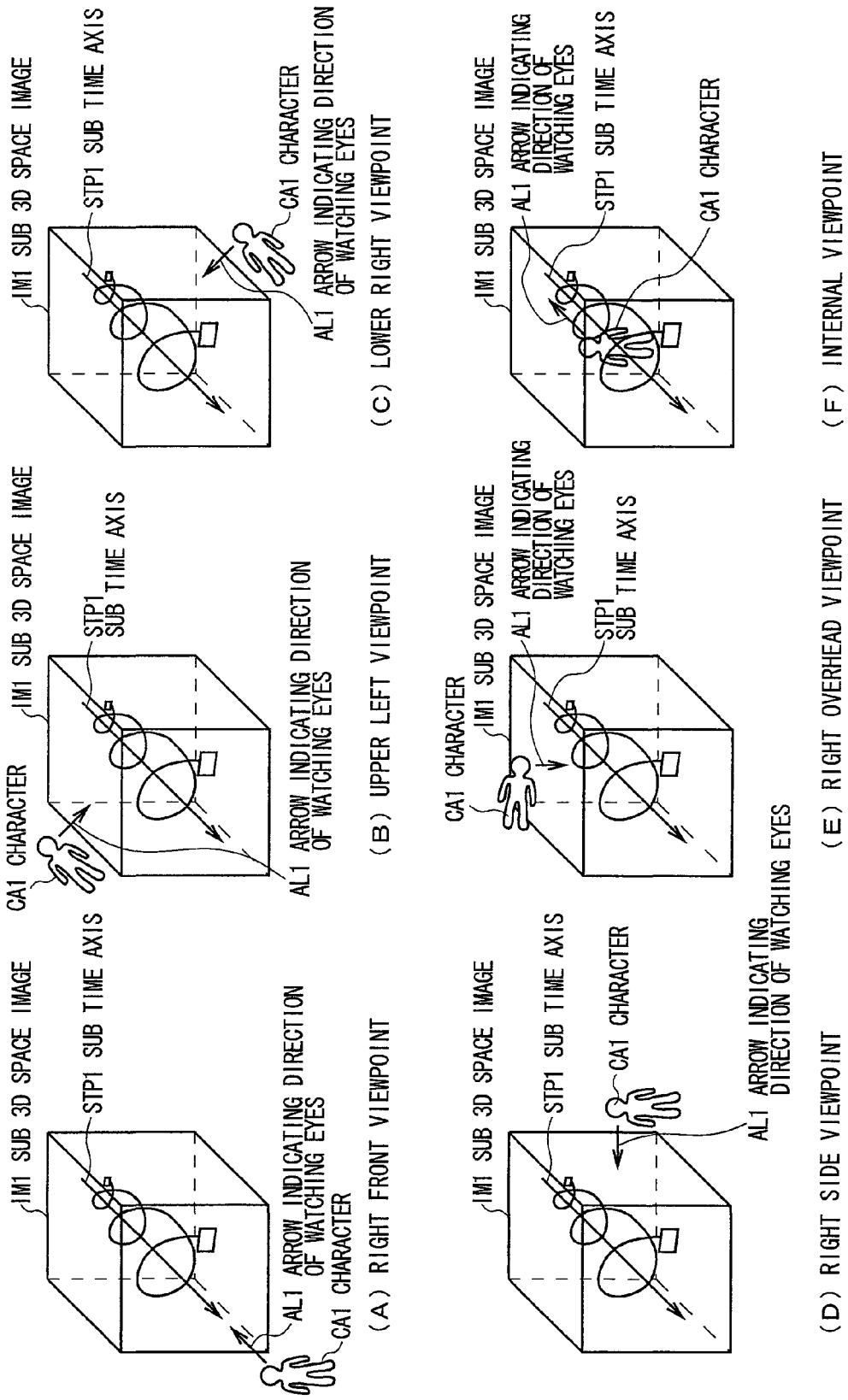
FIG. 23 is a schematic illustration of a shift of viewpoint with a fixed sub 3D space image.

More specifically, referring to FIG. 23(A), if the front viewpoint of the character CA1 placed in front the sub 3D space image IM1 is defined as default display mode for the group of spiral image display sections 58, the microprocessor 3 of the editing apparatus 2 can shift the viewpoint in response to the drag operation using the cursor 71 to an upper left viewpoint position for the character CA1 placed at an upper left position relative to the sub 3D space image IM1 as shown in FIG. 23(B), to a lower right viewpoint position for the character CA1 placed at a lower right position relative to the sub 3D space image IM1 as shown in FIG. 23(C), to a right side viewpoint position for the character CA1 placed at a right side position relative to the sub 3D space image IM1 as shown in FIG. 23(D), to a right overhead position for the character CA1 placed at a right overhead position relative to the sub 3D space image IM1 as shown in FIG. 23(E) or to an internal viewpoint position for the character CA1 placed at an internal position relative to the sub 3D space image IM1 as shown in FIG. 23(F).

With this arrangement, while the group of spiral image display sections 58 is displayed in the display section 55 of the editing image 50, the microprocessor 3 of the editing apparatus 2 can have the GPU 4 change the display mode of the group of spiral image display sections 58 according to the viewpoint and the direction of the watching eyes that are shifted and newly determined by the relative positional relationship between the 3D spatial coordinates of the sub 3D space image IM1 and the viewpoint coordinates of the character CA1 that is moved by means of the cursor 71.

In short, the microprocessor 3 can display the viewpoint and the direction of the watching eyes after moving the viewpoint coordinates of the character CA1 and the viewpoint relative to the group of spiral image display sections 58 internal he display section 55 in an interlocked and aligned manner.

The microprocessor 3 of the editing apparatus 2 can shift the viewpoint not only in response to a drag operation using the cursor 71 but also in response to a key input operation. Therefore, after the character CA1 is selected by means of the cursor 71, for example, the microprocessor 3 can move the character CA1 in the upward direction in response to an operation of depressing the "W" key, in the leftward direction in response to an operation of depressing the "A" key, in the downward direction in response to an operation of depressing the "X" key or in the rightward direction in response to an operation of depressing the "D" key on the keyboard 39.

While the microprocessor 3 of the editing apparatus 2 employs a viewpoint shifting technique in a spatial coordinates locking mode that shifts the viewpoint and the direction of the watching eyes by moving the viewpoint coordinates of the character CA1, while fixing (locking) the spatial coordinates of the sub 3D space image IM1, it is possible to switch to a viewpoint shifting technique in a viewpoint coordinates locking mode that switches the mode in response to an operation of depressing, for example, the "F1" key on the keyboard 39 and shifts the viewpoint and the direction of the watching eyes by rotating the sub 3D space image IM1 to move the spatial coordinates, while fixing (locking) the viewpoint coordinates of the character CA1, contrary to the spatial coordinates locking mode.

Figure 24:
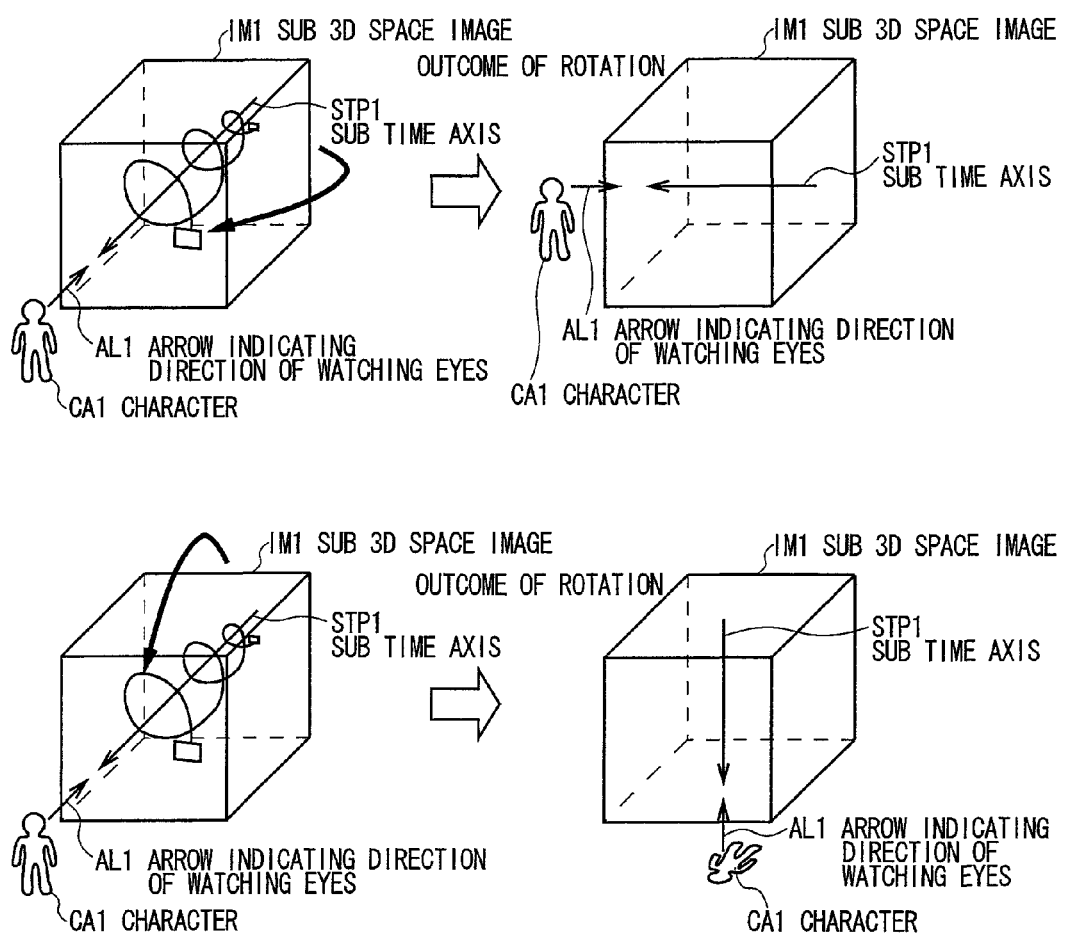
FIG. 24 is a schematic illustration of a turn of a sub 3D space image and that of a character.
Figure 25:
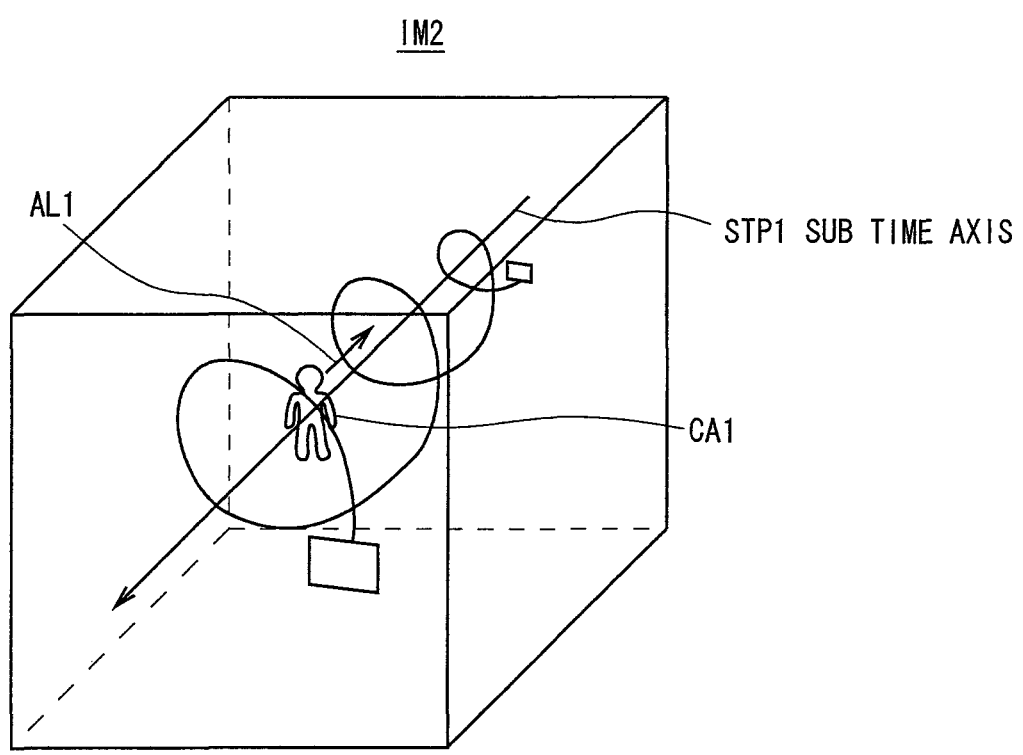
FIG. 25 is a schematic illustration of an enlarged display of a sub 3D space image.

Note that the microprocessor 3 of the editing apparatus 2 can switch the mode in response to an operation of depressing, for example, the "F2" key on the keyboard 39 and rotate the sub 3D space image IM1 and the character CA1 together in response to a drag operation by means of the cursor 71, while maintaining the relative positional relationship between the 3D spatial coordinates of the sub 3D space image IM1 and the viewpoint coordinates of the character CA1 as shown in FIG. 24. With this arrangement, it is possible to shift the sub 3D space image IM1 and the character CA1 that are displayed to an angle in which the operator can visually confirm them with ease.

When an internal viewpoint is selected by means of a viewpoint shifting technique in a spatial coordinates locking mode and the character CA1 is placed in the inside of the sub 3D space image IM1 as shown in FIG. 23(F), the microprocessor 3 of the editing apparatus 2 can automatically generate a sub 3D space image IM2 by enlarging the sub 3D space image IM1 to a predetermined magnification.

Note that the magnification of enlarging the sub 3D space image IM1 to generate the sub 3D space image IM2 is limited to less than a predetermined value so that it may not hinder the group of spiral image display sections 58 in the display section 55 because the sub 3D space images IM1 and IM2 are subordinate images.

(3-2) Display Process Sequence for Group of Spiral Image Display Sections in Response to Shift of Viewpoint Now, the display process sequence for changing the display mode of the group of spiral image display sections 58 of the display section 55 for display in response to a shift of the viewpoint and the direction of the watching eyes due to the relative position relationship between the sub 3D space image IM1 and the character CA1 will be described below.

Figure 26:
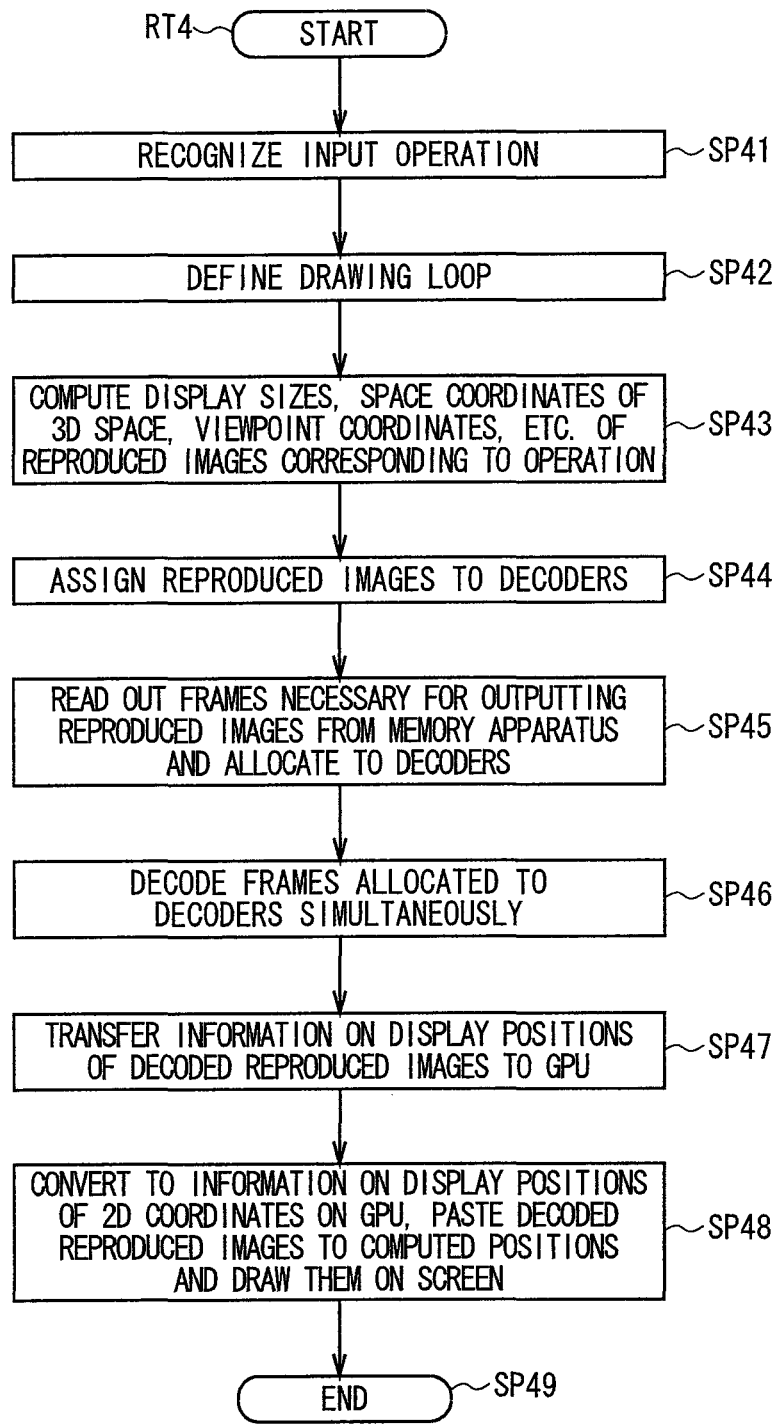
FIG. 26 is a flowchart, illustrating the display process sequence for a group of spiral image display sections according to a shift of viewpoint.

Referring to FIG. 26, the microprocessor 3 of the editing apparatus 2 moves to the starting step of routine RT4 and proceeds to Step SP41, where it takes in the control signal (e.g. for the reproduction speed v and the reproduction time lag ΔT of the reproduced image to be displayed in the image display sections $W57_1$ through $W57_n$ of the group of spiral image display sections 58 or the 3D spatial coordinates of the sub 3D space image IM1 and the viewpoint coordinates of the character CA1 after a move corresponding to a drag operation by the operator) by way of the PCI bus 15 and the south bridge 6 and recognizes it by means of the main CPU core 3M before it moves to the next step, or Step SP42.

In Step SP42, if the control signal it recognizes in Step SP41 is a command for changing the display mode of the group of spiral image display sections 58 for display, the microprocessor 3 of the editing apparatus 2 defines the drawing loop of the clip to be displayed in the image display sections $W57_1$ through $W57_n$ of the group of spiral image display sections 58 in a new display mode by means of the main CPU core 3M and moves to the next step, or Step SP43.

In Step SP43, the microprocessor 3 of the editing apparatus 2 has the main core CPU 3M execute various physical arithmetic processes including computations of the display sizes of the reproduced images of the clip for which the drawing loop is defined in Step SP42, computations of the three-dimensional spatial coordinates of each of the frames having such sizes and computations of the viewpoint coordinates of the character CA1 and then moves to the next step, or Step SP44.

In Step SP44, the microprocessor 3 of the editing apparatus 2 has the main CPU core 3M determine the sub CPU core or cores to which the operations of decoding the reproduced images of the clip for forming the drawing loop are assigned out of the sub CPU cores 3SA through 3SH and then moves to the next step, or Step SP45.

In Step SP45, the microprocessor 3 of the editing apparatus 2 reads out the frames of the clip necessary for outputting the reproduced images from the memory apparatus 22 and allocates them to the sub CPU cores 3SA through 3SH to whom the operations are assigned before it moves to the next step, or Step SP46.

In Step SP46, the microprocessor 3 of the editing apparatus 2 has the eight sub CPU cores 3SA through 3SH that take the role of decoders concurrently decode the frames allocated in Step SP45 in parallel and then moves to the next step, or Step SP47.

In Step SP47, the microprocessor 3 of the editing apparatus 2 has the main CPU core 3M transfer the 3D spatial coordinates of the sub 3D space image IM1 and the viewpoint coordinates of the character CA1 to the GPU 4 as three-dimensional display position information of the reproduced images to the GPU 4 by high speed transfer in order to determine the way in which the reproduced images that are decoded in Step SP46 are arranged on the display screen (on the 3D space) of the display section 55 and then moves to the next step, or Step SP48.

In Step SP48, the microprocessor 3 of the editing apparatus 2 has the GPU 4 convert the three-dimensional display position information including the 3D spatial coordinates of the sub 3D space image IM1 and the viewpoint coordinates of the character CA1 into two-dimensional coordinate display position information for displaying the group of spiral image display sections 58 in the display mode that corresponds to the viewpoint and the direction of the watching eyes defined at this time and draw the group of spiral image display sections 58 in the display mode corresponding to viewpoint and the direction of the watching eyes that are new by pasting them to the predetermined positions of the image display sections $W57_1$ through $W57_n$ according to the display sizes and the display positions in the three-dimensional coordinate display position information before it moves to the next step, or Step SP49, where it ends the process.

In this way, the eight sub CPU cores 3SA through 3SH of the microprocessor 3 of the editing apparatus 2 take the role of decoders for the reproduced images to be displayed in the image display sections $W57_1$ through $W57_n$ and concurrently decode them in parallel so as to transfer the decoded reproduced images to the GPU 4 by high speed data transfer typically at a transfer speed of maximally 30 [Gbyte/sec] by way of the large bandwidth bus 10. Thus, it is possible to decode a large number of high definition reproduced images and transfer them to the GPU 4 by data transfer in a short period of time.

Thus, when the GPU 4 shifts the group of spiral image display sections 58 generated in a 3D space on the internal memory to a new viewpoint and a new direction of the watching eyes and displays them in the display section 55, it converts the three-dimensional display position information including the 3D spatial coordinates of the sub 3D space image IM1 and the viewpoint coordinates of the character CA1 into two-dimensional coordinate display position information of the display section 55 and displays the reproduced images of the image display sections $W57_1$ through $W57_n$ according to the information so that it can sequentially, spirally and highly responsively display the group of spiral image display sections 58 in the display section 55 with reproduction time lags ΔT in a coordinated and interlocked manner as a plurality of image display section $W57_1$ through W57$_n$ that appear as a smoothly moving image as a whole. Additionally, it can freely control the viewpoint and the direction of the watching eyes by way of a coordinate conversion process on a 3D space.

(3-3) Group of Spiral Image Display Sections After Viewpoint Shift

Figure 27:
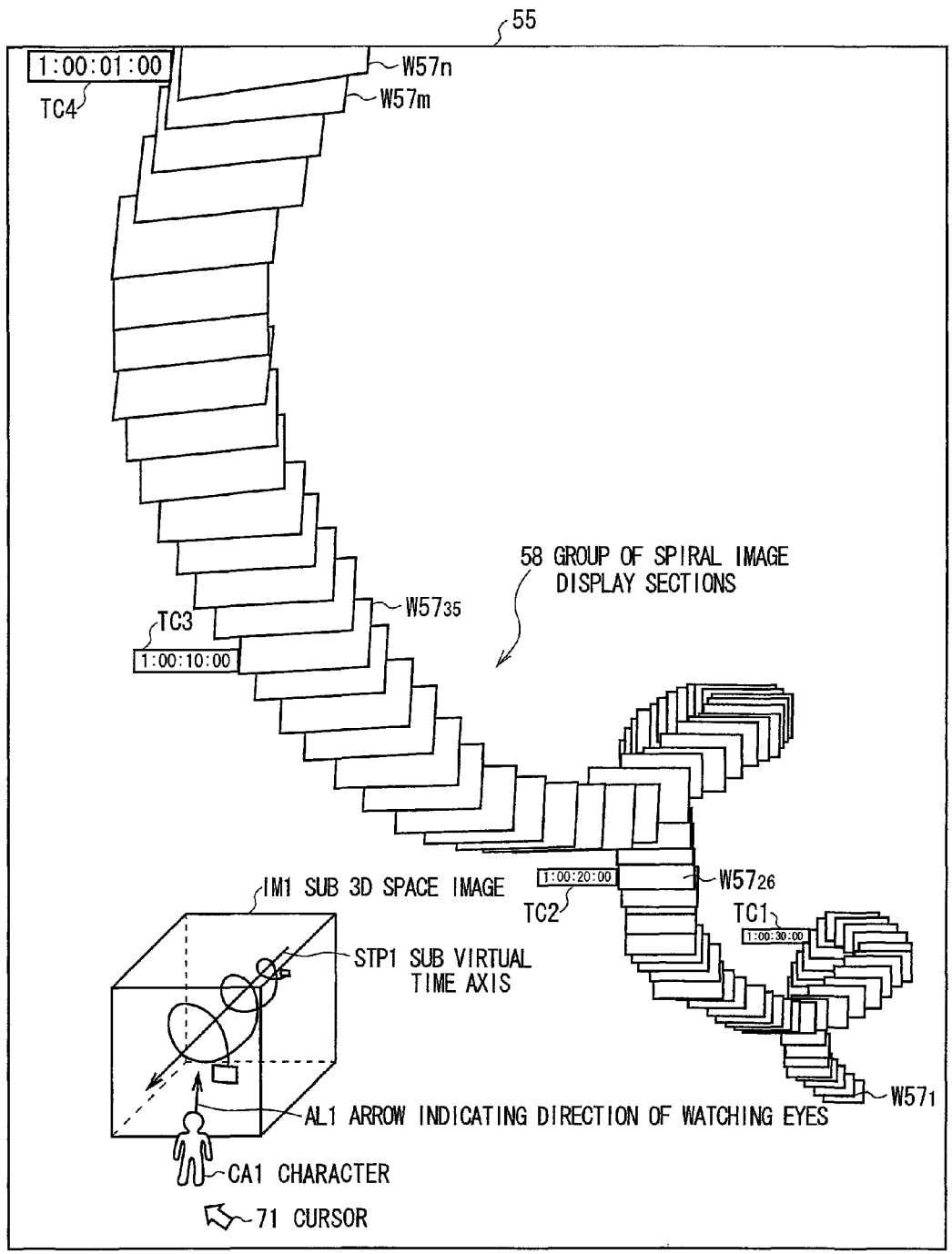
FIG. 27 is a schematic illustration of a group of spiral image display sections (1) after a shift of viewpoint.
Figure 28:
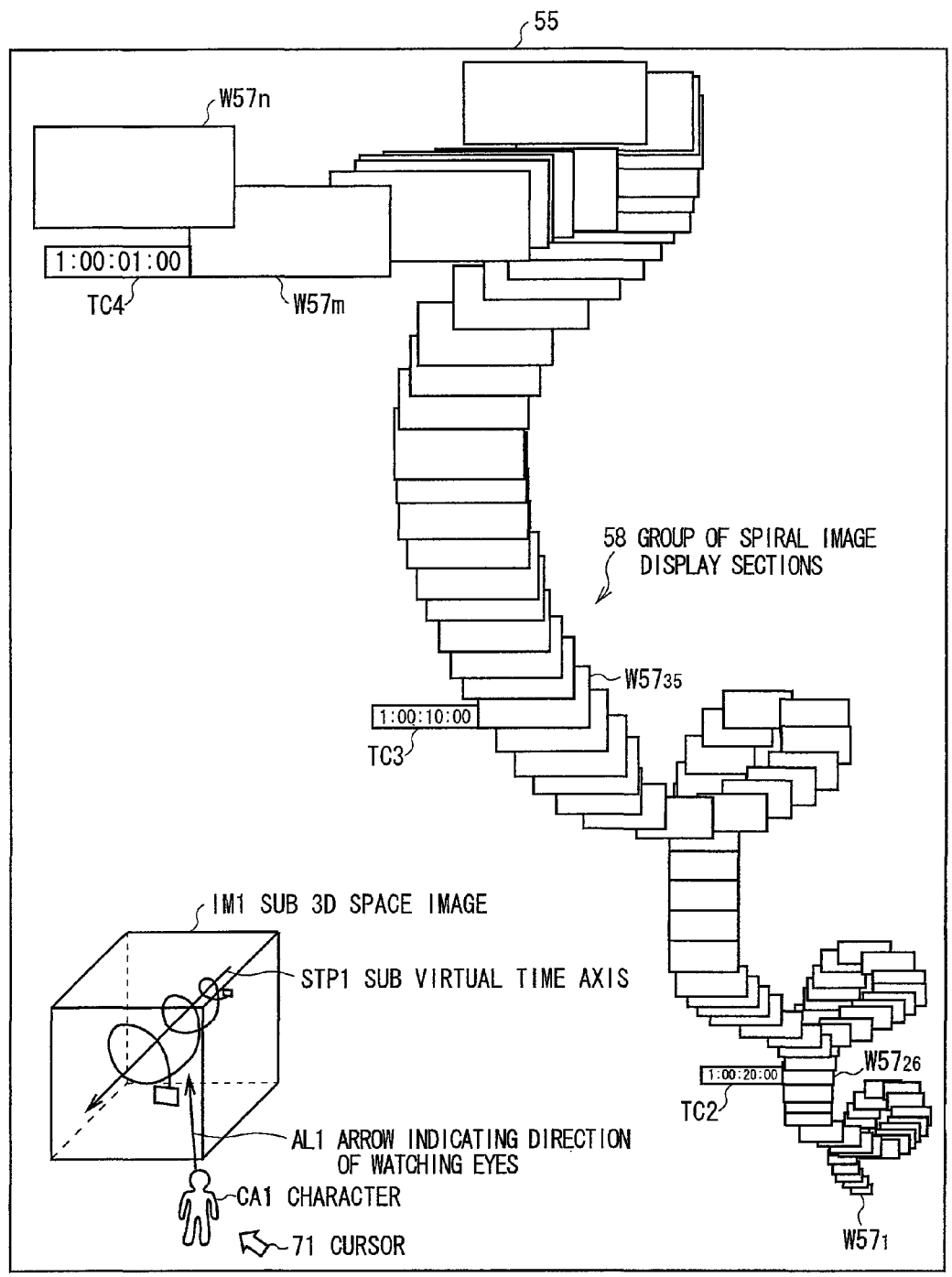
FIG. 28 is a schematic illustration of a group of spiral image display sections (2) after a shift of viewpoint.

When the position of the character CA1 is moved relative to the sub 3D space image IM1 that is displayed in the display section 55 of the editing image 50 by means of the cursor 71 as shown in FIG. 27, the microprocessor 3 of the editing apparatus 2 can change the display mode of the group of spiral image display sections 58 (FIG. 20) being displayed in the display section 55 to a mode of displaying them from below.

In this case, the group of spiral image display sections 58 shown in FIG. 20 is in a display mode where the viewpoint and the direction of the watching eyes of the character CA1 are facing the sub time axis STP1 of the sub 3D space image IM1 from right front, whereas the display mode of the group of spiral image display sections 58 shown in FIG. 27 is changed in such a way that the viewpoint and the direction of the watching eyes of the character CA1 are facing the sub time axis STP1 of the sub 3D space image IM1 from lower left.

Thus, the editing apparatus 2 interlocks the viewpoint and the direction of the watching eyes of the character CA1 relative to the group of spiral image display sections 58 of the sub 3D space image IM1 and the viewpoint and the direction of the watching eyes relative to the group of spiral image display sections 58 whose angles are changed and that are actually displayed in the display section 55.

In this case, the operator can visually check the entire image of the group of spiral image display sections 58 (FIG. 27) displayed in the display section 55 so that he or she can confirm the length of the entire clip that is difficult to be recognized from the image of the group of spiral image display sections 58 displayed in the right front angle relative to the virtual time axis TP (FIG. 20) and recognize the flow of the time series by way of the time code notification frames TC1 through TC4 of important positions of the group of spiral image display sections 58.

Additionally, since all the scenes displayed in the image display sections W57$_1$ through W57$_n$ from each other and the scene that the operator wants may probably be displayed in one of the plurality of image display sections W57$_1$ through W57$_n$ of the group of spiral image display sections 58. Thus, the editing apparatus 2 can facilitate the image searching operation and the editing operation on the part of the operator.

Additionally, since a same reproduced image is displayed in each of the image display sections W57$_1$ through W57$_n$ with the predetermined reproduction time lag $\Delta T$ in the editing apparatus 2, if the operator misses the scene he or she wants in the first image display section W57$_1$, the scene is also displayed in the succeeding image display sections W57$_2$, W57$_3$, W57$_4$, ... with the reproduction time lag $\Delta T$ so that the operator can view the scene he or she misses without rewinding/replaying and hence the image searching operation and the editing operation are facilitated.

When the position of the character CA1 relative to the sub 3D space image IM1 being displayed in the display section 55 of the editing image 50 is moved further by means of the cursor 71, the microprocessor 3 of the editing apparatus 2 in response changes the display mode to the one that corresponds to a situation where the viewpoint is moved further downward relative to the group of spiral image display sections 58 (FIG. 27).

In this case, the viewpoint and the direction of the watching eyes of the character CA1 are shifted in the group of spiral image display sections 58 so as to face the time axis STP1 of the sub 3D spade image IM1 from lower left and the display mode is changed to match the shifted angle of viewing.

Figure 29:
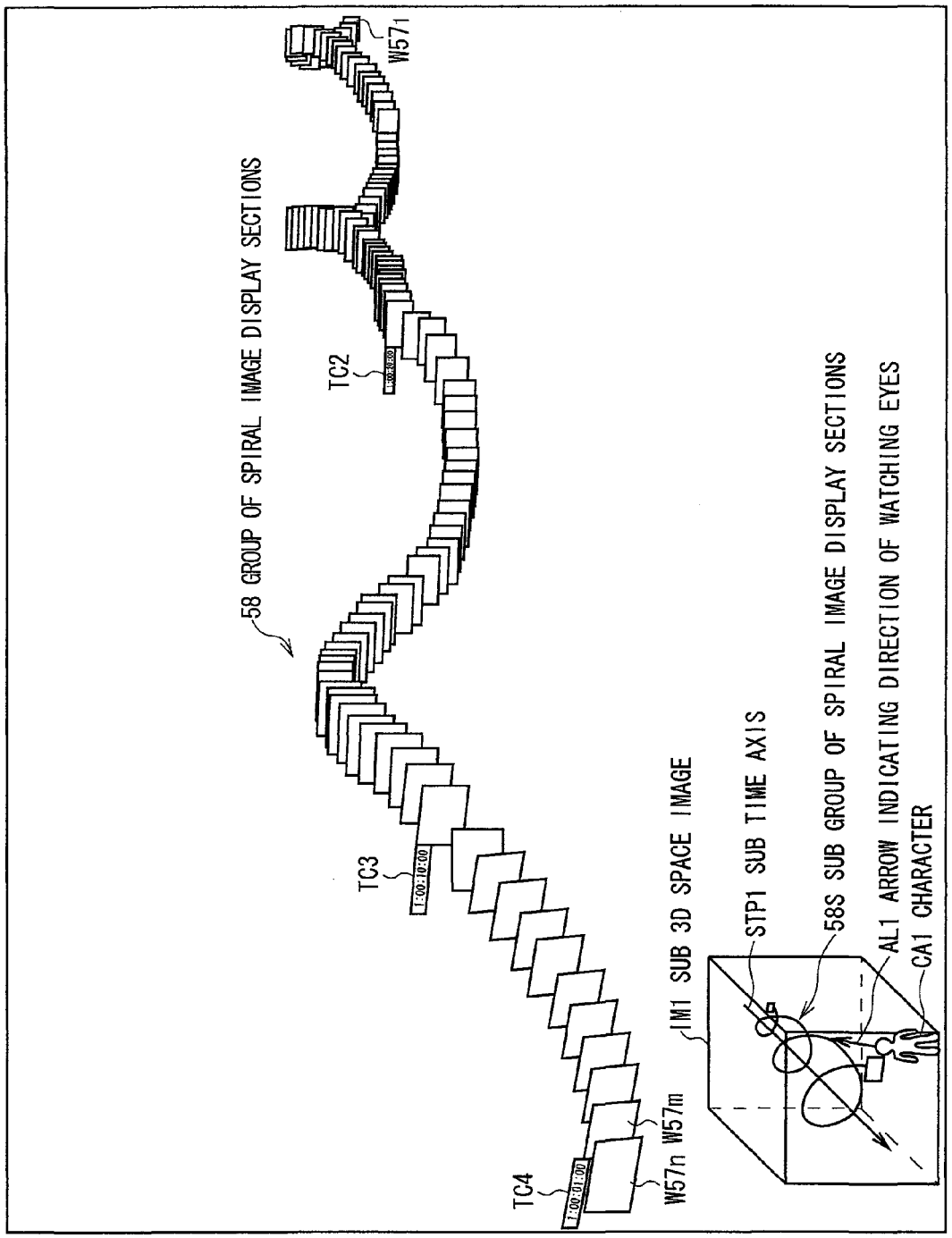
FIG. 29 is a schematic illustration of a group of spiral image display sections (3) after a shift of viewpoint.

As shown in FIG. 29, when the character CA1 is moved relative to the sub 3D space image IM1 being displayed in the display section 55 of the editing image 50 by means of the cursor 71 to a position where the viewpoint located near the sub time axis STP1 of the sub 3D space image IM1 and the direction of the watching eyes runs substantially in parallel with the sub time axis STP1, the microprocessor 3 of the editing apparatus 2 in response changes the display mode of the group of spiral image display sections 58 (FIG. 27) to the one that matches the viewpoint and the direction of the watching eyes running substantially in parallel with the virtual time axis TP.

The microprocessor 3 of the editing apparatus 2 doe not necessarily need to employ a viewpoint shifting technique in a spatial coordinates locking mode that shifts the viewpoint and the direction of the watching eyes by moving the viewpoint coordinates of the character CA1, while fixing (locking) the spatial coordinates of the sub 3D space image IM1 and it is possible to use a viewpoint shifting technique in a viewpoint coordinates locking mode that changes the relative positional relationship between the character CA1 and the sub 3D space image IM1 to shift the viewpoint and the direction of the watching eyes by rotating the sub 3D space image IM1 to move the spatial coordinates, while fixing (locking) the viewpoint coordinates of the character CA1 in order to change the display mode to the one same as that of the group of spiral image display sections 58 illustrated in FIG. 29.

Figure 30:
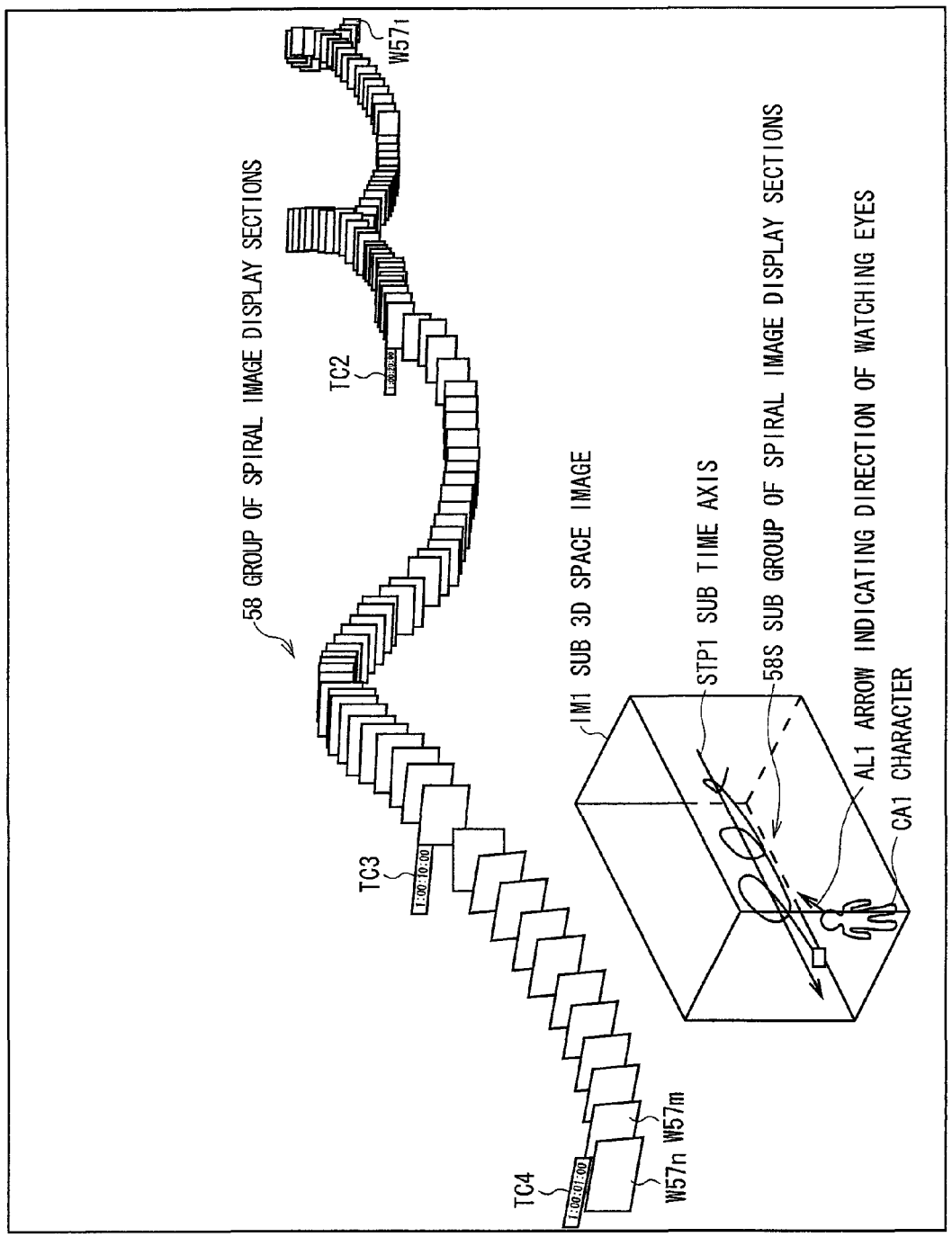
FIG. 30 is a schematic illustration of a group of spiral image display sections after a shift of viewpoint in a viewpoint coordinate lock mode.
Figure 31:
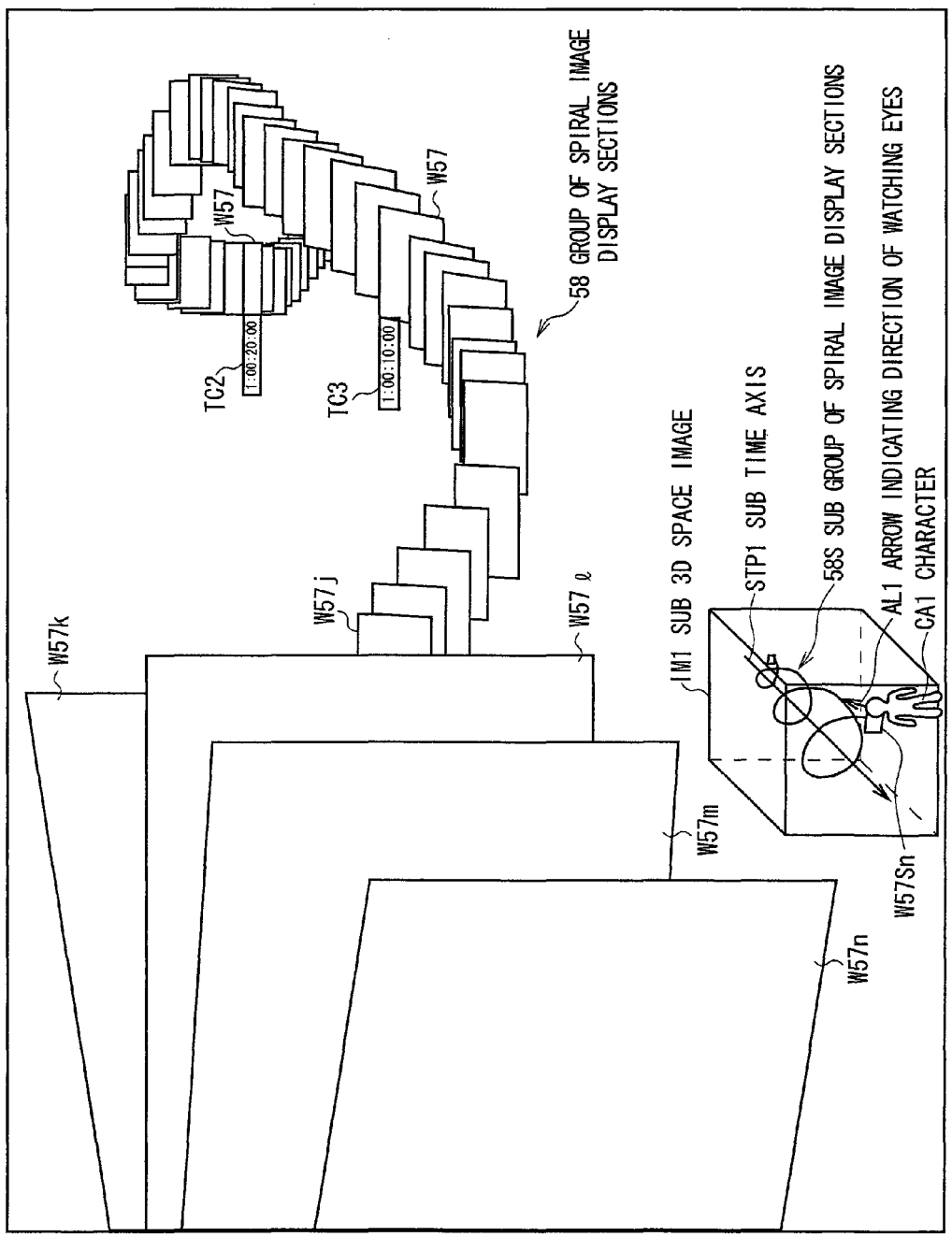
FIG. 31 is a schematic illustration of a group of spiral image display sections (4) after a shift of viewpoint.

More specifically, the group of spiral image display sections 58 being displayed in the display section 55 is viewed from the same angle (FIGS. 29 and 30) and the sub 3D space image IM1 in FIG. 29 and the sub 3D space image IM1 in FIG. 30 differ from each other only in the sense how they appear to the operator and hence are essentially not different from each other.

As the character CA1 relative to the sub 3D space image IM1 being displayed in the display section 55 of the editing image 50 is moved further by means of the cursor 71 to a position located close to the sub time axis STP1 in the sub 3D space image IM1 where the direction of the watching eyes of the character CA1 runs subsequently in parallel with the sub time axis STP1 and the viewpoint of the CA1 is close to the image display section W57$_n$ located at the most proximal side of the sub group of spiral image display sections 58S, the microprocessor 3 of the editing apparatus 2 changes the display mode for displaying the group of spiral image display sections 58 to an angle where the viewpoint of the character CA1 is very close to the most proximal side image display section W57$_n$ of the group of spiral image display sections 58 from the position subsequently in parallel with the virtual time axis TP.

In this case, since the image display sections W57$_n$, W57$_m$, W57$_l$, ... that are located at the most proximal side of the display screen of the display section 55 are displayed in very enlarged scales, the microprocessor 3 of the editing apparatus 2 remarkably raise the moving image frame updating rate of the reproduced images displayed in the enlarged image display sections W57$_n$, W57$_m$, W57$_l$, ... relative to the other image display sections W57 so that the reproduced images displayed in the image display sections W57$_n$, W57$_m$, W57$_l$, ... are presented to the operator as very smoothly moving images.

However, while the microprocessor 3 of the editing apparatus 2 raises the moving image frame updating rate of the reproduced images displayed in the image display sections $W57_n$, $W57_m$, $W57_l$, $W57_k$, . . . having enlarged scales, it reduces the resolutions of their frames by a predetermined level so that the processing load for displaying reproduced images in the image display sections $W57_n$, $W57_m$, $W57_l$, $W57_k$, . . . and those image display sections can safely observe the timings of reproducing the moving images.

On the other hand, the microprocessor 3 of the editing apparatus 2 outputs the plurality of frames of the moving images of the image display sections preceding the image display section $W57_k$ that are not enlarged without raising the frame updating rates. Thus, with this arrangement, the microprocessor 3 of the editing apparatus 2 degrades the image quality of the reproduced images of the image display sections preceding the image display section $W57_k$ whose image qualities are not discernible to the operator to alleviate the processing load of the GPU 4.

In this way, the microprocessor 3 of the editing apparatus 2 can move the position of the character CA1 relative to the sub 3D space image IM1 by means of the cursor 71 and display the image display sections $W57_n$, $W57_m$, $W57_l$, $W57_k$, . . . located at the most proximal side of the group of spiral image display sections 58 and adapted to attract attention in enlarged scales, while it raises the frame frequency of the reproduced images displayed in the enlarged image display sections $W57_n$, $W57_m$, $W57_l$, $W57_k$, . . . to allow the operator to visually check the smooth reproduced images. Thus, operations of searching for a scene and editing operations are remarkably facilitated to the operator.

Therefore, the operator only needs to move the character CA1 by means of the cursor 71 to visually check those of the image display sections $W57_1$ through $W57_n$ of the group of spiral image display sections 58 that are displayed in enlarge scales for the part of the image display section $W57_1$ through $W57_n$ of the group of spiral image display sections 58 that the operator wants to closely examine. Thus, the operator can facilitate the operation of searching for an image by his- or her own will.

At this time, again, time code notification frames TC1 through TC4 are added to the image display sections $W57_1$ through $W57_n$ of the group of spiral image display sections 58 at every predetermined intervals so that the operator can facilitate the operation of searching for an image by referring to them.

Figure 32:
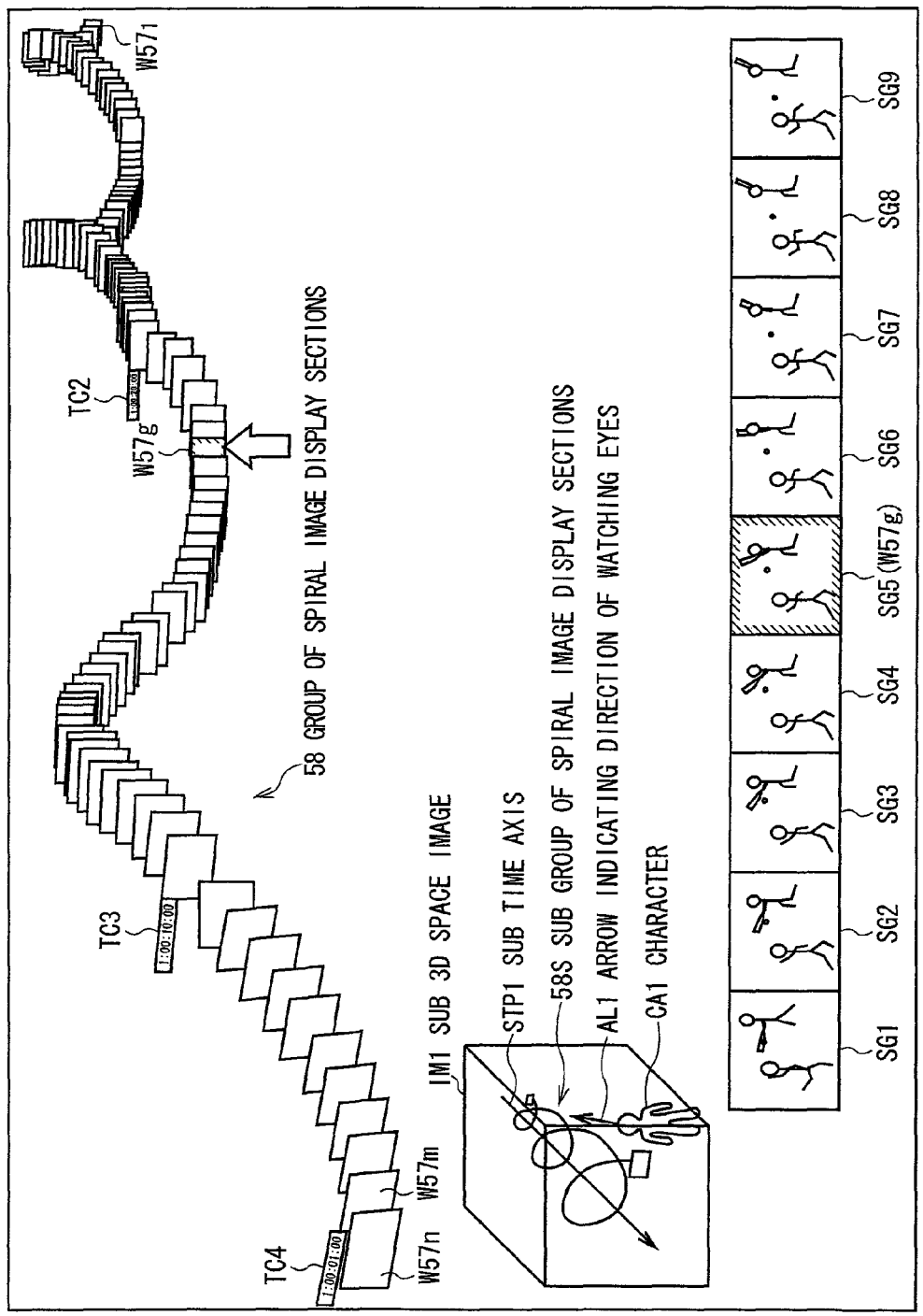
FIG. 32 is a schematic illustration of an example of 2-dimensional image display in an in point searching operation.

(3-4) Two-Dimensional Image Display Process for Group of Spiral Image Display Sections After Shift of Viewpoint As the microprocessor 3 of the editing apparatus 2 recognizes that, for example, the image display section $W57_g$ is selected and operated by means of the cursor 71 out of the image display sections $W57_1$ through $W57_n$ of the group of spiral image display sections 58 while the group of spiral image display sections 58 are being displayed after a shift of the viewpoint as illustrated in FIG. 32, it arranges the images SG1 through SG9 of a total of 9 frames including the frame of the reproduced image that the image display section $W57_g$ is displaying at that time, the four frames immediately preceding that frame and the four frames immediately succeeding the frame two-dimensionally in the display section 55 in such a way that they do not overlap each other. Note that the images SG1 through SG9 are displayed as moving images.

With this arrangement, if the operator feels it difficult to visually confirm the reproduced images of the image display sections $W57_1$ through $W57_n$ because the plurality of image display section $W57_1$ through $W57_n$ of the group of spiral image display sections 58 are mutually overlapping after a shift of the viewpoint, it is possible to two-dimensionally arrange and develop the images SG1 through SG9 of a total of 9 frames including the frame of the reproduced image that the image display section $W57_g$ is displaying at that time, the four frames immediately preceding that frame and the four frames immediately succeeding the frame two-dimensionally. Therefore, it is possible for the operator to remarkably improve the visibility of the plurality of image display sections $W57_1$ through $W57_n$ and facilitate the image searching operation.

Instead of displaying the images SG1 through SG9 of a total of 9 frames including the frame of the reproduced image that the image display section $W57_g$ is displaying at that time, the four frames immediately preceding that frame and the four frames immediately succeeding the frame, it is also possible to display the images SG1 through SG9 of a total of 9 frames including the frame of the reproduced image that the image display section $W57_g$ is displaying at that time, the four frames preceding that frame by every predetermined number and the four frames succeeding the frame by every predetermined number.

When a high reproduction speed v is defined by thinning the frames by every predetermined number of frames (e.g., every five frames) to use the remaining frames and reproduce the images at a predetermined frame rate for displaying the reproduced images in the image display sections $W57_1$ through $W57_n$, the editing apparatus 2 develops and displays the images SG1 through SG9 of a total of 9 frames including the frame of the reproduced image that the image display section $W57_g$ is displaying at that time, the four frames immediately preceding that frame and the four frames immediately succeeding the frame out of the frames left after the initial thinning operation.

The images SG1 through SG9 of the total of nine frames are updated as a function of the reproduction speed of each of the plurality of image display sections $W57_1$ through $W57_n$ of the group of spiral image display sections 58. Therefore, the still images of the nine frames are displayed when the reproduction of the images is suspended, whereas the two-dimensionally developed images are reproduced at the normal speed when the reproduced images are being displayed in the image display section $W57_1$ through $W57_n$ at the normal speed.

(4) Scrub Feature

In addition to the above-described arrangements, the editing apparatus 2 is provided with a scrub feature for the operator to search for an image, while confirming the contents of the moving image.

The expression of scrub as used herein refers to reproduction of a frame or a field of the picture specified by the operator. The operator specifies a picture typically by moving or otherwise manipulating the knob that functions as GUI (graphical user interface).

In this embodiment, the knob is provided as scrub knob 67 that is movable relative to scrub bar 66 arranged at the bottom row of the display section 55 in the editing image 50 and adapted to move in response to the reproducing position of the reproduced image displayed in an image display section, for example the image display sections $W57_n$ (FIG. 3), specified in advance out of the image display section $W57_1$ through $W57_n$ where the reproduced images are displayed with the reproduced time lags $\Delta T$.

When the scrub knob 67 is operated so as to be moved slowly, the image of the frame located at the reproducing position that corresponds to the position of the scrub knob 67 changes slowly for so-called slow replay. When, on the other hand, the scrub knob 67 is operated so as to be moved fast, the image of the frame located at the reproducing position that corresponds to the position of the scrub knob 67 changes fast for so-called high speed replay. Therefore, scrub is a sort of variable speed (special) replay.

On the other hand, in this editing apparatus 2, the relative positional relationship between the 3D virtual space and the character CA1 (FIG. 20) is used to change the display mode for the group of spiral image display sections 58 being displayed in the display section 55 as pointed out above.

Therefore, the editing apparatus 2 can scrub (reproduce an image with a variable speed (in a special way)) in a condition where the display mode of the group of spiral image display sections 58 is changed to match a desired viewpoint on the part of the operator (FIGS. 27 through 32). Then, as a result, the operator can search for an image after analyzing in detail the overall flow of the reproduced images displayed in the group of spiral image display sections 58 and the flow of part of the reproduced images to which attention needs to be paid.

On the other hand, for a scrub operation, it is necessary to read the encoded data of the frame at the position of reproduction that corresponds to the position of the scrub knob 67, decode the encoded data into image data and display (the image corresponding to) the image data in the group of spiral image display sections 58 (image display sections $W57_1$ through $W57_n$) with the reproduced time lags ΔT (FIG. 5). In the current situation where non-linear editing has become very popular, the importance of the scrub feature is increasing as means for checking the contents of a moving image and determining an editing point. Therefore, a scrub feature with which the operator can check the contents of a moving image smoothly in detail is required.

In view of the above identified situation, the editing apparatus 2 (FIG. 1) is adapted to appropriately change the display of the reproduced images being displayed in (the image display section $W57_1$ through $W57_n$ of) the group of spiral image display sections 58 on the display section 55 of the editing image 50 (FIG. 2) with the reproduction time lags ΔT according to the operation of moving the scrub knob 67, constantly maintaining the reproduction time lags ΔT.

Such a process is executed by the microprocessor 3 and the GPU 4 (FIG. 1) and may be divided into a process that is executed prior to the editing operation by way of the editing image 50 (to be referred to as pre-editing process hereinafter) and a process for changing the display of the reproduced images according to the operation of moving the scrub knob 67 and on the basis of the results of the pre-editing process in a state where the reproduced images are maintained with the reproduction time lags ΔT (FIG. 5) (to be referred to as scrub operation hereinafter). Now, the pre-editing process and the scrub operation to be executed by the microprocessor 3 and the GPU 4 will be described sequentially below.

(4-1) Pre-Editing Process

The pre-editing process by the microprocessor 3 and the GPU 4 may be expressed as a functional feature that is executed by an image processing section 1001, a sound processing section 1002, an AV file preparing section 1003, an Fy file preparing section 1004 and a recording/communication section 1005.

The image processing section 1001 receives as input video signals out of the video/audio signals reproduced from the video tape mounted in one of the video tape recorders $23_1$ through $23_n$ (FIG. 1) specified by the operator by means of the operation controller 37, the mouse 38 or the keyboard 39, whereas the sound processing section 1002 receives as input the audio signals out of the reproduced video/audio signals.

The image processing section 1001 executes necessary processes on the video signals including an A/D (analog/digital) conversion process and a noise removing process on a frame by frame basis in time series and supplies the processed image data to the AV file preparing section 1003 and the Fy file preparing section 1004.

The sound processing section 1002 executes necessary processes on the audio signals including an A/D (analog/digital) conversion process and a noise removing process frame by frame by frame basis in time series and supplies the processed audio data to the AV file preparing section 1003.

The AV file preparing section 1003 prepares an AV file storing the time series image data from the image processing section 1001 and the time series audio data from the sound processing section 1002 and supplies it to the recording/communication section 1005.

The Fy file preparing section 1004 determines the variation that expresses the extent of change of the image data supplied from the image processing section 1001 on a frame by frame basis. If necessary, the Fy file preparing section 1004 determines the display type showing the display method of displaying a frame in the image display sections $W57_1$ through $W57_n$ according to the variation of the frame on a picture by picture basis. Additionally, the Fy file preparing section 1004 prepares a file storing either the variation on a picture by picture basis or the variation on a frame by frame basis or both of them (to be also referred to as Fy file whenever appropriate hereinafter) as a meta file (meta data file) (or one of metal data files) storing the meta data of the time series image data supplied from the image processing section 1001 and supplies it to the recording/communication section 1005.

The term of picture as used herein refers to a frame or field. While a frame is adopted as a picture hereinafter, it is also possible to adopt a field as a picture.

The recording/communication section 1005 typically stores the AV file supplied from the AV file preparing section 1003 and the Fy file that is supplied from the Fy file preparing section 1004 and corresponds to the AV file, in other words that is prepared from the image data stored in the AV file supplied from the AV file preparing section 1003 and supplied from the Fy file preparing section 1004, in the memory apparatus 22 (FIG. 1).

An AV file fav and an Fy file fFy that corresponds to the AV file fav are labeled with respective file names that clearly show that they correspond to each other. For example, the file name of the AV file fav and the file name of the Fy file fFy that corresponds to the AV file Fav may differ from each other only in terms of extension (file names whose extensions are different from each other and whose parts other than the extensions are the same).

Figure 33:
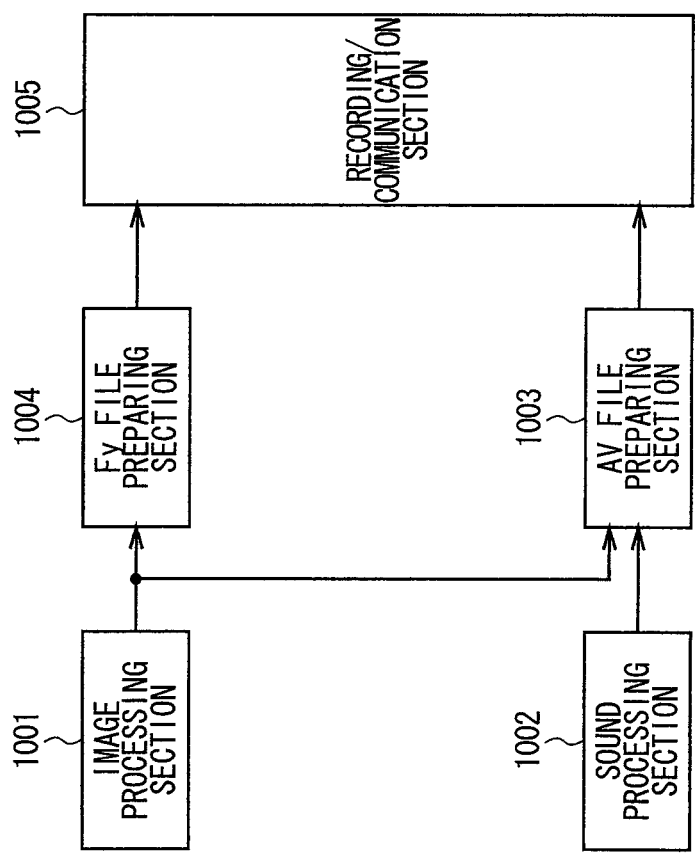
FIG. 33 is a schematic block diagram of a microprocessor and a GPU, illustrating the functional configuration thereof for the pre-editing process.
Figure 34:
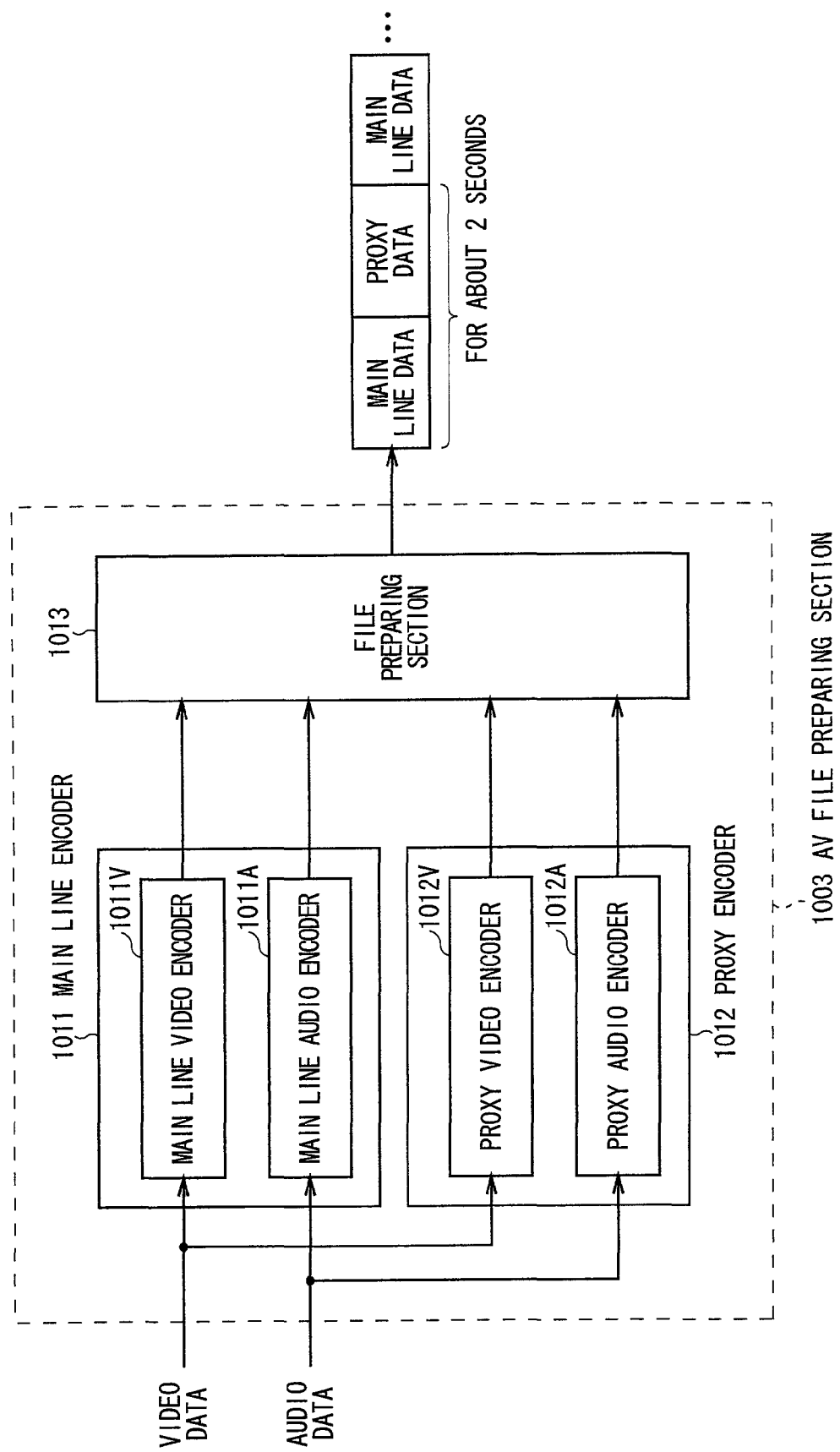
FIG. 34 is a schematic block diagram of the AV file preparing section, illustrating an exemplary configuration thereof.

FIG. 34 shows an exemplary configuration of the AV file preparing section 1003 of FIG. 33. Referring to FIG. 34, the AV file preparing section 1003 includes a main line encoder 1011, a proxy encoder 1012 and a file preparing section 1013.

The main line encoder 1011 includes a main line video encoder 1011V and main line audio encoder 1011A.

The main line video encoder 1011V is supplied with image data as main line data from the image processing section 1001 (FIG. 33). The main line video encoder 1011V encodes the image data supplied from the image processing section 1001 as main line data typically according to an MPEG2 Standard (e.g., MPEG IMX Standard) and supplies the encoded image data to the file preparing section 1013.

The main line audio encoder 1011A is supplied with audio data as main line data from the sound processing section 1002 (FIG. 33). The main line audio encoder 1011A converts the ado data supplied from the sound processing section 1002 as main line data typically according to the AES (Audio Engineering Society) 3 Standard and supplies the converted audio data to the file preparing section 1013.

The proxy encoder 1012 includes a proxy video encoder 1012V and a proxy audio encoder 1012A.

The proxy video encoder 1012V is supplied with image data as main line data from the image processing section 1001 (FIG. 3). The proxy video encoder 1012V thins the pixels of the image data supplied from the image processing section 1001 as main line data and produces image data typically showing a resolution (spatial resolution) lower than the main line data as proxy data. Then, the proxy video encoder 1012V encodes the image data produced as proxy data typically according to the MPEG 4 Standard and supplies the encoded image data to the file preparing section 1013.

The proxy audio encoder 1012A is supplied with audio data from the sound processing section 1002 (FIG. 3). The proxy audio encoder 1012A converts the audio data from the sound processing section 1002 into audio data typically conforming to the ITU-T (International Telecommunication Union, Telecommunication Standardization Sector) G.711 A-Law and supplies the converted audio data to the file preparing section 1013.

The file preparing section 1013 multiplexes the (encoded) image data supplied from the main line video encoder 1011V as main line data, the audio data supplied from the main line audio encoder 1011A as main line data, the image data supplied from the proxy video encoder 1012V as proxy data and the audio data supplied from the proxy audio encoder 1012A as proxy data by every 2 seconds in terms of reproduction time and prepares an AV file of a predetermined format storing the bit stream obtained as a result of the multiplexing, in other words an AV file of a predetermined format storing the bit stream of (the image data and the audio data as) the main line data and (the image data and the audio data as) the proxy data multiplexed by every 2 seconds in terms of reproduction time, which is then supplied to the recording/communication section 1005 (FIG. 33).

Figure 35:
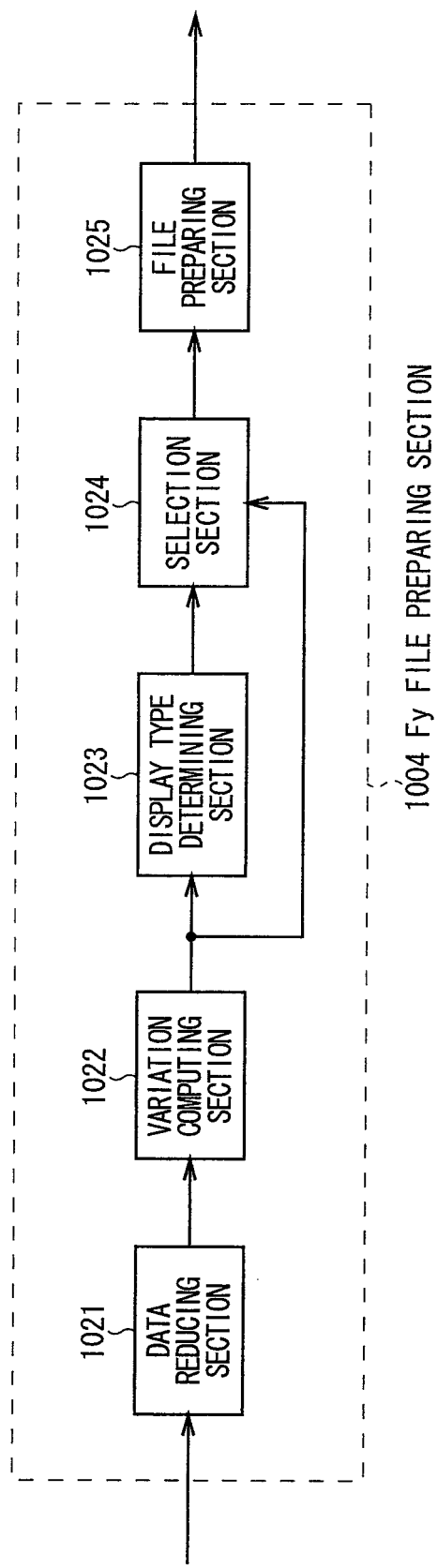
FIG. 35 is a schematic block diagram of the Fy file preparing section, illustrating an exemplary configuration thereof.

FIG. 35 shows an exemplary configuration of the Fy file preparing section 1004 of FIG. 33.

The Fy file preparing section 1004 includes a data reducing section 1021, a variation computing section 1022, a display type determining section 1023, a selection section 1024 and a file preparing section 1025.

The data reducing section 1021 is supplied with image data from the image processing section 1001 (FIG. 3) on a frame by frame basis. The data reducing section 1021 thins the pixels of the image data supplied from the image processing section 1001 on a frame by frame basis and supplies the image data having the reduced number of pixels obtained as a result to the variation computing section 1022.

For example, the data reducing section 1021 thins the pixels of the image data from the image processing section 1001 so as to make both the number of horizontal pixels and the number of vertical pixels equal to ⅛ of the respective original numbers.

Thus, if a frame of image data supplied from the image processing section 1001 (FIG. 33) to the data reducing section 1021 has horizontal 720×vertical 480 pixels, for example, as shown in FIG. 36, the data reducing section 1021 thins the pixels of the image data of 720×480 pixels to produce image data of 90×60 pixels for the number of horizontal pixels and the number of vertical pixels, which are ⅛ of the respective original numbers.

More specifically, the data reducing section 1021 divides an image of 720×480 pixels supplied from the image processing section 1001 into blocks of 8×8 pixels for the number of horizontal pixels and the number of vertical pixels and assigns the average of the pixel values of the pixels of each block to the block to generate image data for 90×60 pixels.

The data reducing section 1021 reduces the number of pixels of the image data from the image processing section 1001 in order to reduce the data volume and alleviate the load of the subsequent processes. Therefore, if the Fy file preparing section 1004 has a sufficient capacity and it is not necessary to reduce the load of the processes, the data reducing section 1021 may be adapted to supply the image data from the image processing section 1001 to the downstream variation computing section 1022 without thinning the pixels or the data reducing section 1021 may be omitted from the Fy file preparing section 1004.

The variation computing section 1022 computationally determines the variation that represents the extent of change of the image data supplied from the data reducing section 1021 on a frame by frame basis and supplies the determined variation to the display type determining section 2012 and the selection section 1024 in time series. Note that the variation computing section 1022 can computationally determine either a variation representing the extent of temporal change (to be referred to as temporal variation hereinafter) or the variation representing the extent of spatial change (to be referred to as spatial variation hereinafter) or both of them.

The expression of temporal variation refers to the extent of change of an image in the temporal direction. For example, the temporal variation of a frame refers to the extent of change between a frame and the frame immediately preceding the former frame or, in other words, the extent of movement of the image. Therefore, if appropriate, the temporal variation may also be expressed as movement information hereinafter.

The expression of spatial variation refers to the extent of change of an image in the spatial direction. For example, the spatial variation of a frame refers to the extent of change of the pixel values of the pixels of the frame and hence the fineness (complexity) of the image. Therefore, if appropriate, the spatial variation may also be expressed as fineness information hereinafter.

The display type determining section 1023 determines the display type, or the display mode, for displaying the frames supplied from the variation computing section 1022 on a frame by frame basis according to the variation of the frames supplied from the variation computing section 1022 in time series and then supplies it to the selection section 1024. The display type will be described in greater detail hereinafter.

The selection section 1024 selects either the variation supplied from the variation computing section 1022 on a frame by frame basis or the display type supplied from the display type determining section 1023 on a frame by frame basis or both of them and supplies it or them, whichever appropriate, to the file preparing section 1025.

It is possible to define how the selection section 1024 operates for selection in advance. It is also possible to define that the selection section 1024 operates according to the operation on the part of the operator. When the selection section 1024 invariably selects the variation supplied form the variation computing section 1022 on a frame by frame basis, it is possible to omit the display type determining section 1023 and the selection section 1024 from the Fy file preparing section 1004.

The file preparing section 1025 prepares an Fy file of a predetermined format that contains the variation or the display type supplied from the selection section 1024 on a frame by frame basis and supplies it to the recording/communication section 77 (FIG. 33).

Figure 37:
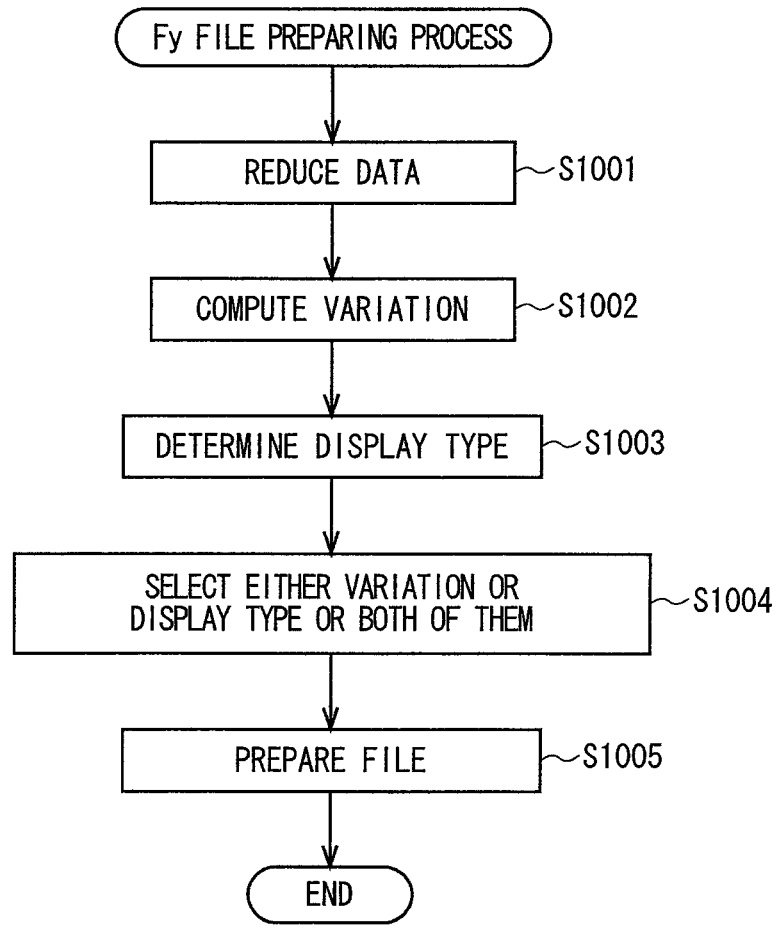
FIG. 37 is a flowchart, illustrating the Fy file preparation process.

Now, the process (Fy preparing process) that the Fy file preparing section 1004 of FIG. 35 executes will be described below by referring to the flowchart of FIG. 37.

Firstly, in Step S1001, the data reducing section 1021 performs data reduction by thinning the pixels from the image data supplied from the image processing section 1001 (FIG. 33) whenever necessary and supplies the image data obtained as a result to the variation computing section 1022. Then, the process proceeds to Step S1002.

In Step S1002, the variation computing section 1022 determines the variation indicating the extent of change of the image data supplied from the image processing section 1001 (FIG. 33) on a frame by frame basis, using the image data from the data reducing section 1021 and supplies it to the display type determining section 1023 and the selection section 1024 in time series. Then, the process proceeds to Step S1003.

In Step S1003, the display type determining section 1023 determines the display mode for displaying the frame on a frame by frame basis according to the variation supplied from the variation computing section 1022 on a frame by frame basis and supplies it to the selection section 1024. Then, the process proceeds to Step S1004.

In Step S1004, the selection section 1024 selects either the variation supplied from the variation computing section 1022 on a frame by frame basis of the display type supplied from the display type determining section 1023 on a frame by frame basis or both of them and supplies it or them, whichever appropriate, to the file preparing section 1025. Then, the process proceeds to Step S1005.

In Step S1005, the file preparing section 1025 prepares an Fy file of a predetermined format storing either the variation or the display type or both of them supplied from the selection section 1024 on a frame by frame basis and supplies it to the recording/communication section 1005 (FIG. 33), when the process ends.

Figure 38:
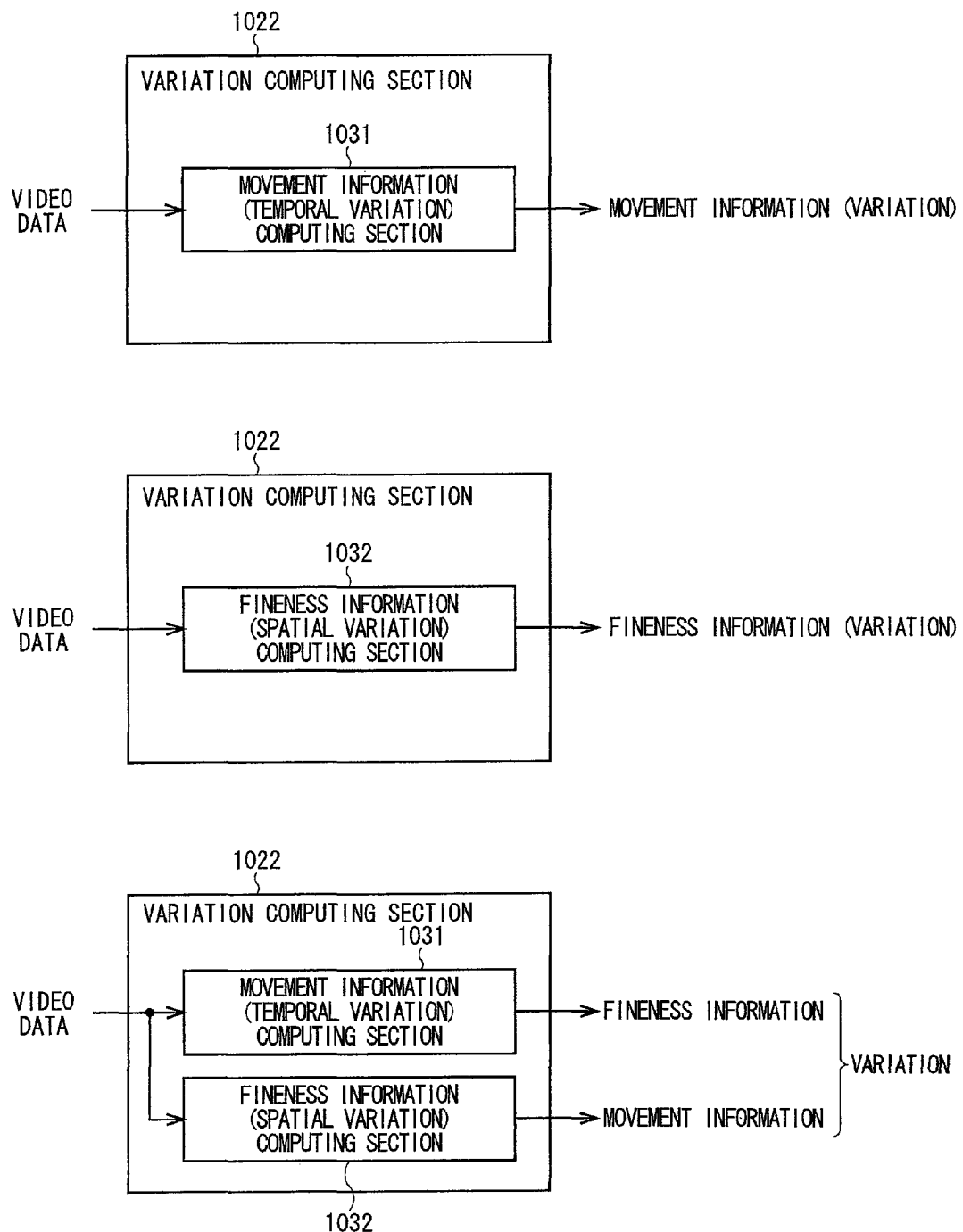
FIG. 38 is a schematic block diagram of the variation computing section, illustrating exemplary configurations thereof.

FIG. 38 shows exemplary configurations of the variation computing section 1022 of FIG. 35.

As described above, the variation computing section 1022 can determine either movement information (temporal variation) showing the extent of temporal change or fineness information (spatial information) showing the extent of spatial change of both as variation on a frame by frame basis.

The top one in FIG. 38 illustrates an exemplary configuration of the variation computing section 1022 adapted to determine only movement information as variation on a frame by frame basis. The second on in FIG. 38 illustrates an exemplary configuration of the variation computing section 1022 adapted to determine only fineness information as variation on a frame by frame basis. The third one (bottom one) in FIG. 38 illustrates an exemplary configuration of the variation computing section 1022 adapted to determine both movement information and fineness information as variation.

The top variation computing section 1022 in FIG. 38 has a movement information computing section 1031 and the second variation computing section 1022 in FIG. 38 has a fineness information computing section 1032, whereas the third variation computing section 1022 in FIG. 38 has both a movement information computing section 1031 and a finesses information computing section 1032.

The movement information computing section 1031 and the fineness information computing section 1032 are supplied with the image data from the data reducing section 1021 (FIG. 35).

The movement information computing section 1031 determines and outputs movement information on a frame by frame basis, using the image data from the data reducing section 1021. The fineness information computing section 1032 determines and outputs fineness information on a frame by frame basis, using the image data from the data reducing section 1021.

Now, movement information that can be determined by the movement information computing section 1031 on a frame by frame basis will be described below by referring to FIG. 39.

Figure 39:
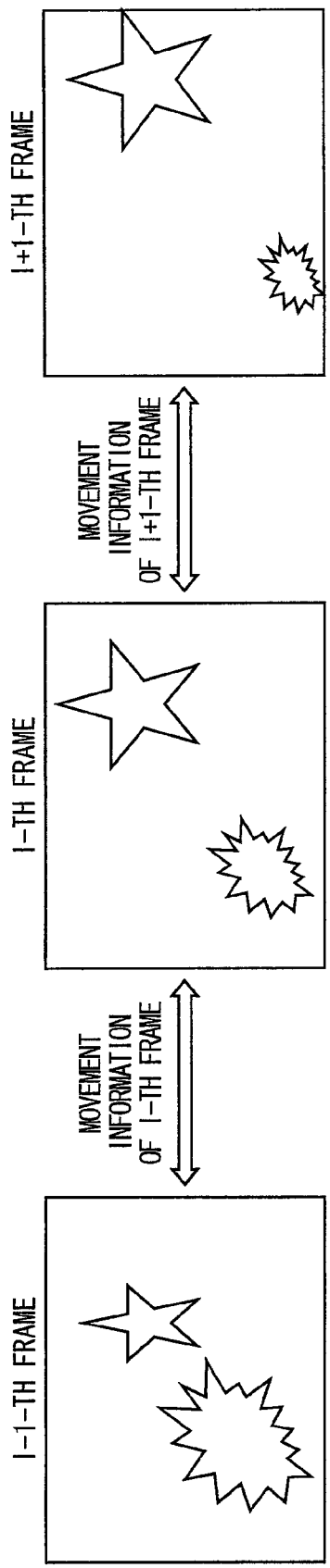
FIG. 39 is a schematic illustration of move information on a frame unit determined by the move information determining section.

For example, the movement information computing section 1031 determines the variation of an image from the i−1-th frame from the forefront of the frames constituting a moving image in time series to the i-th frame as movement information on the i-th frame as shown in FIG. 39. Note that no movement information is determined for the first frame. Note, however, movement information same as the movement information of the second frame may be employed for the first frame. Alternatively, it is possible to determine movement information for the first frame assuming that all the pixel values of the 0-th frame are equal to 0 or same as those of the first frame.

Figure 40:
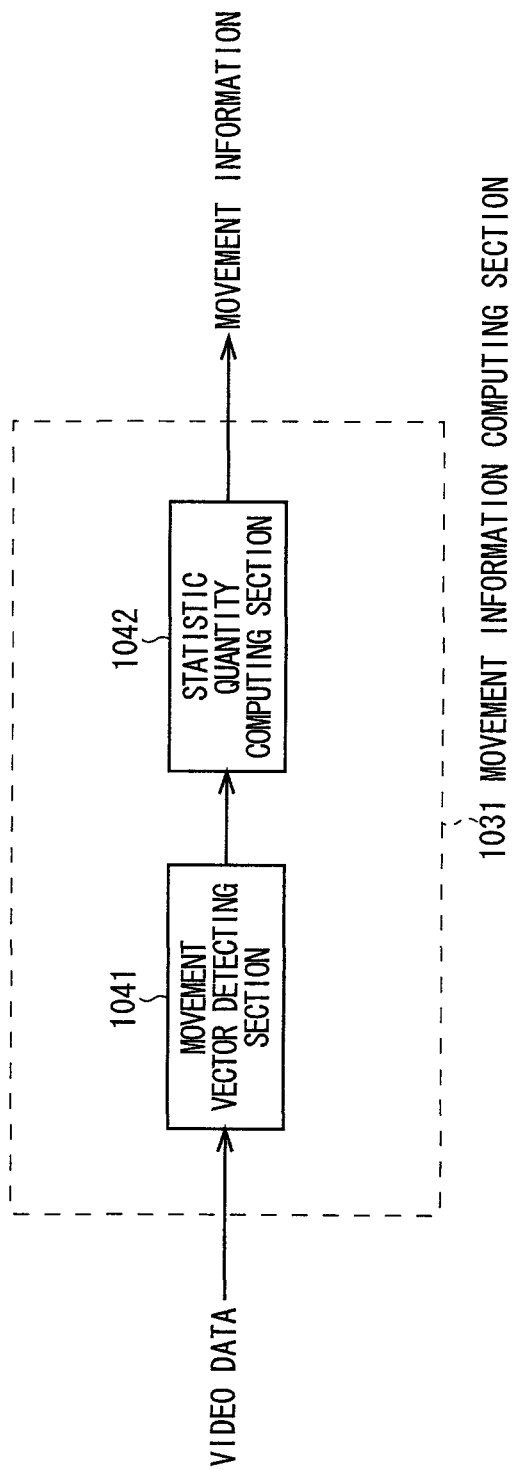
FIG. 40 is a schematic block diagram of the move information determining section, illustrating an exemplary configuration thereof.

FIG. 40 shows an exemplary configuration of the movement information computing section 1031 of FIG. 38.

Referring to FIG. 40, the movement information computing section 1031 includes a motion vector detecting section 1041 and a statistic quantity computing section 1042.

The motion vector detecting section 1041 is supplied with image data from the data reducing section 1021 (FIG. 35). The motion vector detecting section 1041 sequentially picks up each of the frames of the image data supplied from the data recording section 1021 as an attentional frame and divides the frame immediately preceding the attentional frame (to be referred to also as preceding frame whenever appropriate hereinafter) typically into 16×16 pixel blocks (which corresponds to macro blocks according to MPEG). Additionally, the motion vector detecting section 1041 determines the motion vector representing the movement directed from the preceding frame to the attentional frame for each of the macro blocks of the preceding frame and supplies it to the statistic quantity computing section 1042.

The statistic quantity computing section 1042 determines the statistic quantity of the motion vectors determined for the macro blocks of the preceding frame supplied from the motion vector detecting section 1041 and outputs it as movement information on the attentional frame.

Now, the process of the movement information computing section of FIG. 40 will be described further by referring to FIG. 41.

The movement information computing section 1031 divides the preceding frame into macro blocks of 16×16 pixels and detects the macro block of the attentional frame 1 that most resembles the corresponding one of the macro blocks of 16×16 pixels of the preceding frame (to be referred to as resembling block hereinafter). Then, the motion vector detecting section 1041 determines the vector having the upper left corner of the corresponding macro block and the upper left corner of the resembling block respectively as starting point and ending point as motion vector $\Delta F0(h, v)$ of the corresponding macro block.

Assume that the position of the macro block of the preceding frame that is the h-th from the left side and v-th from the top side is expressed by $F0(h, v)$ and the position of the resembling block of 16×16 pixels of the attentional frame that is moved by the motion vector ΔF0(h, v) of the macro block F0(h, v) is expressed by F1(h, v), the motion vector ΔF0(h, v) of the macro block F0(h, v) is expressed by formula ΔF0(h, v)=F1(h, v)−F0(h, v).

The statistic quantity computing section 1042 typically determines the total sum D0=Σ|ΔF0(h, v)| of the sizes |ΔF0(h, v)| of the motion vectors F0(h, v) of all the macro blocks of the preceding frame and outputs the total sum D0 as movement information of the attentional frame.

The summation Σ for the total sum D0=Σ|ΔF0(h, v)| means that h is varied from 1 to the number of horizontal macro blocks of the preceding frame and v is varied from 1 to the number of vertical macro blocks of the preceding frame.

When the size of the motion vector ΔF0(h, v) of each of the macro blocks F0(h, v) of the preceding frame is large, the movement information D0 that is the sum thereof is large accordingly. Therefore, when the movement information D0 of the attentional frame is large, the movement of the attentional frame is large (strong).

While the total sum D0=Σ|ΔF0(h, v)| of the sizes |ΔF0(h, v)| of the motion vectors F0(h, v) of all the macro blocks of the preceding frame is determined as statistic quantity of the motion vectors determined for the macro blocks of the preceding frame in the above description, it is possible to alternatively employ the variance of the motion vectors determined for the macro blocks of the preceding frame.

In such a case, the statistic quantity computing section 1042 determines the average value Δave of the motion vectors ΔF0(h, v) of all the macro blocks of the preceding frame and then determines the variance σ0 of the motion vectors ΔF0(h, v) of all the macro blocks F0(h, v) of the preceding frame by computing equation σ0=Σ(ΔF0(h, v)−Δave)2.

The summation Σ of the variance Σ0=Σ(ΔF0(h, v)−Δave)2 means that h is varied from 1 to the number of horizontal macro blocks of the preceding frame and v is varied from 1 to the number of vertical macro blocks of the preceding frame.

Like the total sum D0, when the variance σ0 of the attentional frame is large, the movement of the attentional frame is large (strong).

If the motion vector ΔF0(h, v) is determined when the image data are encoded by the main line video encoder 1011V of FIG. 34, the statistic quantity computing section 1042 (FIG. 40) can determine the above-described statistic quantity, using the motion vectors ΔF0(h, v) that are determined by the main line video encoder 1011V. In this case, the motion vector detecting section 1041 of the movement information computing section 1031 of FIG. 40 may be omitted.

Figure 42:
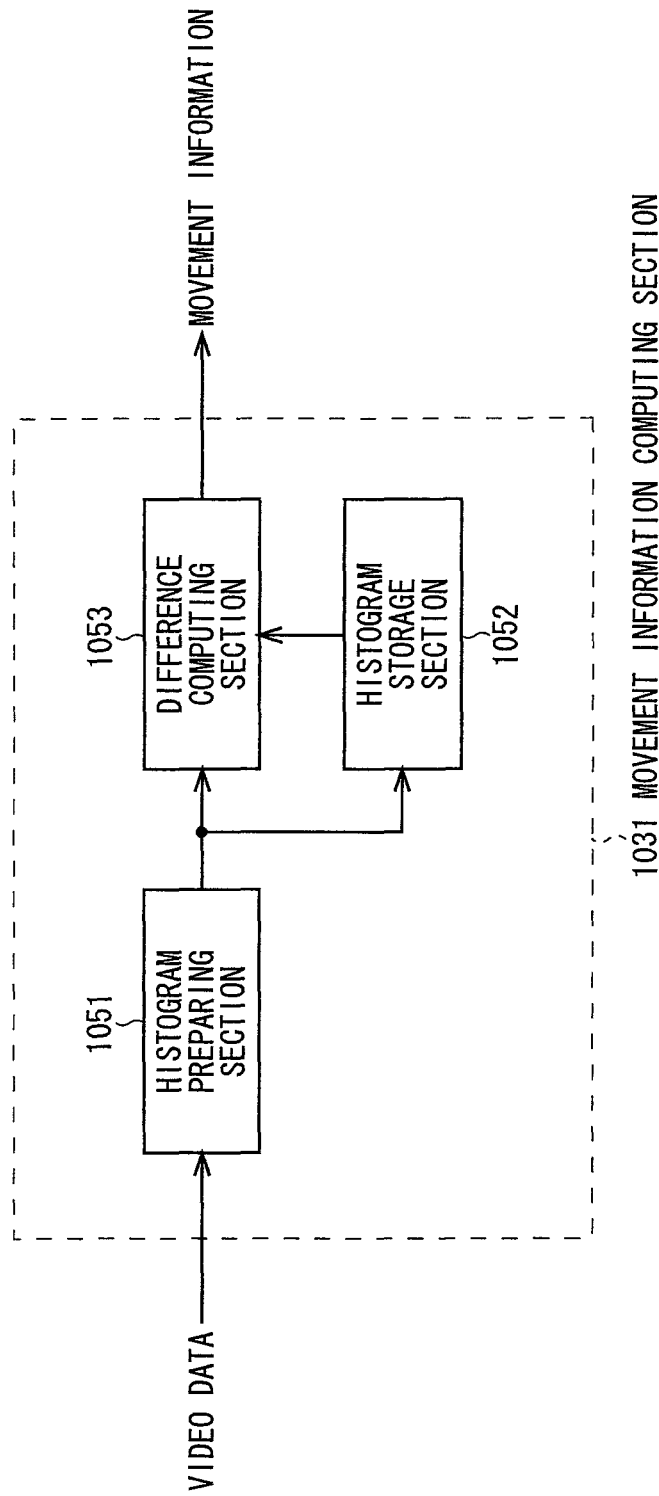
FIG. 42 is a schematic block diagram of the move information determining section, illustrating another exemplary configuration thereof.

FIG. 42 shows another exemplary configuration of the movement information computing section 1031 of FIG. 38.

Referring to FIG. 42, the movement information computing section 1031 has a histogram preparing section 1051, a histogram storage section 1052 and a difference computing section 1053.

The histogram preparing section 1051 is supplied with image data from the data reducing section 1021 (FIG. 35). The histogram preparing section 1051 sequentially selects the frames of the image data from the data reducing section 1021 as attentional frames and prepares a concise histogram of the pixel values of each attentional frame, which is then supplied to the histogram storage section 1052 and the difference computing section 1053 as histogram of the attentional frame.

The histogram storage section 1052 stores the histogram of the attentional frame supplied from the histogram preparing section 1051. The histogram storage section 1052 has a capacity for storing at least the histograms of two frames and stores the histogram of the last attentional frame and the histogram of the frame immediately preceding the last attentional frame.

The difference computing section 1053 determines the sum of the absolute values of the differences, which will be described hereinafter, between the histogram of the attentional frame supplied from the histogram preparing section 1051 and the histogram of the immediately preceding frame stored in the histogram storage section 1052 and outputs it as movement information of the attentional frame.

Figure 43:
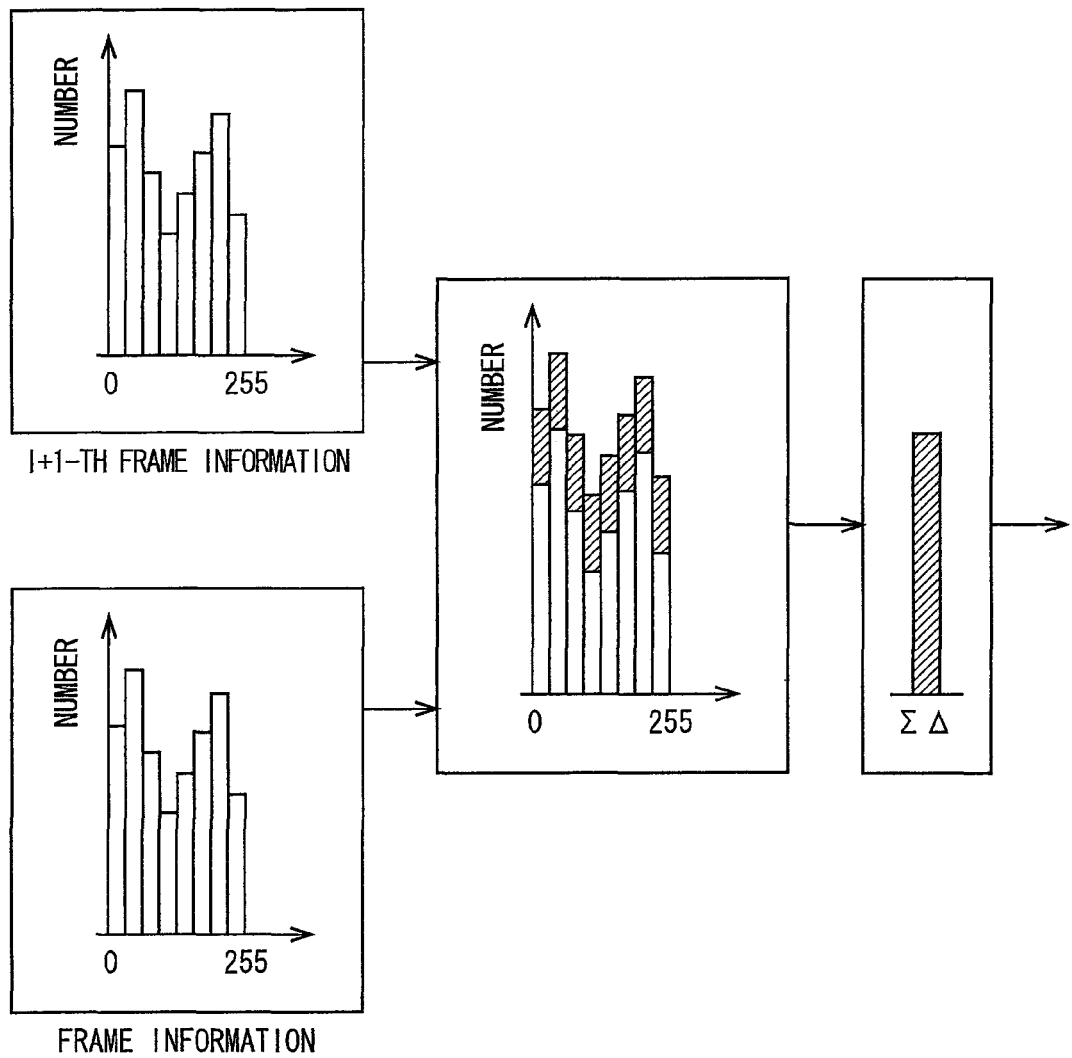
FIG. 43 is a schematic illustration of the process of the move information determining section.

Now, the process of the movement information computing section 1031 of FIG. 42 will be described further by referring to FIG. 43.

If the pixel values of the image data supplied from the data reducing section 1021 (FIG. 35) to the histogram preparing section 1051 are expressed by 8 bits that can express integers between 0 and 255, the histogram preparing section 1051 typically equally divides the range between 0 and 255 by eight to produce eight small ranges of 0 through 31, 32 through 63, 64 through 95, 96 through 127, 128 through 159, 160 through 191, 192 through 223 and 224 through 255 and prepares a concise histogram of the attentional frame by determining the frequency of pixel values contained in each small range.

For example, assume that the i+1-th frame is the attentional frame. The difference computing section 1053 determines the absolute value Δ of the difference of the frequency of each of the small ranges of the i+1-th frame that is the attentional frame and that of the corresponding range of the i-th frame that is the immediately preceding frame (the shaded parts in FIG. 43). Then, the difference computing section 1053 determines the total sum of the absolute values of the differences (sum of the absolute values of the differences) of frequencies determined for the eight small ranges of the histograms and outputs it as movement information of the attentional frame.

When the movement of the attentional frame is large (strong), the frequency distribution of the pixel values of the attentional frame is different from the frequency distribution of the pixel values of the immediately preceding frame. Therefore, when the sum of the absolute values of the differences ΣΔ is large, it means that the movement of the image of the attentional frame is large (strong).

Figure 44:
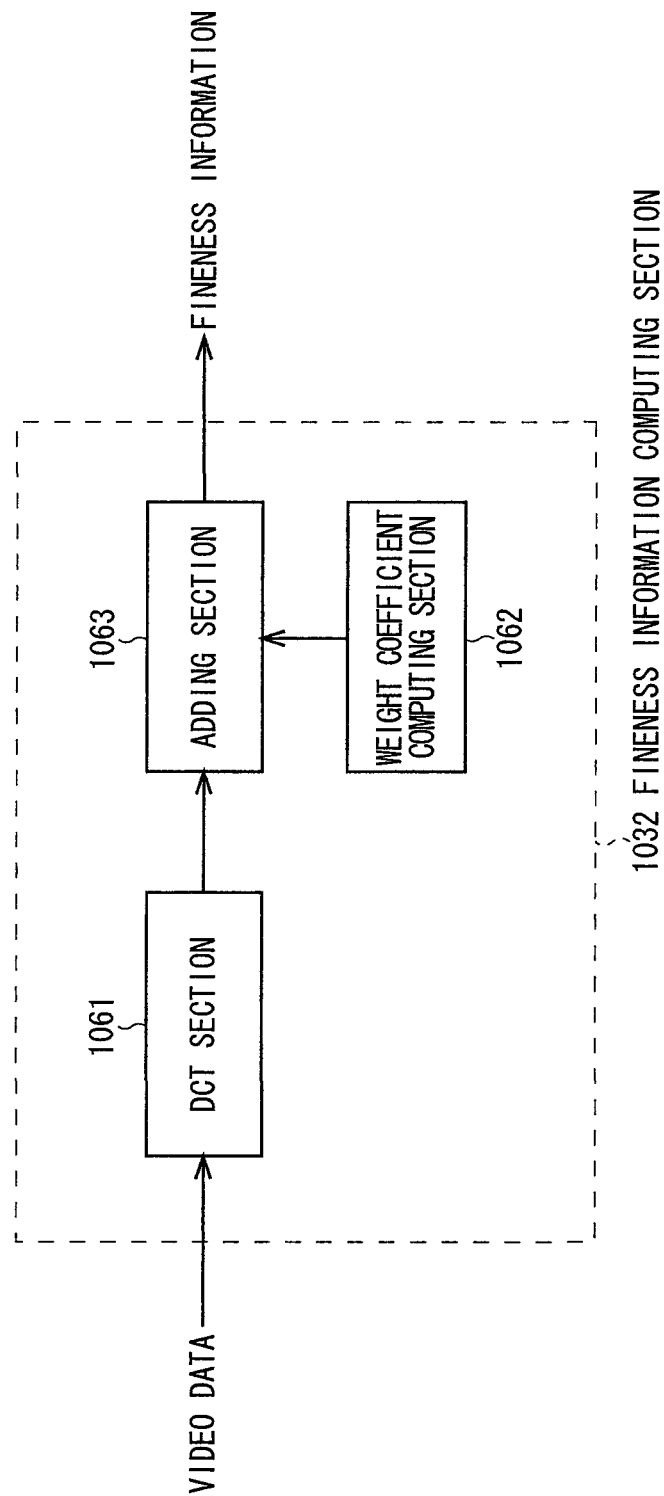
FIG. 44 is a schematic block diagram of the fineness information determining section, illustrating an exemplary configuration thereof.

FIG. 44 shows an exemplary configuration of the fineness information computing section 1032 of FIG. 38.

Referring to FIG. 44, the fineness information configuration section 1032 has a DCT (discrete cosine transform) section 1061, a weight coefficient computing section 1062 and an adding section 1063.

The DCT section 1061 is supplied with image data from the data reducing section 1021 (FIG. 35). The DCT section 1061 sequentially selects the frames of the image data from the data reducing section 1021 as attentional frames and divides each attentional frame into blocks of 8×8 pixels. Additionally, the DCT section 1061 performs a DCT on each of the blocks of the attentional block and supplies the 8×8 DCT coefficients obtained for each of the blocks to the adding section 1063.

The weight coefficient computing section 1062 determines the weights to be respectively put to the 8×8 DCT coefficients of the blocks and supplies them to the adding section 1063.

The adding section 1063 adds the weights supplied from the weight coefficient computing section 1062 respectively to the 8×8 DCT coefficients of the blocks supplied from the DCT section 1061 to determine the sum values. Additionally, the adding section 1063 determines the total sum of the sum values determined for the respective blocks of the attentional frame and outputs it as fineness information of the attentional frame.

Now, the process of the fineness information computing section 1032 of FIG. 44 will be described below by referring to FIG. 45.

Figure 45:
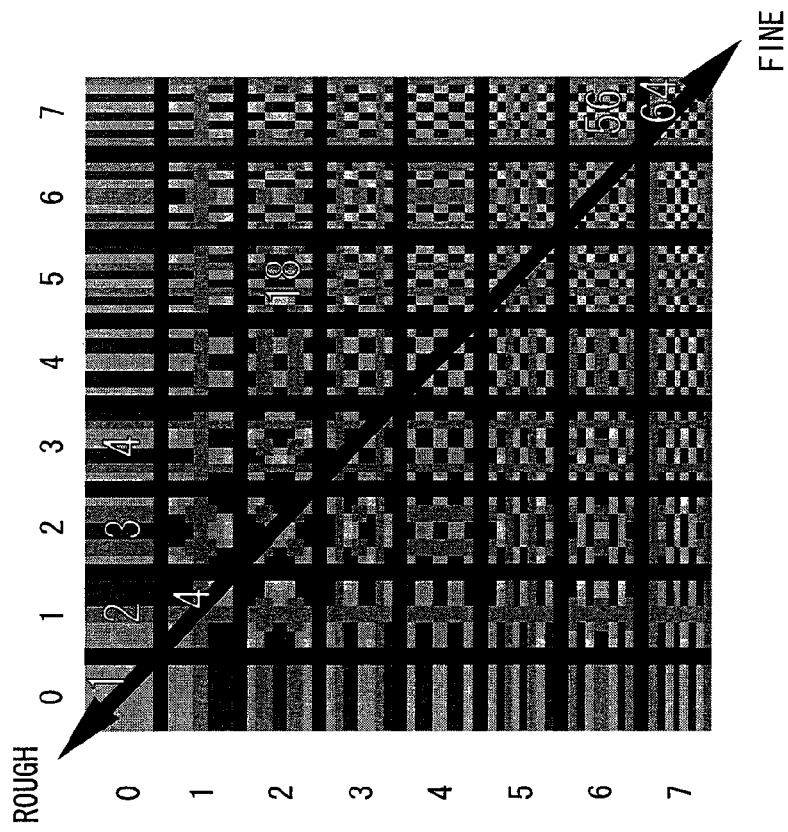
FIG. 45 is a schematic illustration of the process of the fineness information determining section.

The left half of FIG. 45 shows the base image of a DCT. The base image includes 8×8 pattern (frequency components) and the right side patterns and the lower side patterns are patterns of higher frequency components.

Of the 8×8 DCT coefficients of the blocks, the DCT coefficient Fi−1, j−1 that is the DCT coefficient i-th from the left (i=1, 2, . . . , 8) and j-th (j=1, 2, . . . , 8) from the top shows the extent (degree) to which the frequency component of the pattern that is i-th from the left and j-th from the top is contained in the corresponding block.

The right half of FIG. 45 shows the weight Gi−1, j−1 that the weight coefficient computing section 1062 computationally determines.

The weight Gi−1, j−1 is the weight to be put to the DCT coefficient Fi−1, j−1. The weight coefficient computing section 1062 determines the weight Gi−1, j−1 typically by means of formula Gi−1, j−1=i×j. Therefore, the weight coefficient computing section 1062 determines a weight having a large value for the weight Gi−1, j−1 to be put to the DCT coefficient Fi−1, j−1 of a higher frequency component.

The adding section 1063 of FIG. 44 multiplies the DCT coefficient Fi−1, j−1 of the block supplied from the DCT section 1061 by the weight Gi−1, j−1 supplied from the weight coefficient computing section 1062 to determine the product of Gi−1, j−1×Fi−1, j−1. Then, the adding section 1063 adds the products Gi−1, j−1×Fi−1, j−1 obtained for all the DCT coefficients Fi−1, j−1 of the 8×8 blocks, or the sum V=ΣGi−1, j−1×Fi−1, j−1. Note that the summation Σ of the added value V=ΣGi−1, j−1×Fi−1, j−1 means that both i and j are varied from 1 to 8.

Additionally, the adding section 1063 determines the total sum K of the sums V obtained for all the blocks of the attentional frame and outputs it as fineness information on the attentional frame.

Since the fineness information that is the total sum K of the sums V is large when the attentional frame contains higher frequency components to a large extent to tell that the image of the attentional frame is a fine (complex) image.

Figure 46:
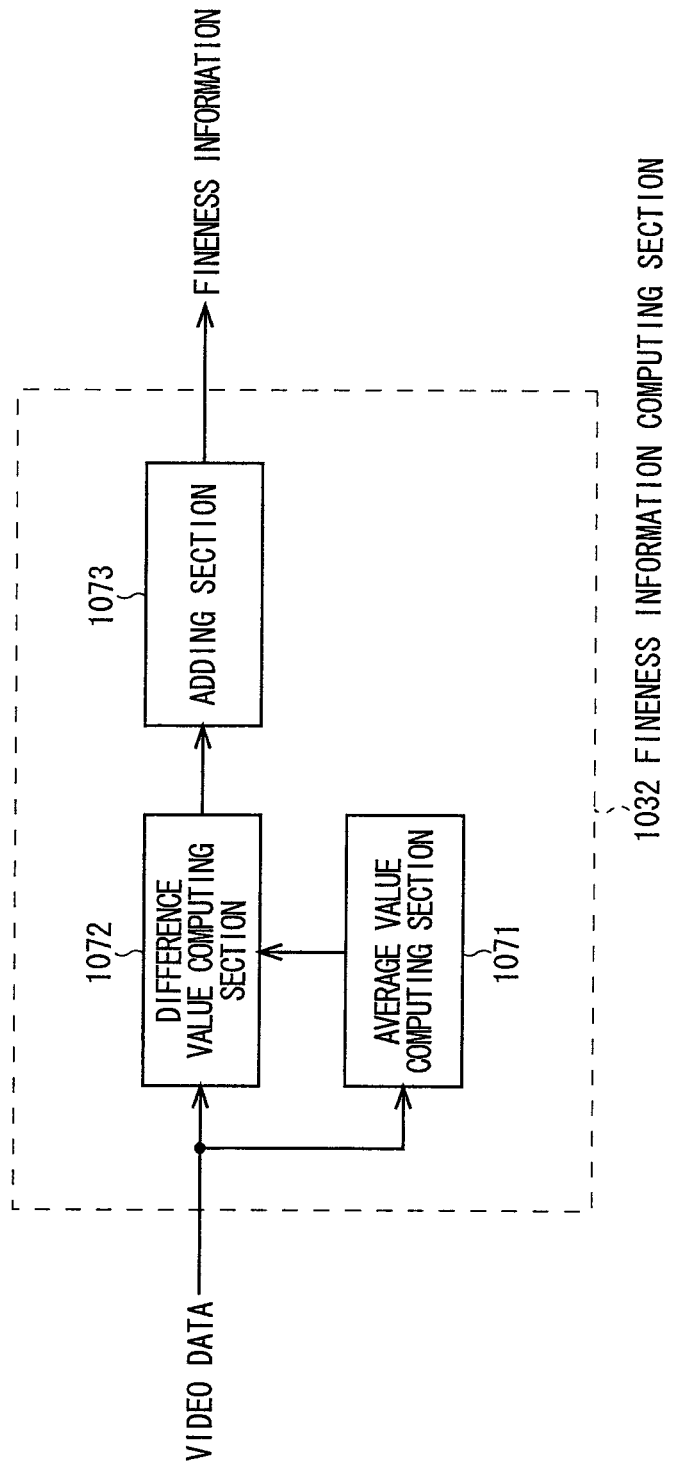
FIG. 46 is a schematic block diagram of the fineness information determining section illustrating another exemplary configuration thereof.

FIG. 46 shows another exemplary configuration of the fineness information computing section 1032 of FIG. 38.

The fineness information computing section 1032 of FIG. 46 has an average value computing section 1071, a difference value computing section 1072 and an adding section 1073.

Figure 47:
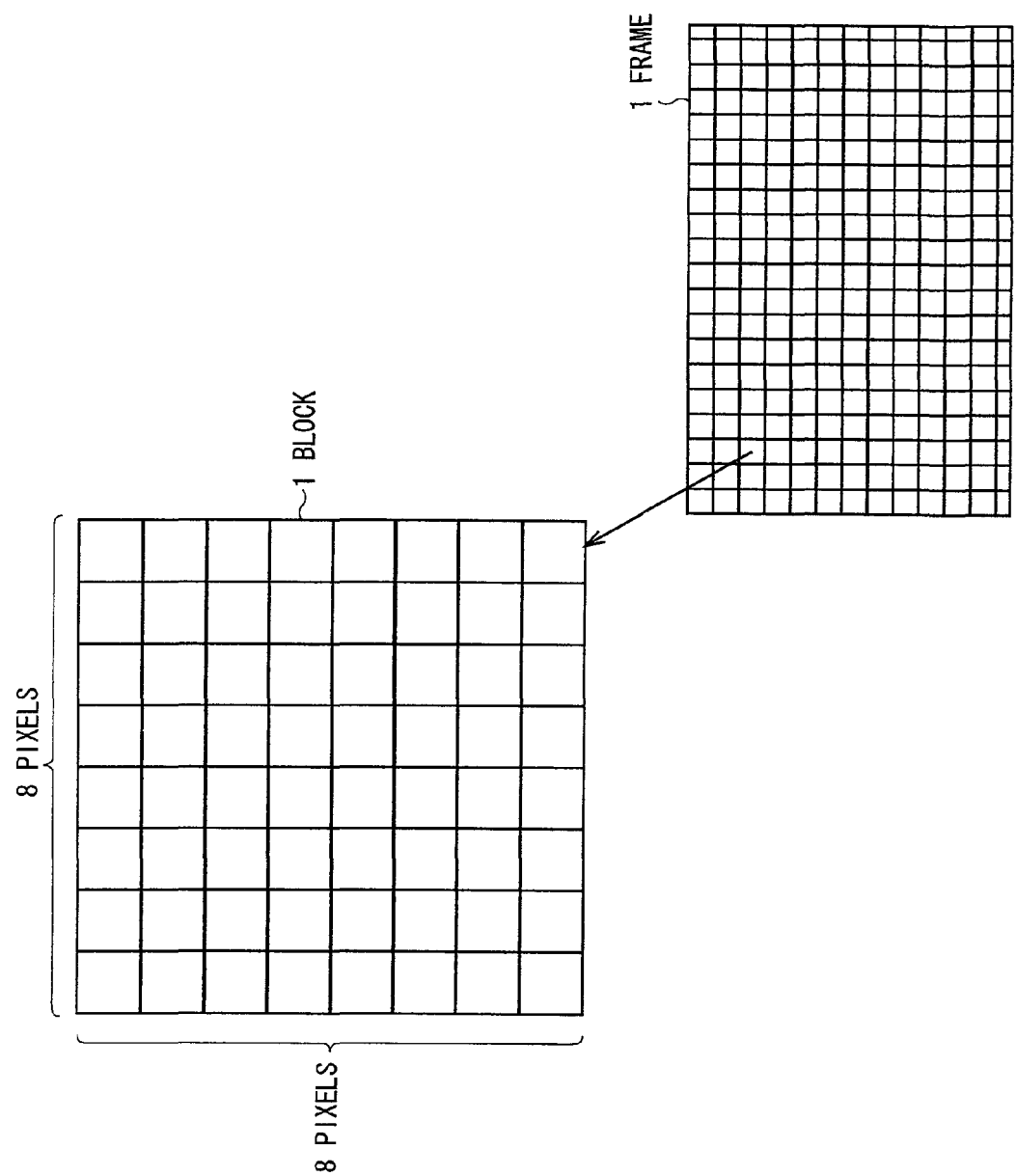
FIG. 47 is a schematic illustration of the process of the average value computing section.

The average value computing section 1071 and the difference value computing section 1072 are supplied with image data from the data reducing section 1021 (FIG. 35). The average value computing section 1071 sequentially selects the frames of the image data from the data reducing section 1021 as attentional frames and divides each attentional frame into blocks of 8×8 pixels as shown in FIG. 47. Additionally, the average value computing section 1071 determines the average value of the pixel values of each of the blocks of the attentional frame and supplies the obtained average values to the difference value computing section 1072.

If the pixel value of the k-th pixel in the order of raster scan of the blocks of 8×8 pixels is expressed as Pk, the average value computing section 1071 determines the average value Pave by means of formula Pave=1/(8×8)×ΣPk. Note that the summation Σ of the average value Pave=1/(8×8)×ΣPk means that k is varied from 1 to 8×8 (=64).

Like the average value computing section 1071, the difference value computing section 1072 divides the attentional frame into blocks of 8×8 pixels and determines the absolute value |Pk−Pave| of the difference value of each of the pixel values Pk of each of the blocks and the average value Pave of the pixel values of the corresponding block supplied from the average value computing section 1071 and supplies it to the adding section 1073.

The adding section 1073 adds the absolute values |Pk−Pave| of the difference values determined for the pixels of the block supplied from the difference value computing section 1072 to determine the sum Q=Σ|Pk−Pave|. Note that the summation Σ of the sum Q=Σ|Pk−Pave| means that k is varied from 1 to 8×8 (=64).

Additionally, the adding section 1073 determines the total sum of the sums Q obtained for all the blocks of the attentional frame and outputs it as fineness information on the attentional frame.

The total sum of the sums Q determined for the attentional frame is referred to as intra-AC and the dispersion of the pixel values of the attentional frame is large when the value of the intra-AC is large. Therefore, when the fineness information that is the total sum of the sums Q is large, the image of the attentional frame is a fine (complex) image.

While the variations including the movement information and the fineness information are utilized for (variable speed replays including) scrubs as will be described hereinafter, they can also be utilized for detecting changes of scenes and for improving the efficiency of MPEG encoding.

Now, the display type determining section 1023 of FIG. 35 will be described by referring to FIGS. 48 through 54.

Figure 48:
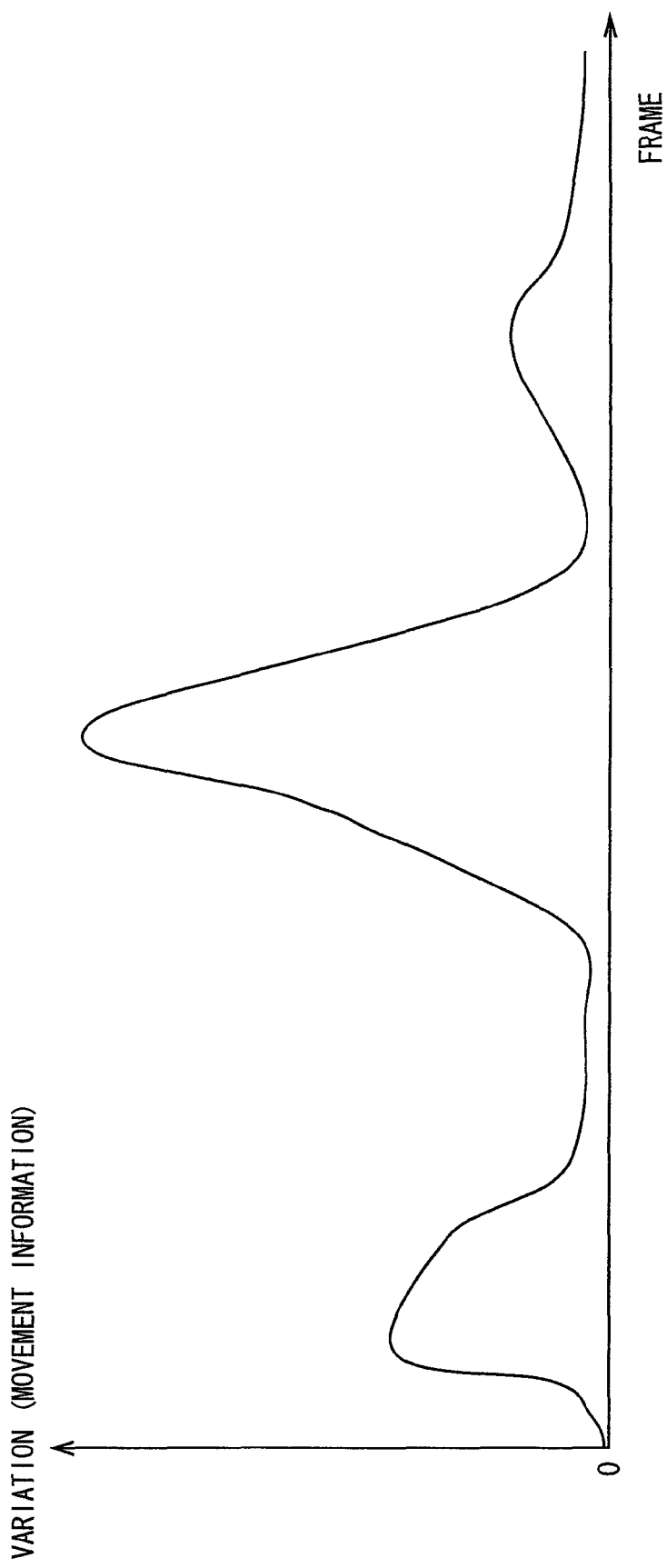
FIG. 48 is a schematic illustration of the variation per frame as determined by the variation computing section.

FIG. 48 is a graph illustrating the variations of the respective frames as determined by the variation computing section 1022 (FIG. 35). In FIG. 48, the horizontal axis indicates frames (the ordinal numbers of frames) and the vertical axis indicates variations.

If the variation is movement information, the variation is large for a frame whose movement is strong (large), whereas the variation is small for a frame whose movement is weak (small).

The display type determining section 1023 (FIG. 35) determines the display type that indicates the display mode for displaying each frame, selecting it from a plurality of display types, according to the variations determined by the variation computing section 1022 on a frame by frame basis as illustrated in FIG. 48.

FIG. 49 shows an example of display types determined by the display type determining section 1023.

FIG. 49 shows three display types including still image type V1 for displaying still images, ordinary type V2 where the resolution and the display rate (frame rate) for displaying frames are variable and high display rate/low resolution type V3.

The term of resolution as used herein for displaying a frame refers to the spatial resolution of the image displayed on a display apparatus such as display 40 (FIG. 1). For example, as for image data including main line data and proxy data, main line data show a high resolution whereas proxy data show a low resolution.

The term of display rate for displaying frames refers to the frequency (period) of updating the display on a display apparatus such as display 40. For example, when the display is updated at a display rate same as the frame rate of moving image (e.g., 30 Hz) and, at the same time, the frame that is the object of display is updated from a frame to the next frame (the temporally next frame) at a rate same as the frame rate, the moving image is displayed at the normal speed.

When, on the other hand, the display is updated at a display rate twice as much as the frame rate of moving image and, at the same time, the frame that is the object of display is updated from a frame to the next frame at a rate twice as much as the frame rate, the moving image is displayed at the double speed.

Note that the moving image is displayed at the double speed when the display is updated at a display rate same as the frame rate of the moving image and, at the same time, the frame that is the object of display is updated from a frame to the next frame at a rate twice as much as the frame rate.

Note that, however, the moving image is displayed at the double speed without thinning frames when the display is updated at a display rate twice as much as the frame rate of moving image and, at the same time, the frame that is the object of display is updated from a frame to the next frame at a rate twice as much as the frame rate, whereas frames are thinned when the display is updated at a display rate twice as much as the frame rate of moving image and, at the same time, the frame that is the object of display is updated from a frame to the next frame at a rate twice as much as the frame rate.

Therefore, it is possible to prevent frames from being thinned (reduced) by raising the display rate when the frame that is the object of display is updated at a rate higher than the frame rate.

As for a frame of the still image type V1, if the frame that is the object of display is changed, the (image of the) frame displayed immediately before the change is displayed so long as the frame that is the object of display can be (continuously) regarded same as the (image of the) frame displayed immediately before the change.

As for a frame of the ordinary type V2, the image is displayed at a display rate same as the frame rate of moving image (to be referred to as ordinary rate hereinafter) and with a resolution same as image data of main line data (a resolution higher than an image of proxy data) (to be referred to as ordinary resolution hereinafter).

As for a frame of the high display rate/low resolution type V3, the image is displayed at a rate higher than the ordinary rate, e.g. a display rate twice as high as the ordinary rate, and with a resolution same as image data of proxy data (a resolution lower than an image of main line data).

When there are three display types including the still image type V1, the ordinary type V2 and the high display rate/low resolution type V3 as shown in FIG. 49, the variation computing section 1022 determines the movement information that expresses the extent of temporal change of frames as variation. Then, the display type determining section 1023 compares, for example, the variation (movement information) of each frame and two predetermined threshold values and selects one of three types of the still image type V1, the ordinary type V2 and the high display rate/low resolution type V3 according to the outcome of the comparison.

Figure 50:
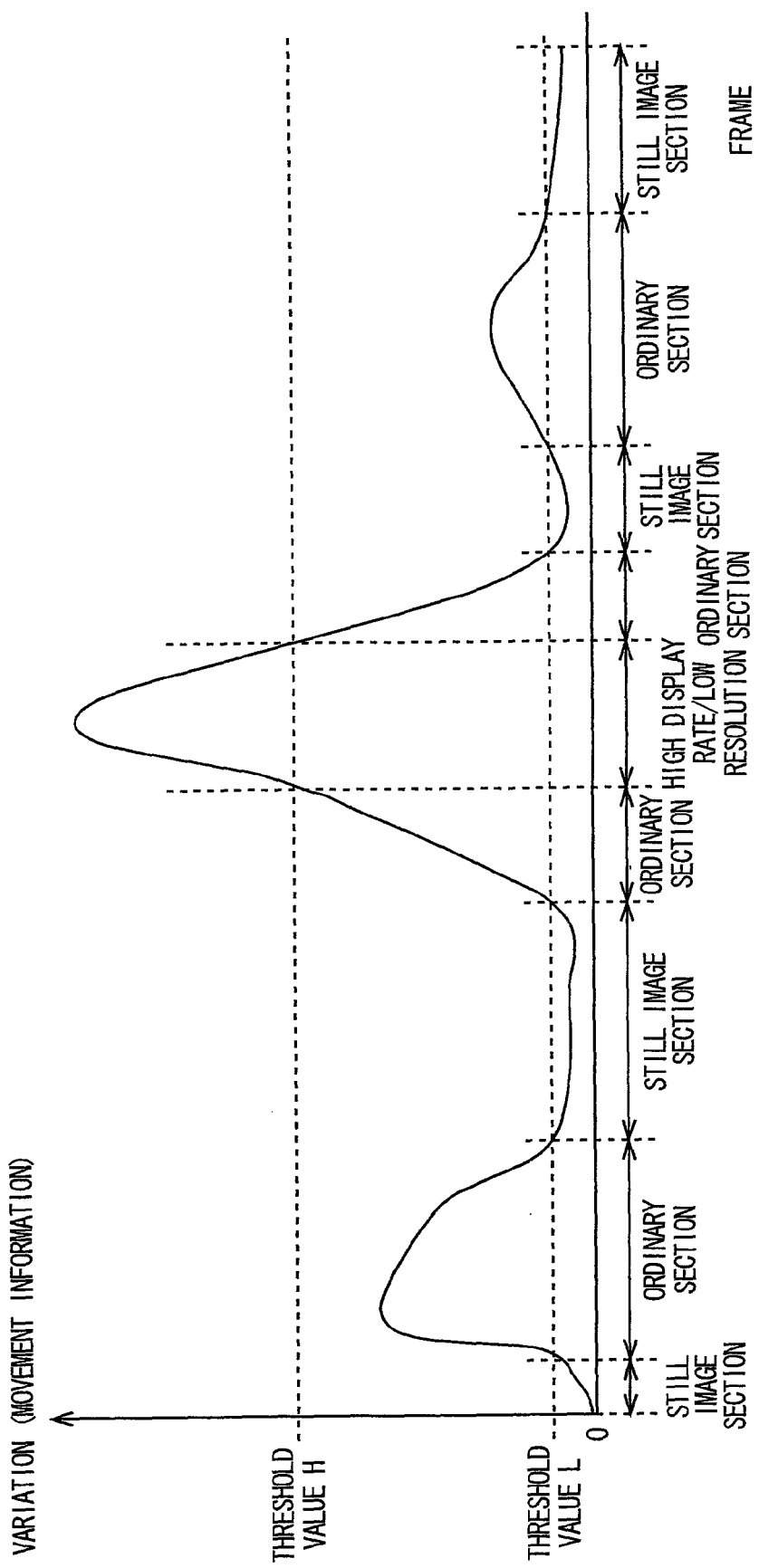
FIG. 50 is a schematic illustration of the display type as determined on a frame by frame basis by the display type determining section.

FIG. 50 illustrates the display type that the display type determining section 1023 determines on a frame by frame basis according to the variations on a frame by frame basis as illustrated in FIG. 48.

Referring to FIG. 50, the display type determining section 1023 compares the variations (movement information) of frames with threshold value L or threshold value H, which show a relationship of L<H on a frame by frame basis. Then, the display type determining section 1023 selects the high display rate/low resolution type V3, which is a low resolution type or a high display rate type, for the frames whose movement information is not lower than the threshold value H and hence indicates a large extent of temporal change.

It is desirable to display frames whose movement is large are displayed at a high display rate because the operator can miss temporal changes of images when he or she is scrubbing in an editing operation if, for example, frames that show a large extent of temporal change and hence a large movement are thinned.

However, the load of the apparatus where the scrub feature is being used is increased when the display rate is raised. Additionally, the quantity of data of a frame showing a large movement is large and hence the load of processing the frame is greater than the load of processing a frame showing only a small movement.

Thus, this embodiment is so adapted that a frame showing a large movement is displayed at a high display rate but the high display rate/low resolution type V3, which is a low resolution type or a high display rate type, is employed for it. Since the quantity of data of an image showing a low resolution is smaller than that of an image showing a high resolution, it is possible to reduce the load of the apparatus where the scrub feature is being used and at the same time prevent the operator from missing temporal changes of images in an editing operation by displaying frames showing a large movement at a low resolution and a high display rate.

On the other hand, the display type determining section 1023 selects the still image type V1 for displaying still images for the display type of frames whose movement information is less than the threshold value L and hence indicates a small extent of temporal change.

When the scrub feature is being used for an editing operation and frames that show a small extent of temporal change and hence do not (or hardly) show any movement appear consecutively, the image being displayed on the display apparatus does not (or hardly) change when the frame that is the object of display is updated among such frames and the display of the display apparatus, or the display 40 (FIG. 1), is shifted from the (image of the) frame displayed immediately before to the (image of the) frame that is the object of display after the update.

The load of the apparatus where the scrub feature is being used is made heavy for nothing when the frame that is the object of display is updated among such frames and the display of the display apparatus is shifted from the (image of the) frame displayed immediately before to the (image of the) frame that is the object of display after the update although the image being displayed on the display apparatus does not (or hardly) change.

Additionally, when frames that show a small extent of temporal change and hence do not (or hardly) show any movement appear consecutively, the image being displayed on the display apparatus can sometimes be changed slightly when the display of the display apparatus, of the display 40 (FIG. 1), is shifted from the frame displayed immediately before to the frame that is the object of display after the update. Then, the operator who is using the scrub feature on the apparatus is forced to pay attention to the frames that appear consecutively and do not (or hardly) show any movement for nothing because such frames are hardly selected for editing points.

In view of the above-described circumstances, this embodiment employs the still image type V1 for displaying the (image of the) frame that is displayed immediately before for frames that do not show any movement if the frame that is the object of display is changed so long as the image of the frame that is the object of display can be regarded same as the image of the frame that is displayed immediately before. With this arrangement, it is possible to prevent a heavy load from being applied to the apparatus where the scrub feature is used and the operator for nothing.

The display type determining section 1023 selects the ordinary type V2 for the display type of frames other than frames whose movement information is not less than the threshold value H and frames whose movement information is less than the threshold value L, or frames showing movement information not less than the threshold value L and less than the threshold value H.

In other words, the ordinary type V2 for display images at the ordinary rate (display rate same as the frame rate of moving images) and normally at a low resolution is employed for frames that show a certain extent of movement that is not large.

Among the (string of) frames arranged in time series to form a moving image, a section where frames of the still image type V1 appear consecutively is referred to as a still image section and a section where frames of the ordinary type V2 appear consecutively is referred to as an ordinary image section. On the other hand, a section where frames of the high display rate/low resolution type V3 consecutively appear is referred to as a high display rate/low resolution section.

Figure 51:
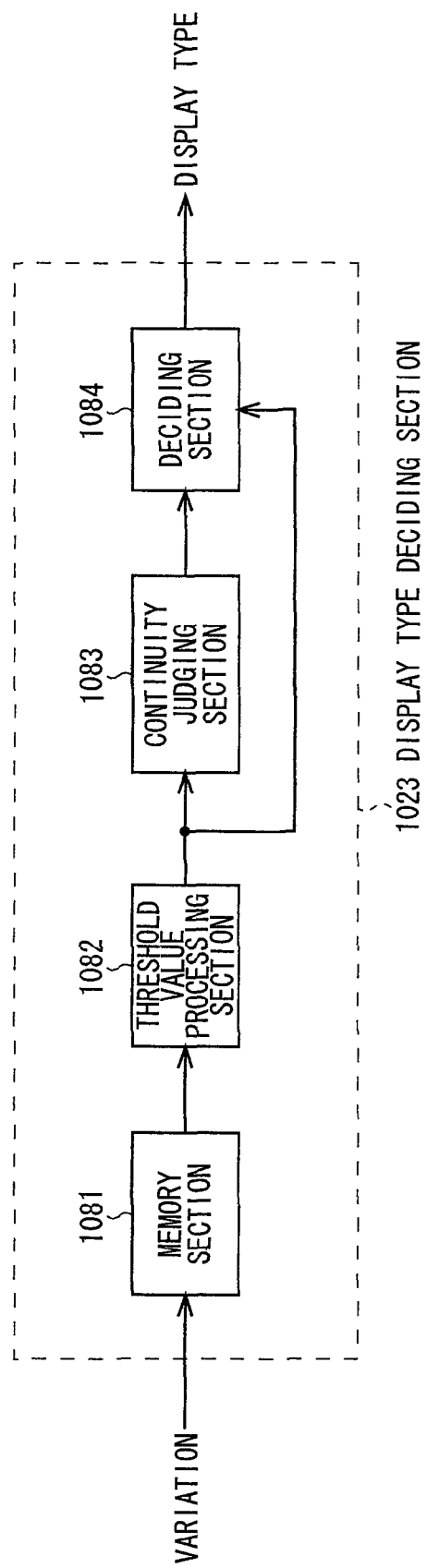
FIG. 51 is a schematic block diagram of the display type determining section, illustrating an exemplary configuration thereof.

FIG. 51 shows an exemplary configuration of the display type determining section 1023 of FIG. 35.

Referring to FIG. 51, the display type determining section 1023 includes a memory section 1081, a threshold value processing section 1082, a continuity determining section 1083 and a deciding section 1084.

The memory section 1081 is supplied with variations on a frame by frame basis from the variation computing section 1022 (FIG. 35). The memory section 1081 temporarily stores the variations on a frame by frame basis supplied from the variation computing section 1022.

The threshold value processing section 1082 compares the variations on a frame by frame basis stored in the memory section 1081 with the threshold value H or L and supplies comparison information that shows the results of the comparison to the continuity determining section 1083 and the deciding section 1084 on a frame by frame basis.

The continuity determining section 1083 judges if a plurality of frames not less than N showing a variation not less than the threshold value H appear consecutively or a plurality of frames not less than N showing a variation less than the threshold value H appear consecutively according to the comparison information supplied from the threshold processing section 1082 on a frame by frame basis and supplies determination information showing the outcome of the determination to the deciding section 1084.

The deciding section 1084 decides the display type of each frame that forms the moving image according to the comparison information from the threshold processing section 1082 and the determination information from the continuity determining section 1083 and outputs the display type.

Now, the process that the display type determining section 1023 executes will be described below by referring to the flowcharts of FIGS. 52 and 53.

As variations are supplied from the variation computing section 1022 (FIG. 35) on a frame by frame basis, the display type determining section 1023 caches (temporarily stores) the variations on a frame by frame basis in the memory section 1081 in Step S1011 and then the process proceeds to Step S1012.

Assume here that movement information of each frame is supplied from the variation computing section 1022 to the display type determining section 1023 as variation. Assume here also that the display type determining section 1023 selects a display type from the three types of the still image type V1, the ordinary type V2 and the high display rate/low resolution type V3 shown in FIG. 49 for each frame.

In Step S1012, the threshold value processing section 1082 executes a threshold process of comparing the variations on a frame by frame basis (movement information) stored in the memory section 1081 and (either) the threshold value H or the threshold value L (or both of them) and supplies comparison information showing the outcome of the comparison of the variations on a frame by frame basis and the threshold value H or L to the continuity determining section 1083 on a frame by frame basis, before the process proceeds to Step S1013.

In Step S1013, the continuity determining section 1083 typically selects the frame that is located most front in time series that is not selected as attentional frame yet among the frames of the moving image for which the Fy file preparing section 1004 (FIG. 35) is preparing an Fy file and then the process proceeds to Step S1014.

In Step S1014, the continuity determining section 1083 judges if the variation of the attentional frame is not less than the threshold value H and there exist a plurality of frames, or not less than N frames, whose variations are not less than the threshold value H and that appear consecutively immediately before, immediately after or across the attentional frame or not according to the comparison information from the threshold value processing section 1082.

If it is determined in Step S1014 that the variation of the attentional frame is not less than the threshold value H and there exist a plurality of frames, or not less than N frames, whose variations are not less than the threshold value H and that appear consecutively immediately before, immediately after or across the attentional frame, the continuity determining section 1083 supplies determination information that shows the outcome of the determination to the deciding section 1084 and the process proceeds to Step S1015.

In Step S1015, the deciding section 1084 decides the display type of the attentional frame as the high display rate/low resolution type V3 according to the determination information from the continuity determining section 1083 and the process proceeds to Step S1020.

The display type of the attentional frame is decided as the high display rate/low resolution type V3 when not only the variation of the attentional frame is not less than the threshold value H but also there exist a plurality of frames, or not less than N frames, whose variations are not less than the threshold value H and that appear consecutively immediately before, immediately after or across the attentional frame in Steps S1014 and S1015 for the reason as described below.

As will be described hereinafter, when the display type is selected from the still image type V1, the ordinary type V2 and the high display rate/low resolution type V3, an image showing a higher resolution (the ordinary resolution), or an image obtained by processing the image data of the main line data whose data quantity is larger (than the proxy data), is displayed for frames whose display type is the still image type V1 or the ordinary type V2 in a scrub operation. On the other hand, an image showing a low resolution, or an image obtained by processing the image data of the proxy data whose data quantity is smaller (than the main line data), is displayed for frames whose display type is the high display rate/low resolution type V3.

If the memory apparatus 22 (FIG. 1) is a professional disk where both main line data and proxy data are recorded and a scrub operation is conducted by using the main line data or the proxy data recorded in the memory apparatus 22, it is necessary to read out the main line data from the memory apparatus 22 for frames of the still image type V1 or the ordinary type V2, whereas it is necessary to readout the proxy data from the memory apparatus 22 for frames of the high display rate/low resolution type V3.

Since main line data and proxy data are recorded at respective positions that are physically separated from each other in the memory apparatus 22, seek operations will take place frequently in scrub operations for detecting data recorded in the memory apparatus 22 to make it difficult to smoothly display the frame specified by operating the scrub bar 66 (FIG. 3) depending on the performance of the apparatus where scrub operations are performed if frames of the still image type V1 or the ordinary type V2 and frames of the high display rate/low resolution type V3 appear alternately in an extreme instance.

In view of this potential problem, this embodiment is so adapted that the display type is selected in such a way that not less than N frames of the high display rate/low resolution type V3 appears consecutively and also not less than N frames of the still image type V1 or the ordinary type V2 appear consecutively in order to prevent seek operations from taking place frequently.

Differently stated, in Steps S1014 and S1015, when the variation of the attentional frame is not less than the threshold value H and there exist a plurality of frames, or not less than N frames, whose variations are not less than the threshold value H and that appear consecutively immediately before, immediately after or across the attentional frame, the high display rate/low resolution type V3 is selected for the display type of the attentional frame.

The number of frames N can be determined by considering the maximum seek time of the drive 5 for reproducing data from the memory apparatus 22 and the total number of frames for forming the moving image for which an Fy file is to be prepared by the Fy file preparing section 1004 (FIG. 35). Alternatively, the number of frames N may be determined in response to the operation performed by the operator.

Since the number of frames N refers to the minimum number of frames whose variations are not less than the threshold value H and that need to appear consecutively (or the minimum macro block of frames whose variations are less than the threshold value H and that need to appear consecutively as will be described hereinafter), it may also be referred to as minimum limit number of frames N if appropriate.

Seek becomes a problem when frames of the still image type V1 or the ordinary type V2 for displaying images by using main line data and frames of the high display rate/low resolution type V3 for displaying images by using proxy data are switched frequently. In other words, seek does not become a problem for frames of the still image type V1 and frames of the ordinary type V2 for displaying images by using main line data.

When, on the other hand, it is determined in Step S1014 that the variation of the attentional frame is not more than the threshold value H or there does not exist a plurality of frames, or not less than N frames, whose variations are not less than the threshold value H and that appear consecutively immediately before, immediately after or across the attentional frame, the process proceeds to Step S1016, where the continuity determining section 1083 judges if the variation of the attentional frame is not more than the threshold value H and there exist a plurality of frames, or not less than the minimum limit number of frames N, whose variations are not less than the threshold value H and that appear consecutively immediately before, immediately after or across the attentional frame or not according to the comparison information from the threshold value processing section 1082.

If it is determined in Step S1016 that the variation of the attentional frame is less than the threshold value H and there exist a plurality of frames, or not less than the minimum limit number of frames N, whose variations are less than the threshold value H and that appear consecutively immediately before, immediately after or across the attentional frame, the continuity determining section 1083 supplies information showing the outcome of determination to the deciding section 1084 and the process proceeds to Step S1017.

Upon receiving the determination information from the continuity determining section 1083 telling that the variation of the attentional frame is not more than the threshold value H and there exist a plurality of frames, or not less than the minimum limit number of frames N, whose variations are not more than the threshold value H and that appear consecutively immediately before, immediately after or across the attentional frame, the deciding section 1084 decides if the variation of the attentional frame is not less than the threshold value L or not according to the comparison information from the threshold value processing section 1082.

If it is decided in Step S1017 that the variation of the attentional frame is not less than the threshold value L and hence the variation of the attentional frame is not less than the threshold value L and less than the threshold value H, the process proceeds to Step S1018, where the deciding section 1084 decides that the display type of the attentional frame is the ordinary type V2 and the process proceeds to Step S1020.

If, on the other hand, it is decided in Step S1017 that the variation of the attentional frame is not more than the threshold value L and hence less than the threshold value L, the process proceeds to Step S1019, where the deciding section 1084 decides that the display type of the attentional frame is the still image type V1 and the process proceeds to Step S1020.

Thus, with the Steps S1016 through S1019, when the variation of the attentional frame is less than the threshold value H and there exist not less than N frames, whose variations are less than the threshold value H and that appear consecutively immediately before, immediately after or across the attentional frame, the ordinary type V2 is selected as the display type of the attentional frame when the variation of the attentional frame is not less than the threshold value L and the still image type V1 is selected as the display type of the attentional frame when the variation of the attentional frame is less than the threshold value L. As pointed out above, this is the measure taken to prevent seek operations from taking place frequently in a scrub operation.

In Step S1020, the continuity determining section 1083 judges if there still is at least a frame that is not selected as attentional frame in the frames that form the moving image for which the Fy file preparing section 1004 (FIG. 35) is preparing an Fy file or not.

If it is determined in Step S1020 that there still is at least a frame that is not selected as attentional frame, the process returns to Step S1013 and a frame that is not selected as attentional frame is newly selected as attentional frame and the process is repeated. If there still remains at least a frame that is not selected as attentional frame thereafter, the process is repeated again.

If it is determined in Step S1020 that there is no frame that is not selected as attentional frame, the display type determining section 1023 ends the process.

Figure 53:
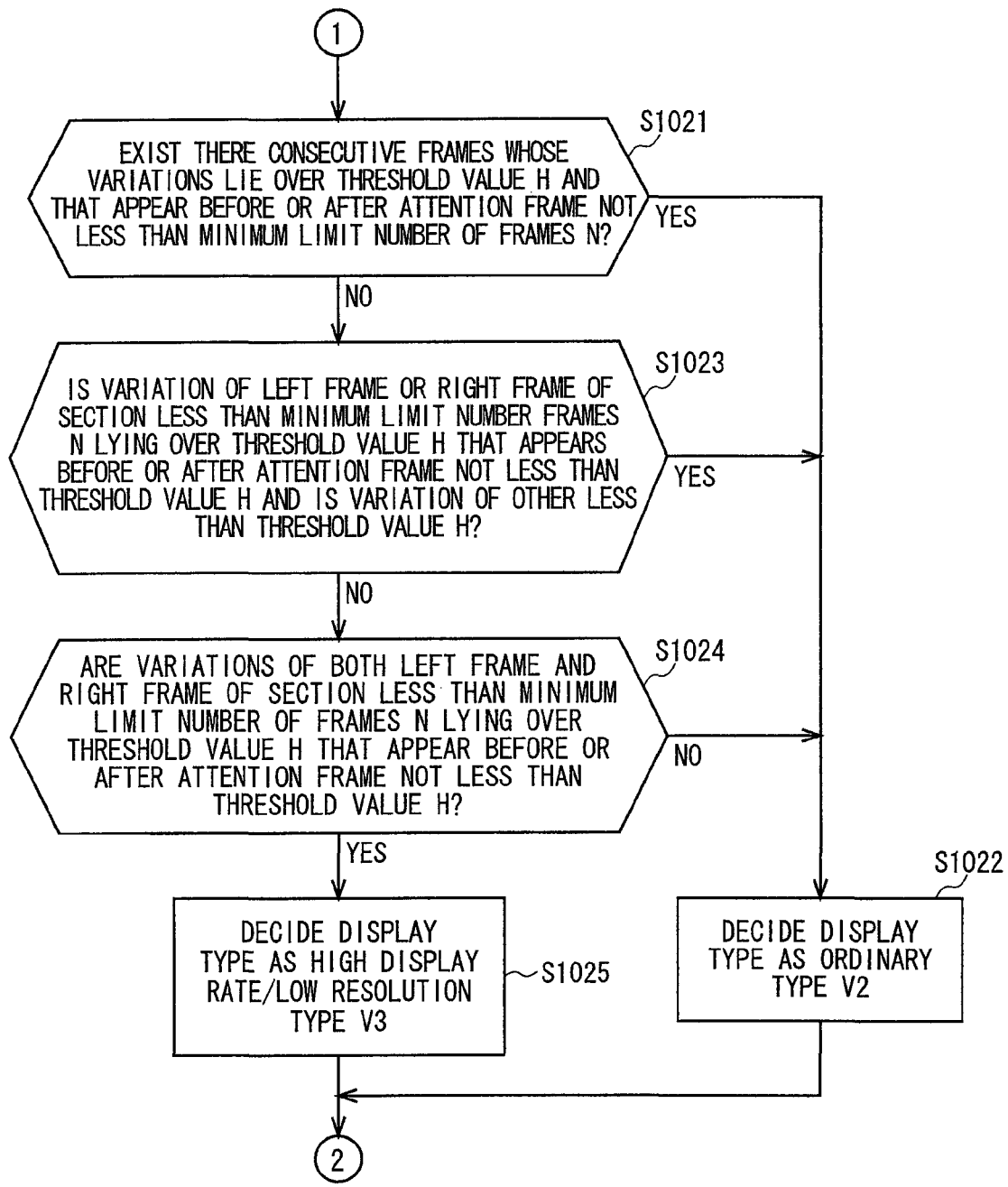
FIG. 53 is a flowchart, illustrating the display type determining process (2).

On the other hand, if it is determined in Step S1016 that the variation of the attentional frame is not less than the threshold value H and there exist a plurality of frames, or not less than the minimum limit number of frames N, whose variations are less than the threshold value H and that appear consecutively immediately before, immediately after or across the attentional frame, the process proceeds to Step S1021 shown in FIG. 53, where the continuity determining section 1083 judges if there exist frames not less than the minimum limit number of frames N whose variations lie over the threshold value H and that appear consecutively immediately before, immediately after or across the attentional frame or not.

Figure 54:
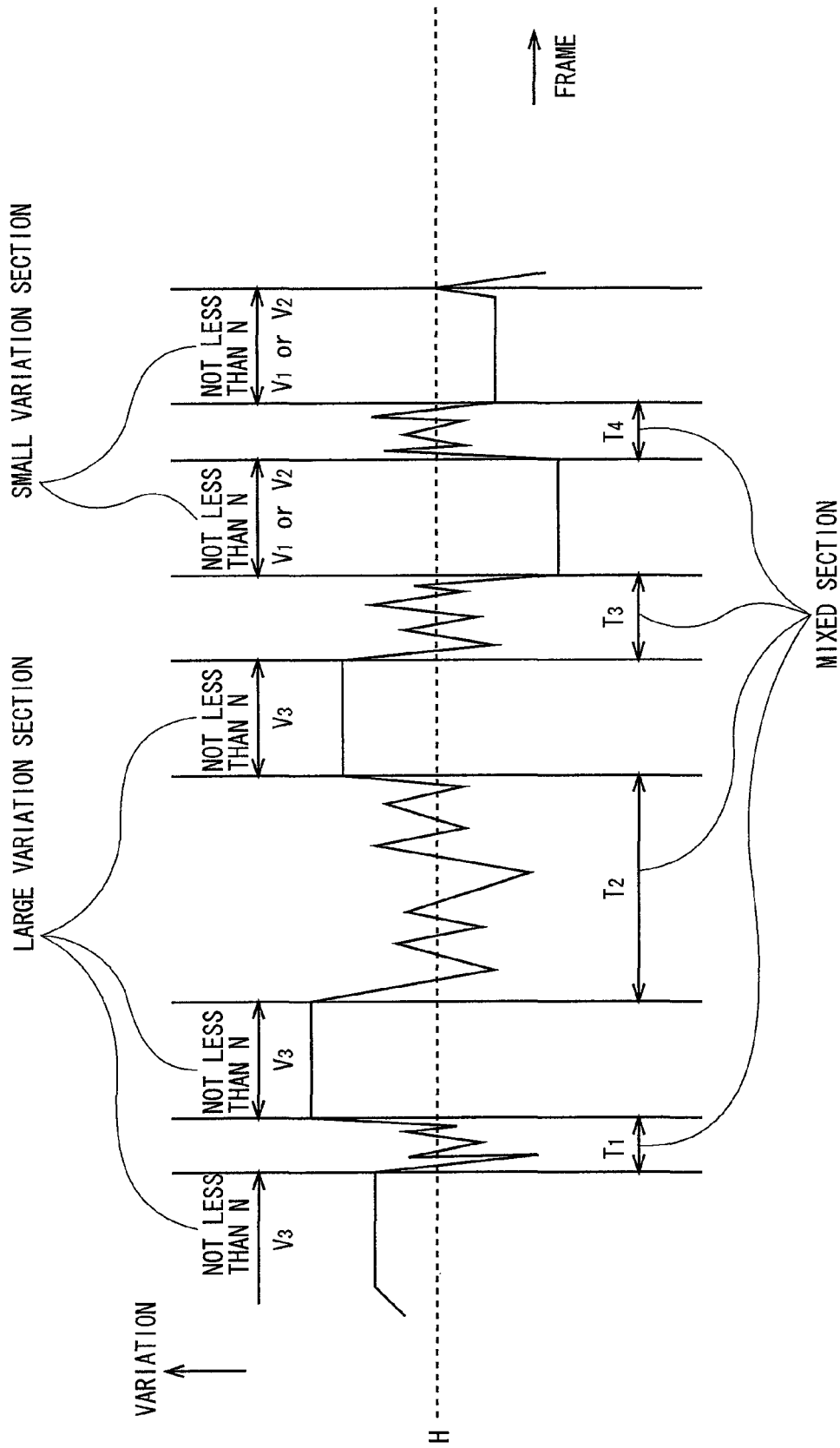
FIG. 54 is a schematic illustration of the variation on a frame by frame basis.

FIG. 54 is an illustration of variations on a frame by frame basis. Note that, in FIG. 54, the horizontal axis indicates frames and the vertical axis indicates variations. Also note that, in FIG. 54, only the threshold value H is shown. In other words, the threshold value L is not shown in FIG. 54.

Figure 52:
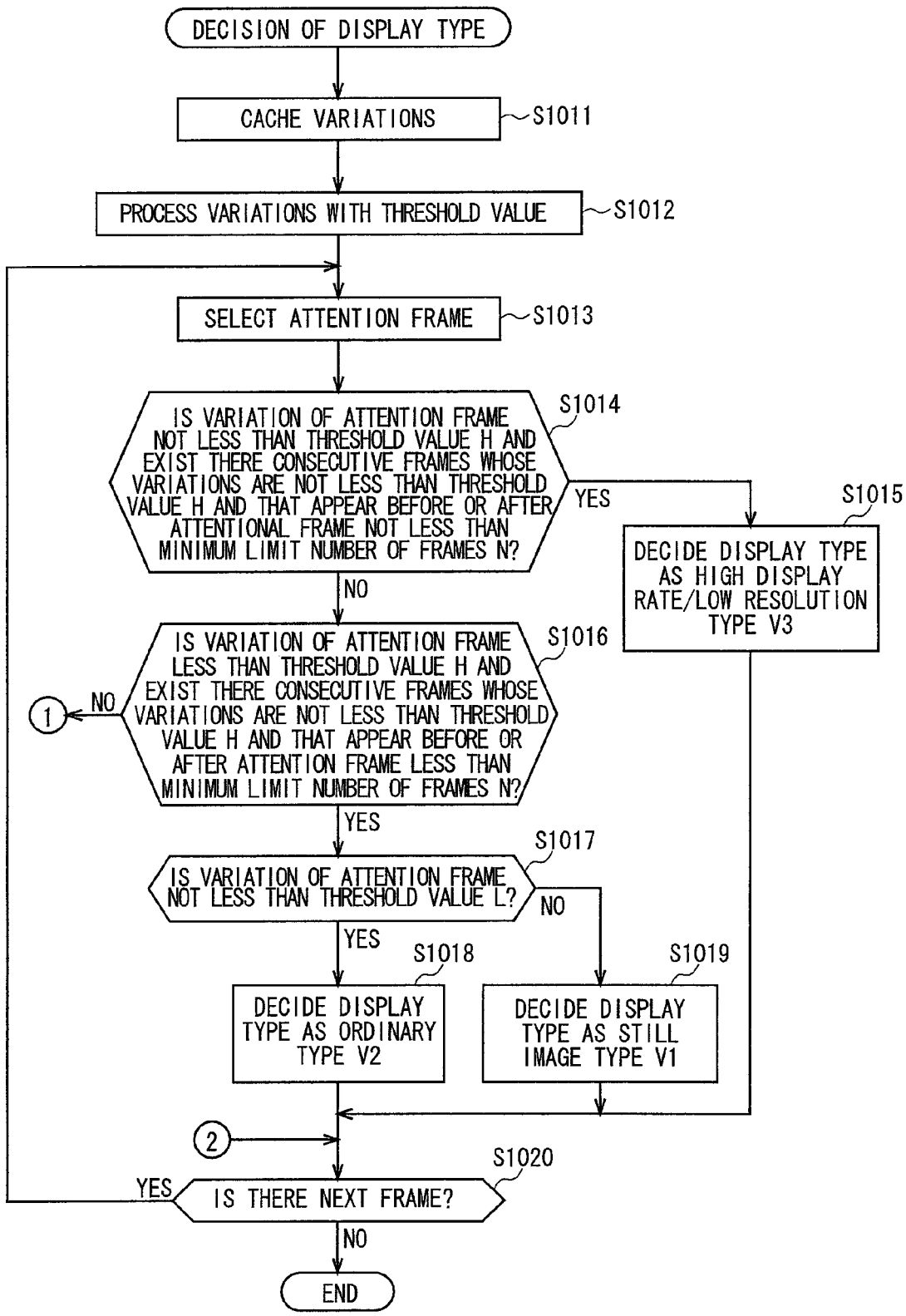
FIG. 52 is a flowchart, illustrating the display type determining process (1).

If the variation of the attentional frame is not less than the threshold value H and there exist not less than N consecutive frames whose variations are not less than the threshold value H immediately before, immediately after or across the attentional frame, it is decided in Step S1015 shown in FIG. 52 that the display type of the attentional frame is the high display rate/low resolution type V3.

If the variation of the attentional frame is less than the threshold value H and there exist not less than the minimum limit number of frames N whose variations are less than the threshold value H and that appear consecutively immediately before, immediately after or across the attentional frame, it is decided in Step S1018 or S1019 shown in FIG. 52 that the display type of the attentional frame is the ordinary type V2 or the still image type V1.

Therefore, the processing operation of Step S1021 of FIG. 53 is performed when there exist neither not less than N consecutive frames whose variations are not less than the threshold value H nor not less than N consecutive frames whose variations are less than the threshold value H immediately before, immediately after or across the attentional frame, in other words, when the attentional frame is found in a section where there exist frames whose variations lie over the threshold value H (in other words a mixture of frames whose variations are not less than the threshold value H and frames whose variations are less than the threshold value H) and both the number of consecutive frames whose variations are not less than the threshold value H and the number of consecutive frames whose variations are less than the threshold value H are less than the minimum limit number of frames N (to be also referred to as mixed section whenever appropriate hereinafter) such as sections T1, T2, T3 and T4 shown in FIG. 54.

As shown in FIG. 54, a mixed section is sandwiched between a section where there exist not less than N consecutive frames whose variations are not less than the threshold value H (to be referred to also as large variation section whenever appropriate hereinafter) and a section where there exist frames not less than the minimum limit number of frames N whose variations are less than the threshold value H (to be referred to also as small variation section whenever appropriate hereinafter), between two large variation sections or two small variation sections without fail.

Mixed sections can be divided into those whose section length (number of frames) is not less than the minimum limit number of frames N and those whose section length is less than the minimum limit number of frames N. Of the mixed sections T1 through T4 in FIG. 54, the mixed section T2 is a section whose section length is not less than the minimum limit number of frames N, whereas the mixed sections T1, T3, T4 are sections whose section length is less than the minimum limit number of frames N.

Mixed sections can also be divided into those that are sandwiched between a large variation section and a small variation section, those that are sandwiched between large variation sections and those that are sandwiched between small variation sections. Of the mixed sections T1 through T4, the mixed sections T1 and T2 are mixed sections that are sandwiched between large variation sections and the mixed section T3 is a mixed section that is sandwiched between a large variation section and a small variation section, whereas the mixed section T4 is a mixed section that is sandwiched between small variation sections.

Now returning to FIG. 53, the continuity determining section 1083 judges in Step S1021 if there exist consecutive frames not less than the minimum limit number of frames N whose variations lie over the threshold value H immediately before, immediately after or across the attentional frame or not, in other words, if the mixed section where the attentional frame is found is a section whose section length is not less than the minimum limit number of frames N or not.

When it is determined in Step S1021 that there exist consecutive frames not less than the minimum limit number of frames N whose variations lie over the threshold value H immediately before, immediately after or across the attentional frame and hence the mixed section where the attentional frame is found is a section whose section length is not less than the minimum limit number of frames N like the mixed section T2 in FIG. 54, the process proceeds to Step S1022, where the deciding section 1084 decides that the display type of the attentional frame is the ordinary type V2 and then the process proceeds to Step S1020 in FIG. 52, where the above-described processing operation is performed.

In other words, the display type of all the frames found in a mixed section where there exist consecutive frames not less than the minimum limit number of frames N whose variations lie over the threshold value H is made either the ordinary type V2 for displaying an image by using (image data of) main line data or the high display rate/low resolution type V3 for displaying an image by using (image data of) proxy data to make it possible to prevent seek operations from taking place frequently.

Therefore, in this embodiment, the display type of all the frames in a mixed section where consecutive frames not less than the minimum limit number of frames N whose variations lie over the threshold value H is ordinary type V2. However, it is possible to alternatively employ the high display rate/low resolution type V3 instead of the ordinary type V2 for the display type of all the frames in a mixed section where consecutive frames not less than the minimum limit number of frames N whose variations lie over the threshold value H.

If attention is paid to only prevention of frequent occurrences of seek operation, it is possible to employ the still image type V1 for displaying an image by using main line data for the display type of the frames of a mixed section. However, since a mixed section is a section where there exist frames whose variations lie over the threshold value H, it is not desirable to employ the still image type V1 for the display type of a mixed section because the still image type V1 is a display type of a frame whose variations is less than the threshold value L. Thus, either the ordinary type V2 or the high display rate/low resolution type V3 is employed for the display type of a mixed section.

When, on the other hand, it is determined in Step S1021 that there do not exist consecutive frames not less than the minimum limit number of frames N whose variations lie over the threshold value H immediately before, immediately after or across the attentional frame and hence the mixed section where the attentional frame is found (to be also referred to as attentional mixed section whenever appropriate hereinafter) is a section whose section length is less than the minimum limit number of frames N like the mixed sections T1, T3 and T4 in FIG. 54, the process proceeds to Step S1023, where the continuity determining section 1083 judges if either the variation of the frame adjacent to the attentional mixed section (to be also referred to as the left frame whenever appropriate hereinafter) among the frames located at the left side, or the temporally preceding frames, of the attentional mixed section whose section length is less than the minimum limit number of frames N or the variation of the frame adjacent to the attentional mixed section (to be also referred to as the right frame whenever appropriate hereinafter) among the frames located at the right side, or the temporally succeeding frames, of the attentional mixed section is not less than the threshold value H and the other one is less than the threshold value H or not. In other words, if the attentional mixed section whose section length is less than the minimum limit number of frames N is a section sandwiched between a large variation section and a small variation section or not.

If, in Step S1023, it is determined that the attentional mixed section whose section length is less than the minimum limit number of frames N is a section sandwiched between a large variation section and a small variation section and hence the attentional mixed section whose section length is less than the minimum limit number of frames N is a mixed section that is like the mixed section T3 in FIG. 54 and sandwiched between a large variation section and a small variation section, the process proceeds to Step S1022, where the deciding section 1084 decides that the display type of the attentional frame is the ordinary type V2. Then, the process proceeds to Step S1020 and the above-described processing operation is performed.

Both the large variation section and the small variation section that sandwich the attentional mixed section whose section length is less than the minimum limit number of frames N are sections whose section lengths are not less than the minimum limit number of frames N. Additionally, the display type of the frames of the large variation section is decided as the high display rate/low resolution type V3 for display images by using proxy data, whereas the display type of the frames of the small variation section is decided as the ordinary type V2 or the still image type V1 for displaying images by using main line data.

Now, the display type of the frames of the attentional mixed section that is sandwiched between the large variation section and the small variation section and whose section length is less than the minimum limit number of frames N is decided either as the high display rate/low resolution type V3 that is the display type same as the frames of the large variation section or the ordinary type V2 that is the display type same as the frames of the small variation section so that the number of consecutive frames of the high display rate/low resolution type V3 or the ordinary type V2 is always not less than the minimum limit number of frames N and hence it is possible to prevent seek operations from taking place frequently.

Thus, in this embodiment, the display type of any attentional mixed section where there exist consecutive frames not less than the minimum limit number of frames N whose variations lie over the threshold value H and that is sandwiched between a large variation section and a small variation section is always decided as the ordinary type V2. Note, however, that the display type of any attentional mixed section where there exist consecutive frames not less than the minimum limit number of frames N whose variations lie over the threshold value H and that is sandwiched between a large variation section and a small variation section may alternatively be decided as the high display rate/low resolution type V3 instead of the ordinary type V2.

On the other hand if, in Step S1023, it is determined that the attentional mixed section whose section length is less than the minimum limit number of frames N is not a section sandwiched between a large variation section and a small variation section, the process proceeds to Step S1024, where the continuity determining section 1083 judges if both the variation of the frame adjacent to the attentional mixed section (left frame) among the frames located at the left side, or the temporally preceding frames, of the attentional mixed section whose section length is less than the minimum limit number of frames N and the variation of the frame adjacent to the attentional mixed section (right frame) among the frames located at the right side, or the temporally succeeding frames, of the attentional mixed section are not less than the threshold value H, in other words, if the attentional mixed section whose section length is less than the minimum limit number of frames N is a section sandwiched between large variation sections or not.

If it is determined in Step S1024 that the attentional mixed section whose section length is less than the minimum limit number of frames N is not a section sandwiched between large variation sections and hence the attentional mixed section whose section length is less than the minimum limit number of frames N is a mixed section sandwiched between small variation sections like the mixed section T4 in FIG. 54, the process proceeds to Step S1022, where the deciding section 1084 decides the display type of the attentional frame as the ordinary type V2. Then, the process proceeds to Step S1020 in FIG. 52 and the above-described processing operation is performed.

Thus, the display type of the frames of an attentional mixed section that is sandwiched between two small variation sections and whose section length is less than the minimum limit number of frames N is decided to be the same as the display type of the frames of the two small variation sections that is (can be) decided as the ordinary type V2 so that the number of consecutive frames of the ordinary type V2 is always not less than the minimum limit number of frames N and hence it is possible to prevent seek operations from taking place frequently.

If, on the other hand, it is determined in Step S1024 that the attentional mixed section whose section length is less than the minimum limit number of frames N is a section sandwiched between large variation sections and hence the attentional mixed section whose section length is less than the minimum limit number of frames N is a mixed section sandwiched between large variation sections like the mixed section T1 in FIG. 54, the process proceeds to Step S1025, where the deciding section 1084 decides the display type of the attentional frame as the high display rate/low resolution type V3. Then, the process proceeds to Step S1020 in FIG. 52 and the above-described processing operation is performed.

Thus, the display type of the frames of an attentional mixed section that is sandwiched between two large variation sections and whose section length is less than the minimum limit number of frames N is decided to be the same as the display type of the frames of the two large variation sections that is decided as the high display rate/low resolution type V3 so that the number of consecutive frames of the high display rate/low resolution type V3 is always not less than the minimum limit number of frames N and hence it is possible to prevent seek operations from taking place frequently.

FIG. 55 illustrates an exemplary Fy file that the file preparing section 1025 prepares when the variation computing section 1022 of FIG. 35 determines movement information as variation and the display type determining section 1023 determines display types according to the movement information while the selection section 1024 selects both a variation and a display type.

The Fy file of FIG. 55 sequentially shows from left to right the frame numbers indicating the ordinal numbers of frames, the time codes that correspond to the respective frames, movement information that tells the variations of the respective frames corresponding to the respective frame numbers and the display types of the respective frames corresponding to the respective frame numbers.

Note that the display type of each frame in the Fy file of FIG. 55 is one of the three types including the still image type V1, the ordinary type V2 or the high display rate/low resolution type V3 as illustrated in FIG. 49.

Additionally, the threshold values L and H for deciding the display type is respectively 1 and 5 in the Fy file of FIG. 55. The minimum limit number of frames N is determined by means of formula N=F×N, where F is the total number of frames F of the moving image used for preparing the Fy file and P is a predetermined coefficient. If the total number of frames F of the moving image used for preparing the Fy file is 3,000 and the predetermined coefficient P is 0.01, for example, the minimum limit number of frames N is 30 (=3,000×0.01).

While movement information is used as variation and the display type of each frame is decided as one of the three types including the still image type V1, the ordinary type V2 and the high display rate/low resolution type V3 according to the movement information of the frame in FIG. 49, the technique for deciding the display type of each frame is by no means limited to the above-described one.

FIG. 56 illustrates another example of display types that the display type determining section 1023 of FIG. 35 determines.

FIG. 56 shows five display types including still image type V11 for displaying a still image, ordinary type V12, high display rate/ordinary resolution type V13, high display rate/low resolution type V14 and super high display rate/low resolution type V15, the latter four types being different from each other in terms of resolution and display rate for displaying a frame.

As for a frame of the still image type V11, if the frame that is the object of display is changed, the (image of the) frame displayed immediately before the change is displayed so long as the frame that is the object of display can be (continuously) regarded same as the (image of the) frame displayed immediately before the change just like the still image type V1 of FIG. 49.

As for a frame of the ordinary type V12, an image is displayed at a display rate same as the frame rate of moving image (ordinary rate) and with a resolution same as the resolution of image data that are the main line data (ordinary resolution) just like the ordinary type V2 of FIG. 49.

As for a frame of the high display rate/ordinary resolution type V13, an image is displayed at a rate higher than the ordinary rate, e.g. a display rate twice as high as the ordinary rate, and with a resolution same as the resolution of image data that are main line data (ordinary resolution).

As for a frame of the super high display rate/low resolution type V14, an image is displayed at a rate higher than the display rate of the high display rate/ordinary resolution type V13, e.g., a display rate three times as high as the ordinary rate, and with a resolution same as image data that are proxy data (a resolution lower than the image data that are main line data).

As for a frame of the ultra super high display rate/low resolution type V15, the image is displayed at a rate higher than the display rate of the super high display rate/low resolution type V14, e.g., a display rate four times as high as the ordinary rate, and with a resolution same as image data of proxy data (a resolution lower than the image data of main line data).

If, for example, the ordinary rate is (about) 30 frames/sec which is same as the NTSC (National Television System Committee) system, the display rates of the ordinary type V12, the high display rate/ordinary resolution type V13, the super high display rate/low resolution type V14 and the ultra super high display rate/low resolution type V15 are respectively 30, 60, 90 and 120 frames/sec.

When five display types including the still image type V11, the ordinary type V12, the high display rate/ordinary resolution type V13, the super high display rate/low resolution type V14 and the ultra super high display rate/low resolution type V15 are provided as shown in FIG. 56, the variation computing section 1022 (FIG. 35) determines movement information that indicates the extent of temporal change of a frame as variation. Then, the display type determining section 1023 (FIG. 35) compares the movement information of each frame and four predetermined threshold values and decides the display type of the frame as one of the still image type V11, the ordinary type V12, the high display rate/ordinary resolution type V13, the super high display rate/low resolution type V14 and the ultra super high display rate/low resolution type V15 on a frame by frame basis according to the outcome of the comparison.

Figure 57:
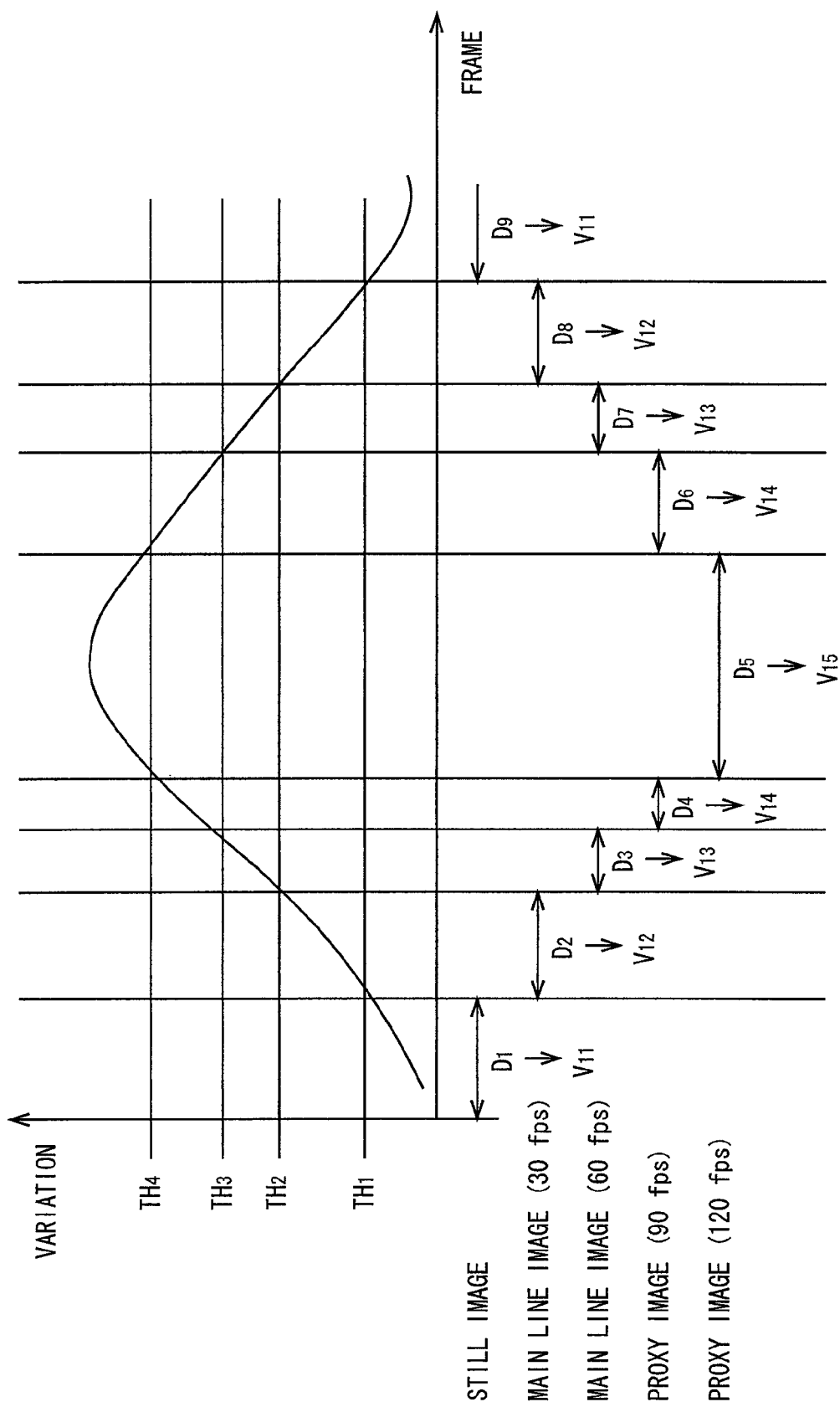
FIG. 57 is a schematic illustration of move information and display type on a frame by frame basis.

FIG. 57 illustrates movement information as variation on a frame by frame basis and how the display type determining section 1023 (FIG. 35) determines the display type of each frame according to the variation.

Note that, in FIG. 57, the horizontal axis indicates frames and the vertical axis indicates variations.

The display type determining section 1023 (FIG. 35) compares the variation (movement information) of each frame with threshold values TH1, TH2, TH3 and TH4 whose relationship is expressed by formula TH1<TH2<TH3<TH4. Then, the display type determining section 1023 determines the display type of a frame whose movement information is not less than the threshold value TH4 and hence shows a very large extent of temporal change as the ultra super high display rate/low resolution type V15 which is a sort of low resolution or high display rate type, or low resolution/high display rate type. In FIG. 57, the display type of the frames of the section D5 where frames whose movement information is not less than the threshold value TH4 are arranged consecutively is decided as the ultra super high display rate/low resolution type V15.

The display type determining section 1023 determines the display type of a frame whose movement information is not less than the threshold value TH3 and less than the threshold value TH4 and hence shows nearly a very large extent of temporal change as the super high display rate/low resolution type V14 which is a sort of low resolution or high display rate type, or low resolution/high display rate type but whose display rate is lower than the ultra super high display rate/low resolution type V15. In FIG. 57, the display type of the frames of the sections D4 and D6 where frames whose movement information is not less than the threshold value TH3 and less than the threshold value TH4 are arranged consecutively is decided as the super high display rate/low resolution type V14.

The display type determining section 1023 determines the display type of a frame whose movement information is not less than the threshold value TH2 and less than the threshold value TH3 and hence shows a not very large but still large extent of temporal change as the high display rate/ordinary resolution type V13 whose display rate is lower than but whose resolution is higher than the super high display rate/low resolution type V14. In FIG. 57, the display type of the frames of the sections D3 and D7 where frames whose movement information is not less than TH2 and less than TH3 are arranged consecutively is decided as the high display rate/ordinary resolution type V13.

The display type determining section 1023 determines the display type of a frame whose movement information is not less than the threshold value TH1 and less than the threshold value TH2 and hence shows an insignificant extent of temporal change as the ordinary type V12 whose display rate is lower than but whose resolution is higher than the high display rate/ordinary resolution type V13. In FIG. 57, the display type of the frames of the sections D2 and D8 where frames whose movement information is not less than the threshold value TH1 and less than the threshold value TH2 are arranged consecutively is decided as the ordinary type V12.

Finally, the display type determining section 1023 determines the display type of a frame whose movement information is less than the threshold value TH1 and hence shows a small extent of temporal change as the still image type V11 for displaying a still image. In FIG. 57, the display type of the frames of the sections D1 and D9 where frames whose movement information is less than TH1 are arranged consecutively is decided as the still image type V11.

Now, the process that the display type determining section 1023 of FIG. 51 executes to decide the display type as one of the still image type V11, the ordinary type V12, the high display rate/ordinary resolution type V13, the super high display rate/low resolution type V14 and the ultra super high display rate/low resolution type V15 as shown in FIG. 56 will be described below by referring to the flowcharts of FIGS. 58 and 59.

As the variations of frames are supplied from the variation computing section 1022 (FIG. 35) on a frame by frame basis, the display type determining section 1023 caches (temporarily stores) the variations on a frame by frame basis in the memory section 1081 (FIG. 51) in Step S1031 and then the process proceeds to Step S1032.

Assume here that variations are supplied as movement information from the variation computing section 1022 to the display type determining section 1023.

In Step S1032, the threshold value processing section 1082 (FIG. 51) executes a threshold process of comparing the variations (movement information) stored in the memory section 1081 on a frame by frame basis with the threshold values TH1, TH2, TH3 and TH4 and supplies comparison information showing the outcome of comparisons of the variations on a frame by frame basis and the threshold values TH1, TH2, TH3 and TH4 to the continuity determining section 1083 on a frame by frame basis and then the process proceeds to Step S1033.

In Step S1033, the continuity determining section 1083 (FIG. 51) selects the frame that is most preceding in time series in the frames that form a moving image for which the Fy file preparing section 1004 (FIG. 35) is preparing an Fy file as attentional frame and the process proceeds to Step S1034.

In Step S1034, the continuity determining section 1083 judges if the variation of the attentional frame is not less than the threshold value TH3 and there exist not less than N frames whose variations are less than the threshold value TH3 and that appear consecutively immediately before, immediately after or across the attentional frame or not according to the comparison information from the threshold value processing section 1082.

If it is determined in Step S1034 that the variation of the attentional frame is not less than the threshold value TH3 and there exist not less than N frames whose variations are not less than the threshold value TH3 and that appear consecutively immediately before, immediately after or across the attentional frame, the continuity determining section 1083 supplies determination information showing the outcome of the determination to the deciding section 1084 (FIG. 51) and the process proceeds to Step S1035.

Upon receiving the supply of the determination information showing the outcome of the determination that the variation of the attentional frame is not less than the threshold value TH3 and there exist not less than N frames whose variations are less than the threshold value TH3 and that appear consecutively immediately before, immediately after or across the attentional frame from the continuity determining section 1083, the deciding section 1084 judges in Step S1035 if the variation of the attentional frame is not less than the threshold value TH4 or not according to the comparison information from the threshold processing section 1082.

If it is determined in Step S1035 that the variation of the attentional frame is not less than the threshold value TH4, the process proceeds to Step S1036, where the deciding section 1084 decides the display type of the attentional frame as the ultra super high display rate/low resolution type V15 and the process proceeds to Step S1043.

If, on the other hand, it is determined in Step S1035 that the variation of the attentional frame is less than the threshold value TH4, that is, the variation of the attentional frame is not less than the threshold value TH3 and less than the threshold value TH4, the process proceeds to Step S1037, where the deciding section 1084 decides the display type of the attentional frame as the super high display rate/low resolution type V14 and the process proceeds to Step S1043.

Thus, with the Steps S1034 through S1037, the display type of the attentional frame is decided as either the ultra super high display rate/low resolution type V15 or the super high display rate/low resolution type V14 when not only the variation of the attentional frame is not less than the threshold value TH3 and but also there exist not less than N frames whose variations are not less than the threshold value TH3 and that appear consecutively immediately before, immediately after or across the attentional frame for the reason as described below.

When the display type is selected from the still image type V11, the ordinary type V12, the high display rate/ordinary resolution type V13, the super high display rate/low resolution type V14 and the ultra super high display rate/low resolution type V15 as shown in FIG. 56, a high resolution image (showing the ordinary resolution) obtained by processing image data of main line data whose data quantity is greater (than proxy data) is displayed for a frame whose display type is the still image type V11, the ordinary type V12 or the high display rate/ordinary resolution type V13 in response to a scrub operation.

On the other hand, a low resolution image obtained by processing image data of proxy data whose data quantity is smaller (than main line data) is displayed for a frame whose display type is either the super high display rate/low resolution type V14 or the ultra super high display rate/low resolution type V15.

When the memory apparatus 22 (FIG. 1) is a professional disk where both main line data and proxy data are recorded and a scrub operation is conducted by using the main line data or the proxy data recorded in the memory apparatus 22, it can be difficult to smoothly display the frame specified by operating the scrub bar 66 (FIG. 3) if frames of the super high display rate/low resolution type V14 or the ultra super high display rate/low resolution type V15 with which an image is displayed by using proxy data are frequently switched to frames of the still image type V11, the ordinary type V12 or the high display rate/ordinary resolution type V13 with which an image is displayed by using main line data among the frames forming a moving image in time series because seek operations take place frequently as described above by referring to FIG. 52.

To prevent such seek operations from taking place frequently, it is necessary that switches from a frame of the super high display rate/low resolution type V14 or the ultra super high display rate/low resolution type V15 with which an image is displayed by using proxy data to a frame of the still image type V11, the ordinary type V12 or the high display rate/ordinary resolution type V13 with which an image is displayed by using main line data and vice versa do no frequently take place.

On the other hand, switches from a frame of the super high display rate/low resolution type V14 to a frame of the ultra super high display rate/low resolution type V15 and vice versa do not give rise to any problem because an image is displayed by using proxy data with frames of the super high display rate/low resolution type V14 and those of the ultra super high display rate/low resolution type V15.

Similarly, switches from a frame of one of the still image type V11, the ordinary type V12 and the high display rate/ordinary resolution type V13 to a frame of some other one of the display types and vice versa do not give rise to any seek problem because an image is displayed by using main line data with frames of the still image type V11, the ordinary type V12 or the high display rate/ordinary resolution type V13.

Figure 58:
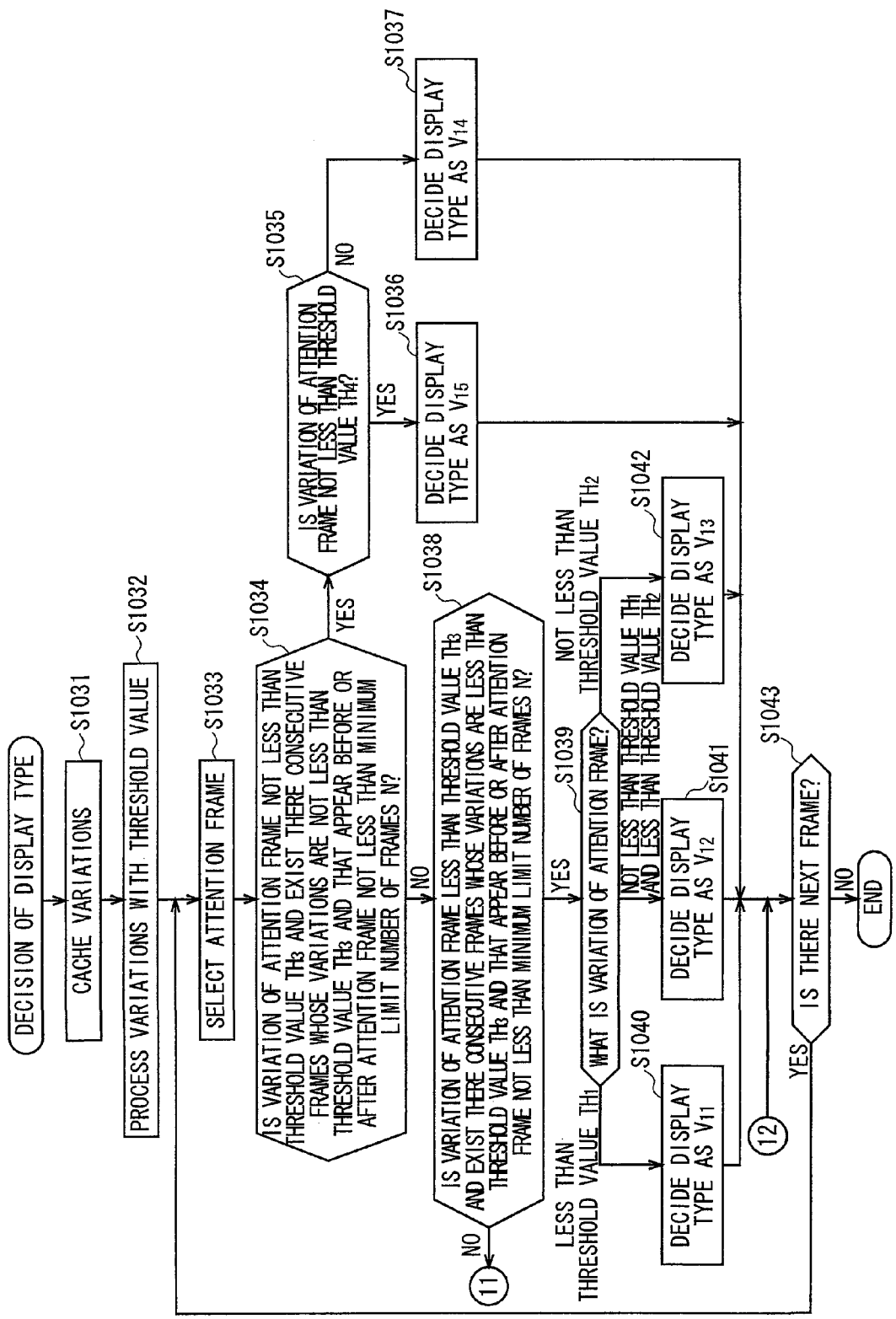
FIG. 58 is a flowchart, illustrating the display type determining process (3).
Figure 59:
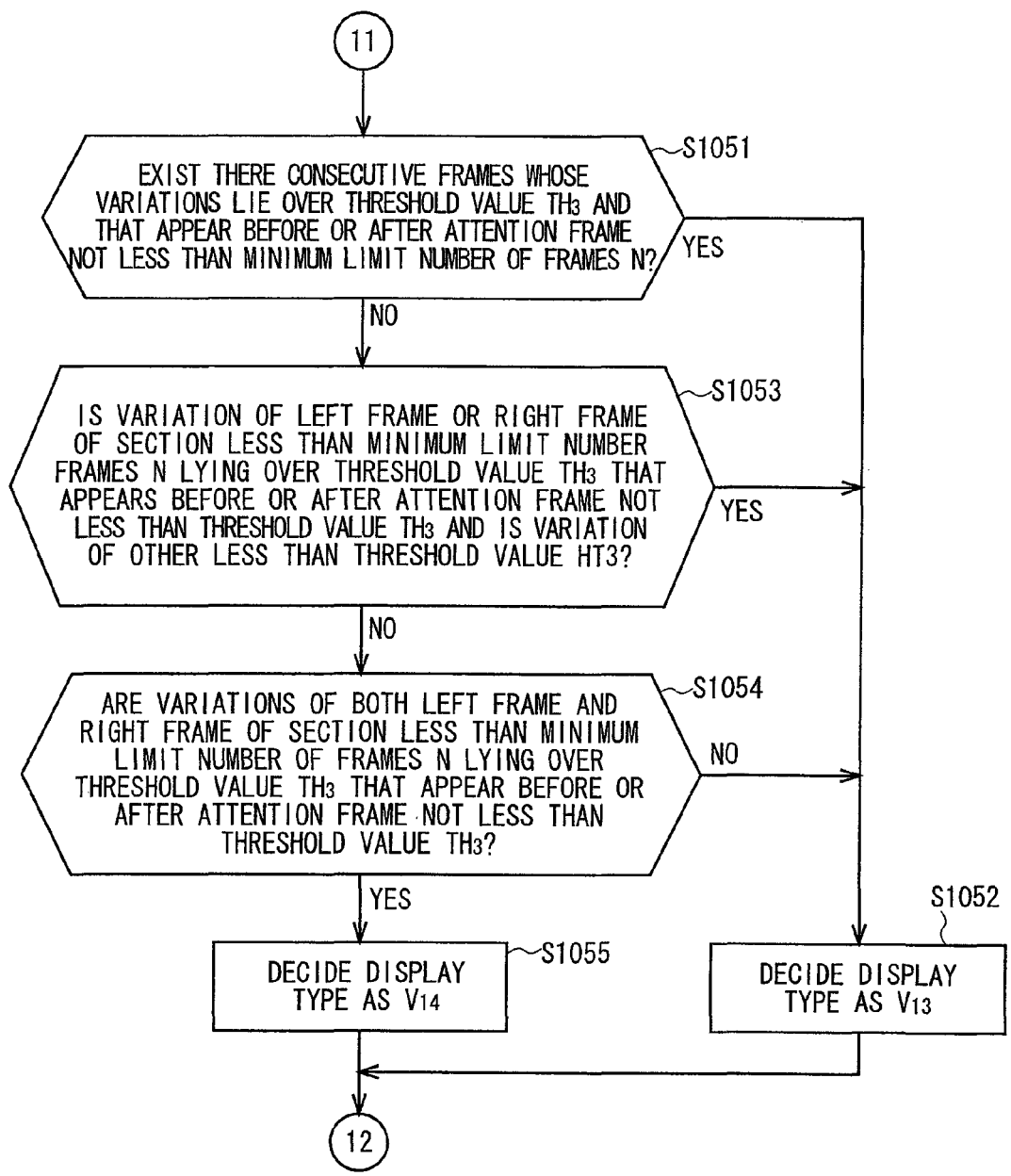
FIG. 59 is a flowchart, illustrating the display type determining process (4).

Thus, in FIGS. 58 and 59, the display type of the attentional frame is decided as either the super high display rate/low resolution type V14 or the ultra super high display rate/low resolution type V15 in the above-described Steps S1034 through S1037 when the variation of the attentional frame is not less than the threshold value TH3 and there exist not less than the minimum limit number of frames N whose variations are not less than the threshold value TH3 and that appear consecutively immediately before, immediately after or across the attentional frame in order that no switch from a frame of a display type with which an image is displayed by using proxy data (the super high display rate/low resolution type V14 or the ultra super high display rate/low resolution type V15) to a frame of a display with which an image is displayed by using main line data (the still image type V11, the ordinary type V12 or the high display rate/ordinary resolution type V13) or vice versa takes place in sections where at least the minimum limit number of frames N are arranged consecutively.

Additionally, the display type of the attentional frame is decided as one of the still image type V11, the ordinary type V12 and the high display rate/ordinary resolution type V13 in Steps S1038 through S1042, which will be described below, when the variation of the attentional frame is less than the threshold value TH3 and there exist not less than the minimum limit number of frames N whose variations are less than the threshold value TH3 and that appear consecutively immediately before, immediately after or across the attentional frame in order that no switch from a frame of a display type with which an image is displayed by using proxy data to a frame of a display with which an image is displayed by using main line data or vice versa takes place in sections where at least the minimum limit number of frames N are arranged consecutively.

Thus, if it is determined in Step S1034 than the variation of the attentional frame is less than the threshold value TH3 or, if the variation of the attentional frame is not less than the threshold value TH3, there do not exist not less than N frames whose variations are not less than the threshold value TH3 and that appear consecutively immediately before, immediately after or across the attentional frame, the process proceeds to Step S1038, where the continuity determining section 1083 judges if the variation of the attentional frame is less than the threshold value TH3 and there exist not less than N frames whose variations are less than the threshold value TH3 and that appear consecutively immediately before, immediately after or across the attentional frame or not according to the comparison information from the threshold value processing section 1082.

If it is determined in Step S1038 that the variation of the attentional frame is less than the threshold value TH3 and there exist not less than N frames whose variations are less than the threshold value TH3 and that appear consecutively immediately before, immediately after or across the attentional frame, the continuity determining section 1083 supplies determination information showing the outcome of the determination to the deciding section 1084 and the process proceeds to Step S1039.

Upon receiving the supply of the determination information showing the outcome of the determination that the variation of the frame is less than the threshold value TH3 and there exist not less than N frames whose variations are less than the threshold value TH3 and that appear consecutively immediately before, immediately after or across the attentional frame from the continuity determining section 1083, the deciding section 1084 judges in Step S1039 if the variation of the attentional frame is less than the threshold value TH1, not less than the threshold value TH1 and less than the threshold value TH2 or not less than the threshold value TH2 and less than the threshold value TH3 according to the comparison information from the threshold processing section 1082.

If it is determined in Step S1039 that the variation of the attentional frame is less than the threshold value TH1, the process proceeds to Step S1040, where the deciding section 1084 decides the display type of the attentional frame as the still image type V11 and then the process goes to Step S1043.

If, on the other hand, it is determined in Step S1039 that the variation of the attentional frame is not less than the threshold value TH1 and less than the threshold value TH2, the process proceeds to Step S1041, where the deciding section 1084 decides the display type of the attentional frame as the ordinary type V12 and then the process goes to Step S1043.

If, finally, it is determined in Step S1039 that the variation of the attentional frame is not less than the threshold value TH2 and less than the threshold value TH3, the process proceeds to Step S1042, where the deciding section 1084 decides the display type of the attentional frame as the high display rate/ordinary resolution type V13 and then the process goes to Step S1043.

Thus, with the Steps S1038 through S1042, when the variation of the attentional frame is less than the threshold value TH3 and there exist not less than N frames whose variations are less than the threshold value TH3 and that appear consecutively immediately before, immediately after or across the attentional frame, the display type of the attentional frame is decided as one of the still image type V11, the ordinary type V12 and the high display rate/ordinary resolution type V13 for displaying an image by using main line data in order to prevent seek operations from taking place frequently during a scrub operation.

In Step S1043, the continuity determining section 1083 judges if there still is at least a frame that is not selected as attentional frame in the frames that form the moving image for which the Fy file preparing section 1004 (FIG. 35) is preparing an Fy file or not.

If it is determined in Step S1043 that there still is at least a frame that is not selected as attentional frame, the process returns to Step S1033 and a frame that is not selected as attentional frame is newly selected as attentional frame and the process is repeated. If there still remains at least a frame that is not selected as attentional frame thereafter, the process is repeated again.

If it is determined in Step S1043 that there is not any frame that is not selected as attentional frame, the display type determining section 1023 ends the process.

On the other hand, if it is determined in Step S1038 that the variation of the attentional frame is not less than the threshold value TH3 or, if the variation of the attentional frame is less than the threshold value TH3, there do not exist not less than the minimum limit number of frames N whose variations are less than the threshold value TH3 and that appear consecutively immediately before, immediately after or across the attentional frame, the process proceeds to Step S1051 shown in FIG. 59, where the continuity determining section 1083 judges if there exist frames not less than the minimum limit number of frames N whose variations lie over the threshold value H and that appear consecutively immediately before, immediately after or across the attentional frame or not.

If the variation of the attentional frame is not less than the threshold value TH3 and there exist not less than N consecutive frames whose variations are not less than the threshold value TH3 immediately before, immediately after or across the attentional frame, it is decided in Step S1036 or S1037 shown in FIG. 58 that the display type of the attentional frame is the super high display rate/low resolution type V14 or the ultra super high display rate/low resolution type V15.

If the variation of the attentional frame is less than the threshold value TH3 and there exist not less than the minimum limit number of frames N whose variations are less than the threshold value TH3 and that appear consecutively immediately before, immediately after or across the attentional frame, it is decided in Steps S1040 through S1042 shown in FIG. 58 that the display type of the attentional frame is the still image type V11, the ordinary type V12 or the high display rate/ordinary resolution type V13.

Therefore, the processing operation of Step S1051 of FIG. 59 is performed when there exist neither not less than N consecutive frames whose variations are not less than the threshold value TH3 nor not less than N consecutive frames whose variations are less than the threshold value TH3 immediately before, immediately after or across the attentional frame, in other words, when the attentional frame is found in a section where there exist frames whose variations lie over the threshold value TH3 (in other words a mixture of frames whose variations are not less than the threshold value TH3 and frames whose variations are less than TH3) and both the number of consecutive frames whose variations are not less than the threshold value TH3 and the number of consecutive frames whose variations are less than the threshold value TH3 is less than the minimum limit number of frames N (to be also referred to as mixed section whenever appropriate hereinafter).

As described earlier by referring to FIG. 54, a mixed section is sandwiched between a section where there exist not less than N consecutive frames whose variations are not less than the threshold value TH3 (to be referred to also as large variation section whenever appropriate hereinafter) and a section where there exist frames not less than the minimum limit number of frames N whose variations are less than the threshold value TH3 (to be referred to also as small variation section whenever appropriate hereinafter), between two large variation sections or two small variation sections without fail.

Mixed sections can be divided into those whose section length (number of frames) is not less than the minimum limit number of frames N and those whose section length is less than the minimum limit number of frames N.

Mixed sections can also be divided into those that are sandwiched between a large variation section and a small variation section, those that are sandwiched between large variation sections and those that are sandwiched between small variation sections.

In Step S1051, the continuity determining section 1083 judges if there exist consecutive frames not less than the minimum limit number of frames N whose variations lie over the threshold value TH3 immediately before, immediately after or across the attentional frame or not, in other words, if the mixed section where the attentional frame is found is a section whose section length is not less than the minimum limit number of frames N or not.

When it is determined in Step S1051 that there exist consecutive frames not less than the minimum limit number of frames N whose variations lie over the threshold value TH3 immediately before, immediately after or across the attentional frame and hence the mixed section where the attentional frame is found is a section whose section length is not less than the minimum limit number of frames N, the process proceeds to Step S1052, where the deciding section 1084 decides that the display type of the attentional frame is the ordinary type V13 and then the process proceeds to Step S1043 of FIG. 58, where the above-described processing operation is performed.

In other words, the display type of all the frames found in a mixed section where there exist consecutive frames not less than the minimum limit number of frames N whose variations lie over the threshold value TH3 is made either a display type for displaying an image by using (image data of) main line data or a display type for displaying an image by using (image data of) proxy data to make it possible to prevent seek operations from taking place frequently.

Therefore, in FIG. 59, the display type of all the frames in a mixed section where consecutive frames not less than the minimum limit number of frames N whose variations lie over the threshold value TH3 is made, for example, the high display rate/ordinary resolution type V13 out of the display types for displaying an image by using main line data.

However, it is possible to alternatively employ the ordinary type V12 out of the display types for displaying an image by using main line data for the display type of the frames in a mixed section where consecutive frames not less than the minimum limit number of frames N whose variations lie over the threshold value TH3. It is also possible to employ either the super high display rate/low resolution type V14 or the ultra super high display rate/low resolution type V15 for displaying an image by using proxy data of the frames in a mixed section where consecutive frames not less than the minimum limit number of frames N whose variations lie over the threshold value TH3.

When, on the other hand, it is determined in Step S1051 that there do not exist consecutive frames not less than the minimum limit number of frames N whose variations lie over the threshold value TH3 immediately before, immediately after or across the attentional frame and hence the mixed section where the attentional frame is found (attentional mixed section) is a section whose section length is less than the minimum limit number of frames N, the process proceeds to Step S1053, where the continuity determining section 1083 judges if either the variation of the frame adjacent to the attentional mixed section (left frame) among the frames located at the left side, or the temporally preceding frames, of the attentional mixed section whose section length is less than the minimum limit number of frames N or the variation of the frame adjacent to the attentional mixed section (right frame) among the frames located at the right side, or the temporally succeeding frames, of the attentional mixed section is not less than the threshold value TH3 and the other one is less than the threshold value TH3 or not, in other words, if the attentional mixed section whose section length is less than the minimum limit number of frames N is a section sandwiched between a large variation section and a small variation section or not.

If, in Step S1053, it is determined that the attentional mixed section whose section length is less than the minimum limit number of frames N is a section sandwiched between a large variation section and a small variation section, the process proceeds to Step S1052, where the deciding section 1084 decides that the display type of the attentional frame is the high display rate/ordinary resolution type V13 as described above. Then, the process proceeds to Step S1043 of FIG. 58 and the above-described processing operation is performed.

Both the large variation section and the small variation section that sandwich the attentional mixed section whose section length is less than the minimum limit number of frames N are sections whose section lengths are not less than the minimum limit number of frames N. Additionally, the display type of the frames of the large variation section is decided as one of the display types for displaying an image by using proxy data (the super high display rate/low resolution type V14 and the ultra super high display rate/low resolution type V15), whereas the display type of the frames of the small variation section is decided as one of the display types for displaying an image by using main line data (the still image type V11, the ordinary type V12 and the high display rate/ordinary resolution type V13).

Now, the display type of the frames of the attentional mixed section that is sandwiched between the large variation section and the small variation section and whose section length is less than the minimum limit number of frames N is decided either as the display same as the large variation section or the display type of the small variation section so that it is possible to prevent seek operations from taking place frequently.

Thus, in FIG. 59, the display type of any attentional mixed section where there exist consecutive frames not less than the minimum limit number of frames N whose variations lie over the threshold value TH3 and that is sandwiched between a large variation section and a small variation section is always decided as, for example, the high display rate/ordinary resolution type V13 which is one of the display types for displaying an image by using main line data.

However, the display type of any attentional mixed section where there exist consecutive frames not less than the minimum limit number of frames N whose variations lie over the threshold value TH3 and that is sandwiched between a large variation section and a small variation section may alternatively be decided as the ordinary type V12 that is a display type for displaying an image by using main line data or the super high display rate/low resolution type V14 that is a display type for displaying an image by using proxy data.

On the other hand if, in Step S1053, it is determined that the attentional mixed section whose section length is less than the minimum limit number of frames N is not a section sandwiched between a large variation section and a small variation section, the process proceeds to Step S1054, where the continuity determining section 1083 judges if both the variation of the frame adjacent to the attentional mixed section (left frame) among the frames located at the left side, or the temporally preceding frames, of the attentional mixed section whose section length is less than the minimum limit number of frames N and the variation of the frame adjacent to the attentional mixed section (right frame) among the frames located at the right side, or the temporally succeeding frames, of the attentional mixed section are not less than the threshold value TH3 or not, in other words, if the attentional mixed section whose section length is less than the minimum limit number of frames N is a section sandwiched between large variation sections or not.

If it is determined in Step S1054 that the attentional mixed section whose section length is less than the minimum limit number of frames N is not a section sandwiched between large variation sections, the process proceeds to Step S1052, where the deciding section 1084 decides the display type of the attentional frame as, for example, the high display rate/ordinary resolution type V13, which is one of the display types for displaying an image by using main line data, and then the process proceeds to Step S1043 of FIG. 58 and the above-described processing operation is performed.

Thus, the display type of the frames of an attentional mixed section that is sandwiched between two small variation sections and whose section length is less than the minimum limit number of frames N is decided to be the same as the display type of the frames between the two small variation sections, or the display type for displaying an image by using main line data, and hence it is possible to prevent seek operations from taking place frequently.

If, on the other hand, it is determined in Step S1054 that the attentional mixed section whose section length is less than the minimum limit number of frames N is a section sandwiched between large variation sections, the process proceeds to Step S1055, where the deciding section 1084 decides the display type of the attentional frame as, for example, the super high display rate/low resolution type V14, which is one of the display types for displaying an image by using proxy data. Then, the process proceeds to Step S1043 in FIG. 58 and the above-described processing operation is performed.

Thus, the display type of the frames of an attentional mixed section that is sandwiched between two large variation sections and whose section length is less than the minimum limit number of frames N is decided to be the same as the display type of the frames of the two large variation sections, which is a display type for displaying an image by using proxy data, and hence it is possible to prevent seek operations from taking place frequently.

FIG. 60 illustrates another example of display types that the display type determining section 1023 of FIG. 35 uses for its decisions.

FIG. 60 shows three display types including a low resolution/ordinary display rate type C1, an ordinary type C2 and an ordinary resolution/low display rate type C3, which are different from each other in terms of resolution and display rate for displaying a frame.

As for a frame of the low resolution/ordinary display rate type C1, an image is displayed at a display rate same as the frame rate of moving image (ordinary rate) and with a resolution same as the resolution of image data that are proxy data (a resolution lower than the image data that are main line data).

As for a frame of the ordinary type C2, an image is displayed at the ordinary rate and with a resolution same as the resolution of image data that are main line data (to be referred to as the ordinary resolution).

As for a frame of the ordinary resolution/low display rate type C3, an image is displayed at a rate, for example, that is equal to ½ of the ordinary rate and with a resolution same as the resolution of image data that are main line data (a resolution higher than the image data that are proxy data).

When three display types including the low resolution/ordinary display rate type C1, the ordinary type C2 and the ordinary resolution/low display rate type C3 are provided as shown in FIG. 60, the variation computing section 1022 (FIG. 35) determines fineness information that indicates the extent of spatial change of a frame as variation. Then, the display type determining section 1023 compares the variation (fineness information) of each frame and two predetermined threshold values and decides the display type of the frame as one of the low resolution/ordinary display rate type C1, the ordinary type C2 and the ordinary resolution/low display rate type C3 on a frame by frame basis according to the outcome of the comparison.

Figure 61:
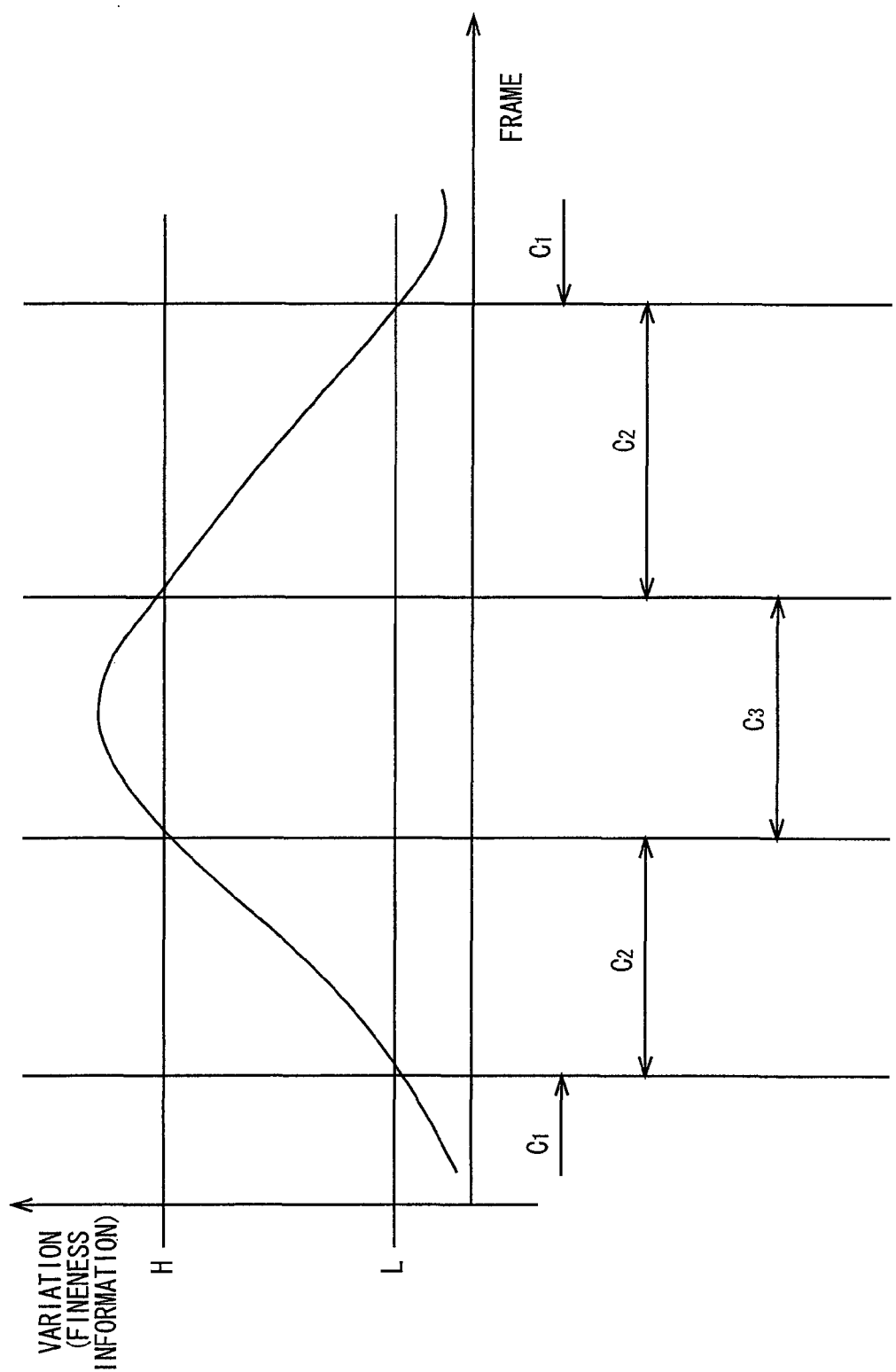
FIG. 61 is a schematic illustration of fineness information and display types on a frame by frame basis.

FIG. 61 illustrates fineness information as variation on a frame by frame basis and how the display type determining section 1023 (FIG. 35) determines the display type of each frame according to the variation.

Note that, in FIG. 61, the horizontal axis indicates frames and the vertical axis indicates variations.

The display type determining section 1023 compares the variation (fineness information) of each frame with threshold values L and H whose relationship is expressed by formula L<H. Then, the display type determining section 1023 determines the display type of a frame whose fineness information is not less than the threshold value H and hence shows a very large extent of spatial change as ordinary resolution/low display rate type C3 which is a sort of high resolution or low display rate type, or high resolution/low display rate type.

It is desirable to display frames whose spatial change is large are displayed with a high resolution because the operator can miss spatial changes of images when he or she is scrubbing in an editing operation if, for example, frames of an image that show a large extent of spatial change and hence pixel values change to a large extent (complex image) are displayed with a low resolution.

However, the processing load of the apparatus is higher when complex images are displayed with a high resolution than when images that are not complex but plane are displayed.

Thus, frames of complex images are displayed with a high resolution but the ordinary resolution/low display rate type C3 that is a high resolution/low display rate type for displaying images at a low display rate is employed here. Since the processing load is smaller when an image is displayed at a low display rate than when an image is displayed at a high display rate, it is possible to reduce the load of the apparatus where the scrub feature is being used and at the same time prevent the operator from missing spatial changes of images in an editing operation by displaying high resolution images with a low resolution for frames of complex images.

On the other hand, the display type determining section 1023 selects the low resolution/ordinary display rate type C1 for displaying images with a resolution lower than the ordinary resolution/low display rate type C3 and at the ordinary display rate that is higher than ordinary resolution/low display rate type C3 for the display type for frames whose fineness information is less than the threshold value L and hence shows only a small extent of spatial change.

Minute parts of frames showing a small extent of spatial change, or those of a plane image, do not appear significantly differently between when the image is displayed with a high resolution and when it is displayed with a low resolution.

The load of the apparatus where the scrub feature is being used is raised for nothing when minutes parts of an image that do not appear significantly differently between when the image is displayed with a high resolution and when it is displayed with a low resolution are displayed with a high resolution.

For this reason, the low resolution/ordinary display rate type C1 for displaying images with a resolution lower than the ordinary resolution/low display rate type C3 and at a display rate higher than the ordinary resolution/low display rate type C3 is employed to display frames of plane images. With this arrangement, it is possible to prevent the load of the apparatus where the scrub feature is being used is raised for nothing.

The display type determining section 1023 selects the ordinary type C2 as the display type for displaying frames other than frames whose fineness information is not less than the threshold value H and frames whose fineness information is less than the threshold value L, or frames whose fineness information is not less than the threshold value L and less than the threshold value H.

In other words, the ordinary type C2 for displaying images at the ordinary rate (same as the frame rate of moving image) and with the ordinary resolution is selected as the display type of frames of images that are neither very complex nor very plane.

Now, the process that the display type determining section 1023 of FIG. 51 executes for selecting one of the low resolution/ordinary display rate type C1, the ordinary type C2 and the ordinary resolution/low display rate type C3 shown in FIG. 60 as the display type according to variations, or fineness information, will be described below by referring to the flowcharts of FIGS. 62 and 63.

As variations are supplied from the variation computing section 1022 (FIG. 35) on a frame by frame basis, the display type determining section 1023 caches (temporarily stores) the variations on a frame by frame basis in the memory section 1081 in Step S1061 and then the process proceeds to Step S1062.

Figure 62:
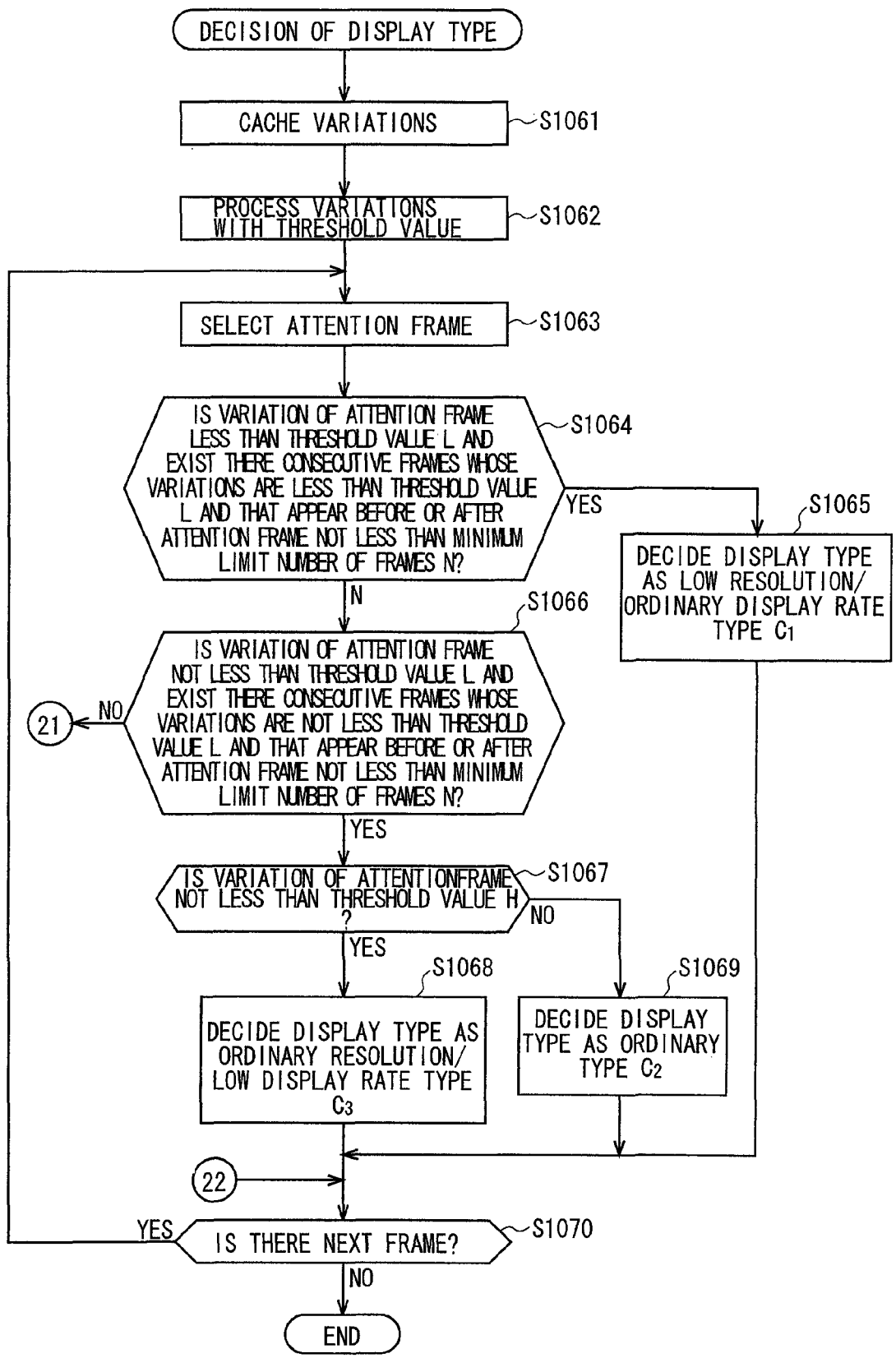
FIG. 62 is a flowchart, illustrating the display type determining process (5).
Figure 63:
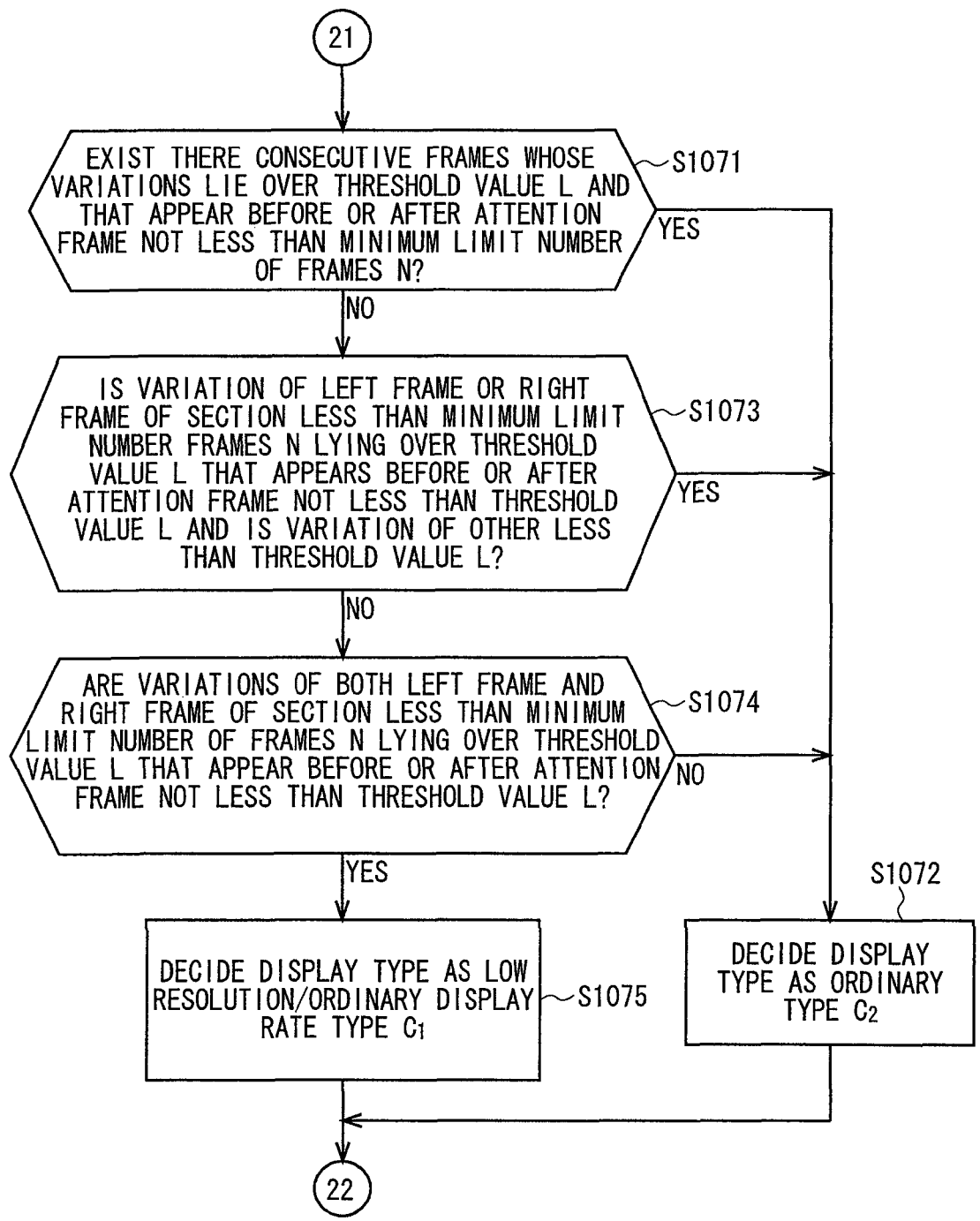
FIG. 63 is a flowchart, illustrating the display type determining process (6).

Assume here that fineness information is supplied from the variation computing section 1022 to the display type determining section 1023 as variation in FIGS. 62 and 63.

In Step S1062, the threshold value processing section 1082 executes a threshold process of comparing the variations on a frame by frame basis (fineness information) stored in the memory section 1081 and (either) the threshold value H or the threshold value L and supplies comparison information showing the outcome of the comparison of the variations on a frame by frame basis and the threshold value H or L to the continuity determining section 1083 on a frame by frame basis, before the process proceeds to Step S1063.

In Step S1063, the continuity determining section 1083 selects the frame that is located most front in time series that is not selected as attentional frame yet among the frames of the moving image for which the Fy file preparing section 1004 (FIG. 35) is preparing an Fy file and then the process proceeds to Step S1064.

In Step S1064, the continuity determining section 1083 judges if the variation of the attentional frame is not less than the threshold value L and there exist not less than N frames whose variations are not less than the threshold value L and that appear consecutively immediately before, immediately after or across the attentional frame or not according to the comparison information from the threshold value processing section 1082.

If it is determined in Step S1064 that the variation of the attentional frame is less than the threshold value L and there exist not less than N frames whose variations are less than the threshold value L and that appear consecutively immediately before, immediately after or across the attentional frame, the continuity determining section 1083 supplies determination information that shows the outcome of the determination to the deciding section 1084 and the process proceeds to Step S1065.

In Step S1065, the deciding section 1084 decides the display type of the attentional frame as the low resolution/ordinary display rate type C1 according to the determination information from the continuity determining section 1083 and the process proceeds to Step S1070.

The display type of the attentional frame is decided as the low resolution/ordinary display rate type C1 when not only the variation of the attentional frame is less than the threshold value L but also there exist or not less than N frames whose variations are less than the threshold value L and that appear consecutively immediately before, immediately after or across the attentional frame in Steps S1014 and S1015 for the reason as described below.

When the display type is selected from the low resolution/ordinary display rate type C1, the ordinary type C2 and the ordinary resolution/low display rate type C3 as shown in FIG. 60, an image showing a low resolution, or an image obtained by processing the image data of the proxy data whose data quantity is smaller (than the main line data), is displayed for frames whose display type is the low resolution/ordinary display rate type C1 in a scrub operation.

On the other hand, an image showing a high resolution, or an image obtained by processing image data of the proxy data whose data quantity is greater (than the proxy data), is displayed for frames whose display type is the ordinary type C2 or the ordinary resolution/low display rate type C3.

When, for example, the memory apparatus 22 (FIG. 1) is a professional disk where both main line data and proxy data are recorded and a scrub operation is conducted by using the main line data or the proxy data recorded in the memory apparatus 22, it can be difficult to smoothly display the frame specified by operating the scrub bar 66 (FIG. 3) if frames of the low resolution/ordinary display rate type C1 with which an image is displayed by using proxy data are frequently switched to frames of the ordinary type C2 or the ordinary resolution/low display rate type C3 with which an image is displayed by using main line data among the frames forming a moving image in time series because seek operations take place frequently as described above by referring to FIG. 52.

To prevent such seek operations from taking place frequently, it is necessary that switches from a frame of the low resolution/ordinary display rate type C1 with which an image is displayed by using proxy data to a frame of the ordinary type C2 or the ordinary resolution/low display rate type C3 with which an image is displayed by using main line data and vice versa do no frequently take place.

On the other hand, switches from a frame of the ordinary type C2 to a frame of the ordinary resolution/low display rate type C3 and vice versa do not give rise to any seek problem because an image is displayed by using main line data with frames of the ordinary type C2 and those of the ordinary resolution/low display rate type C3.

Thus, in FIGS. 62 and 63, the display type of the attentional frame is decided as the low resolution/ordinary display rate type C1 for displaying an image by using proxy data in the above-described Steps S1064 and S1065 when the variation of the attentional frame is less than the threshold value L and there exist not less than the minimum limit number of frames N whose variations are less than the threshold value L and that appear consecutively immediately before, immediately after or across the attentional frame in order that no switch from a frame of a display type with which an image is displayed by using proxy data (the low resolution/ordinary display rate type C1) to a frame of a display with which an image is displayed by using main line data (the ordinary type C2 or the ordinary resolution/low display rate type C3) or vice versa takes place in sections where at least the minimum limit number of frames N are arranged consecutively.

Additionally, the display type of the attentional frame is decided as a display type for displaying an image by using main line data, or either the ordinary type C2 or the ordinary resolution/low display rate type C3, in Steps S1066 through S1069, which will be described below, when the variation of the attentional frame is not less than the threshold value L and there exist not less than the minimum limit number of frames N whose variations are not less than the threshold value L and that appear consecutively immediately before, immediately after or across the attentional frame in order that no switch from a frame of a display type with which an image is displayed by using proxy data to a frame of a display with which an image is displayed by using main line data or vice versa takes place in sections where at least the minimum limit number of frames N are arranged consecutively.

Thus, if it is determined in Step S1064 that the variation of the attentional frame is not less than the threshold value L or, if the variation of the attentional frame is less than the threshold value L, there do not exist not less than N frames whose variations are less than the threshold value L and that appear consecutively immediately before, immediately after or across the attentional frame, the process proceeds to Step S1066, where the continuity determining section 1083 judges if the variation of the attentional frame is not less than the threshold value L and there exist not less than the minimum limit number of frames N whose variations are less than the threshold value L and that appear consecutively immediately before, immediately after or across the attentional frame or not according to the comparison information from the threshold value processing section 1082.

If it is determined in Step S1066 that the variation of the attentional frame is not less than the threshold value L and there exist not less than the minimum limit number of frames N whose variations are not less than the threshold value L and that appear consecutively immediately before, immediately after or across the attentional frame, the continuity determining section 1083 supplies determination information showing the outcome of the determination to the deciding section 1084 and the process proceeds to Step S1067.

Upon receiving the supply of the determination information showing the outcome of the determination that the variation of the attentional frame is not less than the threshold value L and there exist not less than the minimum limit number of frames N whose variations are not less than the threshold value L and that appear consecutively immediately before, immediately after or across the attentional frame from the continuity determining section 1083, the deciding section 1084 judges in Step S1067 if the variation of the attentional frame is not less than the threshold value H or not according to the comparison information from the threshold processing section 1082.

If it is determined in Step S1067 that the variation of the attentional frame is not less than the threshold value H, the process proceeds to Step S1068, where the deciding section 1084 decides the display type of the attentional frame as the ordinary resolution/low display rate type C3 and then the process goes to Step S1070.

If, on the other hand, it is determined in Step S1067 that the variation of the attentional frame is less than the threshold value H, that is, the variation of the attentional frame is not less than the threshold value L and less than the threshold value H, the process proceeds to Step S1069, where the deciding section 1084 decides the display type of the attentional frame as the ordinary type C2 and then the process goes to Step S1070.

Thus, with the Steps S1066 through S1069, when the variation of the attentional frame is not less than the threshold value L and there exist not less than N frames whose variations are not less than the threshold value L and that appear consecutively immediately before, immediately after or across the attentional frame, the display type of the attentional frame is decided as a display type for displaying an image by using main line data, or the ordinary resolution/low display rate type C3 or the ordinary type C2, in order to prevent seek operations from taking place frequently during a scrub operation.

In Step S1070, the continuity determining section 1083 judges if there still is at least a frame that is not selected as attentional frame in the frames that form the moving image for which the Fy file preparing section 1004 (FIG. 35) is preparing an Fy file or not.

If it is determined in Step S1070 that there still is at least a frame that is not selected as attentional frame, the process returns to Step S1063 and a frame that is not selected as attentional frame is newly selected as attentional frame and the process is repeated. If there still remains at least a frame that is not selected as attentional frame thereafter, the process is repeated again.

If it is determined in Step S1070 that there is not any frame that is not selected as attentional frame, the display type determining section 1023 ends the process.

On the other hand, if it is determined in Step S1066 that the variation of the attentional frame is less than the threshold value L or, if the variation of the attentional frame is not less than the threshold value L, there do not exist not less than the minimum limit number of frames N whose variations are not less than the threshold value L and that appear consecutively immediately before, immediately after or across the attentional frame, the process proceeds to Step S1071 shown in FIG. 63, where the continuity determining section 1083 judges if there exist frames not less than the minimum limit number of frames N whose variations lie over the threshold value L and that appear consecutively immediately before, immediately after or across the attentional frame or not.

If the variation of the attentional frame is less than the threshold value L and there exist not less than N consecutive frames whose variations are less than the threshold value L immediately before, immediately after or across the attentional frame, it is decided in Step S1065 shown in FIG. 62 that the display type of the attentional frame is the low resolution/ordinary display rate type C1.

If the variation of the attentional frame is not less than the threshold value L and there exist not less than the minimum limit number of frames N whose variations are not less than the threshold value L and that appear consecutively immediately before, immediately after or across the attentional frame, it is decided in Steps S1068 or S1069 shown in FIG. 62 that the display type of the attentional frame is the ordinary resolution/low display rate type C3 or the ordinary type C2.

Therefore, the processing operation of Step S1071 of FIG. 63 is performed when there exist neither not less than N consecutive frames whose variations are less than the threshold value L nor not less than the minimum limit number of consecutive frames N whose variations are not less than the threshold value L immediately before, immediately after or across the attentional frame, in other words, when the attentional frame is found in a section where there exist frames whose variations lie over the threshold value L (in other words a mixture of frames whose variations are less than the threshold value L and frames whose variations are not less than the threshold value L) and both the number of consecutive frames whose variations are less than the threshold value L and the number of consecutive frames whose variations are not less than the threshold value L are less than the minimum limit number of frames N (to be also referred to as mixed section whenever appropriate hereinafter).

As described earlier by referring to FIG. 54, a mixed section is sandwiched between a section where there exist not less than N consecutive frames whose variations are less than the threshold value L (to be referred to also as small variation section whenever appropriate hereinafter) and a section where there exist frames not less than the minimum limit number of frames N whose variations are not less than the threshold value L (to be referred to also as large variation section whenever appropriate hereinafter), between two large variation sections or two small variation sections without fail.

Mixed sections can be divided into those whose section length (number of frames) is not less than the minimum limit number of frames N and those whose section length is less than the minimum limit number of frames N.

Mixed sections can also be divided into those that are sandwiched between a large variation section and a small variation section, those that are sandwiched between large variation sections and those that are sandwiched between small variation sections.

In Step S1071, the continuity determining section 1083 judges if there exist consecutive frames not less than the minimum limit number of frames N whose variations lie over the threshold value L immediately before, immediately after or across the attentional frame or not, in other words, if the mixed section where the attentional frame is found is a section whose section length is not less than the minimum limit number of frames N or not.

When it is determined in Step S1071 that there exist consecutive frames not less than the minimum limit number of frames N whose variations lie over the threshold value L immediately before, immediately after or across the attentional frame, the process proceeds to Step S1072, where the deciding section 1084 decides that the display type of the attentional frame is, for example, the ordinary type C2 which is a display type for displaying an image by using main line data and then the process proceeds to Step S1070 of FIG. 62, where the above-described processing operation is performed.

In other words, the display type of all the frames found in a mixed section where there exist consecutive frames not less than the minimum limit number of frames N whose variations lie over the threshold value L is made either a display type for displaying an image by using (image data of) main line data or a display type for displaying an image by using (image data of) proxy data to make it possible to prevent seek operations from taking place frequently.

Therefore, in FIG. 63, the display type of all the frames in a mixed section where consecutive frames not less than the minimum limit number of frames N whose variations lie over the threshold value L is made, for example, the ordinary type C2 of the display types for displaying an image by using main line data.

However, it is possible to alternatively employ the low resolution/ordinary display rate type C1 for displaying an image by using proxy data for the display type of the frames in a mixed section where consecutive frames not less than the minimum limit number of frames N whose variations lie over the threshold value L.

When, on the other hand, it is determined in Step S1071 that there do not exist consecutive frames not less than the minimum limit number of frames N whose variations lie over the threshold value L immediately before, immediately after or across the attentional frame and hence the mixed section where the attentional frame is found (attentional mixed section) is a section whose section length is less than the minimum limit number of frames N, the process proceeds to Step S1073, where the continuity determining section 1083 judges if either the variation of the frame adjacent to the attentional mixed section (left frame) among the frames located at the left side, or the temporally preceding frames, of the attentional mixed section whose section length is less than the minimum limit number of frames N or the variation of the frame adjacent to the attentional mixed section (right frame) among the frames located at the right side, or the temporally succeeding frames, of the attentional mixed section is less than the threshold value L and the other one is not less than the threshold value L or not, in other words, if the attentional mixed section whose section length is less than the minimum limit number of frames N is a section sandwiched between a large variation section and a small variation section or not.

If, in Step S1073, it is determined that the attentional mixed section whose section length is less than the minimum limit number of frames N is a section sandwiched between a large variation section and a small variation section, the process proceeds to Step S1072, where the deciding section 1084 decides that the display type of the attentional frame is the ordinary type C2 as described above. Then, the process proceeds to Step S1070 and the above-described processing operation is performed.

Both the large variation section and the small variation section that sandwich the attentional mixed section whose section length is less than the minimum limit number of frames N are sections whose section lengths are not less than the minimum limit number of frames N. Additionally, the display type of the frames of the large variation section is decided as one of the display types for displaying an image by using main line data (the ordinary type C2 or the ordinary resolution/low display rate type C3), whereas the display type of the frames of the small variation section is decided as the display type for displaying an image by using proxy data (the low resolution/ordinary display rate type C1).

Now, the display type of the frames of the attentional mixed section that is sandwiched between the large variation section and the small variation section and whose section length is less than the minimum limit number of frames N is decided either as the display same as the large variation section or the display type of the small variation section so that it is possible to prevent seek operations from taking place frequently.

Thus, in FIG. 63, the display type of any attentional mixed section where there exist consecutive frames not less than the minimum limit number of frames N whose variations lie over the threshold value L and that is sandwiched between a large variation section and a small variation section is always decided as, for example, the ordinary type C2 which is one of the display types for displaying an image by using main line data.

However, the display type of any attentional mixed section where there exist consecutive frames not less than the minimum limit number of frames N whose variations lie over the threshold value L and that is sandwiched between a large variation section and a small variation section may alternatively be decided as the low resolution/ordinary display rate type C1 that is the display type for displaying an image by using proxy data.

On the other hand if, in Step S1073, it is determined that the attentional mixed section whose section length is less than the minimum limit number of frames N is not a section sandwiched between a large variation section and a small variation section, the process proceeds to Step S1074, where the continuity determining section 1083 judges if both the variation of the frame adjacent to the attentional mixed section (left frame) among the frames located at the left side, or the temporally preceding frames, of the attentional mixed section whose section length is less than the minimum limit number of frames N and the variation of the frame adjacent to the attentional mixed section (right frame) among the frames located at the right side, or the temporally succeeding frames, of the attentional mixed section are less than the threshold value L or not, in other words, if the attentional mixed section whose section length is less than the minimum limit number of frames N is a section sandwiched between small variation sections or not.

If it is determined in Step S1074 that the attentional mixed section whose section length is less than the minimum limit number of frames N is not a section sandwiched between small variation sections and hence the attentional mixed section whose section length is less than the minimum limit number of frames N is a section sandwiched between large variation sections, the process proceeds to Step S1072, where the deciding section 1084 decides the display type of the attentional frame as, for example, the ordinary type C2, which is one of the display types for frames between large variation sections and hence the types for displaying an image by using main line data, and then the process proceeds to Step S1070 of FIG. 62 and the above-described processing operation is performed.

Thus, the display type of the frames of an attentional mixed section that is sandwiched between two large variation sections and whose section length is less than the minimum limit number of frames N is decided to be the same as the display type of the frames between two large variation sections, or the display type for displaying an image by using main line data, and hence it is possible to prevent seek operations from taking place frequently.

If, on the other hand, it is determined in Step S1074 that the attentional mixed section whose section length is less than the minimum limit number of frames N is a section sandwiched between small variation sections, the process proceeds to Step S1075, where the deciding section 1084 decides the display type of the attentional frame as the low resolution/ordinary display rate type C1, which is the display type for displaying an image by using proxy data. Then, the process proceeds to Step S1070 in FIG. 62 and the above-described processing operation is performed.

Thus, the display type of the frames of an attentional mixed section that is sandwiched between two mall variation sections and whose section length is less than the minimum limit number of frames N is decided to be the same as the display type of the frames of the two small variation sections, which is the low resolution/ordinary display rate type C1 for displaying an image by using proxy data, and hence it is possible to prevent seek operations from taking place frequently.

Now, FIG. 64 schematically illustrates an exemplary Fy file that the file preparing section 1025 of FIG. 35 prepares when the variation computing section 1022 of FIG. 35 determines movement information and fineness information as variations, the display type determining section 1023 determines display types according to the movement information and the fineness information, while the selection section 1024 selects both variations and a display type.

The Fy file of FIG. 64 sequentially shows from left to right the frame numbers indicating the ordinal numbers of frames, the time codes that correspond to the respective frames, movement information and fineness information that tell the variations of the respective frames corresponding to the respective frame numbers and the display types of the respective frames based on the movement information and the display types of the respective frames based on the fineness information corresponding to the respective frame numbers.

FIG. 65 schematically illustrates an exemplary Fy file that the file preparing section 1025 of FIG. 35 prepares when the variation computing section 1022 of FIG. 35 determines movement information and fineness information as variations and the selection section 1024 selects only variations.

The Fy file of FIG. 65 sequentially shows from left to right the frame numbers indicating the ordinal numbers of frames, the time codes that correspond to the respective frames and movement information and fineness information that tell the variations of the respective frames corresponding to the respective frame numbers.

FIG. 66 schematically illustrates an exemplary Fy file that the file preparing section 1025 of FIG. 35 prepares when the variation computing section 1022 of FIG. 35 determines movement information and fineness information as variations and the display type determining section 1023 determines display types according to the movement information and the fineness information, while the selection section 1024 selects only a display type.

The Fy file of FIG. 66 sequentially shows from left to right the frame numbers indicating the ordinal numbers of frames, the time codes that correspond to the respective frames, display types based on the movement information of the frames corresponding to the respective frame numbers and display types based on the fineness information of the frames corresponding to the respective frame numbers.

While a display type is determined on the basis of either movement information or fineness information in the above description, it is also possible to determine a display type on the basis of both movement information and fineness information.

FIG. 67 schematically illustrates another example of display types that the display type determining section 1023 of FIG. 35 determines.

FIG. 67 shows four display types including still image type VC1 for displaying a still image, ordinary type VC2, high display rate/low resolution type VC3 and ordinary display rate/low resolution type VC4, the latter three types being different from each other in terms of resolution and display rate for displaying a frame.

As for a frame of the still image type VC1, if the frame that is the object of display is changed, the (image of the) frame displayed immediately before the change is displayed so long as the frame that is the object of display can be (continuously) regarded same as the (image of the) frame displayed immediately before the change just like the still image type V1 of FIG. 49.

As for a frame of the ordinary type VC2, the image is displayed at a display rate same as the frame rate of moving image (ordinary rate) and with a resolution same as the image data of the main line data (ordinary resolution) just like the ordinary type VC2 of FIG. 49.

As for a frame of the high display rate/low resolution type VC3, same as that of the high display rate/low resolution type VC3 of FIG. 49, the image is displayed at a rate higher than the ordinary rate, e.g. a display rate twice as high as the ordinary rate, and with a resolution same as image data of proxy data (a resolution lower than the image data of main line data).

As for a frame of the ordinary display rate/low resolution type VC4, the image is displayed at the ordinary rate and with a resolution same as image data of proxy data (a resolution lower than the image data of main line data).

Note that the high display rate/low resolution type VC3 and the ordinary display rate/low resolution type VC4 differ from each other only in that the high display rate/low resolution type VC3 displays an image at a display rate higher than the ordinary rate, whereas the ordinary display rate/low resolution type VC4 displays an image at the ordinary (display) rate.

When there are four display types including the still image type VC1, the ordinary type VC2, the high display rate/low resolution type VC3 and the ordinary display rate/low resolution type VC4 as shown in FIG. 67, the variation computing section 1022 (FIG. 35) determines the movement information and the fineness information as variations. Then, the display type determining section 1023 (FIG. 35) compares, for example, the movement information and two predetermined threshold values and also the fineness information and a single threshold value and selects one of four types of the still image type VC1, the ordinary type VC2, the high display rate/low resolution type VC3 and the ordinary display rate/ low resolution type VC4 according to the outcome of the comparisons, based on both the movement information and the fineness information.

Figure 68:
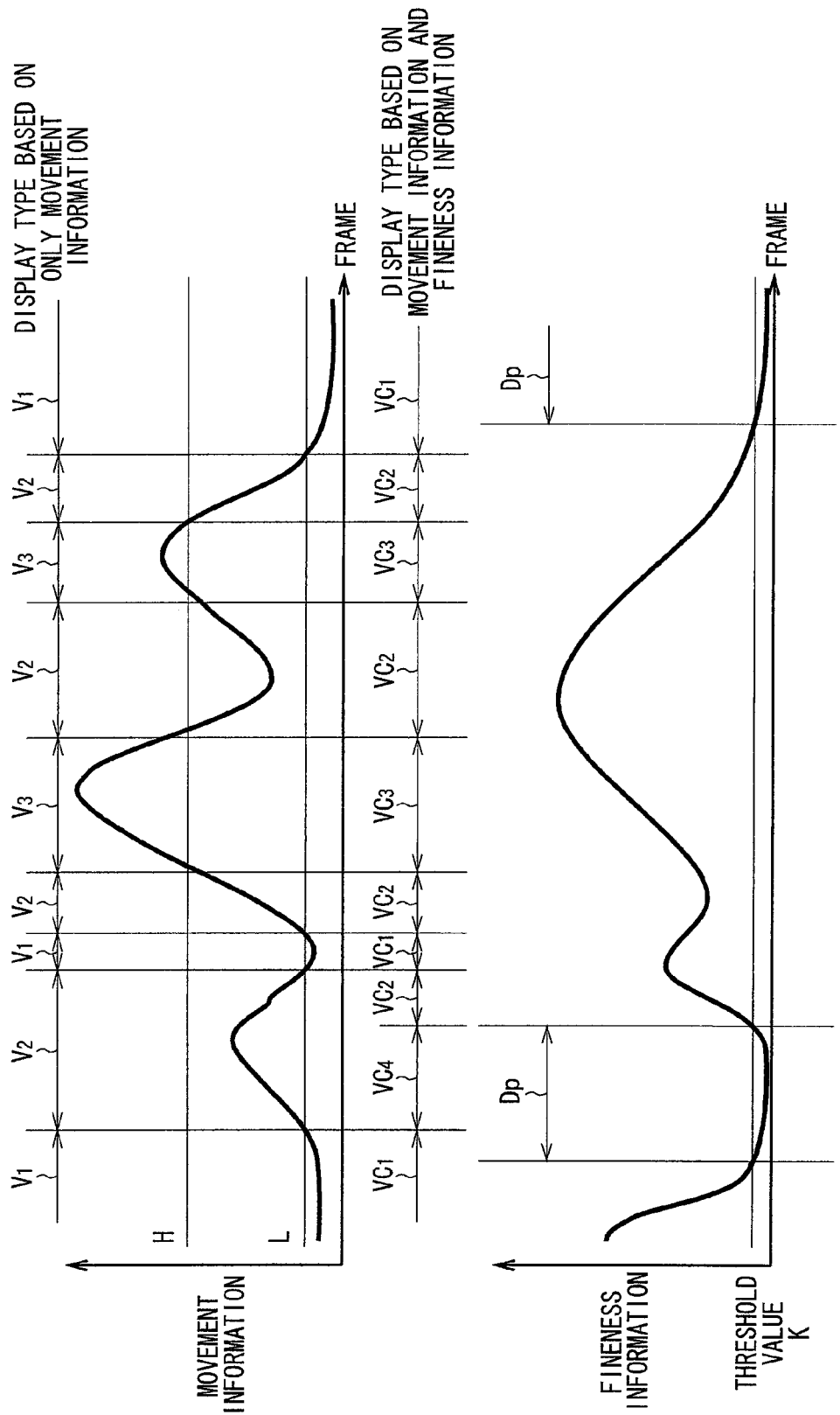
FIG. 68 is a schematic illustration of move information, fineness information and display types.

FIG. 68 illustrates the movement information and the fineness information as variations on a frame by frame basis and the display type that the display type determining section 1023 (FIG. 35) determines on a frame by frame basis according to the movement information and the fineness information on a frame by frame basis.

In FIG. 68, the upper half shows the movement information on a frame by frame basis, whereas the lower half shows the fineness information on a frame by frame basis.

In FIG. 68, the horizontal axis indicates frames and the vertical axis indicates variations (movement information and fineness information).

The display type determining section 1023 (FIG. 35) compares the variations (movement information) of frames with threshold value L or threshold value H, which show a relationship of L<H, on a frame by frame basis. Then, the display type determining section 1023 selects a display type as tentative display type (tentatively determines the display type) according to the outcome of the comparison.

More specifically, the display type determining section 1023 selects one of the still image type V1, the ordinary type V2 and the high display rate/low resolution type V3 shown in FIG. 49 according to the movement information of the frame as tentative display type (tentatively determines the display type) in a manner as described earlier by referring to FIGS. 49 through 54.

As a result, as described earlier by referring to FIGS. 49 through 54, the display type of a frame whose movement information is less than the threshold value L is tentatively determined as the still image type V1 and the display type of a frame whose movement information is not less than the threshold value L and less than the threshold value H is tentatively determined as the ordinary type V2, while a frame whose movement information is not less than the threshold value H is tentatively determined as the high display rate/low resolution type V3.

Then, the display type determining section 1023 (FIG. 35) compares the fineness information of each frame with a predetermined threshold value K on a frame by frame basis and ultimately determines the display type of each frame as one of the still image type VC1, the ordinary type VC2, the high display rate/low resolution type VC3 and the ordinary display rate/low resolution type VC4 according to the outcome of the comparison and the tentative display type tentatively determined according to the movement information.

More specifically, the display type determining section 1023 ultimately determines the display type of a frame whose tentative display type is the still image type V1 as the still image type VC1 and that of a frame whose tentative display type is the high display rate/low resolution type V3 as the high display rate/low resolution type VC3.

Additionally, the display type determining section 1023 ultimately determines the display type of a frame whose tentative display type is the ordinary type V2 and whose fineness information is not less than the threshold value K, which is a frame of an image that cannot be the as a plane image, as the ordinary type VC2. Finally, the display type determining section 1023 ultimately determines the display type of a frame whose tentative display type is the ordinary type V2 and whose fineness information is less than the threshold value K, which is a frame of a plane image, as the ordinary display rate/low resolution type VC4.

A frame whose tentative display type is the ordinary type V2 is a frame that shows a certain extent of movement, although not very large. A frame whose fineness information is less than the threshold value K is a plane frame. Therefore, of the frames whose tentative display type is the ordinary type V2, those whose fineness information is less than the threshold value K are frames that show a certain extent of movement but are still plane.

If an image shows a certain extent of movement, the operator can hardly miss the spatial change of the image if it is a plane image and displayed with a low resolution. Additionally, the load of the apparatus doing a scrub operation can be reduced when the image is displayed with a low resolution.

Therefore, while the display type of a frame that shows a certain extent of movement and whose tentative display type is the ordinary type V2 is ultimately determined as the ordinary type VC2 for displaying an image with the ordinary resolution in principle, it is ultimately determined as the ordinary display rate/low resolution type VC4 for displaying an image with a resolution lower than the ordinary resolution only when the fineness information of the frame is less than the threshold value K.

Thus, in FIG. 68, the display type of a frame that is found in section DP of frames whose fineness information is less than the threshold value K and whose tentative display type as tentatively determined according to the movement information thereof is the ordinary type V2 is ultimately determined as the ordinary display rate/low resolution type VC4.

The display type of a frame that is ultimately determined as one of the still image type VC1, the ordinary type VC2, the high display rate/low resolution type VC3 and the ordinary display rate/low resolution type VC4 as shown in FIG. 67 according to the movement information and the fineness information of the frame is referred to as ultimate display type wherever appropriate hereinafter.

Now, the process of the display type determining section 1023 of FIG. 51 for determining the display type (ultimate display type) of a frame as one of the still image type VC1, the ordinary type VC2, the high display rate/low resolution type VC3 and the ordinary display rate/low resolution type VC4 as shown in FIG. 67 according to both the movement information and the fineness information of the frame will be described below by referring to the flowchart of FIG. 69.

Note that the variation computing section 1022 (FIG. 35) determines movement information and fineness information as variations and supplies them to the display type determining section 1023.

In Step S1081, the display type determining section 1023 determines the display type of the frame according to the movement information supplied from the variation computing section 1022 (FIG. 35) on a frame by frame basis as the display type (tentative display type) according to the movement information as described earlier by referring to FIGS. 52 and 53 and the process proceeds to Step S1082.

In Step S1082, the display type determining section 1023 caches the fineness information supplied from the variation computing section 1022 on a frame by frame basis in the memory section 1081 (FIG. 51) and the process proceeds to Step S1083.

In Step S1083, the threshold value processing section 1082 (FIG. 51) executes a threshold process of comparing the fineness information on a frame by frame basis stored in the memory section 1081 and the threshold value K and supplies comparison information showing the outcome of the comparison of the fineness information on a frame by frame basis and the threshold value K to the continuity determining section 1083 on a frame by frame basis, before the process proceeds to Step S1084.

In Step S1084, the continuity determining section 1083 (FIG. 51) typically selects the frame that is located most front in time series that is not selected as attentional frame yet among the frames of the moving image for which the Fy file preparing section 76 (FIG. 35) is preparing an Fy file and supplies information on the attentional frame to the deciding section 1084 (FIG. 51) before the process proceeds to Step S1085.

In Step S1085, the deciding section 1084 judges if the display type (the tentative display type determined in Step S1081) according to the movement information of the attentional frame is the still image type V1 or not.

If it is determined in Step S1085 that the display type according to the movement information of the attentional frame is determined as the still image type V1, the deciding section 1084 proceeds to Step S1086, where it decides the ultimate display type of the attentional frame (the display type according to the movement information and the fineness information of the attentional frame) as the still image type VC1 and the process proceeds to Step S1093.

If it is determined in Step S1085 that the display type according to the movement information of the attentional frame is not the still image type V1, the deciding section 1084 proceeds to Step S1087, where it judges if the display type according to the movement information of the attentional frame is the high display rate/low resolution type V3 or not.

If it is determined in Step S1087 that the display type according to the movement information of the attentional frame is the high display rate/low resolution type V3, the deciding section 1084 proceeds to Step S1088, where it ultimately decides the ultimate display type of the attentional frame as the high display rate/low resolution type VC3, and the process proceeds to Step S1093.

If, on the other hand, it is determined in Step S1087 that the display type according to the movement information of the attentional frame is not the high display rate/low resolution type V3 and thence the display type according to the movement information of the attentional frame is the ordinary type V2, the process proceeds to Step S1089, where the continuity determining section 1083 (FIG. 51) judges if the fineness information of the attentional frame whose display type according to the movement information is the ordinary type V2 is less than the threshold value K and there exist not less than the minimum limit number of frames N whose fineness information is less than the threshold value K and that appear consecutively immediately before, immediately after or across the attentional frame or not according to the comparison information from the threshold value processing section 1082.

If it is determined in Step S1089 that the fineness information of the attentional frame is not less than the threshold value K or the fineness information of the attentional frame is less than the threshold value K and there does not exist not less than the minimum limit number of frames N whose fineness information is less than the threshold value K and that appear consecutively immediately before, immediately after or across the attentional frame, the continuity determining section 1083 supplies the determination information showing the outcome of the determination to the deciding section 1084 (FIG. 51) and the process proceeds to Step S1090.

Upon receiving the determination information showing the outcome of the determination that the fineness information of the attentional frame is not less than the threshold value K or that the fineness information of the attentional frame is less than the threshold value K and there does not exist not less than the minimum limit number of frames N whose fineness information is less than the threshold value K and that appear consecutively immediately before, immediately after or across the attentional frame supplied from the continuity determining section 1083, the deciding section 1084 (FIG. 51) ultimately decides the ultimate display type of the attentional frame whose display type is the ordinary type V2 according to the movement information as the ordinary type VC2 and the process proceeds to Step S1093.

If, on the other hand, it is determined in Step S1089 that the fineness information of the attentional frame is less than the threshold value K and there exist not less than the minimum limit number of frames N whose fineness information is less than the threshold value K and that appear consecutively immediately before, immediately after or across the attentional frame, the continuity determining section 1083 (FIG. 51) proceeds to Step S1091, where it judges if there arises a section where the number of consecutive frames showing the same display type is less than the minimum limit number of frames N when the display types of the frames that are the ordinary type V2 according to the movement information thereof are changed to the ordinary display rate/low resolution type VC4 out of the frames of the section where there exist not less than the minimum limit number of frames N whose fineness information is less than the threshold value K and that appear consecutively immediately before, immediately after or across the attentional frame or not.

In other words, it is determined in Step S1091 that, when the section DP in FIG. 68, for example, is a section where there exist not less than the minimum limit number of frames N whose fineness information is less than the threshold value K and the display types of the frames that are the ordinary type V2 out of the frames of a section DP according to the movement information thereof are changed to the ordinary display rate/low resolution type VC4, if there arises a section where the number of consecutive frames showing the same display type becomes less than the minimum limit number of frames N among sections where the same display types are consecutively arranged in time series as ultimately obtained according to movement information and fineness information in time series for a moving image for which an Fy files is being prepared or not.

If it is determined in Step S1091 that, when the display types of the frames whose display types are the ordinary type V2 according to the movement information are changed to the ordinary display rate/low resolution type VC4 out of the frames of a section where there exist not less than the minimum limit number of frames N whose fineness information is less than the threshold value K and that appear consecutively immediately before, immediately after or across the attentional frame, there arises a section where the number of consecutive frames showing the same display type becomes less than the minimum limit number of frames N and hence seek operations may take place frequently when the ultimate display type of the attentional frame whose display type is the ordinary type V2 according to the movement information is changed to the ordinary display rate/low resolution type VC4, the process proceeds to Step S1090, where the deciding section 1084 (FIG. 51) ultimately decides the ultimate display type of the attentional frame whose display type according to the movement information is the ordinary type V2 to the ordinary type VC2 before the process proceeds to Step S1093.

If, on the other hand, it is determined in Step S1091 that, when the display types of the frames whose display types are the ordinary type V2 according to the movement information are changed to the ordinary display rate/low resolution type VC4 out of the frames of a section where there exist not less than the minimum limit number of frames N whose fineness information is less than the threshold value K and that appear consecutively immediately before, immediately after or across the attentional frame, there does not arise a section where the number of consecutive frames showing the same display type becomes less than the minimum limit number of frames N, the process proceeds to Step S1092, where the deciding section 1084 (FIG. 51) ultimately decides the ultimate display type of the attentional frame whose display type is the ordinary type V2 according to the movement information as the ordinary display rate/low resolution type VC4 and the process proceeds to Step S1093.

When the display type (ultimate display type) is selected from the still image type VC1, the ordinary type VC2, the high display rate/low resolution type VC3 and the ordinary display rate/low resolution type VC4 as shown in FIG. 67, an image obtained by processing an image showing a high resolution (the ordinary resolution) and hence image data of main line data having a large quantity of data (relative to proxy data) is displayed for frames having the still image type VC1 and frames having the ordinary type VC2 as display type.

On the other hand, an image obtained by processing an image showing a low resolution and hence image data of proxy data having a small quantity of data (relative to main line data) is displayed for frames having the high display rate/low resolution type VC3 and frames having the ordinary display rate/low resolution type VC4 as display type.

When the memory apparatus 22 (FIG. 1) is a professional disk where both main line data and proxy data are recorded and a scrub operation is conducted by using the main line data or the proxy data recorded in the memory apparatus 22, it can be difficult to smoothly display the frame specified by operating the scrub bar 66 (FIG. 3) if frames of the high display rate/low resolution type VC3 or the ordinary display rate/low resolution type VC4 with which an image is displayed by using proxy data are frequently switched to frames of the still image type VC1 or the ordinary type VC2 with which an image is displayed by using main line data among the frames forming a moving image in time series because seek operations take place frequently as described above by referring to FIG. 52.

To prevent such seek operations from taking place frequently, it is necessary that switches from a frame of the high display rate/low resolution type VC3 or the ordinary display rate/low resolution type VC4 with which an image is displayed by using proxy data to a frame of the still image type VC1 or the ordinary type VC2 with which an image is displayed by using main line data and vice versa do no frequently take place.

Figure 69:
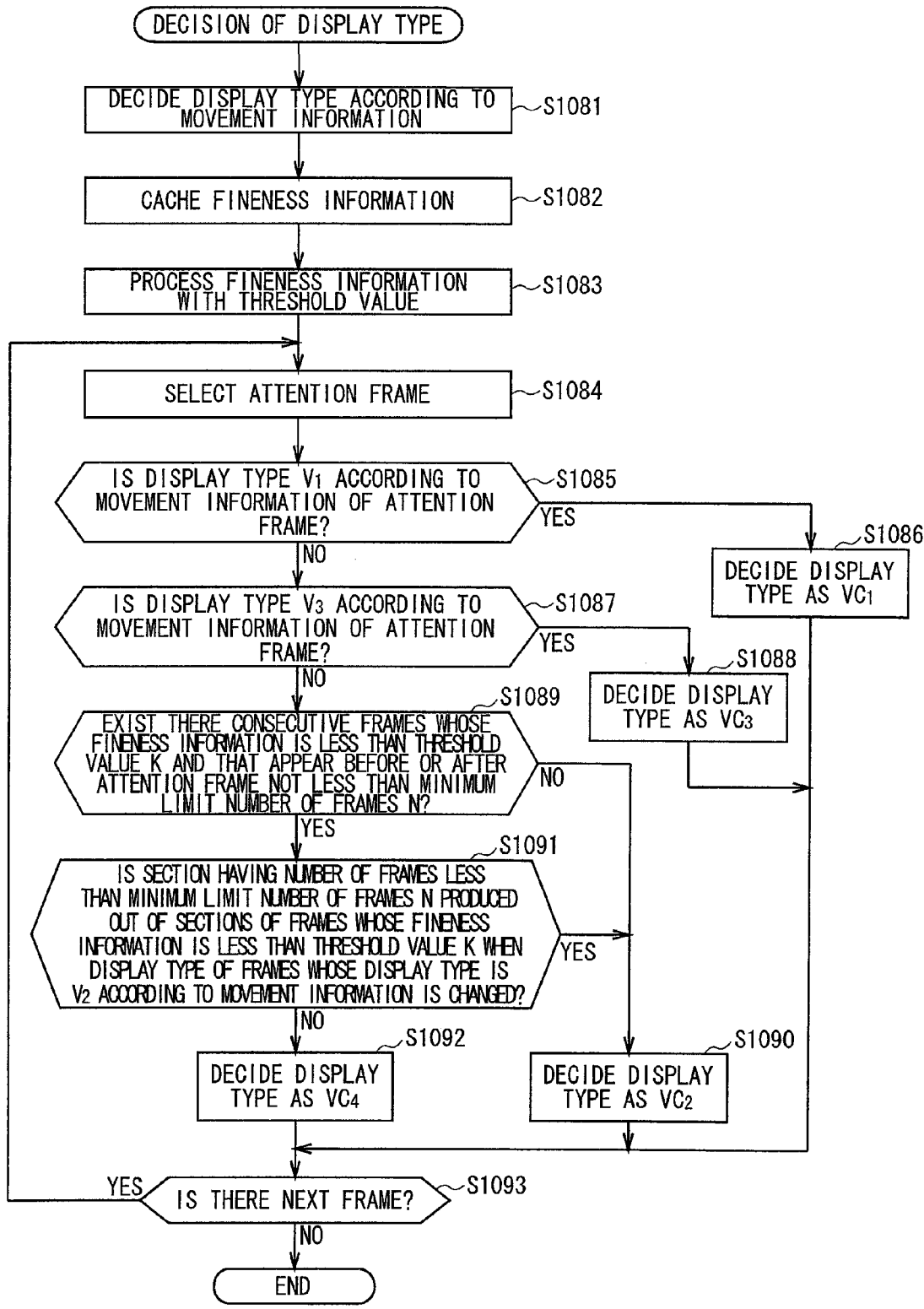
FIG. 69 is a flowchart, illustrating the display type determining process (7).

Thus, in FIG. 69, the ultimate display type of the attentional frame whose display type is the ordinary type V2 according to the movement information is decided as the ordinary display rate/low resolution type VC4 so long as there does not arise a section where the number of consecutive frames showing the same display type becomes less than the minimum limit number of frames N, when the display types of the frames whose display types are the ordinary type V2 according to the movement information are changed to the ordinary display rate/low resolution type VC4 out of the frames of a section where there exist not less than the minimum limit number of frames N whose fineness information is less than the threshold value K and that appear consecutively immediately before, immediately after or across the attentional frame, and otherwise (when there arises a section where the number of consecutive frames showing the same display type (ultimate display type) becomes less than the minimum limit number of frames N), the ultimate display type of the attentional frame whose display type is the ordinary type V2 according to the movement information is decided as the ordinary display rate/low resolution type VC4.

In Step S1093, the continuity determining section 1083 judges if there still is at least a frame that is not selected as attentional frame in the frames that form the moving image for which the Fy file preparing section 1004 (FIG. 35) is preparing an Fy file or not.

If it is determined in Step S1093 that there still is at least a frame that is not selected as attentional frame, the process returns to Step S1084 and a frame that is not selected as attentional frame is newly selected as attentional frame and the process is repeated as described above. If there still remains at least a frame that is not selected as attentional frame thereafter, the process is repeated again.

If it is determined in Step S1093 that there is not any frame that is not selected as attentional frame, the display type determining section 1023 ends the process.

Now, FIG. 70 schematically illustrates an exemplary Fy file that the file preparing section 1025 of FIG. 35 prepares when the variation computing section 1022 of FIG. 35 determines movement information and fineness information as variations, the display type determining section 1023 determines display types according to the movement information and the fineness information (ultimate display type), while the selection section 1024 selects both variations and a display type.

The Fy file of FIG. 70 sequentially shows from left to right the frame numbers indicating the ordinal numbers of frames, the time codes that correspond to the respective frames, movement information and fineness information that tell the variations of the respective frames corresponding to the frame numbers and the display types (ultimate display types) of the respective frames based on the movement information and the fineness information corresponding to the respective frame numbers.

In the above-described pre-editing process, the type of pixel value to be used for determining the variations of frames is not subjected to any particular limitations. In other words, when a pixel value is determined from a luminance signal (Y) and a color difference signal (Cb, Cr), it is possible to use either the luminance signal or the color difference signal to determine the variation of a frame. However, since a change in the luminance signal is more influential than the color difference signal to the visual sense of human being, it is desirable to use the luminance signal to determine the variation.

When, on the other hand, a pixel value is determined from the color components of R, G and B, it is possible to determine the variation of a frame by using the square sum of the color components of R, G and B.

A value that quantitatively expresses the strength of movement other than those described above by referring to FIGS. 40 through 43 may alternatively be employed as movement information that expresses a variation. Similarly, a value (such as a value referred to as difficulty or flatness) that quantitatively expresses the fineness of an image other than those described above by referring to FIGS. 44 through 47 may alternatively be employed as fineness information that expresses a variation.

When the variation of a frame is determined by using image data encoded according to the MPEG2 System as described above by referring to FIG. 44, it is also possible to analyze (parse) the coded bit stream obtained by encoding the image data according to the MPEG2 System and determine the variation by using the outcome of the analysis.

More specifically, a coded bit stream includes a motion vector. Therefore, when determining movement information as variation by using a motion vector as described earlier by referring to FIGS. 40 and 41, it is possible to obtain the motion vector included in the coded bit stream by analyzing the coded bit stream and determine the movement information by using the motion vector.

Additionally, a coded bit stream includes DCT coefficients obtained by way of DCT of blocks of 8×8 pixels. Therefore, when determining fineness information as variation by using a DCT coefficient, it is possible to obtain the DCT coefficient by analyzing the coded bit stream and determine the fineness information by using the DCT coefficient as a result of the analysis as described earlier by referring to FIGS. 44 and 45.

Still additionally, the upper left DCT coefficient in the DCT coefficients obtained by way of DCT of blocks of 8×8 pixels, of the so-called DC component, is the average value of the pixel values of the 8×8 pixels of the block. Therefore, when determining fineness information as variation by using the average of the pixel values of the block, it is possible to analyze the coded bit stream in order to obtain the DC component of the DCT coefficients included in the coded bit steam as a result of the analysis and determine the fineness information by using the DC component, or the average value of the pixel values of the block as described earlier by referring to FIGS. 46 and 47.

(4-2) Scrub Operation

Figure 71:
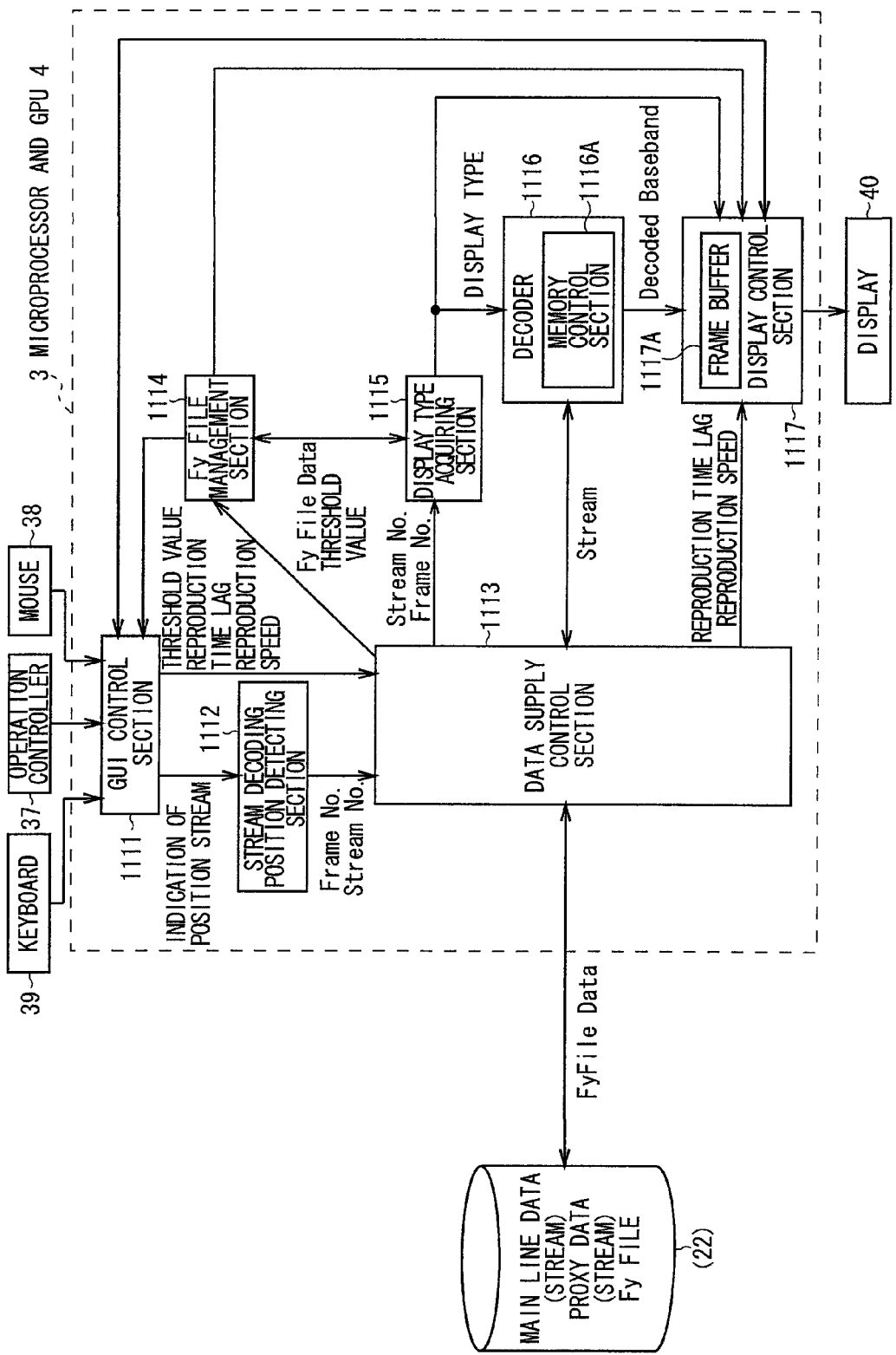
FIG. 71 is a schematic block diagram of a microprocessor and a GPU, illustrating the functional configuration thereof for the scrub operation.

Now, the scrub operation by means of the microprocessor 3 and the GPU 4 will be described below. From the functional viewpoint of the process that the microprocessor 3 and the GPU 4 execute for the purpose of the present invention, the components that take part in process include GUI control section 1111, stream decoding position detecting section 1112, data supply control section 1113, Fy file management section 1114, display type acquiring section 1115, decoder 1116 and display control section 1117 as shown in FIG. 71.

The GUI control section 1111 controls the display control section 1117 so as to have the display 40 display a GUI such as an editing image (FIG. 2) as shown in FIG. 2. The GUI control section 1111 receives the operation signal supplied from the operation controller 37, the mouse 38 or the keyboard 39 in response to an operation by the operator of the operation controller 37, the mouse 38 or the keyboard 39, whichever appropriate, for the GUI displayed on the display 40 and supplies the stream decoding position detecting section 1112, the data supply control section 1113, the display control section 1117 and so on with necessary information in response to the operation signal.

More specifically, the GUI control section 1111 supplies a command requesting reproduction of a frame to the stream decoding position detecting section 1112 along with information indicating the stream (AV file) of main line data or proxy data that is the object of a scrub operation and information indicating the frame to be reproduced by the scrub operation in response to the operation signal supplied from the operation controller 37, the mouse 38 or the keyboard 39.

Additionally, the GUI control section 1111 supplies the data supply controller section 1113 with the threshold value or values to be used when determining the display type according to a variation in response to the operation signal supplied from the operation controller 37, the mouse 38 or the keyboard 39.

Furthermore, the GUI control section 1111 supplies the data supply controller section 1113 with the reproduced time lag and the reproduction speed v supplied from the operation controller 37, the mouse 38 or the keyboard 39 according to the reproduction time lag/reproduction speed v specifying dialog (FIG. 7).

The stream decoding position detecting section 1112 generates a frame number and a stream number respectively as information for identifying the frame to be displayed in the group of spiral image display sections 58 and information for identifying the stream containing the data (main line data or proxy data) of the frame supplies them to the data supply control section 1113 in response to the command from the GUI control section 1111.

The data supply control section 1113 relays the data exchanged among blocks.

More specifically, the data supply control section 1113 typically receives a threshold value or threshold values from the GUI control section 1111 and supplies the threshold value or values, whichever appropriate, to the Fy file management section 1114. Additionally, the data supply control section 1113 typically receives a frame number and a stream number from the stream decoding position detecting section 1112 and supplies the frame number and the stream number to the display type acquiring section 1115. Furthermore, the data supply control section 1113 typically receives and acquires the Fy file read out from the memory apparatus 22 and supplies the Fy file to the Fy file management section 1114.

The Fy file management section 1114 manages (stores) the Fy file supplied from the data supply control section 1113.

The display type acquiring section 1115 acquires the display type of the frame identified by the frame number (and, if necessary, the stream number) supplied from the data supply control section 1113 by referring to the Fy file managed by the Fy file management section 1114 and supplies it to the decoder 1116, the display control section 1117 and some other necessary block or blocks such as the GUI control section 1111 of the editing system.

The decoder 1116 contains a memory control section 1116A and decodes the stream (main line data or proxy data) supplied from the data supply control section 1113 and supplies the image data (base band image data) of the frame that is obtained as a result to the display control section 1117.

While the decoder 1116 decodes a stream, storing the data necessary for decoding the steam in the XDR-RAM 5 (FIG. 1), and the memory control section 1116A that the decoder 1116 contains controls the operations writing data to and reading data from the XDR-RAM 5. Additionally, while the decoder 1116 may not decode the stream when the display type of the frame to be displayed in the group of spiral image display sections 58 is the still image type, it recognizes that the display type of the frame to be displayed in the group of spiral image display sections 58 is the still image type for which it does not decode the stream by referring to the display type supplied from the display type acquiring section 1115.

The display control section 1117 has the display 40 display an editing image (FIG. 2) according to the information supplied from the GUI control section 1111 and the Fy file that is managed by the Fy file management section 1114.

Additionally, the display control section 1117 displays the image that corresponds to the image data of the frame supplied from the decoder 1116 in the group of spiral image display sections 58 in the display section 55 of the editing image 50 according to the display type supplied from the display type acquiring section 1115 and the reproduction time lag and the reproduction speed v supplied from the data supply control section 1113.

More specifically, the display control section 1117 thins the image data of frames supplied from the decoder 1116 by the number of frames that corresponds to the reproduction speed v and has the image of the image data of the frames that are left after the thinning operation displayed respectively in the group of spiral image display sections 58 (image display sections $W57_1$ through $W57_n$) by means of the display method indicated by the display type of the frames and with the reproduction time lags $\Delta T$ (FIG. 5) specified by the operator.

When no reproduction time lag and no reproduction speed v are supplied from the data supply control section 1113 as reproduction parameters (and hence not specified by the operator), the display control section 1117 employs the reproduction parameters previously defined as default. The display 40 is adapted to display an image corresponding to the data stored in part of the memory region of the XDR-RAM 5 (FIG. 1) and the display control section 1117 has the image corresponding the image data displayed in the group of spiral image display sections 58 (image display sections $W57_1$ through $W57_n$) by writing the image data to the XDR-RAM 5 (FIG. 1).

Meanwhile, when the frame specified as the frame to be displayed in the group of spiral image display sections 58 in a scrub operation is selected as attentional frame, the display type acquiring section 1115 acquires the display type of the attentional frame according to the Fy file managed by (stored in) the Fy file management section 1114 and supplies it to the display control section 1117.

Then, the decoder 1116 decodes the data supplied from the memory apparatus 22 by way of the data supply control section 1113 as the image data of the attentional frame and supplies them to the display control section 1117. Thus, the display control section 1117 has the image that corresponds to the image data of the attentional frame displayed in the group of spiral image display sections 58 (image display sections $W57_1$ through $W57_n$) by means of the display method indicated by the display type of the frame, at a timing corresponding to the reproduction speed v and with the time lags of the reproduced time lag $\Delta T$ (FIG. 5).

Note that the Fy file stores either the variation and the display type on a frame by frame basis or both of them as pointed out above. In other words, the Fy file may store both the variation and the display type or only the variation but not the display type or vice versa.

When the Fy file stores the display type, in other words when the Fy file stores both the variation and the display type or when it stores only the display type but not the variation, it is possible to have the group of spiral image display sections 58 display the image that corresponds to the image data of the attentional frame, simply using the display type stored in the Fy file.

When, on the other hand, the Fy file stores the variation, in other words when the Fy file stores both the variation and the display type or when it stores only the variation but not the display type, it is possible to have the Fy file management section 1114 determine the display type on a frame by frame basis according to the variation on the frame by frame basis that is stored in the Fy file and then have the group of spiral image display sections 58 display the image that corresponds to the image data of the attentional frame, using the determined display type.

Figure 72:
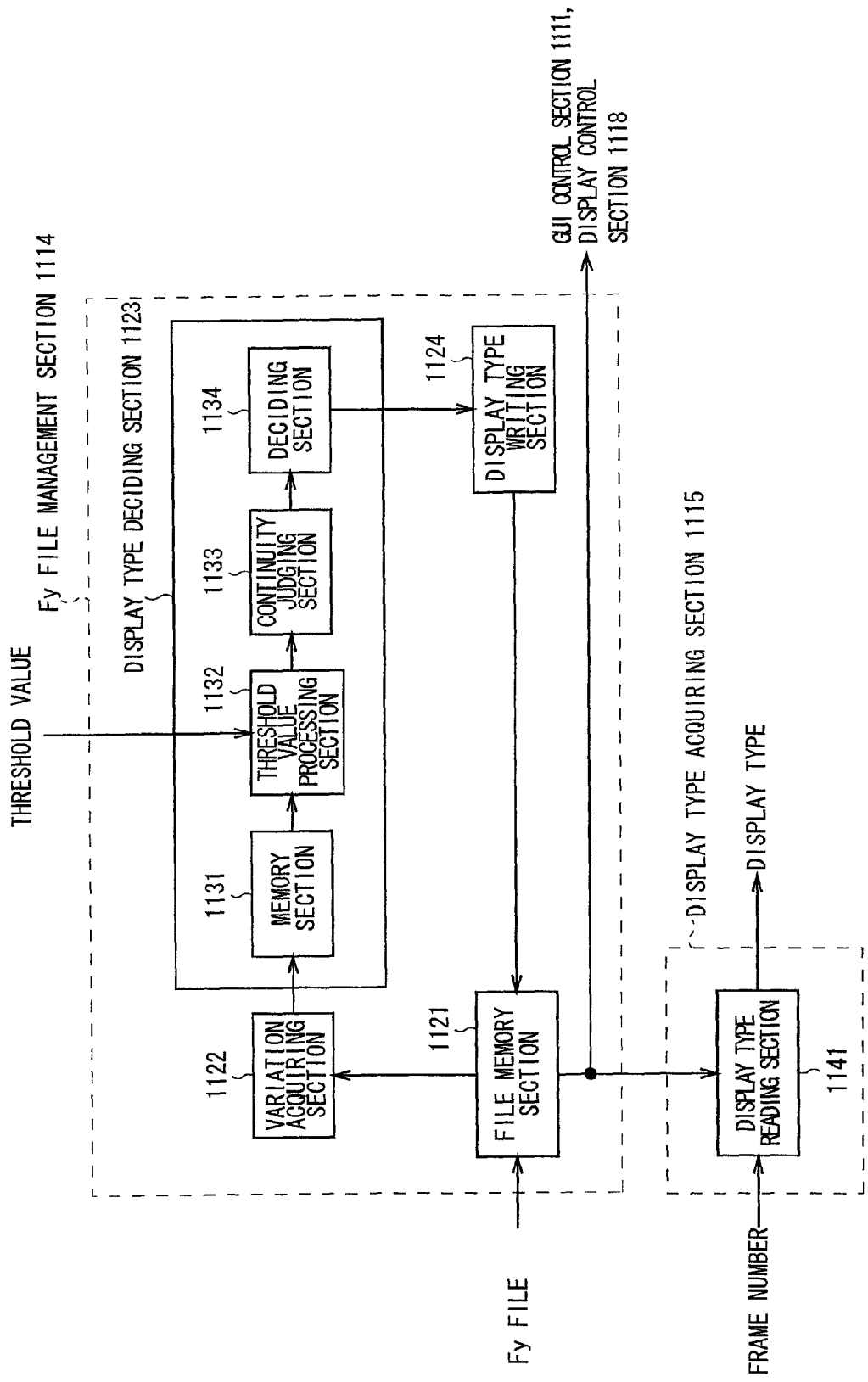
FIG. 72 is a schematic block diagram of the Fy file management section and the display type acquiring section, illustrating an exemplary configuration thereof.

FIG. 72 illustrates an exemplary configuration of the Fy file management section 1114 and the display type acquiring section 1115 of FIG. 71.

The Fy file management section 1114 includes a file memory section 1121, a variation acquiring section 1122, a display type determining section 1123 and a display type writing section 1124.

The file memory section 1121 stores (the data stored in) the Fy file supplied from the data supply control section 1113 (FIG. 72).

The variation acquiring section 1122 acquires the variation on a frame by frame basis by reading it from the Fy file stored in the file memory section 1121 and supplies it to the display type determining section 1123.

The display type determining section 1123 includes a memory section 1131, a threshold value processing section 1132, a continuity determining section 1133 and a deciding section 1134 and determines (redetermines) the display type of the frame on a frame by frame basis like the display type determining section 1023 of FIG. 51 according to the variation on a frame by frame basis as supplied from the variation acquiring section 1122 and supplies it to the display type writing section 1124.

In the display type determining section 1123, the memory section 1131, the threshold value processing section 1132, the continuity determining section 1133 and the deciding section 1134 have respective configurations same as the memory section 1081, the threshold value processing section 1082, the continuity determining section 1083 and the deciding section 1084 of the display type determining section 1023 of FIG. 51.

While the threshold value processing section 1132 compares the variation on a frame by frame basis with a threshold value like the threshold value processing section 1082, the threshold value that the threshold value processing section 1132 compares with the variation is supplied to it from the GUI control section 1111 of FIG. 45 by way of the data supply control section 1113.

The display type writing section 1124 stores (writes) the display type supplied from the Fy file management section 1114 on a frame by frame basis in the file memory section 1121, associating it with the frame number and the time code that correspond to it and are stored in the Fy file (FIG. 55).

The display type acquiring section 1115 includes a display type reading section 1141. The display type reading section 1141 reads out and acquires the display type that is associated with the frame number of the attentional frame as supplied from the data supply control section 1113 from the Fy file managed by the Fy file management section 1114 and hence stored in the file memory section 1121 of the Fy file management section 1114 and supplies it to the decoder 1116, the display control section 1117 and so on of FIG. 71.

Then, in a scrub operation as shown in FIG. 71, the frame (attentional frame) (of the reproduced image) to be displayed (in the group of spiral image display sections 58 that are displayed) on the display 40 is typically specified according to the position of the scrub knob 67 of the scrub bar 66 shown in FIG. 2.

More specifically, the GUI control section 1111 of FIG. 72 has the display control section 1117 display the scrub bar 66 and recognizes the frame specified by the position of the scrub knob 67 of the scrub bar 66 as attentional frame.

Now, the relationship between the position of the scrub knob 67 and the frame specified by the position will be described below by referring to FIG. 73.

Figure 73:
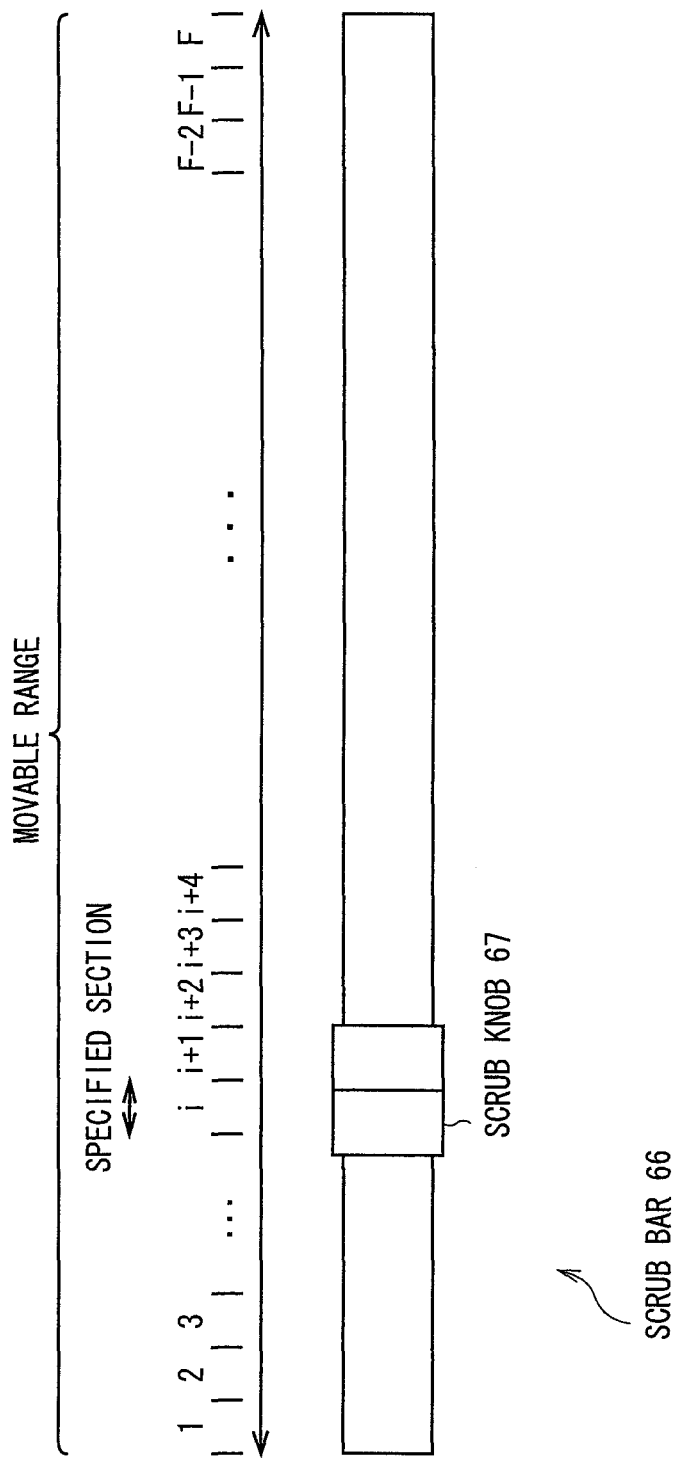
FIG. 73 is a schematic illustration of the relationship between the scrub knob and the frame specified by the position of the scrub knob.

FIG. 73 illustrates the scrub bar 66.

In the scrub bar 66, the horizontal movable range in which the scrub knob 67 can move horizontally (e.g., a range of a horizontal length of about little more than 10 cm) is divided into small sections, the number of which is the same as the number of frames that form (the stream of) the reproduced image, which the object of editing (and hence the object of scrub) and displayed in the group of spiral image display sections 58.

In FIG. 73, the movable range is divided into F specifiable sections.

If the horizontal length (or the width by which the movable range is divided into specifiable sections) of each specifiable section is referred to as section length, the movable range is divided into specifiable sections having the same section length (divided into equal parts) in FIG. 73.

The frames that form the reproduced image, which is the object of editing (and hence the object of scrub) and displayed in the group of spiral image display sections 58, are assigned respectively to the specifiable sections produced by dividing the movable range from the left end specifiable section to the right end specifiable section in time series. Thus, if the i-th specifiable section from left is referred to as the i-th specifiable section and the i-th frame of the frames that form the reproduced image as counted from the leading one is referred to as the i-th frame, the i-th frame is assigned to the i-th specifiable section.

The GUI control section 1111 detects the specifiable section where the scrub knob 67 is located at a timing corresponding to the display rate indicated by the display type of the frame displayed immediately before in the group of spiral image display sections 58 and recognizes the frame assigned to the specifiable section as attentional frame.

Assume here that three display types including the still image type V1, the ordinary type V2 and the high display rate/low resolution type V3 as shown in FIG. 49 are employed and the display rate of the still image type V1 and the ordinary type V2 is typically 30 frames/sec, whereas the display rate of the high display rate/low resolution type V3 is typically 60 frames/sec. Note that the display rate of the ordinary type V2 is the display rate that corresponds to the reproduction speed v of the reproduction parameters.

Figure 74:
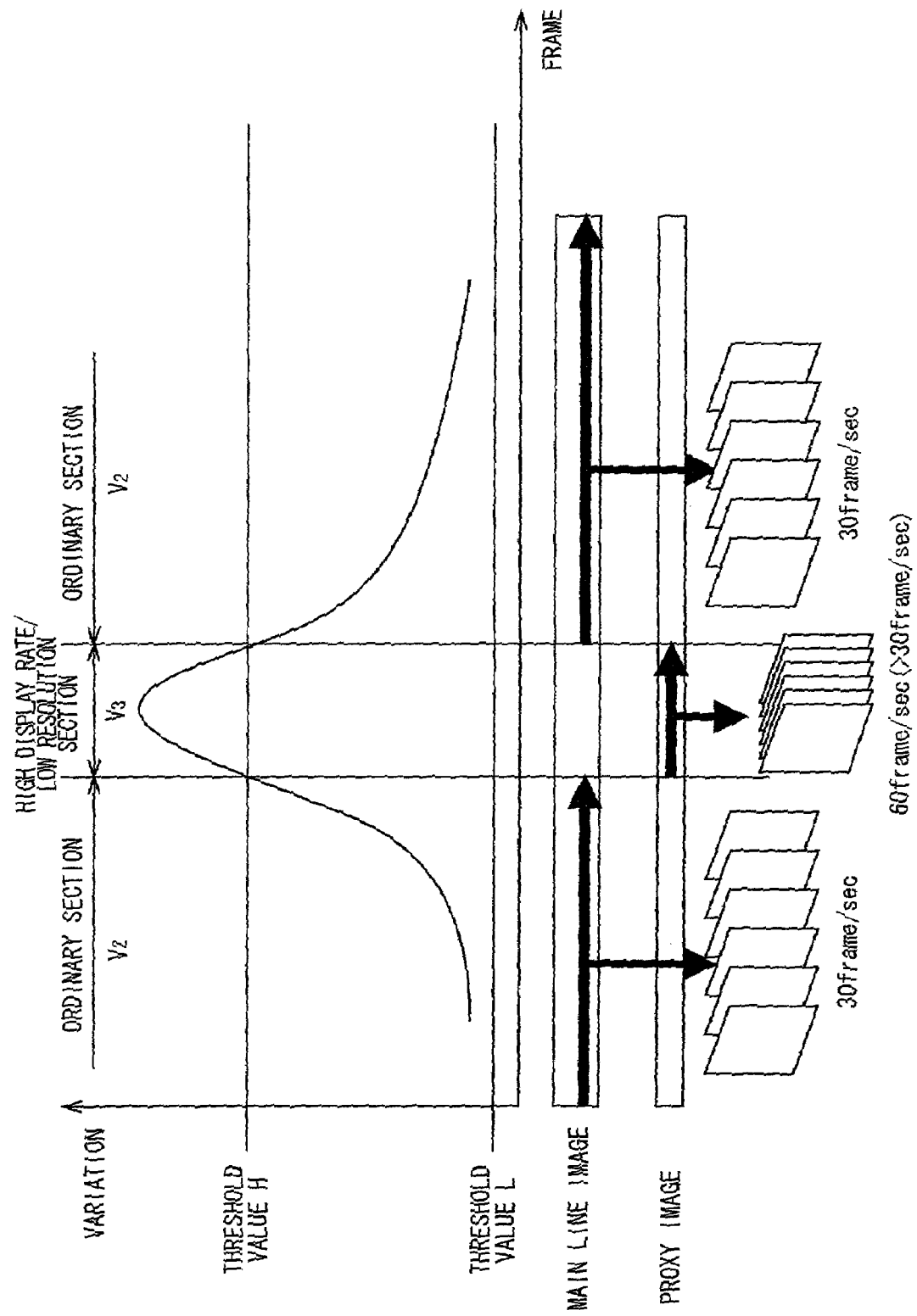
FIG. 74 is a schematic illustration of the display mode by scrubbing of frames of the ordinary type and those of the high display rate/low resolution type.

FIG. 74 illustrates the display method of displaying frames for the ordinary type V2 and that of displaying frames for the high display rate/low resolution type V3.

If the display type of the frame displayed immediately before in the group of spiral image display sections 58 is either the still image type V1 or the ordinary type V2 for displaying frames at a rate of 30 frames/sec, the GUI control section 1111 detects the specifiable section where the scrub knob 67 is located at intervals of 1/30 seconds and recognizes the frame assigned to the specifiable section as attentional frame. Therefore, if the display type is the ordinary type V2, the frame (attentional frame) that is displayed in the group of spiral image display sections 58 is updated in every 1/30 seconds, or at a display rate of 30 frames/sec.

If, on the other hand, the display type of the frame displayed immediately before in the group of spiral image display sections 58 is the high display rate/low resolution type V3 for displaying frames at a rate of 60 frames/sec, the GUI control section 1111 detects the specifiable section where the scrub knob 67 is located at intervals of 1/60 seconds and recognizes the frame assigned to the specifiable section as attentional frame. Therefore, if the display type is the high display rate/low resolution type V3, the frame (attentional frame) that is displayed in the group of spiral image display sections 58 is updated in every 1/60 seconds, or at a display rate of 60 frames/sec.

From the above, when the scrub knob 67 is moved at a rate of moving from left to right by the length of two specifiable sections in 1/30 seconds, every other frame, or the i-th frame, the i+2-th frame, the i+4-th frame, . . . become the attentional frame at time intervals of 1/30 seconds in an ordinary section where frames of the ordinary type V2 are arranged consecutively. Then, as a result, images are thinned and displayed at the double speed in the group of spiral image display sections 58.

When the scrub knob 67 is moved at a rate of moving from left to right by the length of two specifiable sections in 1/30 seconds and hence by the length of a specifiable section in 1/60 seconds, every frame, or the i-th frame, the i+1-th frame, the i+2-th frame, . . . become the attentional frame at time intervals of 1/60 seconds in a high display rate/low resolution section where frames of the high display rate/low resolution type V3 are arranged consecutively. Then, as a result, images are displayed at the double speed in the group of spiral image display sections 58 without being thinned.

As described above, there are frames of a display type that does not involve frame thinning and frames of a display type that involves frame thinning when the scrub knob 67 is moved at a high moving speed for producing a double speed display (replay). In other words, a fast moving speed of the scrub knob 67 does not give rise to any frame thinning for frames of the high display rate/low resolution type V3 whose display rate is higher than the ordinary type V2. Thus, it is possible to prevent the operator from mixing a temporal change of image for frames showing a large movement.

As pointed out above, the attentional frame is updated in every 1/30 seconds in an ordinary section whereas the attentional frame is updated in every 1/60 seconds in a high display rate/low resolution section, which is 1/2 of an ordinary section.

Therefore, the decoder 1116 (FIG. 71) needs to decode the frames of a high display rate/low resolution section (frames whose display type is the high display rate/low resolution type V3) at a rate twice as high as the frames of the ordinary section (frames whose display type is an ordinary type V2). Additionally, since a frame of a high display rate/low resolution section is a frame showing a large movement that is larger than a frame of an ordinary section, the quantity of data of a frame of a high display rate/low resolution section that the decoder 1116 needs to decode is larger than the quantity of data of a frame of an ordinary section. From the above, the load of displaying a frame of a high display rate/low resolution section is greater than the load of displaying a frame of an ordinary section.

In view of this fact, the editing apparatus 2 decodes image data as main line data when displaying a frame of an ordinary section, whereas it decodes image data as proxy data when displaying a frame of a high display rate/low resolution section because the quantity of data is smaller in the case of the latter to reduce the load of displaying a frame of a high display rate/low resolution section.

While the scrub knob 67 is moved at a rate of moving from left to right by the length of two specifiable sections in 1/30 seconds in the above-described instance, when the scrub knob 67 is moved at rate of moving from left to right by the length of a specifiable section in 1/30 seconds, for example, every frame becomes the attentional frame at time intervals of 1/30 seconds in an ordinary section where frames of the ordinary type V2 are arranged consecutively. Then, as a result, images are displayed at the normal speed in the group of spiral image display sections 58 without frame thinning.

When the scrub knob 67 is moved at rate of moving from left to right by the length of a specifiable section in 1/30 seconds, in other words at a rate of moving left to right by a length of 1/2 of a specifiable section in 1/60 seconds, every frame becomes the attentional frame at time intervals of 1/30 seconds in a high display rate/low resolution section where frames of the high display rate/low resolution type V3 are arranged consecutively. Then, as a result, images are displayed also at the normal speed in the group of spiral image display sections 58 without frame thinning.

Now, the display of a frame whose display type is the still image type V1 will be described below by referring to FIG. 75.

In the editing apparatus 2, the frame that is displayed immediately before in the group of spiral image display sections 58 is displayed for the frames of a still image section where frames whose display type is the still image type V1 are arranged consecutively if the attentional frame (the frame that is the object of display) is shifted among the frames of the still image section.

In other words, for the frames of a still image section, the image of the frame that becomes the first attentional frame in the still image section is continuously displayed so long as any of the frames of the still image section is selected as attentional frame.

Figure 75:
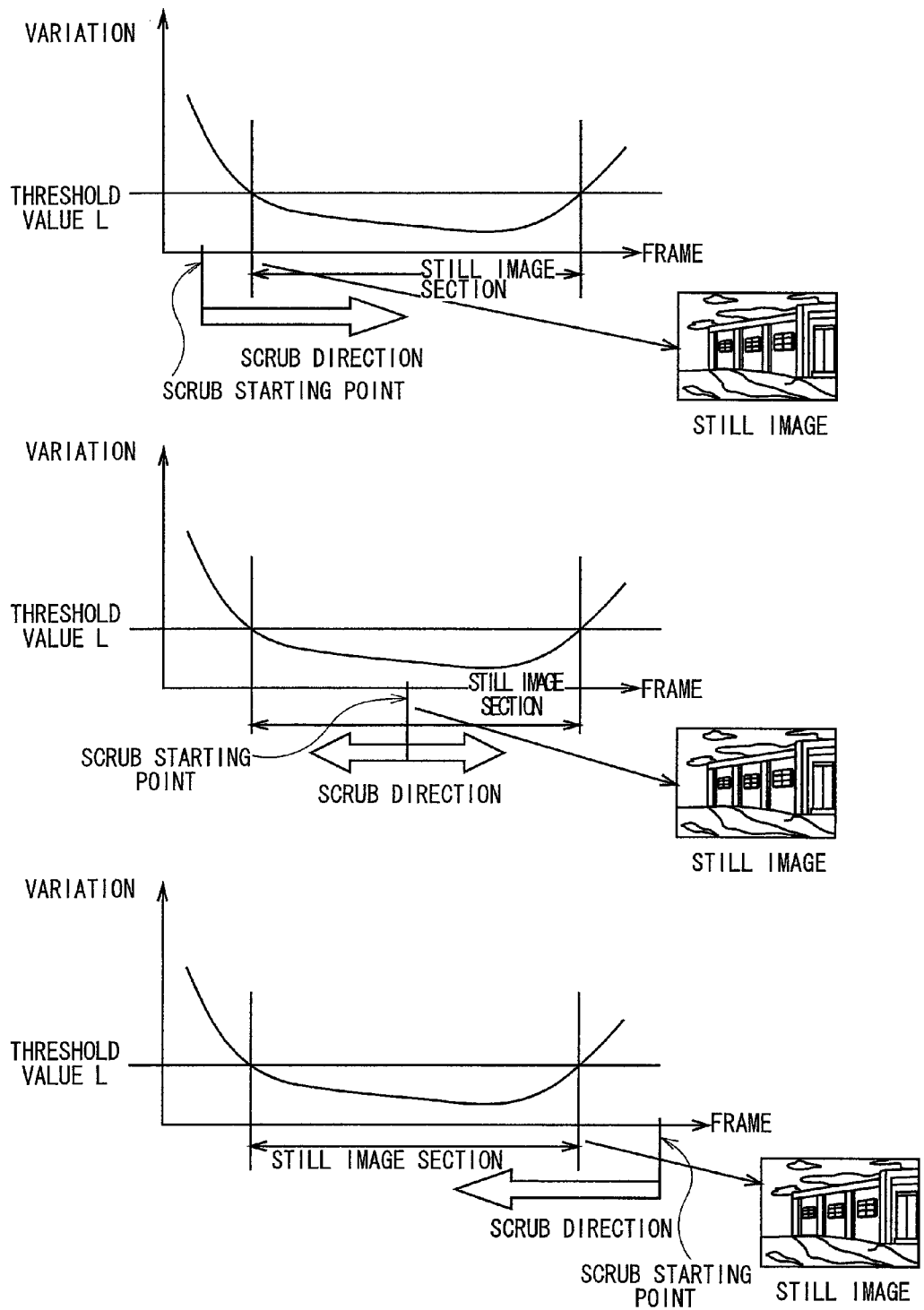
FIG. 75 is a schematic illustration of displaying a frame of the still image type, which is a display type.

Therefore, as shown at the top of FIG. 75, when the scrub knob 67 specifies a frame of a section other than a still image section (a high display rate/low resolution section in the illustrated instance) at the start of a scrub operation and the operator moves the scrub knob 67 from left to right to firstly specify the leftmost frame of a still image section (the frame that is temporally most preceding frame in the still image section) as attentional frame, the decoder 1116 (FIG. 71) decodes the image data of the frame that is firstly specified as attentional frame and the corresponding image is displayed in the group of spiral image display sections 58.

Thereafter, the image of the frame firstly specified as attentional frame is displayed as the image of the current attentional frame so long as a frame of the still image section is specified as attentional frame. Thus, the decoder 1116 does not decode the image data of any frame of the still image section other than the image data of the frame that is firstly specified as attentional frame so long as a frame of the still image section is specified as attentional frame.

When, on the other hand, the scrub knob 67 specifies a frame somewhere in the middle of a still image section at the start of a scrub operation as attentional frame as shown in the middle part of FIG. 75, the decoder 1116 (FIG. 71) decodes the image data of the frame that is firstly specified as attentional frame and corresponding image is displayed in the group of spiral image display sections 58.

Thereafter, the image of the frame specified as attentional frame at the start of the scrub operation is displayed as the image of the current attentional frame so long as a frame of the still image section is specified as attentional frame. Thus, the decoder 1116 does not decode the image data of any frame of the still image section other than the image data of the frame that is firstly specified as attentional frame so long as a frame of the still image section is specified as attentional frame.

Furthermore, when the scrub knob 67 specifies a frame that is out of the still image section (which is an ordinary section or a high display rate/low resolution section in this instance) at the start of a scrub operation as attentional frame as shown at the bottom of FIG. 75 and the operator moves the scrub knob 67 from right to left and firstly specifies the frame located at the right end of the still image section (the frame that is temporally most succeeding), the decoder 1116 (FIG. 71) decodes the image data of the frame that is firstly specified as attentional frame and corresponding image is displayed in the group of spiral image display sections 58.

Thereafter, the image of the frame firstly specified as attentional frame is displayed as the image of the current attentional frame so long as a frame of the still image section is specified as attentional frame. Thus, the decoder 1116 does not decode the image data of any frame of the still image section other than the image data of the frame that is firstly specified as attentional frame so long as a frame of the still image section is specified as attentional frame.

Figure 76:
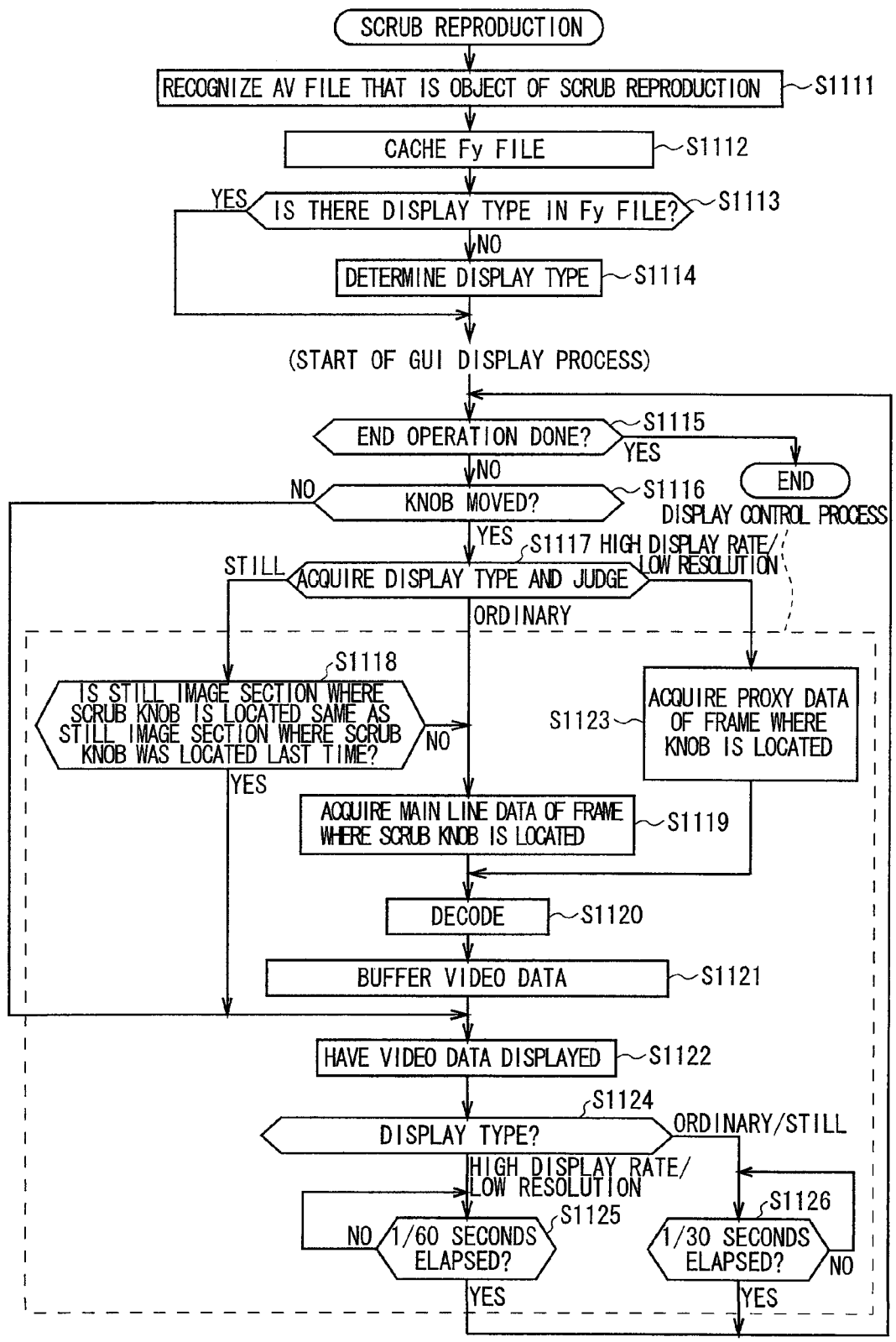
FIG. 76 is a flowchart, illustrating the scrub operation.

Now, the scrub operation will be described by referring to the flowchart of FIG. 76.

For example, the operator operates the operation controller 37, the mouse 38 or the keyboard 39 to specify an AV file that is the object of editing, the operation signal that corresponds to the operation is supplied to the GUI control section 1111 from the operation controller 37, the mouse 38 or the keyboard 39, whichever appropriate.

Upon receiving the operation signal from the mouse 38 or the keyboard 39, whichever appropriate, the GUI control section 1111 recognizes the AV file that is the object of editing in Step S1111 and the process proceeds to Step S1112.

In Step S1112, the Fy file management section 1114 cashes (temporarily stores) the Fy file that corresponds to the AV file recognized by the GUI control section 1111 as object of editing and the process proceeds to Step S1113.

More specifically, the GUI control section 1111 controls the data supply control section 1113 by way of the stream decoding position detecting section 1112 so as to supply the Fy file that corresponds to the AV file it recognizes as object of editing. The data supply control section 1113 reads out the Fy file from the memory apparatus 22 and supplies it to the Fy file management section 1114 under the control of the GUI control section 1111. Thus, in Step S1112, the Fy file management section 1114 stores the Fy file supplied from the data supply control section 1113 in the file memory section 1121 (FIG. 46) in the above-described manner.

In Step S1113, the variation acquiring section 1122 (FIG. 72) of the Fy file management section 1114 determines if display types are found in the Fy file stored in the file memory section 1121 in the immediately preceding step, or Step S1112, or not.

If it is determined in Step S1113 that display types are found in the Fy file stored in the file memory section 1121, the process skips the next step, or Step S1114 which will be described hereinafter, and proceeds to Step S1115.

If, on the other hand, it is determined in Step S1113 that display types are not found in the Fy file stored in the file memory section 1121, the variation acquiring section 1122 reads out variations from the Fy file stored in the file memory section 1121 on a frame by frame basis and supplies them to the display type determining section 1123 (FIG. 72) before the process proceeds to Step S1114.

Note that it is assumed here that the Fy file stored in the file memory section 1121 contains at least movement information that is variations on a frame by frame basis.

In Step S1114, the display type determining section 1123 determines the display type on a frame by frame basis according to the variation supplied from the variation acquiring section 1122 on a frame by frame basis just like the display type determining section 1023 of FIG. 51 and supplies it to the display type writing section 1124 (FIG. 72). Then, the display type writing section 1124 writes the display type from the display type determining section 1123 in the Fy file of the file memory section 1121 and the process proceeds from Step S1114 to Step S1115.

Note that the threshold value processing section 1132 (FIG. 72) of the display type determining section 1123 compares the variation and a threshold value when the display type determining section 1123 determines the display type in Step S1114 and that it employs threshold value same as the one that the threshold processing section 1082 of the display type determining section 1023 of FIG. 51 uses.

The editing image 50 as shown in FIG. 2 or some other GUI is displayed on the display 40 when the process proceeds from Step S1113 to Step S1115 or from Step S1114 to Step S1115.

In Step S1115, the GUI control section 1111 judges if the operation controller 37, the mouse 38 or the keyboard 39 is operated to end the editing program or not.

If it is determined in Step S1115 that the operation controller 37, the mouse 38 or the keyboard 39 is not operated to end the editing program, the process proceeds to Step S1116, where the GUI control section 1111 judges if the scrub knob 67 of the scrub bar 66 of the editing image 50 (FIG. 2) that is displayed when the process proceeds from Step S1114 to Step S1115 is moved by operating the operation controller 37, the mouse 38 or the keyboard 39 or not.

If it is determined in Step S1116 that the scrub knob 67 is moved, more specifically that the operator operates the operation controller 37, the mouse 38 or the keyboard 39 to move the scrub knob 67 and the operation signal that corresponds to the operation is supplied from the operation controller 37, the mouse 38 or the keyboard 39, whichever appropriate, to the GUI control section 1111, the GUI control section 1111 selects the frame assigned to the specifiable section (FIG. 73) where the scrub knob 67 is located as attentional frame and supplies information on the attentional frame to the display type acquiring section 1115 by way of the stream decoding position detecting section 1112 and the data supply control section 1113 and the process proceeds to Step S1117.

In Step S1117, the display type acquiring section 1115 reads out the display type of the attentional frame from the file memory section 1121 (FIG. 72) of the Fy file management section 1114 according to the information on the attentional frame supplied from the GUI control section 1111 by way of the stream decoding position detecting section 1112 and the data supply control section 1113 to acquire the display type and supplies it to the GUI control section 1111, the decoder 1116 and the display control section 1117. Additionally, in Step S1117, the decoder 1116 and the display control section 1117 judge the display type of the attentional frame supplied from the display type acquiring section 1115 and execute a display control process (in Steps S1118 through S1123 as will be described in greater detail hereinafter) for displaying an image of the attentional frame according to the outcome of the determination, before the process returns to Step S1115.

More specifically, if it is determined in Step S1117 that the display type of the attentional frame is the still image type V1, the process proceeds to Step S1118, where the display control section 1117 judges if the display type of the frame that was the attentional frame immediately before (to be also referred to as immediately preceding frame whenever appropriate hereinafter) is the still image type V1 and both the immediately preceding frame and the attentional frame are frames of the same still image section or not by referring to the Fy file stored in the file memory section 1121 of the Fy file management section 1114.

If it is determined in Step S1118 that the immediately preceding frame and the attentional frame are not frames of a same still image section, the process proceeds to Step S1119, where the decoder 1116 waits until the data supply control section 1113 reads out the main line data of the attentional frame (and the data necessary for decoding the attentional frame) from the memory apparatus 22 and supplies them to the decoder 1116 and then acquires (receives) the main line data of the attentional frame before it proceeds to Step S1120.

In Step S1120, the decoder 1116 decodes the main line data of the attentional frame it acquires from the data supply control section 1113 and supplies the image data obtained as a result to the display control section 1117 before the process proceeds to Step S1121. In Step S1121, the display control section 1117 buffers the image data of the attentional frame supplied from the decoder 1116 and proceeds to Step S1122, where it has an image that corresponds to the buffered image data displayed in the group of spiral image display sections 58 (image display sections $W57_1$ through $W57_n$) with the reproduction time lags $\Delta T$ (FIG. 5).

Thus, an image that corresponds to the image data of main line data and has a higher resolution (than an image that corresponds to the image data of proxy data) is displayed as the image of a frame whose display type is the still image type V1.

On the other hand, if it is determined in Step S1118 that the immediately preceding frame and the attentional frame are frames of the same still image section, the process proceeds to Step S1122, where the display control section 1117 has an image that corresponds to the image data buffered in the immediately preceding step, or Step S1121 displayed in the group of spiral image display sections 58 (image display sections $W57_1$ through $W57_n$) with the reproduction time lags $\Delta T$ (FIG. 5) as an image of the attentional frame.

Thus, when the immediately preceding frame and the attentional frame are frames of the same still image section, an image of the frame that is firstly selected as attentional frame in the still image section is displayed as an image of any of the frames of the still image section. Therefore, the decoder 1116 is not required to operate for decoding and hence the load of the editing apparatus 2 is reduced.

If, on the other hand, it is determined in Step S1117 that the display type of the attentional frame is the ordinary type V2, the process sequentially proceeds to Steps S1119 through S1122 so that an image of the attentional frame is displayed in the above-described manner.

Namely, in Step S1119, the decoder 1116 waits until the data supply control section 1113 reads out the main line data of the attentional frame from the memory apparatus 22 and supplies them to the decoder 1116 and then acquires the main line data of the attentional frame before it proceeds to Step S1120.

In Step S1120, the decoder 1116 decodes the main line data of the attentional frame it acquires from the data supply control section 1113 and supplies the image data obtained as a result to the display control section 1117 before the process proceeds to Step S1121. In Step S1121, the display control section 1117 buffers the image data of the attentional frame supplied from the decoder 1116 and proceeds to Step S1122, where it has an image that corresponds to the buffered image data displayed in the group of spiral image display sections 58 (image display sections $W57_1$ through $W57_n$) with the reproduction time lags $\Delta T$ (FIG. 5).

Thus, an image that corresponds to the image data of main line data and has a higher resolution (than an image that corresponds to the image data of proxy data) is displayed as the image of a frame whose display type is the ordinary type V2.

If, finally, it is determined in Step S1117 that the display type of the attentional frame is the high display rate/low resolution type V3, the process sequentially proceeds to Steps S1123, where the decoder 1116 reads out the proxy data (and the data necessary for decoding the attentional frame) from the memory apparatus 22 and supplies them to the decoder 1116 and then acquires the proxy data of the attentional frame before it proceeds to Step S1120.

In Step S1120, the decoder 1116 decodes the proxy data of the attentional frame it acquires from the data supply control section 1113 and supplies the image data obtained as a result to the display control section 1117 before the process proceeds to Step S1121. In Step S1121, the display control section 1117 buffers the image data of the attentional frame supplied from the decoder 1116 and proceeds to Step S1122, where it has an image that corresponds to the buffered image data displayed in the group of spiral image display sections 58 (image display sections $W57_1$ through $W57_n$) with the reproduction time lags $\Delta T$ (FIG. 5).

Thus, an image that corresponds to the image data of proxy data and has a lower resolution (than an image that corresponds to the image data of main line data) is displayed as the image of a frame whose display type is the high display rate/low resolution type V3.

If, on the other hand, it is determined in Step S1116 that the scrub knob 67 is not moved, the process proceeds to Step S1122, where the display control section 1117 has an image that corresponds to the image data buffered in the immediately preceding (nearest) step, or Step S1121 displayed in the group of spiral image display sections 58 (image display sections $W57_1$ through $W57_n$) with the reproduction time lags $\Delta T$ (FIG. 5) as an image of the attentional frame.

Thus, when the scrub knob 67 has not been moved since the last determination in Step S1116, the display control section 1117 has the image that corresponds to the image data stored in the frame buffer 1117A and hence the image displayed immediately before (the image displayed in Step S1122 last time) displayed once again.

After the image of the attentional frame is displayed in Step S1122 in the above-described manner, the process proceeds to Step S1124, where the GUI control section 1111 determines the display type of the attentional frame supplied from the display type acquiring section 1115 in Step S1117.

If it is determined in Step S1124 that the display type of the attentional frame is the high display rate/low resolution type V3, the process proceeds to Step S1125, where the GUI control section 1111 determines if the scrub knob 67 is determined to have been moved or not last time in Step S1116 and then it judges if, for example, 1/60 seconds, which corresponds to the display rate of the high display rate/low resolution type V3, have elapsed or not.

If it is determined in Step S1125 that 1/60 seconds have not elapsed, the process returns to Step S1125.

If, on the other hand, it is determined in Step S1125 that 1/60 seconds have elapsed, the process returns to Step S1115 and the above-described processing operations are repeated.

Thus, when a frame whose display type is the high display rate/low resolution type V3 is selected as attentional frame, the GUI control section 1111 judges in Step S1116 if the scrub knob 67 is moved or not periodically with a period of 1/60 seconds, which correspond to the high display rate/low resolution type V3.

If it is determined that the scrub knob 67 is moved, the display control section 1117 has an image (low resolution image), which corresponds to the image data obtained by decoding the proxy data of the frame assigned to the specifiable section (FIG. 47) where the scrub knob 67 is located after the move, displayed in the group of spiral image display sections 58 (image display sections $W57_1$ through $W57_n$) with the reproduction time lags ΔT (FIG. 5).

If, on the other hand, it is determined that the scrub knob 67 is not moved, the display control section 1117 has the image that is displayed on the display 40 immediately before displayed once again.

As described above, the image of a frame whose display type is the high display rate/low resolution type V3 is displayed at a rate of 60 frames/sec, which is equal to the display rate of the type V3.

If, it is determined in Step S1124 that the display type of the attentional frame is either the still image type V1 or the ordinary type V2, the process proceeds to Step S1126, where the GUI control section 1111 determines if the scrub knob 67 is determined to have been moved or not last time in Step S1116 and then it judges if, for example, ⅟₃₀ seconds, which corresponds to the display rate of the still image type V1 and the ordinary type V2, have elapsed or not.

If it is determined in Step S1126 that ⅟₃₀ seconds have not elapsed, the process returns to Step S1126.

If, on the other hand, it is determined in Step S1126 that ⅟₃₀ seconds have elapsed, the process returns to Step S1115 and the above-described processing operations are repeated.

Thus, when a frame whose display type is either the still image type V1 or the ordinary type V2 is selected as attentional frame, the GUI control section 1111 judges in Step S1116 if the scrub knob 67 is moved or not cyclically with a period of ⅟₃₀ seconds, which correspond to the still image type V1 and the ordinary type V2.

If it is determined that the scrub knob 67 is moved, the display control section 1117 has an image (high resolution image), which corresponds to the image data obtained by decoding the main line data of the frame assigned to the specifiable section (FIG. 47) where the scrub knob 67 is located after the move, displayed in the group of spiral image display sections 58 (image display sections $W57_1$ through $W57_n$) with the reproduction time lags ΔT (FIG. 5).

If, on the other hand, it is determined that the scrub knob 67 is not moved, the display control section 1117 has the image that is displayed on the display 40 immediately before displayed once again.

As described above, the image of a frame whose display type is the still image type V1 or the ordinary type V2 is displayed at a rate of 30 frames/sec, which is equal to the display rate of the type V1 or V2.

If it is determined in Step S1115 that the mouse 38 or the keyboard 39 is operated to end the editing program and hence that the operator operates the keyboard 39 or the mouse 38 to end the editing program and an operation signal that corresponds to the operation is supplied to the GUI control section 1111 from the keyboard 39 or the mouse 38, whichever appropriate, the scrub operation (the execution of the editing program) ends.

As described above, the editing apparatus 2 acquires the display type of the attentional frame that is the frame specified by the scrub knob 67, referring to the display rate that corresponds to the reproduction speed v and has an image of the attentional frame displayed in the group of spiral image display sections 58 (image display sections $W57_1$ through $W57_n$) with the reproduction time lags ΔT in the display mode indicated by the display type so that it is possible to perform a scrub operation appropriately.

Thus, when the attentional frame is a frame whose display type is the still image type V1 and hence that does not show any movement, the image data of the frame that is firstly selected as attentional frame in the still image section where frames of the still image type V1 are arranged consecutively and the attentional frame is selected from them are obtained by decoding the main line data and an image that corresponds to the image data is displayed. Therefore, a high quality image of the same frame is displayed and consequently the operator can check the contents of the image with ease. Additionally, as long as frames of the same still image section are consecutively specified as attentional frame, it is not necessary to decode the main line data so that it is possible to reduce the load of the editing apparatus 2.

When, on the other hand, the attentional frame is a frame whose display type is the high display rate/low resolution type V3 and hence that shows a large (strong) movement, an image is displayed at a high display rate so that the operator can check the contents of the image showing a strong movement accurately with ease.

Additionally, when the attentional frame is a frame whose display type is the high display rate/low resolution type V3, the proxy data whose quantity of data is smaller than the main line data are decoded and an image that corresponds to the image data obtained as a result is displayed so that it is possible to reduced the load of the editing apparatus 2 and prevent a situation where the editing program does not respond (and hence the editing apparatus 2 is hung up) from taking place due to a heavy load of the editing apparatus 2.

When the attentional frame is a frame whose display type is the ordinary type V2 and hence shows a certain extent of movement, although not strong, an image of the frame whose display rate is lower than that of a frame of the high display rate/low resolution type V3 but whose resolution is higher than that of a frame of the high display rate/low resolution type V3 is displayed. Since an image of a frame whose display type is the ordinary type V2 shows a movement (the interframe change of pixel values) smaller than an image of a frame whose display type is the high display rate/low resolution type V3, the operator can accurately check the contents of the image if the image is displayed at the display rate of a frame of a display type whose display rate is lower than that of the high display rate/low resolution type V3.

Furthermore, an image of a frame whose display type is the ordinary type V2 shows a movement whose extent is smaller than an image of a frame whose display type is the high display rate/low resolution type V3, the data quantity of the main line data of a frame whose display type is the ordinary type V2 is smaller than that of the main line data of a frame whose display type is the high display rate/low resolution type V3. Therefore, when the attentional frame is a frame whose display type is the ordinary type V2, if the main line data thereof are decoded and a high resolution image that corresponds to the image data that are obtained as a result of the decoding is displayed, the load of the editing apparatus 2 is smaller than the load that is applied to the editing apparatus 2 when the main line data of a frame whose display type is the high display rate/low resolution type V3 are decoded.

As described above, in a scrub operation, all the frames to be displayed are not displayed in the same display mode but reproduced images are displayed by changing predetermined parameters according to the variations (movement information, fineness information) of the images. More specifically, the parameters include a parameter (display parameter) that relates to display and is employed to change the resolution of image and parameters (reproduction parameters) that relate to reproduction and are employed to change the display rate (frame rate) and the reproduction speed v. Additionally, only necessary frames are decoded according to the variations of images. With these arrangements, it is possible to perform a scrub operation appropriately.

(4-3) Other Forms of Scrub Operation

The display type is determined according to movement information in the above-described scrub operation. Three display types including the still image type V1, the ordinary type V2 and the high display rate/low resolution type V3 are provided for the scrub operation as shown in FIG. 49. However, a scrub operation can alternatively be executed by using five display types including the still image type V11, the ordinary type V12, the high display rate/ordinary resolution type V13, the super high display rate/low resolution type V14 and the ultra super high display rate/low resolution type V15 as shown in FIG. 56 or by using three display types including the low resolution/ordinary display rate type C1, the ordinary type C2 and the ordinary resolution/low display rate type C3 that are determined according to the fineness information as shown in FIG. 60.

The main line data of an image showing a high resolution and the proxy data of a corresponding image showing a low resolution are recorded in the memory apparatus 22, in other words, images of two different types of resolution showing same contents are recoded in the memory apparatus 22, and then either an image showing a high resolution or a corresponding image showing a low resolution is displayed depending on the display type of the attentional frame in the above-described scrub operation. However, alternatively it is possible to record images of three different types of resolution including a high resolution, medium resolution and a low resolution in the memory apparatus 22 and selectively display an image showing a high resolution, an image showing a medium resolution or an image showing a low resolution according to the display type of the attentional frame.

Furthermore, the section length of the specifiable section to which frames are assigned is held to a constant value in the above-described scrub operation. However, alternatively it is possible to use a section length obtained by weighting according to movement information, or the variations of the frames assigned to the section.

The position of the scrub knob 67 is detected periodically with a period that corresponds to the display rate and one of the frames assigned to the specifiable section where the scrub knob 67 is located is selected as attentional frame in the above-described scrub operation so that the attentional frame is displayed in the group of spiral image display sections 58 (image display sections W57$_1$ through W57$_n$) with the reproduction time lags ΔT.

As described above by referring to FIG. 73, when the movable range of the scrub bar 66 is divided into a number of specifiable sections having a section length same as the number of frames of a reproduced image that is the object of editing (and hence the object of scrub) displayed in the group of spiral image display sections 58 and the scrub knob 67 is moved at a constant speed, the scrub knob 67 moves by a predetermined distance and hence across a predetermined number of specifiable sections in a unit time. Therefore, if the display rate is constant, a predetermined number of frames are displayed as the scrub knob 67 is moved at a constant speed by a constant distance.

To simplify the explanation, assume that the display rate is constant and the reproduced image that is displayed in the group of spiral image display sections 58 includes sections where frames showing a strong movement are arranged consecutively (to be referred to as movement sections whenever appropriate hereinafter) and sections where frames showing no movement are arranged consecutively (to be referred to as non-movement sections wherever appropriate hereinafter). If the scrub knob 67 is moved at a constant speed by a constant distance in each of the range of a specifiable section where frames of movement section are assigned and the range of a specifiable where frames of non-movement section are assigned, the number of frames displayed in the group of spiral image display sections 58 does not change.

However, when the scrub knob 67 is moved within the range of a specifiable section where frames of movement section are assigned, the image being displayed in the group of spiral image display sections 58 changes (moves) to a large extent because frames of movement section show a strong movement.

On the other hand, when the scrub knob 67 is moved within the range of a specifiable section where frames of non-movement section are assigned, the image being displayed in the group of spiral image display sections 58 changes (moves) scarcely because frames of non-movement section do not (scarcely) show a movement.

Thus, when the movable range of scrub bar 66 is defined to be a specifiable section and the section lengths of specifiable sections are made equal to each other, there arise ranges where the image being displayed in the group of spiral image display sections 58 changes to a large extent and ranges where the image being displayed in the group of spiral image display sections 58 does not change.

When the scrub knob 67 is moved to a certain extent within the range of a specifiable section where frames of non-movement section are assigned, the image being displayed in the group of spiral image display sections 58 does not change so that the operator operating the scrub knob 67 may have an irritating feeling.

When, on the other hand, the scrub knob 67 is moved to a certain extent within a range of a specifiable section where frames of movement section are assigned, the image being displayed in the group of spiral image display sections 58 changes to a large extent so that the operator operating the scrub knob 67 may be required to manipulate it delicately (finely) in order to detect a desired frame of an image.

In view of the above-described circumstances, it is possible to make the section length of specifiable sections to which frames are assigned not constant but weighted as a function of movement information, or the variations of frames assigned to the specifiable sections, in such a way that the movable range of the scrub bar 66 is divided into specifiable sections and the section length of a specifiable section where frames showing large variations as movement information are assigned is made large. Specific examples will be described below.

Figure 77:
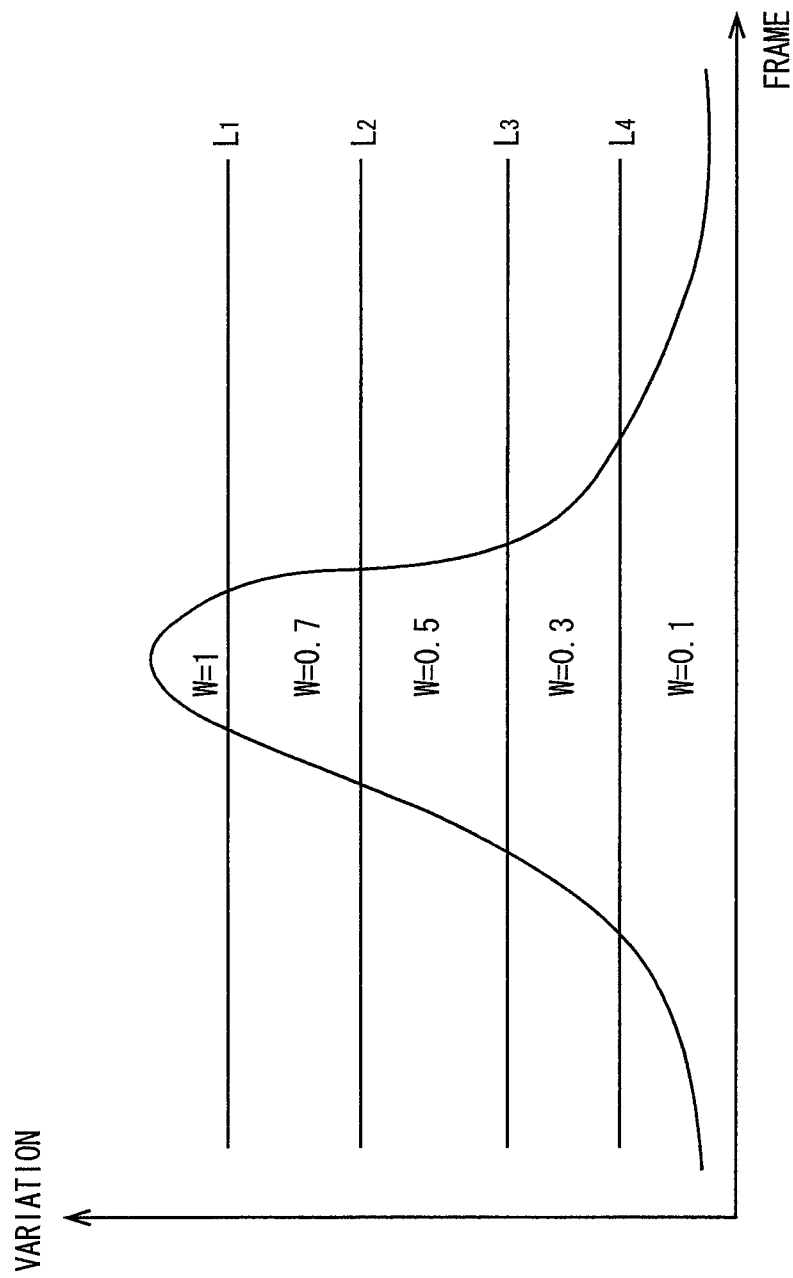
FIG. 77 is a schematic illustration of example (1) of weight to be used for weighting the section length of specifiable section.

FIG. 77 illustrates an example of weight to be used for weighting the section length of specifiable section.

In FIG. 77, the horizontal axis indicates the frame (as indicated by an ordinal number) and the vertical axis indicates the movement information, which is the variation.

Referring to FIG. 77, the weight w of the section length of a specifiable section where frames whose movement information is not less than threshold value L1 are assigned is typically made equal to 1 and the weight w of the section length of a specifiable section where frames whose movement information is not less than threshold value L2 and less than threshold value L1 are assigned is typically made equal to 0.7, whereas the weight w of the section length of a specifiable section where frames whose movement information is not less than threshold value L3 and less than threshold value L2 are assigned is typically made equal to 0.5 and the weight w of the section length of a specifiable section where frames whose movement information is not less than threshold value L4 and less than threshold value L3 are assigned is typically made equal to 0.3. Additionally, the weight w of the section length of a specifiable section where frames whose movement information is less than threshold value L4 are assigned is typically made equal to 0.1, the threshold values L1, L2, L3 and L4 satisfying the requirement of formula L1>L2>L3>L4.

The section lengths weighted by weight w in the above-described manner can be determined typically in the following way.

Sections where specifiable sections whose section lengths are weighted by the same weight w are arranged consecutively will be referred to as same weight sections hereinafter. Assume that the range where frames of the reproduced image that is displayed in the group of spiral image display sections 58 as the object of editing (and hence the object of scrub) is divided into Q same weight sections.

The number of specifiable sections constituting the q-th same weight section from the forefront of the Q same weight sections, or the number of frames assigned to the specifiable section that is the q-th same weight section, is expressed as Fq and the weight fitted to the section length of each of the specifiable sections constituting the q-th same weight section is expressed as wq.

The total number F of frames of the reproduced image that is the object of editing (and hence the object of scrub) displayed in the group of spiral image display sections 58 is expressed by formula F=F1+F2+ . . . FQ.

If the length of the movable range is 1, the section length of a specifiable section is expressed by 1/F when no weighting system is used.

On the other hand, when a weighting system as described above is used, the section length of the specifiable section that constitutes the q-th same weight section from the forefront is expressed by wqFq/($\Sigma$wiFi). Since the section length of the q-th same weight section from the forefront is expressed by wqFq/($\Sigma$wiFi), it is possible to determine the section length of the specifiable section constituting the q-th same weight section from the forefront is determined by dividing wq/($\Sigma$wiFi) by the number of (the frames assigned to) the specifiable section that constitutes the q-th same weight section when the weighting system is used. Note that $\Sigma$wiFi expresses the total sum of wiFi when the suffix i is varied from 1 to Q.

It will be appreciated that, when no weighting system is used, the section length of the specifiable section can be determined by making all the weights w1, w2, . . . , wQ of the weighting system equal to each other. In other words, when the weighting system is used, the section length of the specifiable section that constitutes the q-th same weight section from the forefront is wq/($\Sigma$wiFi) as described above. When the weights w1, w2, . . . , wQ are equal to each other and also to w, wq/($\Sigma$wiFi)=w/(w$\Sigma$Fi)=1/$\Sigma$Fi=1/F.

While four threshold values L1, L2, L3 and L4 that are not related to the threshold values used for determining display types are employed in FIG. 77 to determine the weight w of the section length of a specifiable section where frames are assigned, the threshold values used for determining display types may alternatively be employed for determining the weight w of the section length.

Figure 78:
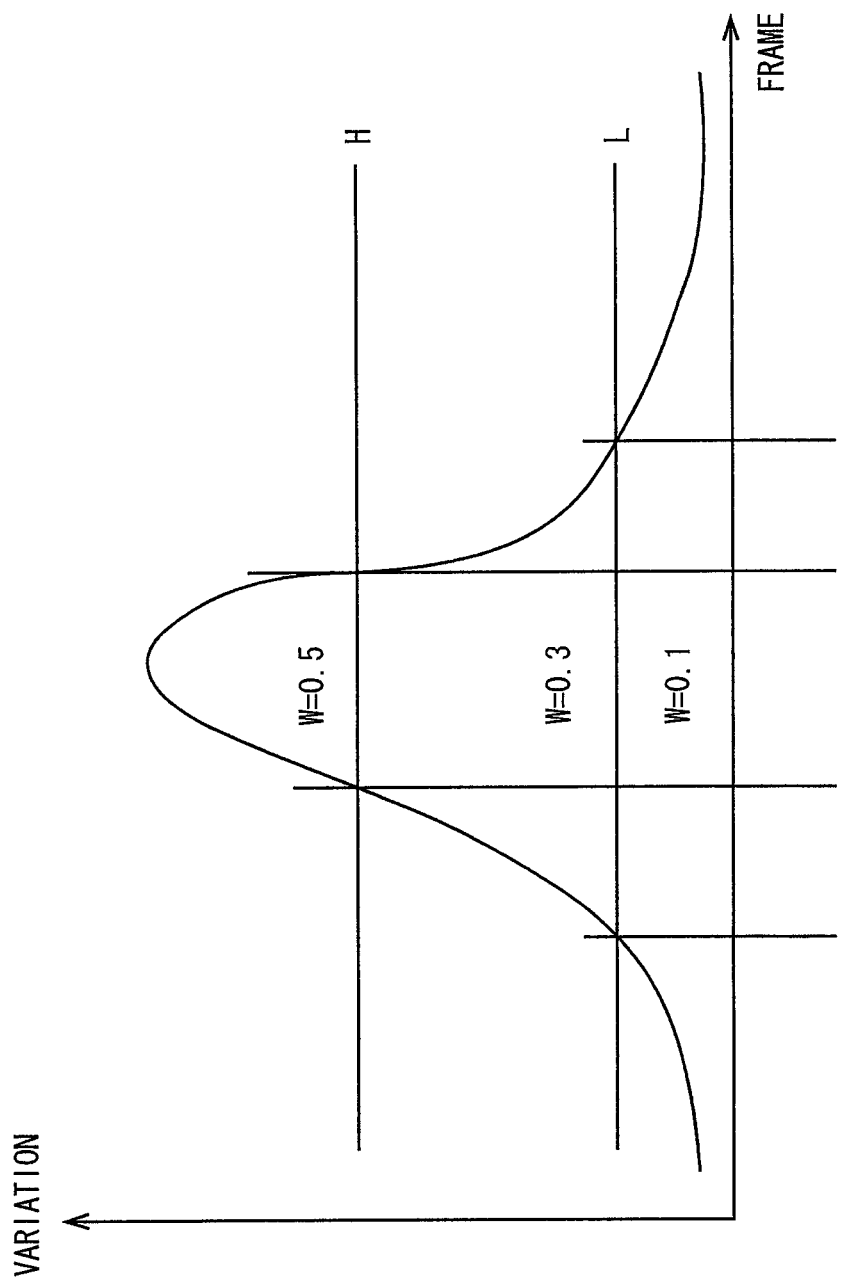
FIG. 78 is a schematic illustration of example (2) of weight to be used for weighting the section length of specifiable section.

FIG. 78 illustrates an example where the threshold values H and L that are used for determining display types according to the movement information are also employed for determining the weight of the section length.

In FIG. 78, the horizontal axis indicates the frame (as indicated by an ordinal number) and the vertical axis indicates the movement information, which is the variation.

Referring to FIG. 78, the weight w of the section length of a specifiable section where frames whose movement information is not less than the threshold value H are assigned is typically made equal to 0.5 and the weight w of the section length of a specifiable section where frames whose movement information is not less than the threshold value L and less than the threshold value H are assigned is typically made equal to 0.3, whereas the weight w of the section length of a specifiable section where frames whose movement information is less than the threshold value L are assigned is typically made equal to 0.1.

Alternatively, when frames are assigned to a specifiable section and the display type of each of the frames is determined according to the movement information of the frame, the weight w of the section length of the specifiable section may be determined according to the display type.

When the display type of a frame is determined according to the movement information of the frame, the display type indicates the extent of movement of the frame. More specifically, the display type of a frame is selected from the still image type V1, the ordinary type V2 and the high display rate/low resolution type V3 according to the movement information of the frame, a frame of the still image type V1 is a frame whose movement information is less than the threshold value L in principle and a frame of the ordinary type V2 is a frame whose movement information is not less than the threshold value L and less than the threshold value H, whereas a frame of the high display rate/low resolution type V3 is a frame whose movement information is not less than the threshold value H.

Therefore, as in the case where the threshold values H and are used as described above by referring to FIG. 78, it may be so arranged that the weight w of the section length of a specifiable section where frames of the still image type V1 are assigned is typically made equal to 0.1 and the weight w of the section length of a specifiable section where frames of the ordinary type V2 are assigned is typically made equal to 0.3, whereas the weight w of the section length of a specifiable section where frames of the high display rate/low resolution type V3 are assigned is typically made equal to 0.5.

When the weight w of the section length of a specifiable section where frames are assigned is determined according to the display type of the frames, still image sections where frames of the still image type V1 are consecutively arranged are same weight sections and ordinary image sections where frames of the ordinary type V2 are consecutively arranged are same weight sections. Similarly, high display rate/low resolution sections where frames of the high display rate/low resolution type V3 are consecutively arranged are same weight sections.

Figure 79:
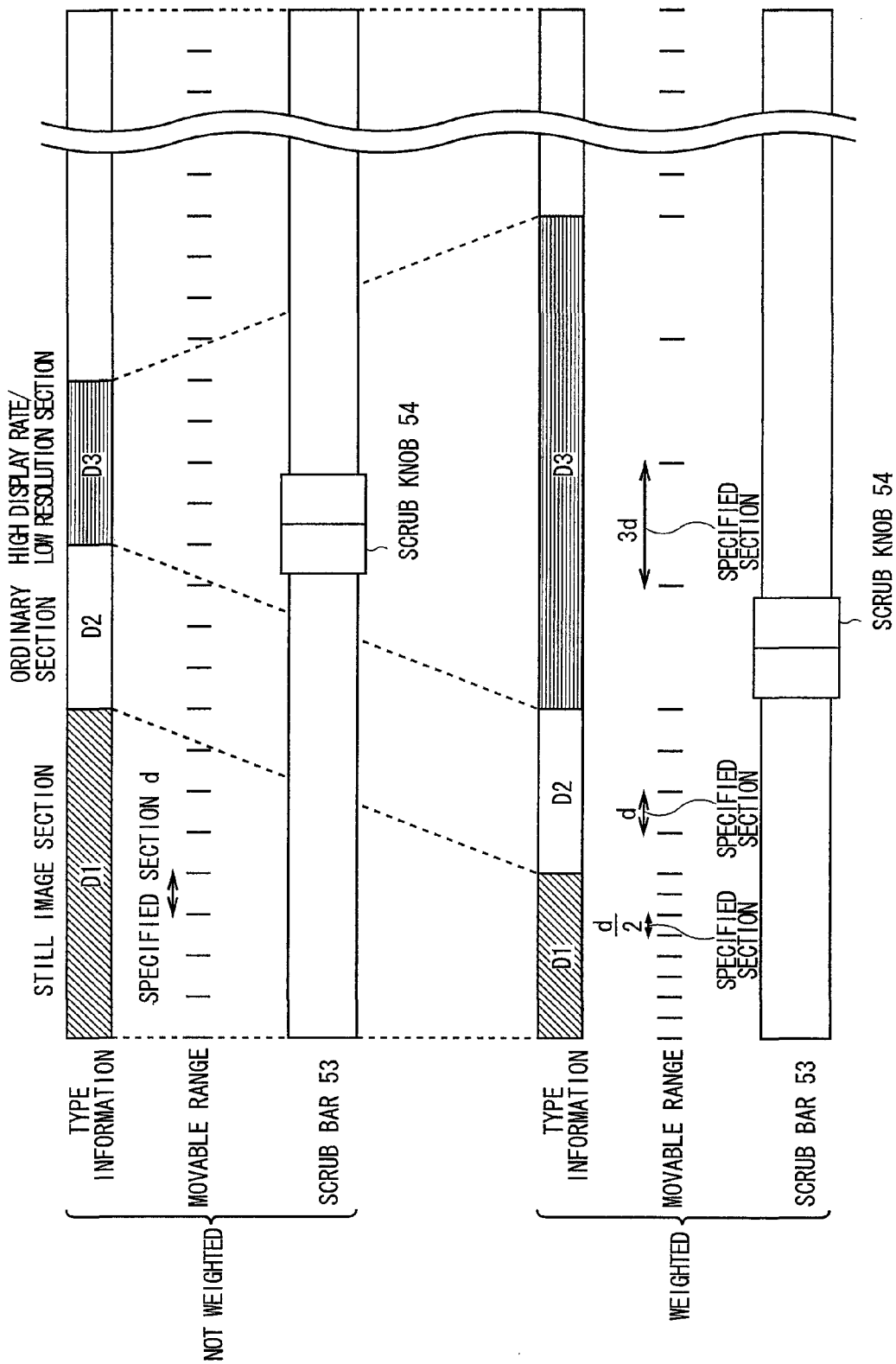
FIG. 79 is a schematic illustration of specifiable sections when the section length is not weighted and specifiable sections when the section length is weighted.

FIG. 79 is a schematic illustration of specifiable sections when the section length is not weighted and specifiable sections when the section length is weighted.

When the section length is not weighted, the movable range of the scrub bar 66 is divided into specifiable sections having a same section length by the number of the frames constituting the reproduced image that is the object of editing (and hence the object of scrub) displayed in the group of spiral image display sections 58 as shown in the upper half of FIG. 79 and the frames constituting the reproduced image to be displayed in the group of spiral image display sections 58 are assigned in time series from the leftmost specifiable section as described above by referring to FIG. 73.

When the section length is not weighted, the section length of all the sections including still image sections where frames of the still image type V1 are arranged consecutively, ordinary sections where frames of the ordinary type V2 are arranged consecutively and high display rate/low resolution sections where frames of the high display rate/low resolution type V3 are arranged consecutively is made equal to d.

When, on the other hand, the section length is weighted, the movable range of the scrub bar 66 is divided into specifiable sections having different section lengths as shown in the lower half of FIG. 79. More specifically, as described above by referring FIG. 73, the frames constituting the reproduced image that is the object of editing (and hence the object of scrub) are assigned in time series from the leftmost specifiable section but the section length of a specifiable where frames having large variations that are movement information are assigned is made long.

More specifically, in FIG. 79, the section length of a still image section where frames of the still image type V1 and hence frames showing no movement are assigned is d/2, or ½ of the section length d of a still image section when no weighting system is used. The section length of an ordinary section where frames of the ordinary type V2 and hence frames showing a movement to a certain extent but not strong are assigned is d, or same as the section length d of an ordinary section when no weighting system is used. Finally, the section length of a specifiable section where frames of the high display rate/low resolution section type V3 are assigned, frames showing a strong movement is 3d, or 3 times of the section length d of a high display rate/low resolution section when no weighting system is used.

Thus, when the section length is weighted, the display of a frame of a still image section ends as the scrub knob 67 is moved by a distance equal to ½ of the section length for which no weighting system is used. Then, as a result, it is possible to prevent the operator operating the scrub knob 67 from having an irritating feeling when the image being displayed in the group of spiral image display sections 58 does not change although he or she moves the scrub knob 67 considerably, or to a certain extent.

Additionally, when the section length is weighted, the attentional frame being displayed in the group of spiral image display sections 58 is changed from a frame to another of a high display rate/low resolution section as the scrub knob 67 is moved by a distance equal to 3 times of the section length for which no weighting system is used. Then, as a result, it is possible for the operator to detect the desired frame of an image without delicately (finely) manipulating the scrub knob 67.

Note that FIG. 79 illustrates type information (GUIs of belt-shaped regions for displaying display types in time series) that is made to agree with the horizontal scale of the movable range of the scrub bar 66.

In the case of type information that is made to agree with the horizontal scale of the movable range of the scrub bar 66, the (pattern of the) type information at the position of the scrub knob 67 indicates the display type of the frames assigned to the specifiable section where the scrub knob 67 is located.

In FIG. 79, of the belt-shaped regions shown as type information, region D1 shaded by oblique lines indicates a still image section where frames of the still image type V1 are arranged consecutively and plain region D2 indicates an ordinary section where frames of the ordinary type V2 are arranged consecutively, whereas region D3 shaded by horizontal lines indicates a high display rate/low resolution region section where frames of the high display rate/low resolution type V3 are arranged consecutively.

The weighted section length of a specifiable section where frames of still image section and hence where frames of the still image type V1 are arranged consecutively is ½ of the section length d of the corresponding specifiable section that is not weighted, or d/2. Therefore, the horizontal length of the region D1 whose section length is weighted is ½ of the horizontal length of the corresponding region D1 whose section length is not weighted in FIG. 79.

Then, the weighted section length of a specifiable section where frames of the ordinary section and hence where frames of the ordinary type V2 are arranged consecutively is same as the section length d of the corresponding specifiable section that is not weighted, or d. Therefore, the horizontal length of the region D2 whose section length is weighted same as the horizontal length of the corresponding region D1 whose section length is not weighted in FIG. 79.

Finally, the weighted section length of a specifiable section where frames of high display rate/low resolution image section and hence where frames of the high display rate/low resolution type V3 are arranged consecutively is 3 times of the section length d of the corresponding specifiable section that is not weighted, or 3d. Therefore, the horizontal length of the region D3 whose section length is weighted is 3 times of the horizontal length of the corresponding region D3 whose section length is not weighted in FIG. 79.

As described above, when the section length is weighted, the type information corresponds to the weighted section length and hence differs from the type information that corresponds to the section length that is not weighted (conversely, the type information that corresponds to the section length that is not weighted differs from the type information that corresponds to the section length that is weighted).

This editing apparatus 2 is provided with a weighting-on mode where the section length of each specifiable section is weighted and a weighting-off mode where the section length of each specifiable section is not weighted and the operator can select either mode, or switch from the weighting-on mode to the weighting-off mode or vice versa.

Figure 80:
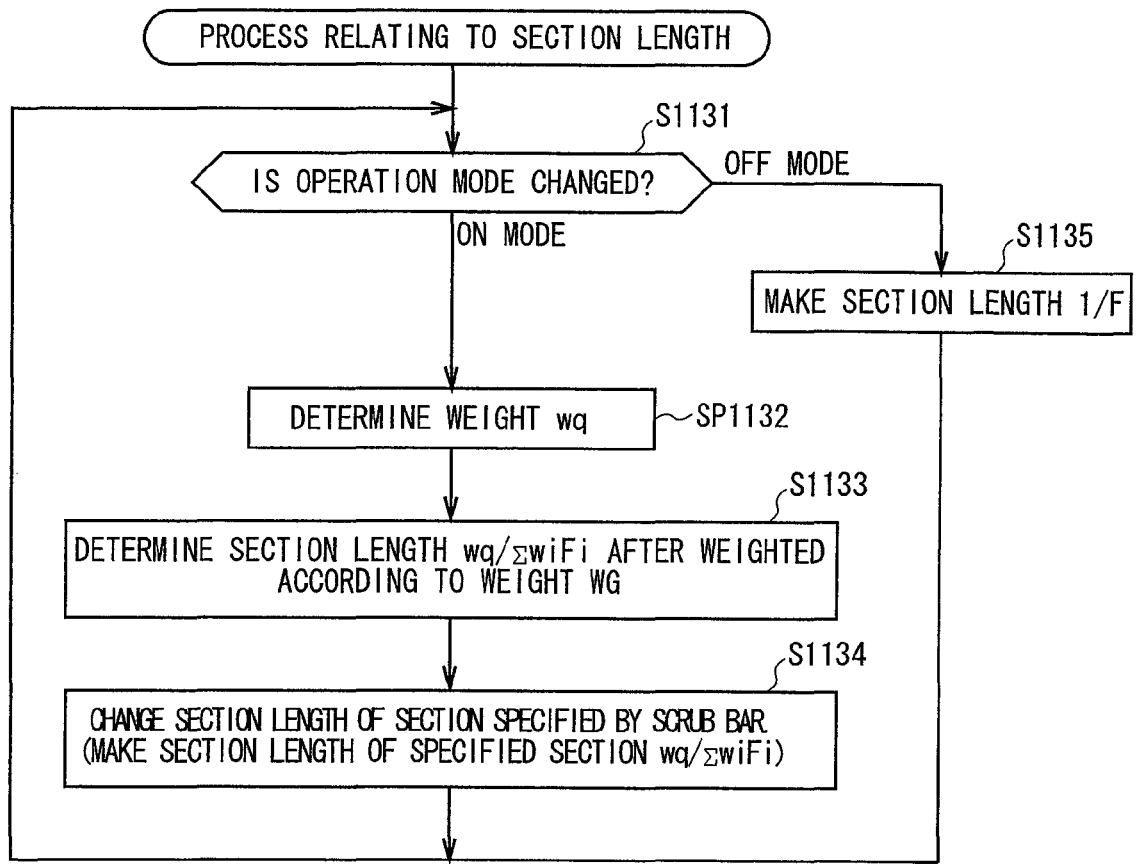
FIG. 80 is a flowchart, illustrating a process relating to a section length.

Now, the process that the microprocessor 3 of the editing apparatus 2 executes relating to the section length of specifiable section (process relating to section length) will be described below by referring to the flowchart of FIG. 80.

A weight button (not shown) is arranged at a predetermined position of the editing image 50 (FIG. 2) so as to be operated to switch from the weighting-on mode to the weighting-off mode or vice versa. Thus, as the operator operates the weight button, the operation mode is switched to the weighting-on mode or the weighting-off mode.

Assume that the movable range of the scrub bar 66 is 1.

In the process relating to section length, the GUI control section 1111 determines if the operation mode is switched or not in Step S1131. If it is determined in Step S1131 that the operation mode is switched to the weighting-on mode, the process proceeds to Step S1132, where the GUI control section 1111 determines the weight to be used for the section length of each specifiable section to which frames are assigned according to the variation or the display type in the Fy file stored in the file memory section 1121 of the Fy file management section 1114 (FIG. 72) and then the process proceeds to Step S1133.

In Step S1133, the GUI control section 1111 determines the weighted section length of each specifiable section according to the weight to be used for the specifiable section to which frames are assigned.

More specifically, as the weight to be used for the section length of each specifiable section to which frames are assigned is determined according to the variation or the display type as described above, the GUI control section 1111 recognizes sections where specifiable sections whose section lengths are weighted by the same weight w are arranged consecutively as same weight sections.

If a sequence of specifiable sections where frames of the moving image are assigned that is the object of scrub is divided into Q same weight sections, the GUI control section 1111 determines the section length wq/(ΣwiFi) of the specifiable section that constitutes the q-th same weight section from the forefront of the Q same weight sections, using the number of frames Fq assigned to the specifiable section that is the q-th same weight section from the forefront and the weight wq to be used for the section length of the specifiable section that constitutes the q-th same weight section.

As the GUI control section 1111 determines the section length wq/(ΣwiFi) of each of the specifiable sections that constitute the Q same weight sections in Step S1133, it supplies the section length wq/(ΣwiFi) of each of the specifiable sections to the display control section 1117 (FIG. 72) and the process proceeds to Step S1134, where the section lengths of the specifiable sections produced by dividing the movable range of the scrub bar 66 as displayed in the display section 55 of the editing image 40 are defined as (altered to) the section lengths determined in Step S1133 and then the process returns to Step S1131.

If, on the other hand, it is determined in Step S1131 that the operation mode is switched to the weighting-off mode, the process proceeds to Step S1135, where the section lengths of the specifiable sections to which frames are assigned are defined as (altered to) the same 1/F and the GUI control section 1111 supplies the section length 1/F to the display control section 1117 and the process returns to Step S1131. Note that F represents the total number of the frames that constitute the reproduced image that is the object of editing (and hence the object of scrub) displayed in the group of spiral image display sections 58 as described above.

Figure 81:
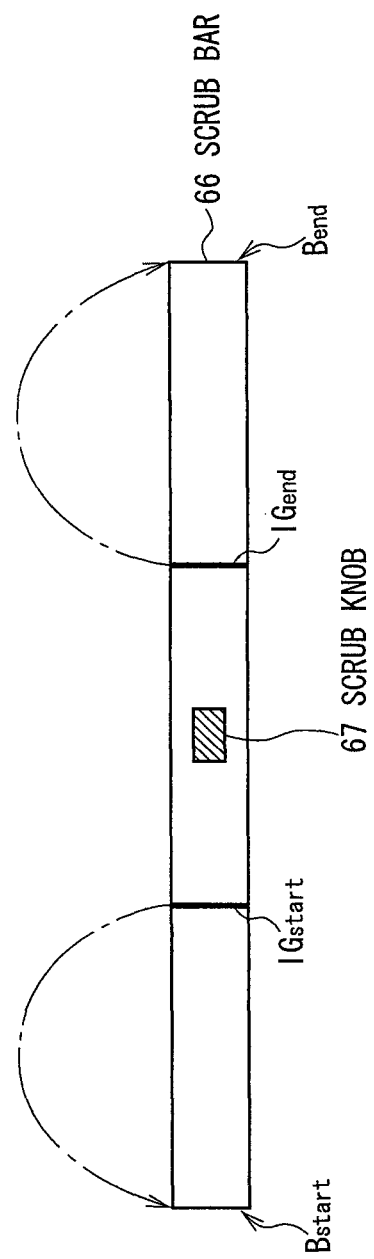
FIG. 81 is a schematic illustration of specifying a range of assignment range.

The frames from the front end to the tail end of the reproduced image that is the object of editing (and hence the object of scrub) displayed in the group of spiral image display sections 58 are assigned to the movable range from the forefront Bst to the tail end Bed of the scrub bar 66 in the above description, it is also possible to assign the frames that correspond to the range (range of assignment) from the starting point indicator IGst for specifying the starting position to the ending point indicator IGed for specifying the ending position, or the range of a part of the reproduced image as shown in FIG. 81.

If such is the case, not the range of all the frames from the forefront frame to the tail end frame of the reproduced image that is the object of editing (and hence the object of scrub) displayed in the group of spiral image display sections 58 but the range of a part of the frames can be used as the range of assignment (the range of frames assigned to the specifiable sections from the forefront specifiable section to the tail end specifiable section in the movable range of the scrub bar 66).

As the range of a part of the reproduced image is used as the range of assignment for the movable range of the scrub bar 66, the number of frames assigned to the specifiable sections from the forefront specifiable section to the tail end specifiable section in the movable range of the scrub bar 66 is reduced if compared with the arrangement where all the range of the reproduced image is used as the range of assignment. Then, as a result, the section lengths of the specifiable sections are reduced.

Then, it is possible to prevent a situation where the frame that is the attentional frame displayed in the group of spiral image display sections 58 changes remarkably between before a move of the scrub knob 67 and after the move due to short section lengths of the specifiable sections from taking place. Thus, as a result, the operator can detect the desired frame of the image with ease.

Since the starting point indicator IGst and the ending point indicator IGed indicate the range of assignment that is the range of the frames assigned from the forefront specifiable section to the tail end specifiable section of the movable range of the scrub bar 66, they provide range of assignment information. Additionally, since they are operated to specify a range of assignment, they may also be referred to as range specifying operation means.

Figure 82:
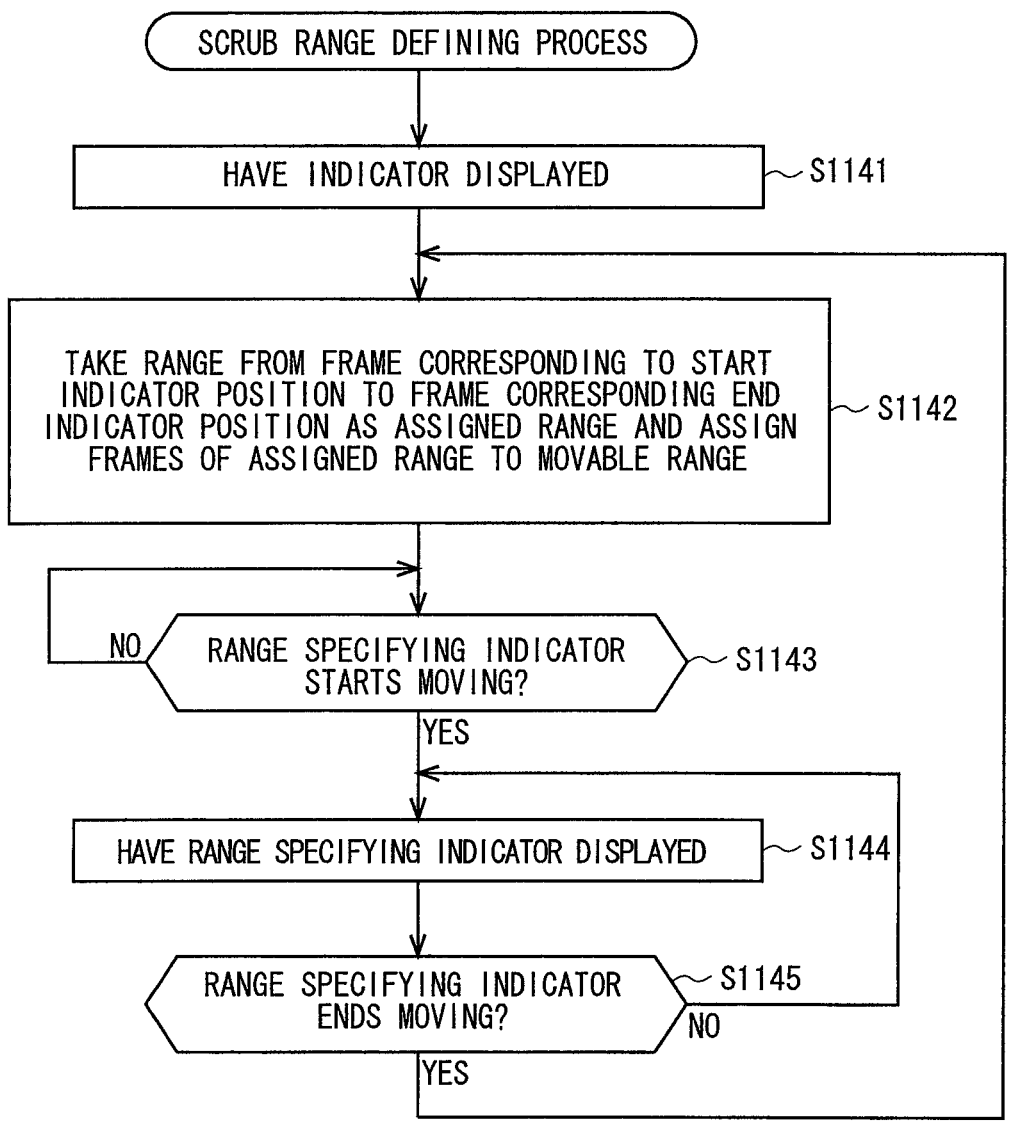
FIG. 82 is a flowchart, illustrating the range of assignment specifying process.

Now, the range of assignment defining process for defining the range (the range of assignment) of the frames to be assigned to (the specifiable sections of) the movable range of the scrub bar 66 according to the starting point indicator IGst and the ending point indicator IGed will be described by referring to the flowchart of FIG. 82.

As an operation of defining a predetermined scrub range is performed by means of the operation controller 37, the mouse 38 or the keyboard 39, the GUI control section 1111 (FIG. 45) controls the display control section 1117 so as to have the starting point indicator IGst and the ending point indicator IGed displayed at predetermined respective positions on the predetermined position of the scrub bar 66 in Step S1141 and then the process proceeds to Step S1142.

In Step S1142, the GUI control section 1111 (FIG. 45) assigns the frames of the range of assignment, which is the range of frames between the frame corresponding to the position of the starting point indicator IGst and the frame corresponding to the position of the ending point indicator IGed, to the movable range of the scrub bar 66 out of the frames that constitute the reproduced image displayed in the group of spiral image display sections 58 that is the object of editing (and hence the object of scrub).

If the above-described weighting for the section lengths of specifiable sections is not considered for the purpose of simplifying the following description, the GUI control section 1111 divides the movable range of the scrub bar 66 into specifiable sections whose section length is equal to the quotient of the division of dividing the length of the movable range by the number of the frames found in the range of assignment. Thus, it assigns the frames of the range of assignment to the specifiable sections from the forefront specifiable section to the tail end specifiable section of the movable range.

Then, the process proceeds from Step S1142 to Step S1143, where the GUI control section 1111 determines if the starting point indicator IGst or the ending point indicator IGed (FIG. 81) starts moving or not, in other words, if the operator operates the operation controller 37, the mouse 38 or the keyboard 39 to move the starting point indicator IGst or the ending point indicator IGed, whichever appropriate, or not.

If it is determined in Step S1143 that neither the starting point indicator IGst nor the ending point indicator IGed starts moving, the process returns to Step S1143.

If, on the other hand, it is determined in Step S1143 that either the starting point indicator IGst or the ending point indicator IGed starts moving, in other words, that the operator operates the operation controller 37, the mouse 38 or the keyboard 39 to move the starting point indicator IGst or the ending point indicator IGed, whichever appropriate, and an operation signal that corresponds to the operation is supplied to the GUI control section 1111 from the operation controller 37, the mouse 38 or the keyboard 39, whichever appropriate, the GUI control section 1111 determines the position of the starting point indicator IGst or the ending point indicator IGed, whichever appropriate, according to the operation signal from the mouse 38 or the keyboard 39, whichever appropriate, and supplies information showing the position to the display control section 1117 before the process proceeds to Step S1144.

In Step S1144, the display control section 1117 has the starting point indicator IGst or the ending point indicator IGed displayed at the position indicated by the information from the GUI control section 1111 instead of the position where it is displayed immediately before and the process proceeds to Step S1145.

In Step S1145, the GUI control section 1111 determines if the move of the starting point indicator IGst or the ending point indicator IGed is ended or not, in other words, if the operator ends the operation of the operation controller 37, the mouse 38 or the keyboard 39 for moving the starting point indicator IGst or the ending point indicator IGed, whichever appropriate, or not.

If it is determined in Step S1145 that the operation of moving the starting point indicator IGst or the ending point indicator IGed is not ended, in other words that the operator is still operating the operation controller 37, the mouse 38 or the keyboard 39 to move the starting point indicator IGst or the ending point indicator IGed, whichever appropriate, and an operation signal that corresponds to the operation is being supplied to the GUI control section 1111 from the operation controller 37, the mouse 38 or the keyboard 39, whichever appropriate, the GUI control section 1111 determines the position to which the starting point indicator IGst or the ending point indicator IGed, whichever appropriate, is to be moved and supplies information indicating the position to the display control section 1117 before the process returns to Step S1144. Then, the above processing operations are repeated.

Thus, as a result of the processing operations of Steps S1143 through S1145, the starting point indicator IGst or the ending point indicator IGed is moved horizontally according to the operation for moving the starting point indicator IGst or the ending point indicator IGed, whichever appropriate.

If, on the other hand, it is determined in Step S1145 that the operation of moving the starting point indicator IGst or the ending point indicator IGed is ended, in other words, that the operator ends operating the operation controller 37, the mouse 38 or the keyboard 39 to move the starting point indicator IGst or the ending point indicator IGed, whichever appropriate, and the operation signal that corresponds to the operation is no longer supplied to the GUI control section 1111 from the operation controller 37, the mouse 38 or the keyboard 39, whichever appropriate, the GUI control section 1111 recognizes the (horizontal) position of the starting point indicator IGst or the ending point indicator IGed, whichever appropriate, and the process returns to Step S1142 to assign the frames of assignment, which is the range from the frame that corresponds to the position of the starting point indicator IGst to the frame that corresponds to the position of the ending point indicator IGed, to the movable range of the scrub bar 66. Thereafter, the above-described process is repeated.

As described above, the operator can alter the range of the frames that are the objects of scrub (the range of the frames assigned to the movable range of the scrub bar 66 (the range of assignment)) out of the frames that constitute the reproduced image that is displayed in the group of spiral image display sections 58 as an object of editing by operating either the starting point indicator IGst or the ending point indicator IGed as GUI.

The range of assignment defining process of FIG. 64 ends when a predetermined end of defining a scrub range operation is performed.

In this way, it is possible to divide the movable range of the scrub bar 66 into specifiable sections, where the section length of a specifiable section to which frames showing large variations as movement information are assigned is made long, by weighting the section lengths of the specifiable sections to which frames are assigned according to movement information.

While the image displayed in the group of spiral image display sections 58 have a same size in the above-described scrub operation, the size can be altered according to the display type of the frames of the image. In other words, the image size (display size) can be added as a display parameter for altering the display as a function of the variation of image. This will be described below by way of a specific example.

In this example, it is assumed that the display type of a frame is determined according to movement information as one of the still image type V1, the ordinary type V2 or the high display rate/low resolution type V3 as described earlier by referring to FIG. 49.

A default size is defined in advance for the image of a frame of the still image type V1 in terms of the length of the diagonal line or the horizontal and vertical lengths and the image is displayed with the default size.

The size of the image of a frame of the ordinary type V2 is defined as 1.5 times of the default size. Thus, the image of a frame of the ordinary type is displayed with a size that is 1.5 times of default size in terms of the length of the diagonal line or the horizontal and vertical lengths. The size of the image of a frame of the high display rate/low resolution type V3 is defined as 2 times of the default size. Thus, the image of a frame of the high display rate/low resolution type is displayed with a size that is 2 times of default size in terms of the length of the diagonal line or the horizontal and vertical lengths.

For displaying an image with a size defined according to the display type, the above process is executed in Step S1122 of the scrub operation as described above by referring to FIG. 76.

Figure 83:
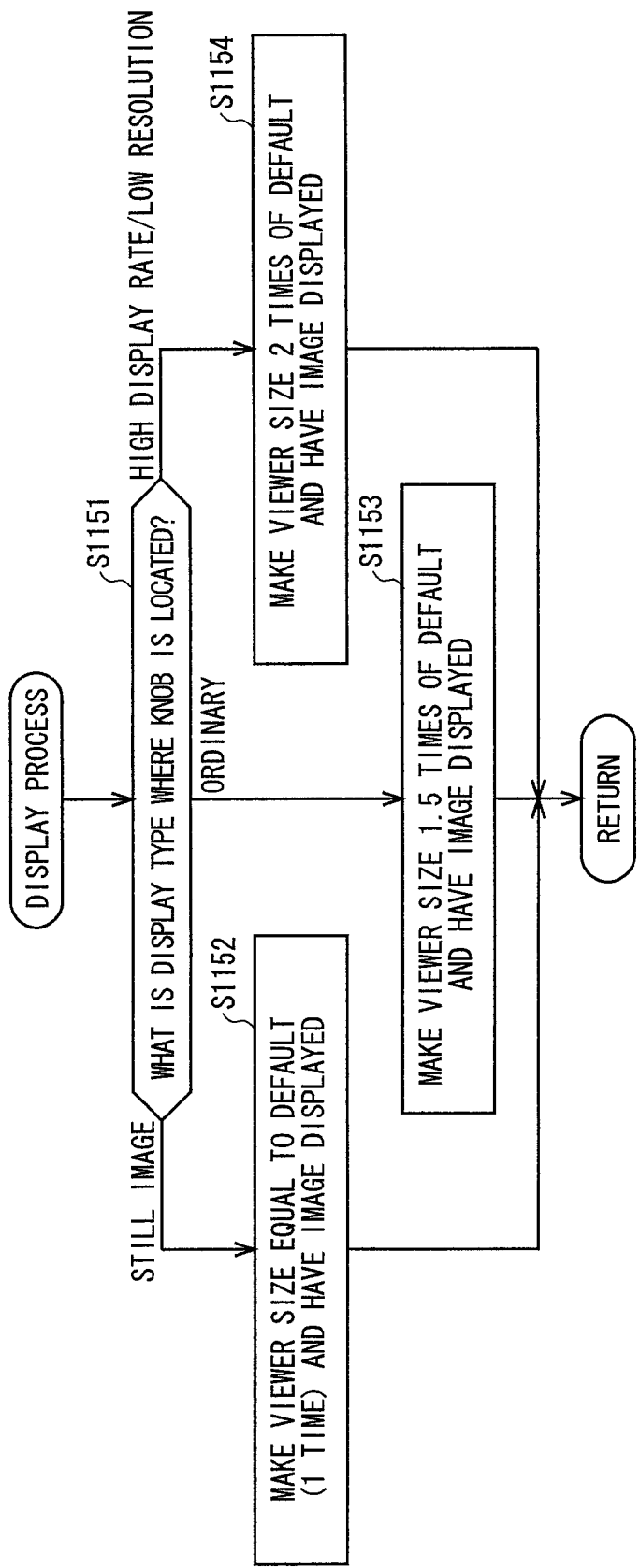
FIG. 83 is a flowchart, illustrating the display process.
Figure 84:
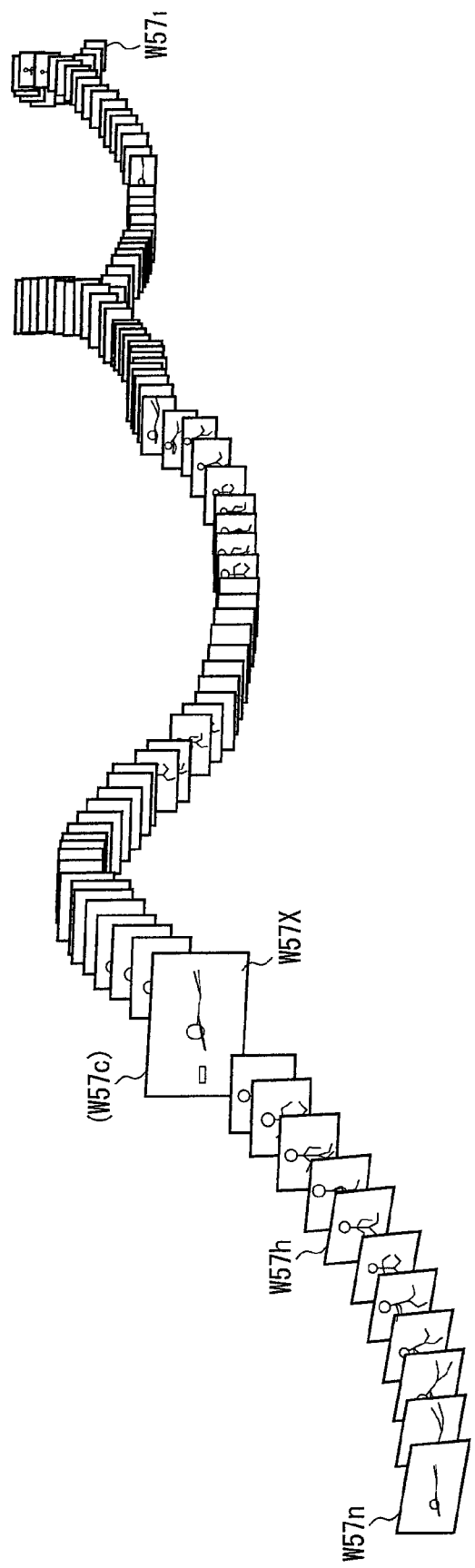
FIG. 84 is a schematic illustration of an exemplary display of transition (1) of enlarged image display section.
Figure 85:
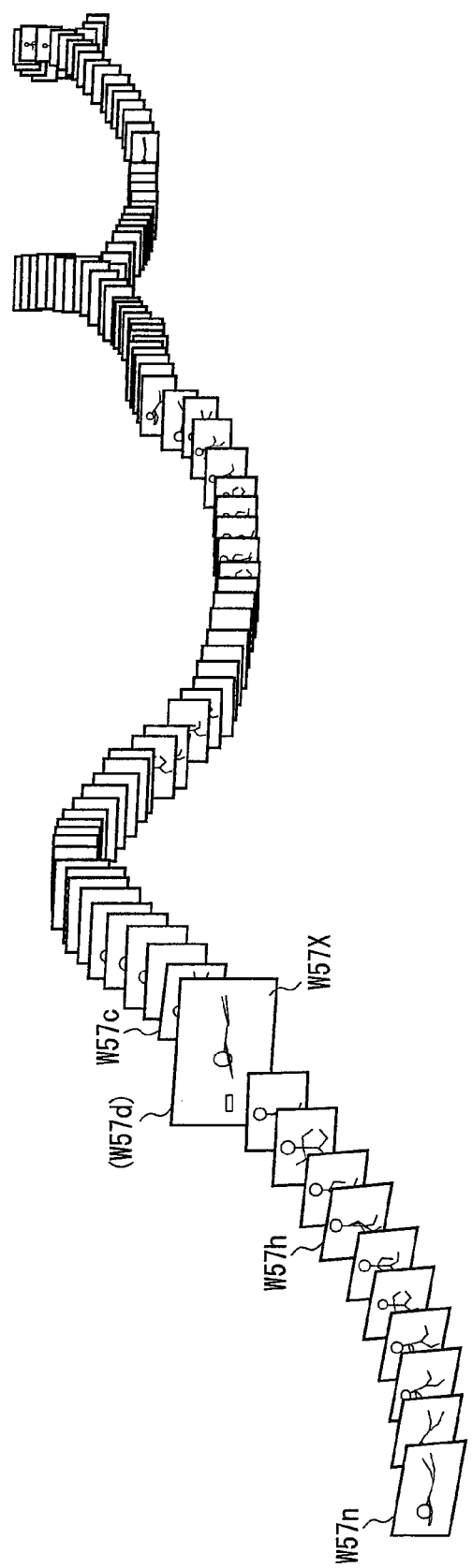
FIG. 85 is a schematic illustration of an exemplary display of transition (2) of enlarged image display section.
Figure 86:
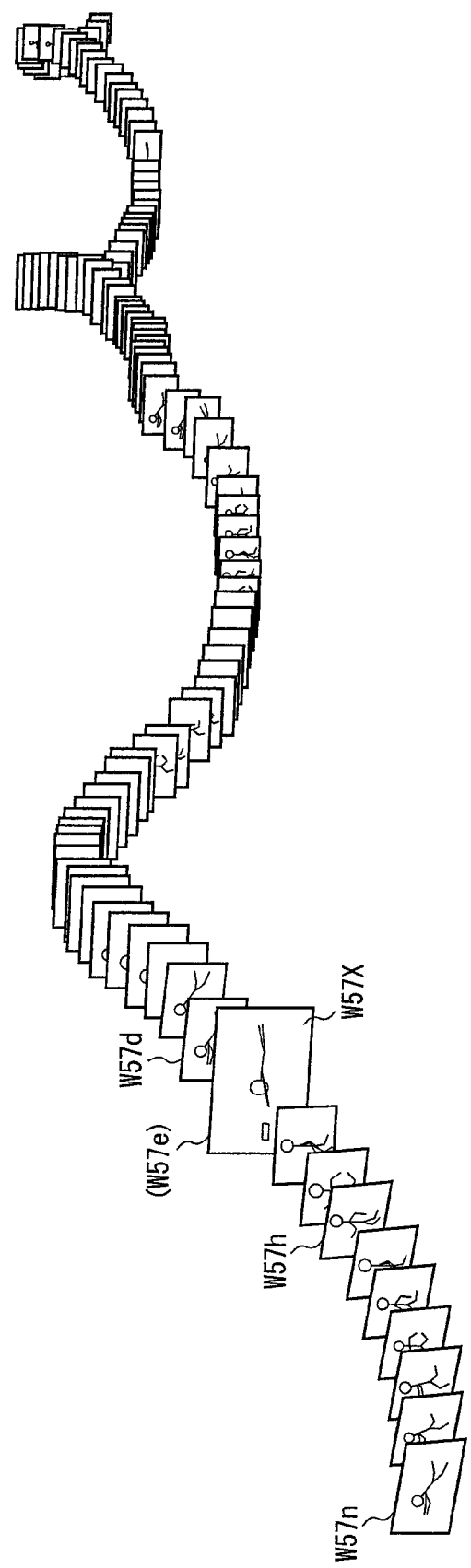
FIG. 86 is a schematic illustration of an exemplary display of transition (3) of enlarged image display section.
Figure 87:
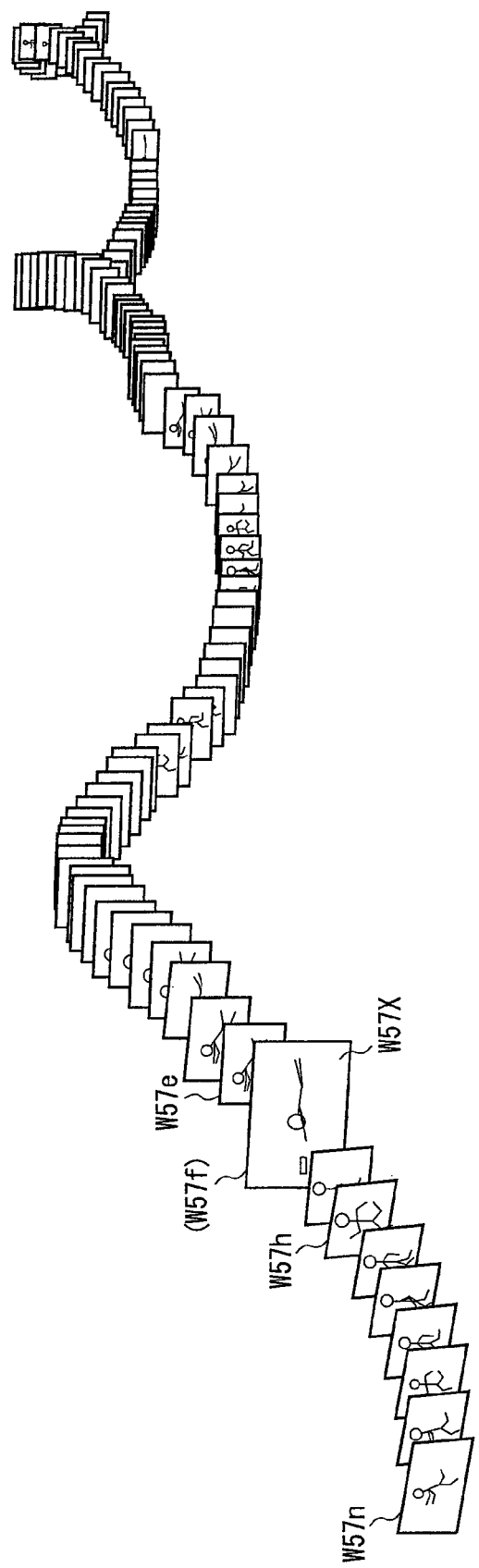
FIG. 87 is a schematic illustration of an exemplary display of transition (4) of enlarged image display section.
Figure 88:
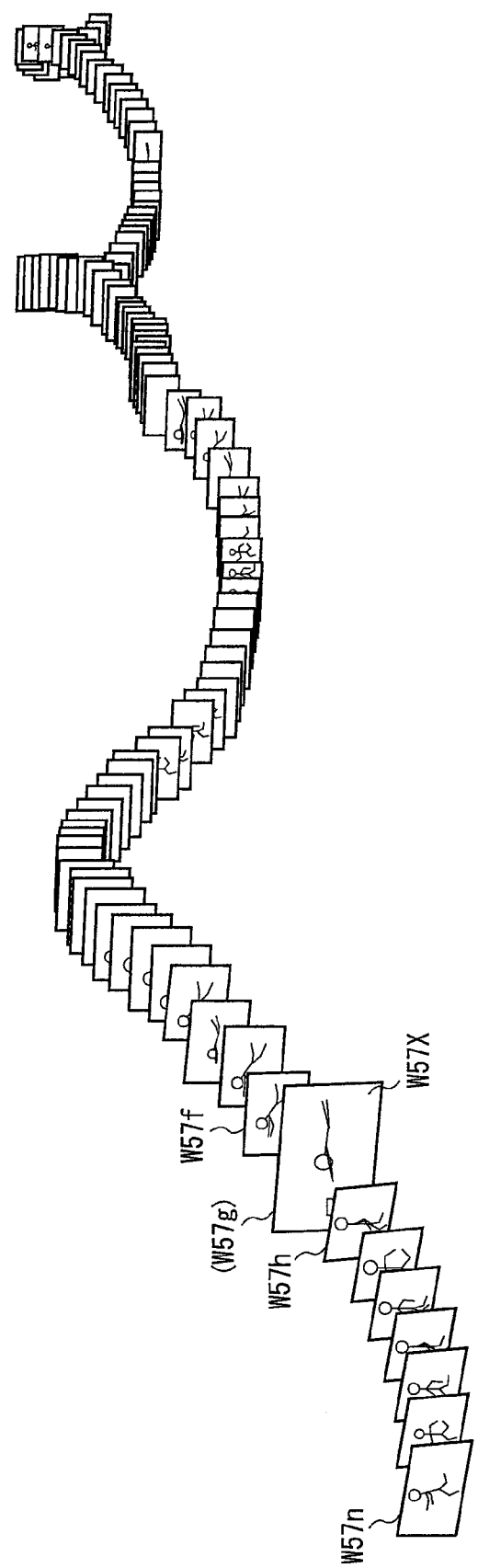
FIG. 88 is a schematic illustration of an exemplary display of transition (5) of enlarged image display section.
Figure 89:
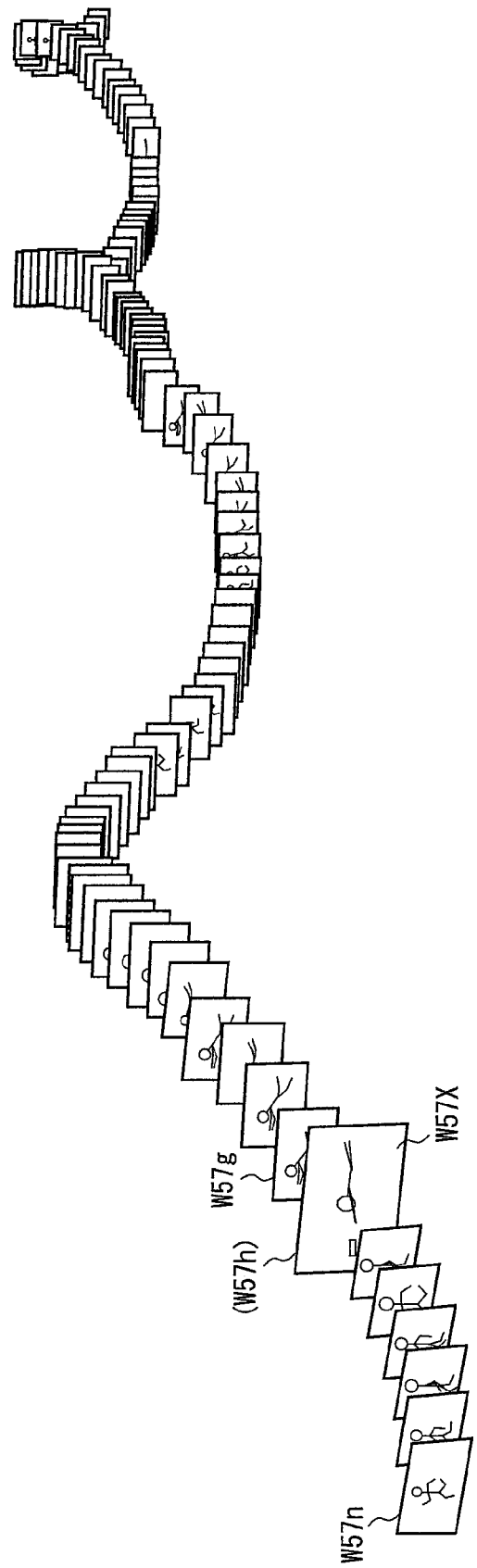
FIG. 89 is a schematic illustration of an exemplary display of transition (6) of enlarged image display section.
Figure 90:
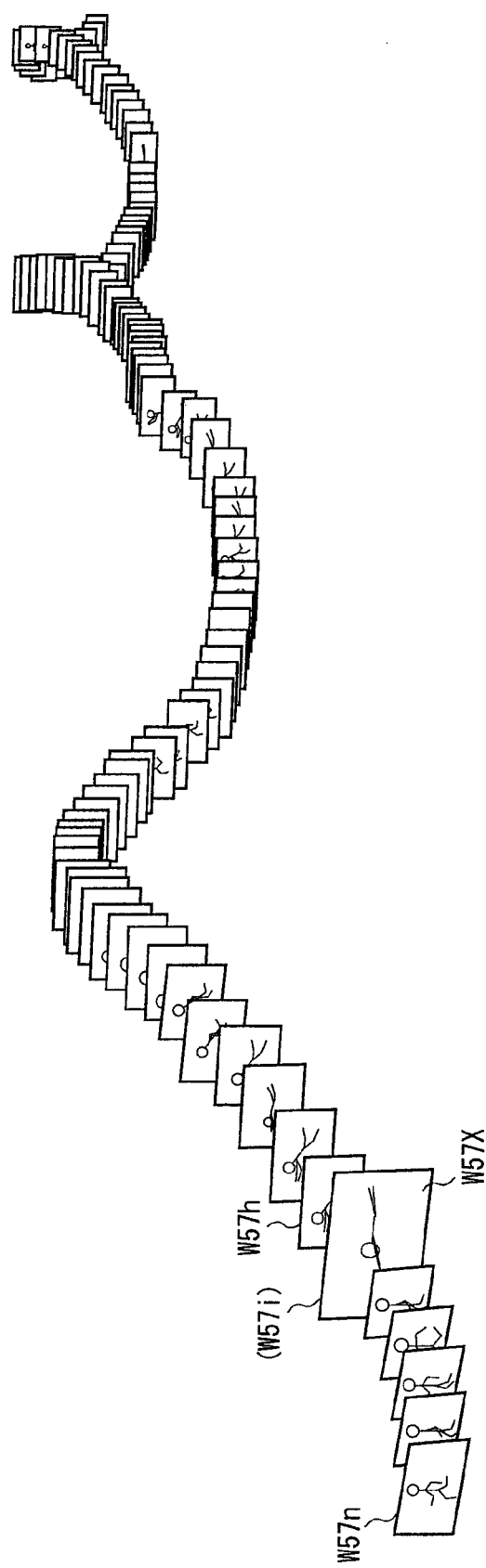
FIG. 90 is a schematic illustration of an exemplary display of transition (7) of enlarged image display section.
Figure 91:
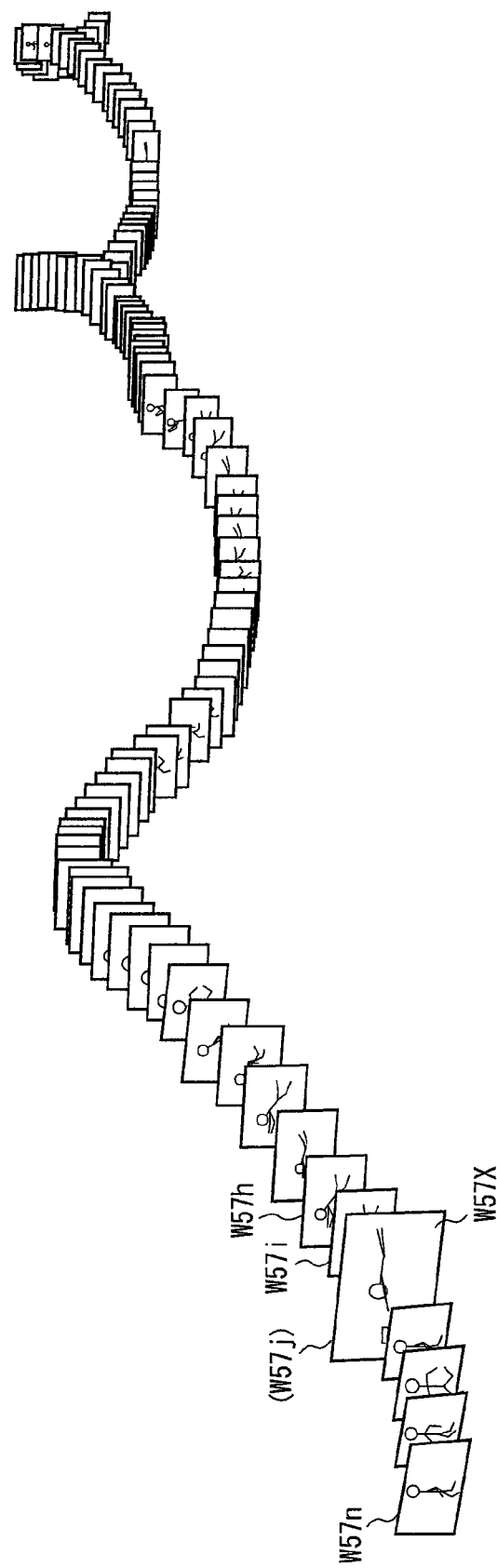
FIG. 91 is a schematic illustration of an exemplary display of transition (8) of enlarged image display section.
Figure 92:
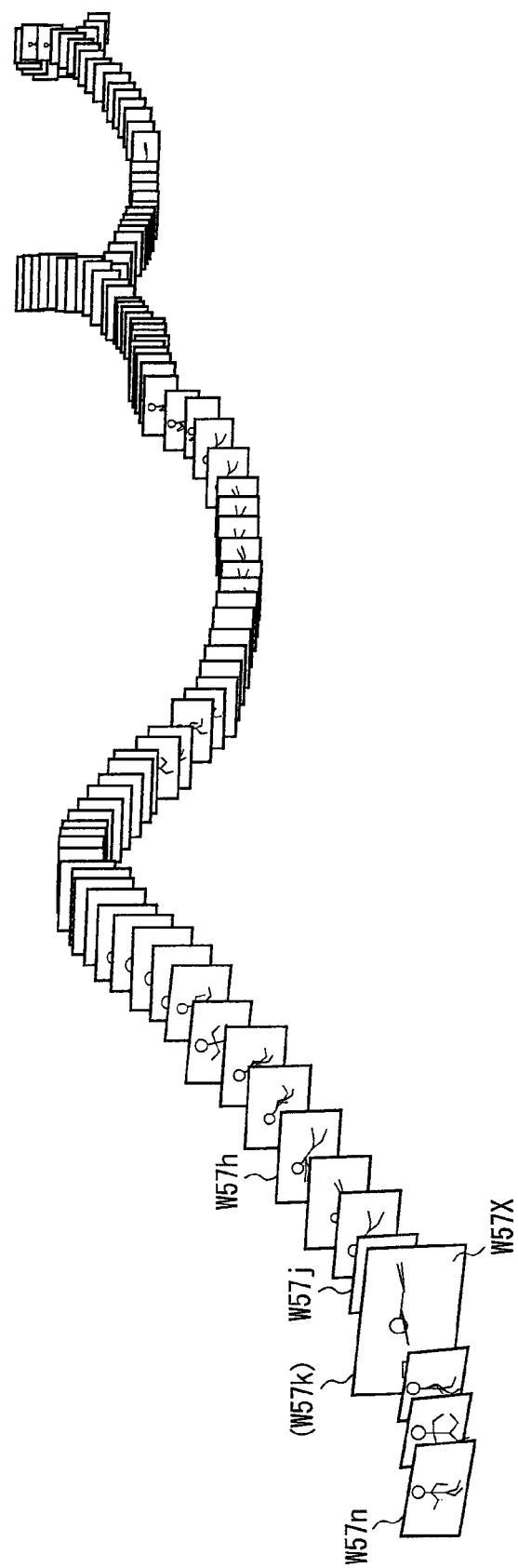
FIG. 92 is a schematic illustration of an exemplary display of transition (9) of enlarged image display section.
Figure 93:
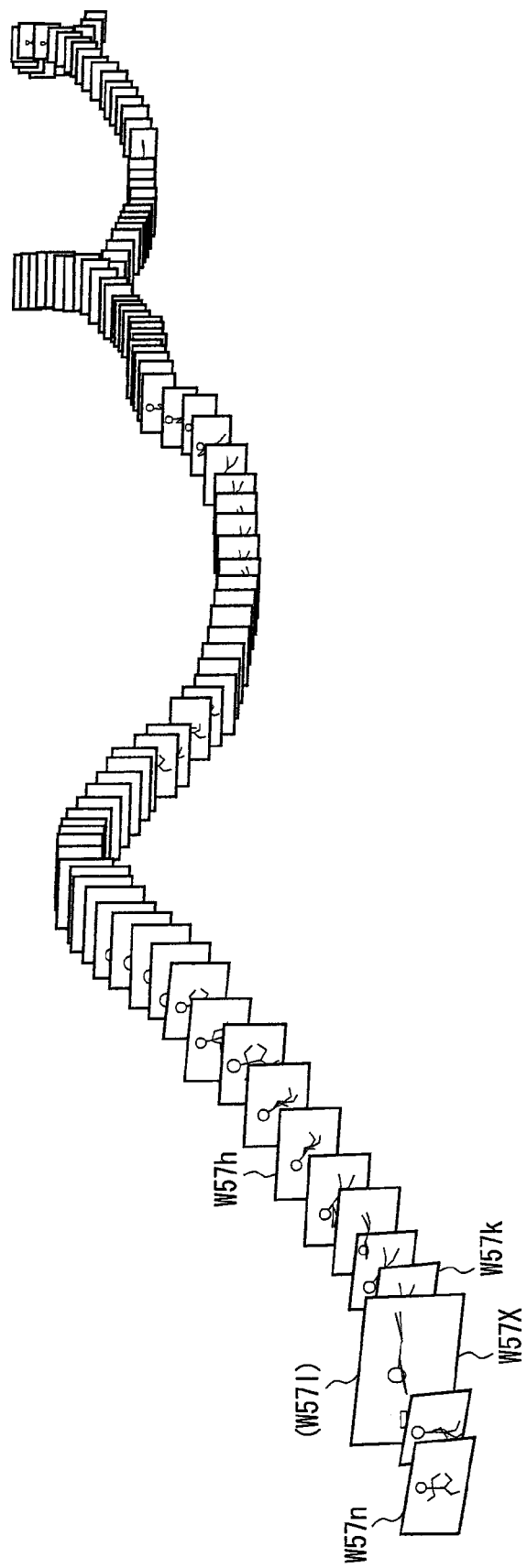
FIG. 93 is a schematic illustration of an exemplary display of transition (10) of enlarged image display section.

The process of Step S1122 of FIG. 76 (display process) for displaying an image with a size defined according to the display type will be described below by referring to the flowchart of FIG. 83.

It is assumed here that three display types including the still image type V1, the ordinary type V2 and the high display rate/low resolution type V3 are provided as described above by referring to FIG. 49. It is also assumed here that a default size is defined in advance for the image of a frame of the still image type V1 and the size of the image of a frame of the ordinary type V2 is defined as 1.5 times of the default size, whereas the size of the image of a frame of the high display rate/low resolution type V3 is defined as 2 times of the default size.

In Step S1151, the display control section 1117 (FIG. 71) determines the display type of the frame (attentional frame) assigned to the specifiable section where the scrub knob 67 is located that is supplied from the display type acquiring section 1115 (FIG. 71) as the still image type V1, the ordinary type V2 or the high display rate/low resolution type V3.

If it is determined in Step S1151 that the display type of the attentional frame is the still image type V1, the process proceeds to Step S1152, where the display control section 1117 has the image displayed in the corresponding one of the image display sections $W57_1$ through $W57_n$ of the group of spiral image display sections 58 with the default size according to the image data stored in the frame buffer 1117A (FIG. 71).

If, on the other hand, it is determined in Step S1151 that the display type of the attentional frame is the ordinary type V2, the process proceeds to Step S1153, where the display control section 1117 extends the size of the corresponding one of the image display sections $W57_1$ through $W57_n$ of the group of spiral image display sections 58 to 1.5 times of the default size and has the image displayed in the extended image display section (to be also referred to as an extended display section wherever appropriate hereinafter) according to the image data stored in the frame buffer 1117A.

If, finally, it is determined in Step S1151 that the display type of the attentional frame is the high display rate/low resolution type V3, the process proceeds to Step S1154, where the display control section 1117 extends the size of the corresponding one of the image display sections $W57_1$ through $W57_n$ of the group of spiral image display sections 58 to 2 times of the default size and has the image displayed in the extended image display section according to the image data stored in the frame buffer 1117A.

It may be so arranged that the size of (the image displayed in) one of the group of spiral image display sections 58 may be altered according to the display type as long as the scrub knob 67 is operated (e.g., dragged) and returned to the default size when the operation of the scrub knob 67 is stopped.

While the image of a frame of the ordinary type V2 shows a certain extent of movement, the operator can check the movement of the image in detail when the size of the displayed image of the frame of the ordinary type V2 is increased from the default size.

While the image of a frame of the high display rate/low resolution type V3 shows a strong movement, the operator can check the movement of the image in detail when the size of the displayed image of the frame of the high display rate/low resolution type V3 is increased to a size greater than that of the image of a frame of the ordinary type V2.

Additionally, as the size of a displayed image is differentiated according to the display type, the operator can intuitively grasp the extent of movement of that particular image among the overall image (reproduced image) being displayed in the group of spiral image display sections 58.

Particularly, when the display mode of the group of spiral image display sections 58 is altered to the one described above by referring to FIG. 68 and the above-described technique of altering the image size is employed, the group of spiral image display sections 58 appears in a manner as shown in FIGS. 84 through 93. Note that in FIGS. 84 through 93, an image showing a strong movement appears in an isolated manner and it is assumed that the display rates of the image display sections $W57_1$ through $W57_n$ are same.

As seen from FIGS. 84 through 93, the image display section W57 where the image showing a strong movement is displayed is gradually shifted (W57c through W57l in FIGS. 84 through 93) as an extended image display section $W57_X$ and the image showing a strong movement in the extended image display section $W57_X$ is emphasized as it is displayed with a size larger than the sizes of the other images. Additionally, the image showing a strong movement shows a flowing transition from the distal side toward the proximal side along the virtual time axis TP with the reproduction time lag ΔT.

Figure 94:
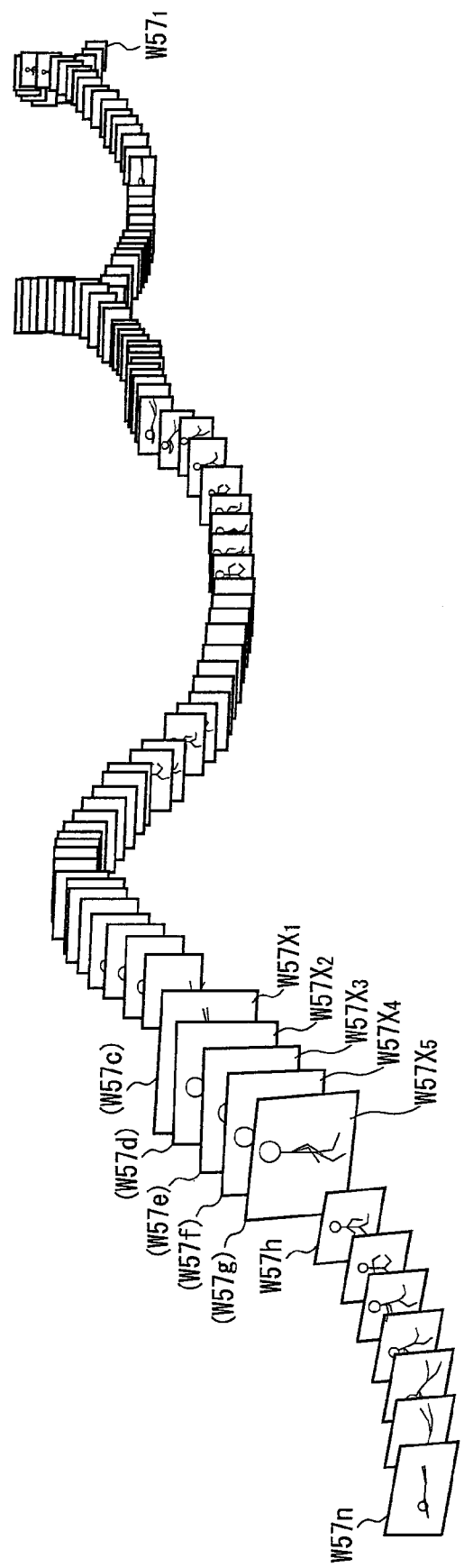
FIG. 94 is a schematic illustration of an exemplary display of transition (11) of enlarged image display sections.

When there is a section of consecutive images that show a strong movement in the reproduced image, the image display sections W57 (W57c through W57g in FIG. 94) displaying the images of the section show a flowing transition with consecutively extended image display sections $W57X_1$ through $W57X_5$ as shown in FIG. 94. Note that, in FIG. 94, it is assumed that the display rates of the image display sections $W57_1$ through $W57_n$ are same as in FIGS. 84 through 93.

Figure 95:
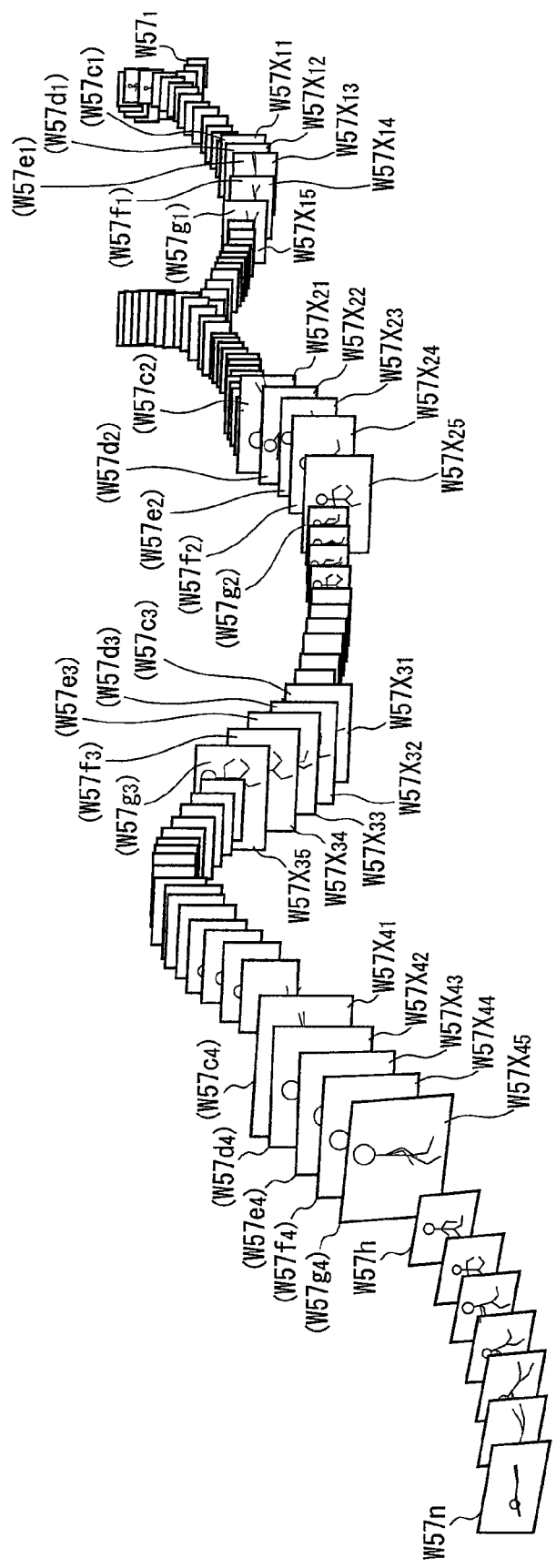
FIG. 95 is a schematic illustration of an exemplary display of transition (12) of enlarged image display sections.

When there are a plurality of sections of consecutive images that show a strong movement in the reproduced image, the image display sections W57 (W57c1 through W57g1, W57c2 through W57g2, W57c3 through W57g3 and W57c4 through W57g4 in FIG. 95) displaying the images of the respective sections show a flowing transition with consecutively extended image display sections $W57_{11}$ through $W57_{15}$, $W57_{21}$ through $W57_{25}$, $W57_{31}$ through $W57_{35}$ and $W57_{41}$ through $W57_{45}$ as shown in FIG. 95. Note that, in FIG. 95, it is assumed that the display rates of the image display sections $W57_1$ through $W57_n$ are same as in FIGS. 84 through 93.

Thus, as images having a strong movement show a flowing transition, the operator can intuitively grasp the contents of the images showing a strong movement such as those at scene changes as images having a strong movement are extended and presented, while being conscious of the entire group of spiral image display sections 58.

When a moving image is being reproduced in the image display section $W57_1$ through $W57_n$ of the group of spiral image display sections 58, it is possible to alter the image size according to the variation of the image without requiring a scrub operation. Then, the operator can intuitively grasp the contents of the images having a strong movement, while being conscious of the entire group of spiral image display sections 58.

Images are displayed with sizes defined respectively for the display types and the display type of each frame is determined according to the movement information thereof in the above-described specific example, and alternatively, for example, it may be so arranged that images are displayed with sizes defined respectively for the display types and the display type of each frame is determined according to the fineness information thereof. Still alternatively, it may be so arranged that images are displayed with sizes defined respectively for the display types and the display type of each frame is determined according to the movement information and the fineness information thereof. When images are displayed with sizes defined respectively for the display types and the display type of each frame is determined according to the fineness information thereof, it is possible to display an image of the display type that is determined according to fineness information showing a large extent of fineness with a large size. Then, the operator can intuitively recognize the image in detail.

When images are displayed with sizes defined respectively for the display types and the display type of each frame is determined according to the movement information and the fineness information thereof, it is possible to display an image of the display type that is determined according to movement information showing a large extent of movement with a large size in the corresponding one of the image display sections $W57_1$ through $W57_n$ that are framed in a color that is deepened when the fineness information thereof shows a large extent of fineness. With such an arrangement, the operator can further intuitively recognize the image in detail.

While the size of an image is altered according to the display type of the attentional frame in the above-described description, it is also possible to alter the size of an image in response to a scrub knob operation 67 by the operator.

When the operator is searching for a desired image and paying not much attention to the images being displayed in the group of spiral image display sections 58, he or she may move the scrub knob 67 fast. Inversely, when the operator is paying much attention to the images being displayed in the group of spiral image display sections 58, he or she may move the scrub knob 67 slowly.

Then, it can be so arranged that the images are displayed with the default size when the operator is moving the scrub knob 67 fast, whereas the images are displayed with a size larger than the default size when the operator is moving the scrub knob 67 slowly. With such an arrangement, the operator can find the desired image with ease.

While the scrub bar 66 having a scrub knob 67 is provided as means that is operated when specifying a frame to be displayed in the group of spiral image display sections 58 and the frame to be displayed in the group of spiral image display sections 58 is specified according to the position of the scrub knob 67 for the above-described scrub operation, it is also possible to arrange in such a way that the operator can specify the frame to be displayed in the group of spiral image display sections 58 by operating a jog dial or a shuttle ring (which is not a GUI one but a real one).

When a moving image is being reproduced in the image display section $W57_1$ through $W57_n$ of the group of spiral image display sections 58, it is possible to alter the image size according to the variation of the image without requiring a scrub operation by means of a jog dial or a shuttle ring. Then, the operator can intuitively grasp the contents of the images having a strong movement, while being conscious of the entire group of spiral image display sections 58.

The variations (movement information, fineness information) that represent the extent of change in the image data of a moving image are determined for each frame and the display type of each frame is determined on a frame by frame basis in the above-described scrub operation. Then, the various processes relating to scrub are executed by using the display types. However, when the moving image is accompanied by audio data, the display type may be determined according to the level (power) of the audio data or the value that shows the extent of change of the audio data. Thus, for example, a frame where the level of audio data changes from low to high (there is an upsurge of sound) may probably show an image that requires attention. Therefore, it may be so arranged that a display type of a high display rate may be selected for displaying such a frame if the movement information thereof shows a certain extent of variation and a display type of a high resolution may be selected for displaying such a frame if the fineness information thereof shows a certain extent of variation.

While the scrub operation is executed by using the image data of two different types of resolution including the main line data and the proxy data recorded in the memory apparatus 22 in the above description, it is possible to execute the scrub operation alternatively by using image data of a single type of resolution or image data of three or more than three different types of resolution.

Additionally, while it is determined by the display type determining section 1023 of FIG. 51 if there exist consecutive frames not less than the minimum limit number of frames N whose variations are not less than a threshold value or less than a threshold value (determination of continuity) in order to cope with the seek problem in the above-described scrub operation, it is possible to determine the display type of a frame simply by determining if the variation of the frame is not less than a threshold value or less than a threshold value without determining the continuity when there is not seek problem.

Furthermore, while the variation of each frame is determined and the display type of each frame is determined according to the variation thereof in the above-described scrub operation, it is also possible to determine the variation of a plurality of frames and the display type of the plurality of frames.

Figure 96:
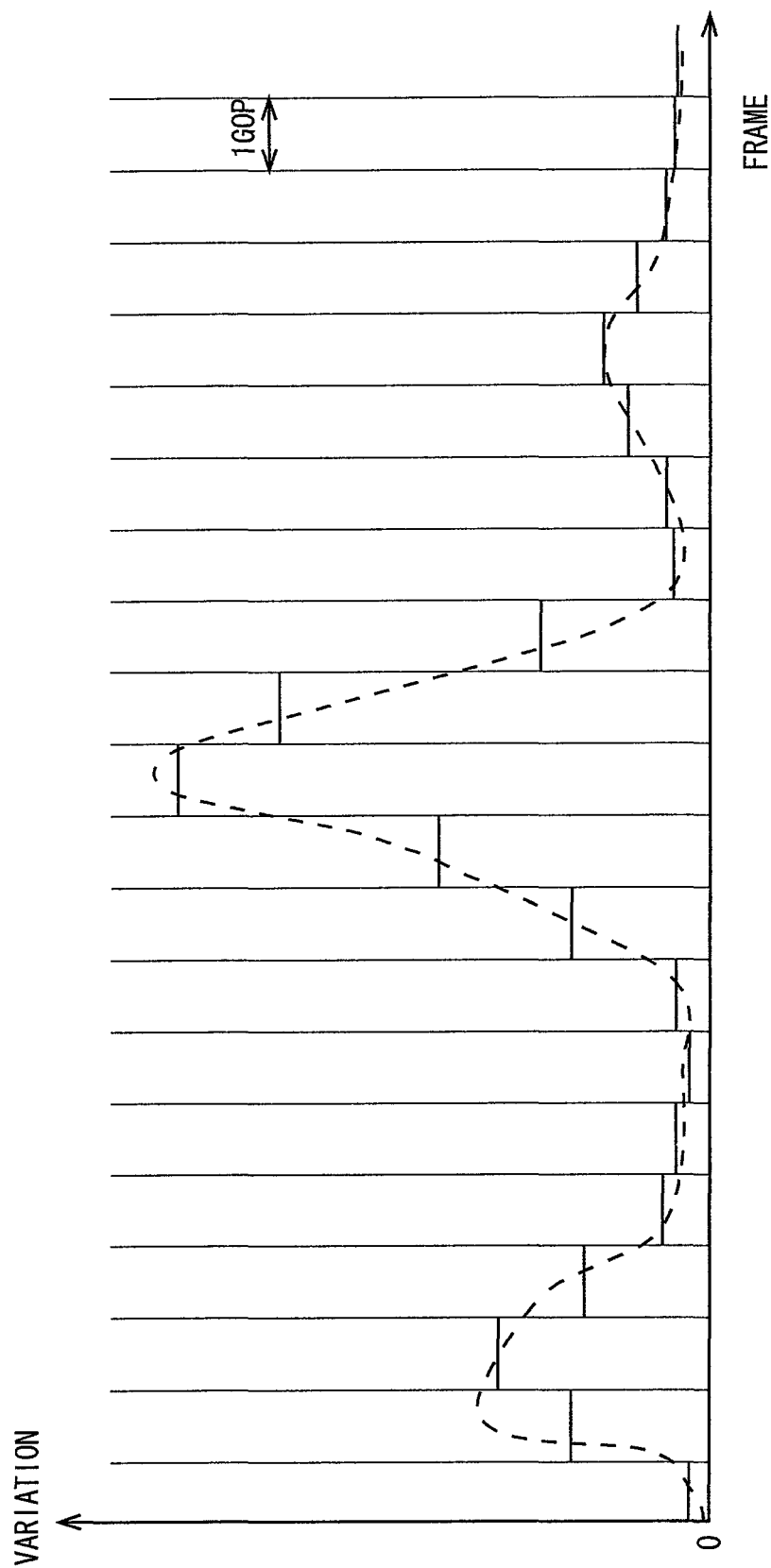
FIG. 96 is a schematic illustration of the variation of each frame of 1 GOP.

FIG. 96 illustrates the variations of units of frames, each unit having a plurality of frames that constitute a GOP. In FIG. 96, the horizontal axis indicates frames and the vertical axis indicates variations.

In FIG. 96, each solid line indicates the variation of a unit of frames that constitute a GOP. The variation of a unit of frames that constitute a GOP may be the average value of the variations of all the frames that constitute a GOP or the variation of the I-th picture of the frames that constitute a GOP.

As shown in FIG. 96, when the variation of each frame of a GOP is determined, it is possible to determine the display type of each (unit) frame of the GOP according to the variation of the frame as in the above-described case of determining the display type of each frame according to the variation thereof.

The display type of the plurality of frames that constitute a GOP can be determined according to the display type of each of the frames that constitute a GOP and also according to the variations of the frames that constitute a GOP.

FIG. 97 illustrates an Fy file that stores the variation of each frame and the display type of each frame.

Assume now that a GOP is constituted by 15 frames. Then, it is possible to determine the display type of the GOP constituted by 15 frames as the display type that is the majority display type among the 15 frames, or the display type that the largest number of frames commonly have in the GOP.

Then, in the case of the GOP constituted by the 15 frames from the first frame to the 15th frame from the top in the Fy file of FIG. 97, the display type V2 has a majority among the display types V1, V2, V3 of the frames so that the display type of the GOP is determined as V2.

For instance, while the display type of the 9th frame from the top in the Fy file of FIG. 97 is V1, the display type of the GOP is V2.

As described above, when the variation and the display type of a GOP constituted by a plurality of frames are determined by determining the variation and the display type of each of the plurality of frames and stored in the Fy file, the capacity (file size) of the Fy file can be lessened if compared with an arrangement where the variations and the display types of all the frames are stored in the Fy file and the load of a process that requires an analysis of the Fy file (file parse) can be reduced.

When preparing an Fy file, encoding image data according to the MPEG system, by determining the variation and the display type of each frame of each GOP, the variation and the display type can be contained in the GOP header in the stream obtained by encoding according to the MPEG system.

In the above-described scrub operation, it is necessary for the decoder 1116 of FIG. 71 to decode image data according to the MPEG system in order to encode image data according to the MPEG system and store them in the memory apparatus 22. According to the MPEG system, when a GOP is constituted by 15 frames, each of the frames is encoded as a picture of one of the three picture types including I (Intra) picture, P (predictive) picture and B (bidirectionally predictive) picture. Out of I, P, B pictures, P picture and B picture are encoded on the basis of the I picture or the P picture that is encoded before them and operates as reference image (an image providing the basis for generating a predictive picture) and hence cannot be decoded after decoding the reference image.

For example, if a GOP is constituted by 15 frames and each of the frames is expressed by I, P or B and a numeral that indicates the order of display, the 15 frames of the GOP may be expressed as B1, B2, I3, B4, B5, P6, B7, B8, P9, B10, B11, P12, B13, B14 and P15.

Assume here that, out of the GOP constituted by the 15 frames of B1 through P15, the 6th P picture P6 from the forefront is encoded by using the 3rd I picture I3 as reference image and the 9th P picture P6 is encoded by using the 6th P picture P6 as reference image, whereas the 15th P picture P15 is encoded by using the 12th P picture P12 as reference image and the 13th B picture B13 is encoded by using the 12th P picture P12 and the 15th P picture P15 as reference images.

In this case, when the 13th B picture B13 becomes the attentional frame to be displayed to the viewer 15, it is not possible to refer to the 12th P picture P12 and the 15th P picture P15 to decode the 13th B picture B13 before decoding the 3rd I picture I3, decoding the 6th P picture P6 by referring to the 3rd I picture I3, decoding the 9th P picture P9 by referring to the 6th P picture P6, decoding the 12th P picture P12 by referring to the 9th P picture P9 and decoding the 15th P picture P15 by referring to the 12th P picture P12. Thus, it is time consuming to decode the B picture B13.

However, if the P pictures P6, P9, P12 and P15 are stored in a separate file referred to as P-to-I file as I pictures I6, I9, I12 and I15 respectively, the decoder 1116 can decode any picture quickly by referring to the pictures stored in the P-to-I file. In the above-described example, the B picture B13 can be decoded in a short period of time by referring to the I pictures I12 and I15 stored in the P-to-I file.

While resolution and image size are applied as parameters relating to display (display parameters) and display rate (frame rate) and reproduction speed v are applied as parameters relating to reproduction (reproduction parameters) in the above-described scrub operation as parameters changed according to the variations, any of various combinations of display parameters and reproduction parameters can be appropriately defined for the purpose of the present invention.

Additionally, the reproduction time lag $\Delta T$ may be applied as reproduction parameter in addition to display rate (frame rate) and reproduction speed v. Then, the reproduction time lag $\Delta T$ may be made large when images change to a large extent and the gaps separating the image display sections W57 may be extended or reduced according to the reproduction time lag $\Delta T$. With this arrangement, when images that change strongly appear, the display mode is changed for them to the operation of searching for an image remarkably easier.

While the scrub operation is described above, the present invention can be applied to variable speed reproductions (n times higher speed reproduction).

As described earlier, when a moving image is displayed in the image display sections $W57_1$ through $W57_n$ of the group of spiral image display sections 58, the image itself appears as if flowing in the group of spiral image display sections 58 so that a scrub effect can be produced without executing the scrub operation.

(5) Drawing Interval Automatic Alteration Feature

When the editing apparatus 2 displays a reproduced image in the image display section $W57_1$ through $W57_n$ by thinning the frames, removing every predetermined ordinal number of frames, it can newly prepare image display sections whose number corresponds to the number of the frames removed for thinning (to be referred to new image display sections whenever appropriate hereinafter) between the image display section W57 ($W57_1$, $W57_2$, ..., or $W57_{n-1}$) that is currently displaying a frame whose variation exceeds a predetermined value (threshold value) and the image/sound W57 ($W57_2$, $W57_3$, ..., or $W57_n$) that displays the frame after the reproduction time lag $\Delta T$ and display the removed frames in the prepared new image display sections.

The process executed by the microprocessor 3 and the GPU 4 for this feature will be described below. It is assumed here for the simplicity of explanation that the frames that constitute a moving image are thinned by removing every predetermined ordinal number of frames and, for example, only the 19th frame among the plurality of frames that are left to constitute the reproduced image is a frame whose variation exceeds a predetermined level (threshold value). Then, the frame is selected as object of attention in the following description.

While the editing image 50 is being displayed, the microprocessor 3 and the GPU 4 thin the frames that constitute the moving image by removing every ordinal number of frames from the 1st through 18th frames whose variations are less than a predetermined level (threshold value) and, after decoding the frames that are left after the thinning, display them sequentially in the image display section $W57_1$ through $W57_n$ of the display section 55 with the reproduction time lags $\Delta T$.

Note that the threshold value for variation can be acquired from the Fy file stored in the memory apparatus 22 in the above-described pre-editing process of the scrub operation.

Figure 98:
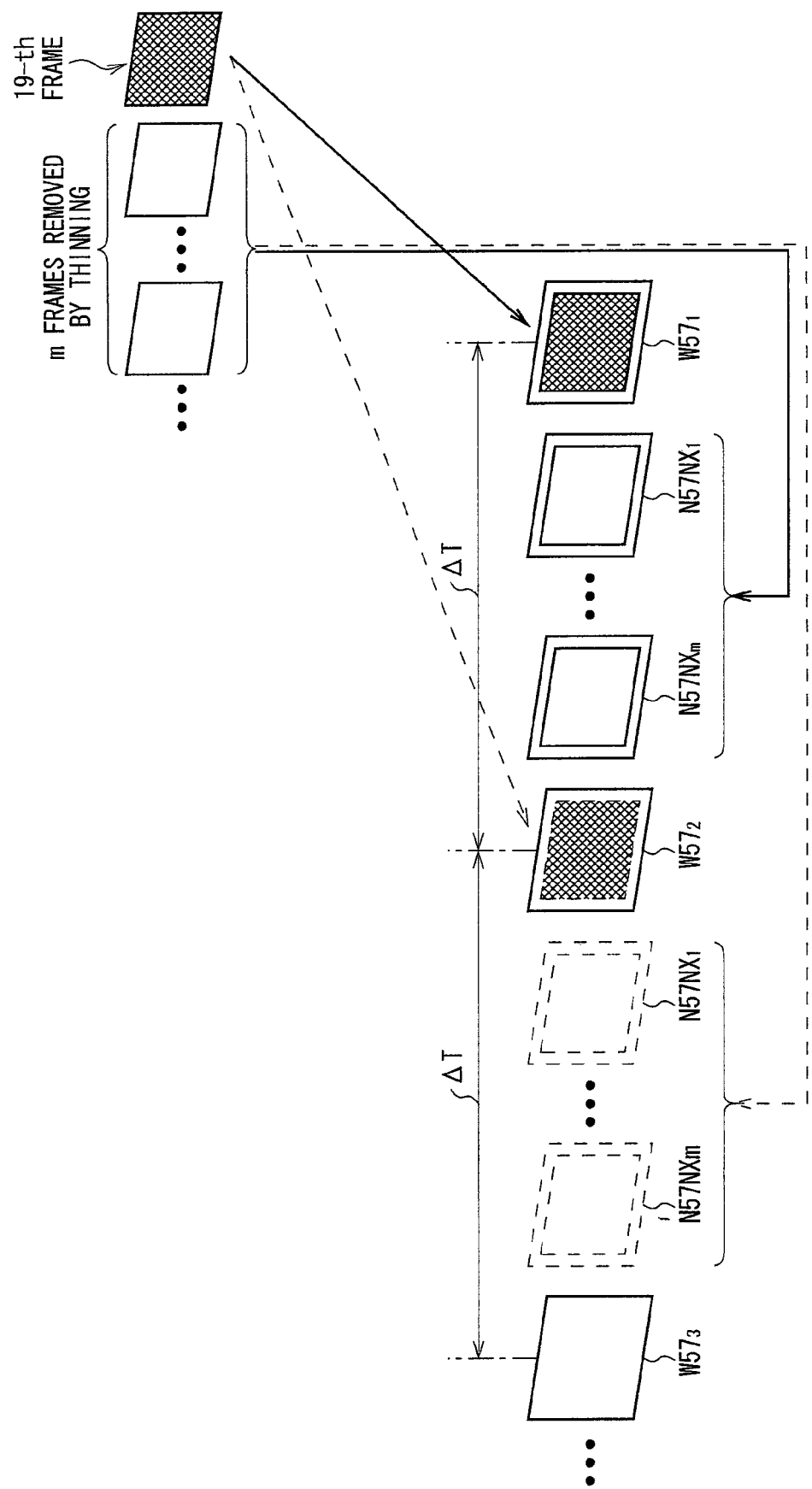
FIG. 98 is a schematic illustration of densifying an image arrangement by reducing the image intervals.

On the other hand, the microprocessor 3 and the GPU 4 stop the thinning process when they recognize the 19th frame whose variation exceeds the predetermined level (threshold value) as shown in FIG. 98 and then sequentially decode the m frames that are supposed to be removed for thinning (to be referred to as thinning frames hereinafter) without altering the display rate unlike the above-described scrub operation.

Then, the microprocessor 3 and the GPU 4 display the 19th image in the image display section $W57_1$ and, at the same time, prepare new image display sections $W57NX_1$ through $W57NX_m$, the number of which is same as that of the m thinning frames. Then, they display the thinning frames respectively in the prepared new image display sections $W57NX_1$ through $W57NX_m$.

The 19th image (frame) is displayed sequentially in the image display sections $W57_2$, $W57_3$, ... with the reproduction time lags $\Delta T$, while the new image display sections $W57NX_1$ through $W57NX_m$ are displayed between the image display section W57 that is currently displaying the frame and the next image display section W57 (between $W57_2$ and $W57_3$, between $W57_3$ and $W57_4$, ...).

Figure 19:
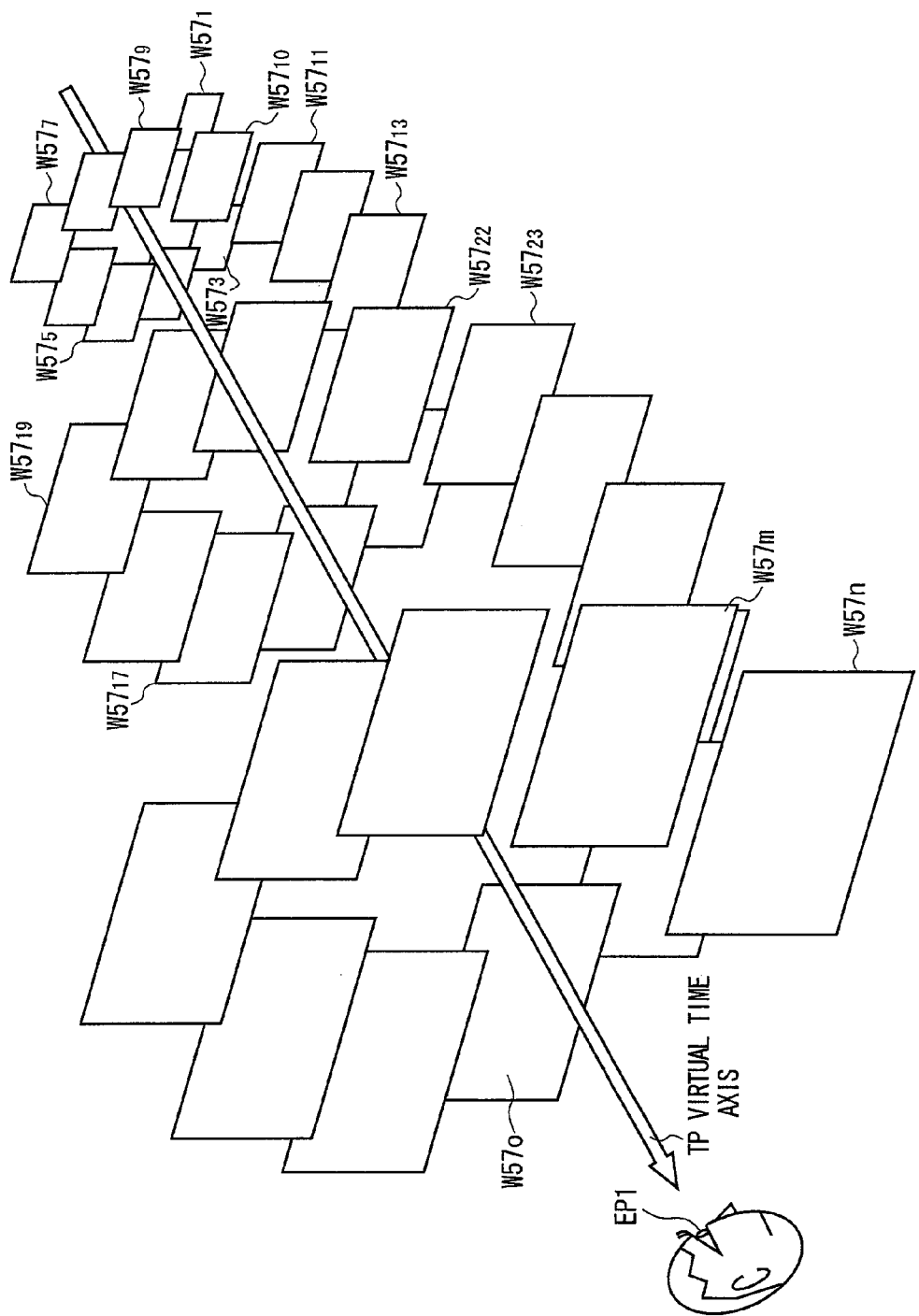
FIG. 19 is a schematic illustration of the spiral structure of the group of spiral image display sections.
Figure 99:
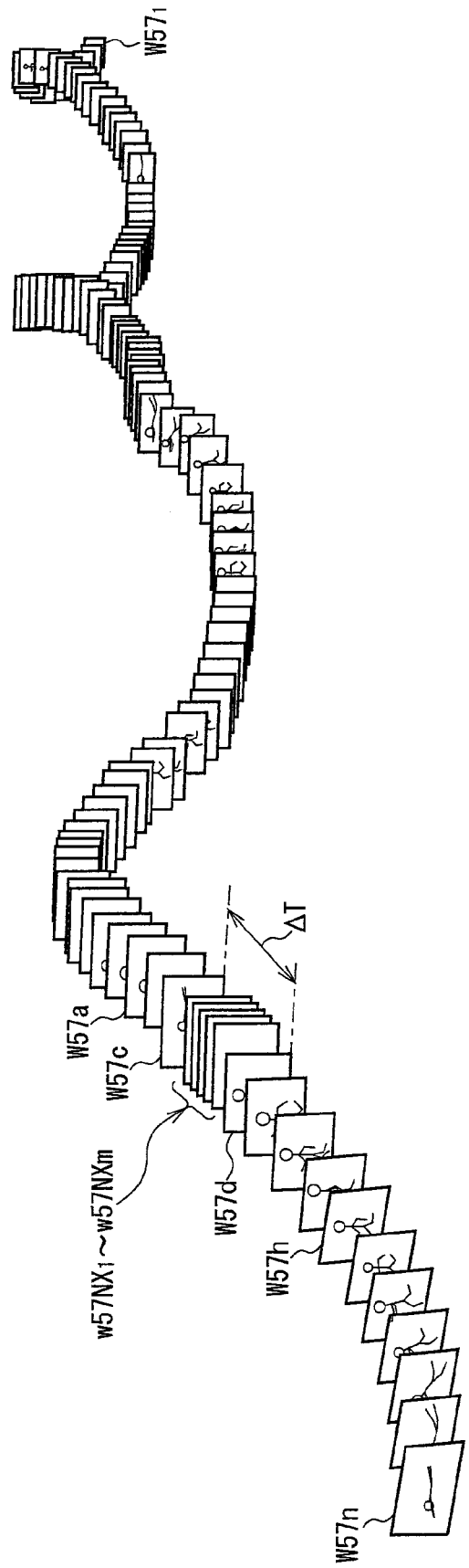
FIG. 99 is a schematic illustration of densification (1) of image arrangement by reducing the image intervals that correspond to the reproduction time lag.
Figure 100:
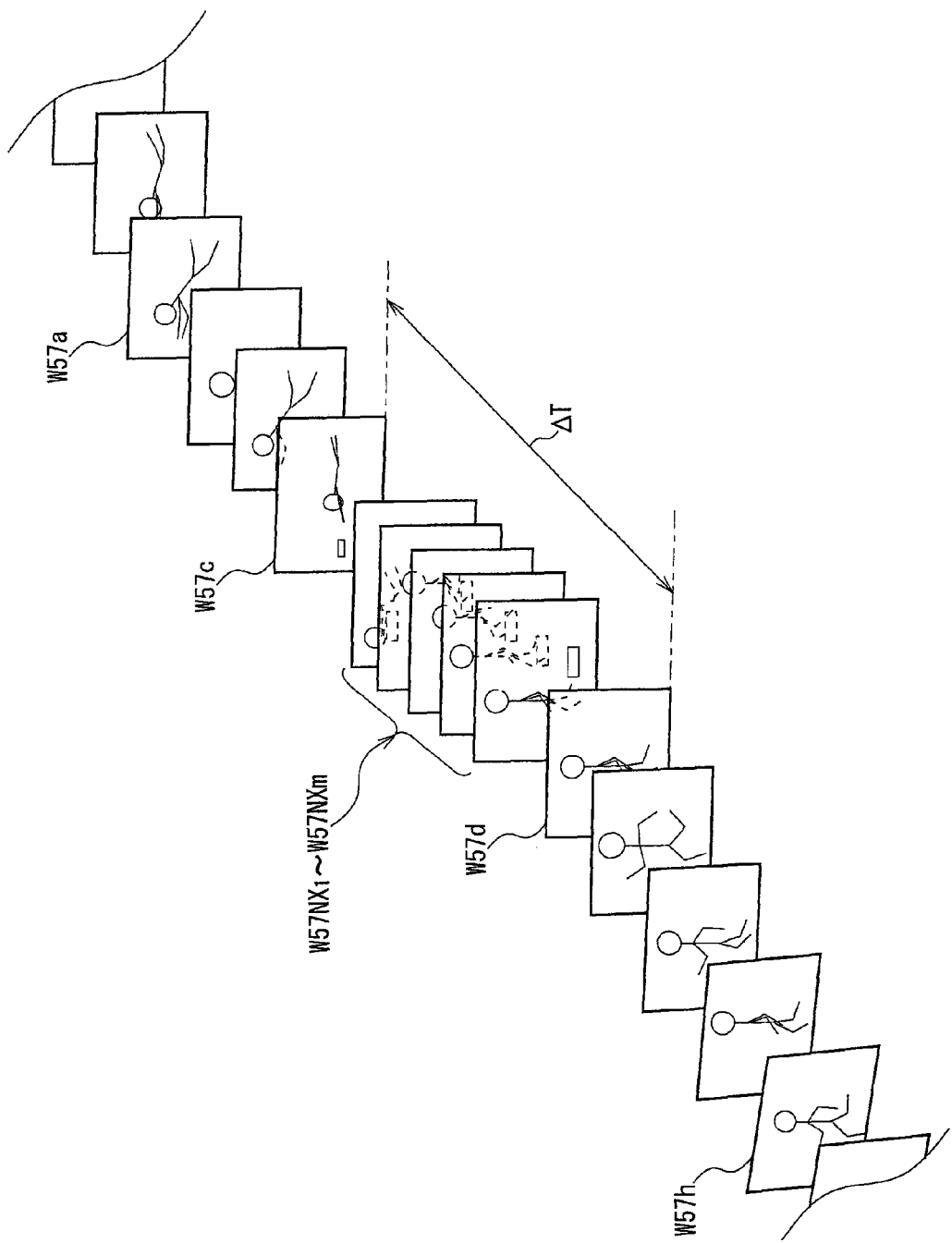
FIG. 100 is a schematic illustration of densification (2) of image arrangement by reducing the image intervals that correspond to the reproduction time lag.

Then, as a result, the transition of drawing in the reproduction time lag $\Delta T$ between the image display section W57c that is currently displaying the image showing a strong movement and the next image display section W57d as viewed in the direction of progress of the virtual time axis TP (FIG. 19) is finely presented in the new image display sections $W57NX_1$ through $W57NX_m$ as shown in FIGS. 99 and 100 so that the operator can intuitively grasp the contents of the image showing a strong movement. Note that m=5 in FIGS. 99 and 100.

The microprocessor 3 and the GPU 4 restarts the thinning process for the frames after the m thinning frames and, after decoding the frames that are left after the thinning, displays them sequentially in the image display sections $W57_1$ through $W57_n$ of the display section 55 with the reproduction time lags $\Delta T$.

In this way, when the editing apparatus 2 thins the frames of a moving image by removing every ordinal number of frames and displays the reproduced image in the image display section $W57_1$ through $W57_n$, it is possible for the editing apparatus 2 not to remove any frame in the reproduced image whose variation exceeds a predetermined level (threshold value) but to prepare new image display sections $W57NX_1$ through $W57NX_m$ between the image display section W57 that is currently displaying the frame whose variation is large and the next image display section W57 (between $W57_2$ and $W57_3$, between $W57_3$ and $W57_4$, ...) and display it in the new image display sections $W57NX_1$ through $W57NX_m$.

While all the frames removed for the purpose of thinning (thinning frames) are objects of display between the image display section W57 that is currently displaying the frame whose variation is large and the next image display section W57 in the above description of the drawing interval alternation technique, it is not necessary to use all the thinning frames as objects of display and an arbitrarily selected number of frames may alternatively be used as objects of display.

It is also possible to change the number of frames that are to be used as objects of display (thinning frames) between the image display section W57 that is currently displaying the frame whose variation is large and the next image display section W57 stepwise according to the variation in such a way that, for example, a first number of frames is used when the variation is not less than a first threshold value and less than a second threshold value, a second number of frames that is greater than the first number of frames is used when the variation is not less than the second threshold value and less than a third threshold value, while a third number of frames that is greater than the second number of frames is used when the variation is not less than the third threshold value.

With this arrangement, the editing apparatus 2 can change the number of frames that are displayed between the image display section W57 that is currently displaying the frame whose variation is large and the next image display section W57 according to the extent of change of the image so that the operator can grasp not only the images being displayed but also the changing part of the reproduced image by way of the number of frames. Then, as a result, the operator can highly intuitively seek for an image.

With the above-described drawing interval alternation technique, it is possible to display thinning frames between the image display section W57 that is currently displaying the frame whose variation is large and the next image display section W57 by changing the number of thinning frames as a function of variation and, at the same time, with a size that changes as a function of variation.

With this arrangement, the editing apparatus 2 can change both the number of frames and the size thereof that are displayed between the image display section W57 that is currently displaying the frame whose variation is large and the next image display section W57 as a function of the extent of change of the image so that the operator can grasp not only the images being displayed but also the changing part of the reproduced image by way of the number and the size of frames. Then, as a result, the operator can highly intuitively seek for an image.

The above-described drawing interval alternation technique can be combined with the scrub operation described earlier. More specifically, it is possible to display thinning frames between the image display section W57 that is currently displaying the frame whose variation is large and the next image display section W57 with the number of thinning frames that changes as a function of variation and, at the same time, change the resolution and the display rate of the images (of the frames other than the thinning frames) according to the display type that corresponds to the variation thereof.

With this arrangement, the editing apparatus 2 can change the number of frames displayed between the image display section W57 that is currently displaying the frame whose variation is large and the next image display section W57 and also the resolution and the display rate of the frame being currently displayed in the image display section W57 according to the extent of change of the image. Then, it is possible to smoothly display the reproduced image to the operator regardless of the speed of moving the scrub knob 67 and have the operator grasp the displayed image in detail. Then, as a result, the operator can highly intuitively seek for an image.

Note that, when a moving image is displayed in the image display sections $W57_1$ through $W57_n$ of the group of spiral image display sections 58, the image itself appears as if flowing in the group of spiral image display sections 58 so that an effect similar to the one illustrated in FIGS. 99 and 100 can be produced for recognition of a moving image in a 3D space without executing the scrub operation.

(6) Operations and Effects

In the editing apparatus 2 of the editing system 1 having the above-described configuration, as the operator selects, drags and drops a desired clip from the clip synopsis display section 51 of the editing image 50 displayed on the display 40, if necessary, subsequently selects the group of spiral image display sections 58 associated with the clip and clips the reproduction button 56, scenes of the reproduced image of the clip are displayed respectively in the image display sections $W57_1$ through $W57_n$ of the group of spiral image display sections 58 with predetermined time lags.

With this image display method, the scenes of the reproduced image of the clip sequentially appear from the distal side toward the proximal side of the screens of the plurality of image display sections $W57_1$ through $W57_n$ that constitutes the group of spiral image display sections 58 with the reproduction time lags ΔT defined for them as the reproduction process is started for the image display sections $W57_1$ through $W57_n$. Thus, the scenes can give a feeling of depth to the operator.

Then, with the editing apparatus 2, when the operator searches for the frame of a change of scene, he or she is not forced to do a cumbersome operation of moving frames one by one and can intuitively search for the frame with ease if compared with a comparable conventional editing image 2001 (FIG. 104) in which the operator is forced to visually search for a desired frame, while moving the frames one by one of the two-dimensional reproduced image displayed in the monitor section 2003, because the same reproduced image is sequentially displayed in the image display section $W57_1$ through $W57_n$ with the reproduction time lags ΔT in the editing image 50.

Particularly, the microprocessor 3 of the editing apparatus 2 displays the group of spiral image display sections 58 having a spiral structure by way of the image display sections $W57_1$ through $W57_n$ that are arranged spirally so that all the image display sections $W57_1$ through $W57_n$ are displayed in a single image of the display section 55 and none of them are hidden by others to allow the operator to do the operation of searching a desired scene and other editing operations with ease.

This provides an important advantage when the editing apparatus 2 stops all the frames of the reproduced image in the image display sections $W57_1$ through $W57_n$ because still images of the frames neighboring the desired frame are displayed in the image display section $W57_1$ through $W57_n$ of the group of spiral image display sections 58 with time lags so that the operator does not have to search for the desired frame, while moving frames one by one to a great advantage on the part of the operator.

Additionally, the editing apparatus 2 displays frames of a reproduced image in the form of a moving image in a concerted manner in the image display section $W57_1$ through $W57_n$ of the group of spiral image display sections 58 with the reproduced time lags ΔT so that, when there is a change of scene, the display of the change of scene is updated successively so as to be sequentially shifted from the proximal side to the distal side of the image display sections $W57_1$ through $W57_n$. Thus, the operator can intuitively do the operation of searching for a desired scene and other editing operations, while effectively feeling the flow of time (the reproduction speed and the direction of reproduction) in the direction of progress of the reproduced image in the entire group of spiral image display sections 58.

When the editing apparatus 2 reverses the sequence of frames of the reproduced image displayed in the image display sections $W57_1$ through $W57_n$, the operator can intuitively do the operation of searching for a desired scene and other editing operations, while effectively feeling a sensation that the entire group of spiral image display sections 58 is moving away to the distal side.

Since the group of spiral image display sections 58 is arranged in a 3D virtual space on the internal memory of the GPU 4 of the editing apparatus 2, the editing apparatus 2 can move the viewpoint toward the distal side of the vortex of the spiral by way of the sub 3D space image IM1 and the character CA1 having a coordinate system same as the 3D virtual space and change the display mode of the group of spiral image display sections 58 to the one that allows them to be seen from an internal viewpoint after the move.

Thus, if the reproduced image that is displayed in the image display sections $W57_1$ through $W57_n$ is temporarily stopped and when the editing apparatus 2 moves the viewpoint toward the distal end of the vortex of the spiral and displays the frames, while changing the display mode of the group of spiral image display sections 58, the editing apparatus 2 gives the operator an impression that he or she is moving into the future passing through the center of the vortex of the spiral. Thus, it is possible to provide a highly entertaining GUI (graphical user interface).

Additionally, the viewpoint and the direction of the watching eyes of the operator are shifted relative to the group of spiral image display sections 58 according to the relative positional relationship between the sub 3D space image IM1 and the character CA1 so that the display mode of the group of spiral image display sections 58 can be changed and displayed in the form of a belt (see FIGS. 27 through 32, etc.), when the viewpoint is moved to the outside of the circle formed by the plurality of image display sections $W57_1$ through $W57_n$ of the group of spiral image display sections 58. Then, it is possible to have the operator imagine the reproduction time of the entire clip from the total length of the group of spiral image display sections 58 and shift the entire clip to a position or an angle that facilitate the editing operation of the operator.

Furthermore, various operations including cutting out individual clips, editing a plurality of clips and checking the edited image and so on can be realized within a single display section 55 in the editing apparatus 2 so that it is no longer necessary to do cumbersome operations as in the case of conventional editing apparatus that require to use the monitor section 2003 of the editing image 2001 for cutting clips, the stream board section 2004 and the timeline section 2005 for editing processes and the monitor section 2003 for checking the edited image. Thus, it is possible to facilitate not only so-called image searching operations but also the entire editing operation.

Finally, it is possible to select either "main sound output mode" or "all sound output mode" as sound output mode when displaying a reproduced image in the image display sections $W57_1$ through $W57_n$ of the group of spiral image display sections 58 of the editing apparatus 2. Thus, the operation of searching for a desired video/audio part by means of output sounds can be facilitated by switching the sound output mode appropriately according to the contents of the reproduced sounds of the clip, which are the object of editing.

More specifically, when the "all sound mode" is selected as sound output mode in the editing apparatus 2, all the reproduced sounds that accompany the frames of the reproduced image being displayed in the image display sections $W57_1$ through $W57_n$ of the group of spiral image display sections 58 that is operated are output from the speaker 41 with volumes that are adjusted in such a way that the sounds of the frames of the reproduced image in the image display sections $W57_1$ through $W57_m$ remote from the reference image display section $W57_n$ are made small. Thus, it is possible to output the sounds three-dimensionally to make the operation of searching for a desired image/sound part according to the output sounds so much easier. This arrangement can not only make the editing operation easier but also output sounds to give out a feeling of depth that has never been experienced simply because that the reproduced image is displayed in the form of a spiral belt.

The editing apparatus 2 according to the present invention generates image data of the plurality of images to be displayed in the plurality of image display sections $W57_1$ through $W57_n$ of the editing image 50. Additionally, the editing apparatus 2 decides the display type of the picture (frame) to be displayed in the corresponding each of the image display sections $W57_1$ through $W57_n$ on a picture by picture basis according to the variation that expresses the extent of change of the image data of the picture in the video/audio signals of the reproduced image to be displayed (see FIGS. 33 through 70, etc.).

Then, the editing apparatus 2 alters the resolution and the display rate of each of the displayed images that correspond to the image data according to the type information indicating the display type of each picture and has the images of the image data sequentially displayed at the respective positions of the editing image 50 in the form of a moving image with the resolution and at the display rate that are altered for the images with display time lags (see FIGS. 71 through 98, etc.).

Thus, since the editing apparatus 2 can display the images of a moving image sequentially in the proper order of display with time lags on the editing image 50 so that it can draw the contents (the story) of the images so as to make them appear as if flowing. Then, as a result, it is possible to allow the operator to search for an image, intuitively grasping the contents of the moving image, and hence search for the editing points (the in point and the out point) with ease.

Additionally, when the editing apparatus 2 displays the images of a moving image sequentially with time lags, it does not display all the image in a same display mode but it displays all the images to be displayed with a resolution and a display rate that can vary from image to image according to the display type of the image. Still additionally, the display apparatus 2 does not decode all the frames that become the attentional frame but decodes only a necessary frame or necessary frames.

Therefore, if the reproduction speed v is varied, the editing apparatus 2 can draw the contents (the story) of the moving image as if they are flowing and can change the display mode of each image according to the change of the image. Then, as a result, it is possible to allow the operator to search for an image, intuitively grasping the contents of the moving image, and hence search for the editing points (the in point and the out point) with ease.

Furthermore, the editing apparatus 2 arranges the images of a moving image to be displayed sequentially with time lags in the form of a three-dimensional spiral. Thus, if compared with images arranged simply horizontally or vertically, it is possible to present many images, maintaining the temporal continuity thereof. Then, the operator can accurately check if an image is an object of editing or not, taking long time, so that consequently it is possible to raise the efficiency of searing for an image.

Thus, with the above-described arrangement, the images (frames) of the reproduced image of the selected clip are arranged in the form of a three-dimensional spiral with reproduction time lags ΔT and displayed in the proper display order to realize a display mode that provides the reproduced image with a temporal depth and easiness of searching for an image. Thus, it is possible to realize an editing system that allows the operator to intuitively search for a desired image part with ease and facilitates the editing operation if compared with the conventional editing image 2001 where images of a reproduced image are arranged one-dimensionally and the operator searches for a desired image part, constantly viewing the reproduced image.

Additionally, when the editing apparatus 2 displays display the images of a moving image in the image display sections $W57_1$ through $W57_n$ sequentially with time lags, it does not display all the images with in the same display mode but it displays all the images to be displayed with a resolution and a display rate that can vary from image to image according to the display type of the image. Still additionally, the display apparatus 2 does not decode all the frames that become the attentional frame but decodes only a necessary frame or necessary frames. Then, as a result, it is possible to allow the operator to search for an image, intuitively grasping the contents of the moving image, and hence search for the editing points with ease.

As described above, when the operator displays the reproduced image of the selected clip on the display screen and searches for a desired scene, he or she simply repeats an operation of variable replay (scrub replay) for a number of times on the display frame. A prime object of the above-described arrangement of the present invention, on the other hand, is to display the reproduced image in such a way that the operator can intuitively check the predetermined image with ease as the reproduced image of the selected clip shows (changes like) "a time series move (flowing move)" on the display screen.

Another prime object of the above-described arrangement of the present invention is to adaptively change the display parameters, the reproduction parameters and the display type according to the processing capacity of the system (CPU/GPU processing capacity, data transfer rate of the storage storing clips, the seek time, etc.) in order to facilitate the operation of searching for the desired scene in the image searching process so that the operator can intuitively check the reproduced image with ease.

(7) Second Embodiment (7-1) Configuration of Editing System Formed by Using this Embodiment In FIG. 1, reference numeral 90 denotes the editing system of the second embodiment. The configuration of this editing system is same as the editing system 1 (FIG. 1) of the first embodiment except that the sizes of the image display sections $W57_1$ through $W57_n$ of the group of spiral image display sections 58 (FIG. 2) displayed in the display section 55 of the editing image 50 are not only varied in such a way they gradually become larger toward the proximal side from the distal side but also as a function of the sound levels of the reproduced sounds that accompany the frames of the reproduced images displayed in the image display sections $W57_1$ through $W57_n$. Thus, the editing apparatus 2 of this embodiment can execute various processes like the editing apparatus 2 of the first embodiment.

In the case of this editing system 90, the microprocessor 3 of the editing apparatus 2 has the image display sections $W57_1$ through $W57_n$ of the group of spiral image display sections 58 display the reproduced image of the selected clip according to the video/audio signals of the clip applied to it from the memory apparatus 22 by way of the PCI bus 15 and the south bridge 6 as illustrated in FIG. 2 and also sequentially notifies the GPU 4 of the sound levels of the reproduced sounds (the signal levels of the audio signals) that accompany the respective frames of the reproduced images.

Then, the GPU 4 determines if the peak level of each of the reproduced sounds is higher than predefined threshold value Thd or not according to the notification from the microprocessor 3 and, if it determines that the peak level is higher than the threshold value Thd, it has the corresponding one of the image display sections $W57_1$ through $W57_n$ displayed with a size larger than the size with which it is ordinarily displayed when it displays the image of the corresponding frame.

For example, if the reproduced images displayed in the image display sections $W57_1$ through $W57_n$ are those illustrated in (A) of FIG. 101 and the sound levels of the reproduced sounds (the signal levels of the audio signals) that accompany the reproduced images are those illustrated in (B) of FIG. 101, the sound levels of the reproduced sounds that accompany the reproduced images displayed respectively in the second through fourth image display sections $W57_i$, $W57_k$, $W57_j$ as counted toward the distal side from the reference image display section $W57_n$ located at the proximal side of the screen are higher than the threshold value Thd so that the image display sections $W57_i$, $W57_k$, $W57_j$ are displayed with respective sizes larger than the other image display sections at this moment as indicated by arrow crosses in (C) of FIG. 101.

In this case, the microprocessor 3 controls the GPU 4 in such a way that the image display sections $W57_i$, $W57_k$, $W57_j$ are displayed with respective magnifications, any of which is made greater than others when the sound level of the reproduced sound that accompanies the corresponding one of the reproduced images displayed in the image display sections $W57_i$, $W57_k$, $W57_j$ is higher than the others.

Thus, in the instance of (B) in FIG. 101, the sound level of the reproduced sound accompanying the reproduced image displayed in the second right side neighboring image display section $W57_i$ from the reference image display section $W57_n$ is highest and the sound levels of the reproduced sounds accompanying the reproduced images displayed respectively in the third and fourth right side neighboring image display sections $W57_k$, $W57_j$ are slightly lower than that and about same at this moment. Thus, the second right side neighboring image display section $W57_i$ from the reference image display section $W57_n$ is enlarged and displayed with the largest magnification and the other image display sections $W57_k$, $W57_j$ are enlarged and displayed with a smaller magnification.

In this way, the editing system 90 can display the reproduced images in such a way that the operator can recognize the sound levels of the reproduced sounds accompanying the reproduced images displayed in the image display sections $W57_1$ through $W57_n$ of the group of spiral image display sections 58 so that the operator can intuitively recognize the contents of the clip and do the operation of searching for an image and other editing operations with ease.

(7-2) Sequence of Enlarging and Displaying Image Display Sections

Figure 102:
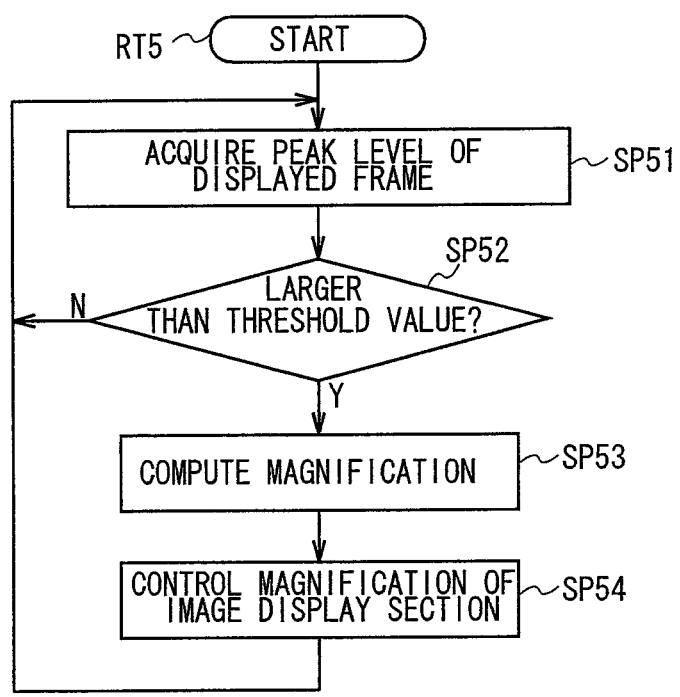
FIG. 102 is a flowchart, illustrating the enlarged display process sequence of an image display section.

In actuality, the microprocessor 3 of the editing apparatus 2 of the editing system 90 executes the process of enlarging and displaying the image display sections $W57_l$, $W57_k$, $W57_j$ according to the sound levels of the reproduced sounds that accompany the reproduced images displayed in the image display sections the $W57_1$ through $W57_n$, following the image display section enlarging/displaying process sequence RT5 illustrated in FIG. 102, according to the control program stored in the hard disk drive 7 (FIG. 1).

More specifically, as the microprocessor 3 ends the operation of having the reproduced image of the clip, following the reproduction process sequence RT2 illustrated in FIG. 10, it has the GPU 4 start the image display section enlarging/displaying process sequence RT5 in parallel with the above-described display alteration process sequence RT2 illustrated in FIG. 10.

Namely, in Step SP51, the microprocessor 3 of the editing apparatus 2 acquires the peak levels of the reproduced sound that accompanies the displayed frame (e.g., a frame) in one of the image display sections $W57_1$ through $W57_n$ of the group of spiral image display sections 58 displayed in the display section 55 and moves to the next step, or Step SP52.

In Step SP52, the microprocessor 3 of the editing apparatus 2 determines if the peak level of the reproduced sound is higher than the predefined threshold value Thd or not. It returns to Step SP5 when the result of the determination is negative, whereas it goes to the next step, or Step SP53 when the result of the determination is positive.

In Step SP53, the microprocessor 3 of the editing apparatus 2 computes the magnification for each of the image display sections $W57_1$ through $W57_n$ where the peak level of the reproduced sound is determined to be higher than the predefined threshold value Thd and then moves to Step SP54, where it controls the magnification of the corresponding one of the image display sections $W57_1$ through $W57_n$ according to the outcome of the computation.

In this way, the corresponding one of the image display sections $W57_1$ through $W57_n$ of the group of spiral image display sections 58 displayed in the display section 55 of the editing image 50 is enlarged and displayed with the magnification computed in Step SP53 from the ordinary size (the size when the peak level is not higher than the threshold value Thd).

Subsequently, the microprocessor 3 of the editing apparatus 2 returns to Step SP51 and executes the process of Steps SP51 through SP54 in the same manner. Thereafter, it repeats the process sequentially and cyclically, switching the object of the process selected from the image display sections $W57_1$ through $W57_n$.

In this way, when the sound level of the reproduced sound that accompanies the reproduced image displayed in any of the image display sections $W57_1$ through $W57_n$ of the group of spiral image display sections 58 is high, the microprocessor 3 of the editing apparatus 2 can display the image display section with a size that corresponds to the sound level out of the image display sections $W57_1$ through $W57_n$.

(7-3) Operations and Effects of the Second Embodiment

With the above-described arrangement of the second embodiment, when the sound level of the reproduced sound that accompanies the reproduced image displayed in any of the image display sections $W57_1$ through $W57_n$ of the group of spiral image display sections 58 is high, the microprocessor 3 of the editing apparatus 2 can display the image display section with a size that corresponds to the sound level out of the image display sections $W57_1$ through $W57_n$.

With the above-described image display technique, the operator can recognize the sound levels of the reproduced sounds accompanying the reproduced images displayed in the image display sections $W57_1$ through $W57_n$ with the sizes of the respective image display sections $W57_1$ through $W57_n$ of the group of spiral image display sections 58 so that the operator can intuitively recognize the contents of the clip and do the operation of searching for an image and other editing operations with ease.

Thus, with the above-described arrangement, when the sound level of the reproduced sound that accompanies the reproduced image displayed in any of the image display sections $W57_1$ through $W57_n$ of the group of spiral image display sections 58 is high, the image display section is displayed with a size that corresponds to the sound level out of the image display sections $W57_1$ through $W57_n$. Thus, this embodiment provides both the visual effect of displaying the image display sections $W57_1$ through $W57_n$ as a moving image in the form of a three-dimensional spiral in a coordinated manner and the display effect of coordinating the reproduced images and the reproduced sounds of the image display sections $W57_1$ through $W57_n$ to allow the operator to do the operation of searching for an image and other editing operations remarkably easier. Thus, the editing system 90 of this embodiment can facilitate editing operations much easier if compared with the editing system 1 of the first embodiment.

(8) Other Embodiments

While the editing apparatus 2 of the first embodiment and that of the second embodiment are non-linear editing apparatus, the present invention is not limited thereto and also applicable to editing apparatus of various different forms and various image display control apparatus other than editing apparatus.

Now, possible applications of the present invention will be described below. When, for example, the reproduced image is a TV image (recorded TV image), applications where a scene containing an image of an opaque card is extracted and the scenes before and after the scene that contains the image of the opaque card for a predetermined period of time are identified as attentional part so as to change the display parameters and the reproduction parameters (in such a way that the gaps of display regions are made wide and the sizes of display regions are made large to reproduce high resolution images) may be conceivable other than extracting characteristic quantities contained in an image. Similarly, applications where a CM is identified by way of scene change detection so as to change the display parameters and the reproduction parameters (in such a way that the gaps of display regions are made narrow and the sizes of display regions are made small to reproduce low resolution images) may also be conceivable.

Additionally, in the case of music live images, music promotion images and sport images, applications where a scene showing a high sound level is identified as an important scene so as to change the display parameters and the reproduction parameters (in such a way that the gaps of display regions are made wide and the sizes of display regions are made large to reproduce high resolution images) may be conceivable.

When the peak level of the sound level of the reproduced sound of an image is higher than a predefined threshold value Thd, the corresponding one of the image display sections $W57_1$ through $W57_n$ for displaying the image of the corresponding frame is displayed with a size larger than the ordinary display size in the above description of the second embodiment. However, the present invention is by no means limited thereto and the size of each of the image display sections $W57_1$ through $W57_n$ may be enlarged or reduced according to the sound level of the reproduced sound of the corresponding image without providing any threshold value Thd.

While the image display sections $W57_1$ through $W57_n$ on the screen of the display section 55 are displayed in a fixed state in the above description of the first and second embodiments, the present invention is by no means limited thereto and it may alternatively be so arranged particularly when the reproduction speed v of the reproduced images of the image display sections $W57_1$ through $W57_n$ is very slow and the reproduction time lag ΔT is not greater than a frame that the image being displayed in each of the image display sections $W57_1$ through $W57_n$ is not updated and the positions of the image display sections $W57_1$ through $W57_n$ are shifted sequentially in such a way that the entire image display sections $W57_1$ through $W57_n$ appear as if they were moving in the direction of reproduction. Then, the operator can visually check the group of images being displayed while they are reproduced highly smoothly at low speed.

For example, the editing apparatus 2 may be so adapted that it stops the reproduced images of the image display sections $W57_1$ through $W57_n$ without updating and sequentially shift the positions of the image display sections $W57_1$ through $W57_n$ on the screen to make the reproduced images appear as if they are being shifted all together from the distal side toward the proximal side on a frame by frame basis at low speed.

While the editing apparatus 2 of the first embodiment and that of the second embodiment have a configuration as illustrated in FIG. 1 in the above description, the present invention is by no means limited thereto and an editing apparatus according to the present invention can be applied to image processing apparatus of various different configurations. Applications of the present invention include computers, video cameras, digital cameras, game machines, portable information terminals (portable computers, portable telephones, portable game machines) and storage devices (e.g., optical disk storages, homer servers) as well as processing boards and processing cards equipped with the functional features according to the present invention. However, any image processing apparatus according to the present invention comprises a cabinet, a signal processing section and an external interface as common components, which are combined with one or more than one peripheral devices according to the form of the commodity. For example, if an image processing apparatus according to the present invention is a video camera or a digital camera, it comprises a camera unit and a write circuit for storing the picked up image data in a memory medium in addition to the above listed components. If an image processing apparatus according to the present invention is a portable telephone or some other electronic apparatus having a communication feature, it comprises a transmission/reception circuit and an antenna in addition to the above listed components.

While the microprocessor 3 starts the control program stored in the hard disk drive 7 as image processing program and executes a display change process that corresponds to the viewpoint relative to the group of spiral image display sections 58 in the above-described first and second embodiments, the present invention is by no means limited thereto and alternatively it may be so arranged that the microprocessor 3 executes a display change process when a program storage medium storing the control program is installed in the microprocessor 3.

Program storage mediums that can be used for storing the control program for executing a display change process and installed in the hard disk drive 7 to bring the control program into a state of being ready for execution typically include floppy disks (tradename), CD-ROMs (compact disk-read only memories), DVDs (digital versatile disks) and other package mediums as well as semiconductor memories and magnetic disks where the control program can be stored temporarily or permanently. Means that can be used for storing the control program in program storage mediums include local area networks, Internet, digital satellite broadcasting and other wired and wireless telecommunication mediums. The control program can also be stored by way of routers, modems and other various communication interfaces.

INDUSTRIAL APPLICABILITY

The present invention can find applications widely in the field of non-linear editing apparatus, other editing apparatus and various image display control apparatus for displaying images other than editing apparatus.

EXPLANATION OF REFERENCE SYMBOLS 1, 90 . . . EDITING SYSTEM, 2 . . . EDITING APPARATUS, 22 . . . MEMORY APPARATUS, 3 . . . MICROPROCESSOR, 4 . . . GPU, 5 . . . XDR-RAM, 37 . . . OPERATION CONTROLLER, 38 . . . MOUSE, 39 . . . KEYBOARD, 40 . . . DISPLAY, 41 . . . SPEAKER, 50 . . . EDITING IMAGE, 55 . . . DISPLAY SECTION, W571 THROUGH W57N . . . IMAGE DISPLAY SECTION, 58 . . . GROUP OF SPIRAL IMAGE DISPLAY SECTIONS, IM1 . . . SUB 3D SPACE IMAGE, CA1 . . . CHARACTER

The invention claimed is:

1. An image processing apparatus comprising:
an image generating processing circuit configured to generate display video data of a plurality of images to be displayed respectively in a plurality of image display sections on a display screen from video data;
a display type determining processing circuit configured to determine display types indicating display modes of displaying the pictures of the video data on a picture by picture basis or Group of Pictures (GOP) by GOP basis according to image variations expressing the extents of change of the video data or sound variations expressing the extents of change of the audio data corresponding to the video data;
a parameter altering processing circuit configured to alter the display parameters or the reproduction parameters corresponding to the display video data according to the type information expressing the display type on a picture by picture basis or GOP by GOP basis as determined by the display type determining processing circuit;
an image processing circuit configured to display the images to be displayed in the form of moving image on the display screen with time lags in the display sequence, using the display parameters or the reproduction parameters altered by the parameter altering processing circuit, the image processing circuit being configured to display the display video data on the display screen as a group of spatial image display sections, a plurality of image display sections being arranged and displayed in a form of a spiral on the display screen and linked in the displaying order, a diameter at a section of the spiral that is closer to an origin of the spiral being smaller than a diameter at another section of the spiral that is farther from the origin; and
a sound processing circuit configured to output, in response to an instruction to output sound, sound corresponding to the plurality of image display sections such that a volume of sound at the section of the spiral that is closer to the origin of the spiral is lower than a volume of sound at the another section of the spiral that is farther from the origin.

2. The apparatus according to claim 1, wherein
the display types indicate the resolutions for respectively displaying the pictures of the video data or the display rates for respectively displaying the pictures of the video data; and
the image processing circuit has the pictures of the video data display with the resolutions or at the display rates indicated by the respective display types.

3. The apparatus according to claim 2, wherein
the image variations are fineness information expressing the extents of spatial change of the pictures of the video data, and
the display type determining processing circuit is configured to determine the display type of each of the pictures of the video data as high resolution type showing a high resolution or low display rate type showing a low display rate when the extent of spatial change of the picture as expressed by the fineness information is large.

4. The apparatus according to claim 2, wherein
the image variations are movement information expressing the extents of temporal change of the pictures of the video data, and
the display type determining processing circuit is configured to determine the display type of each of the pictures of the video data as low resolution type showing a low resolution or high display rate type showing a high display rate when the extent of temporal change of the picture as expressed by the movement information is large.

5. The apparatus according to claim 1, further comprising:
a display type acquiring processing circuit configured to acquire the display type of each of the pictures specified by a picture specifying operation bar that is operated when the picture of the video data to be displayed is specified; and
the parameter altering processing circuit is configured to alter the display parameters or the reproduction parameters that correspond to the display video data according to the display type acquired by the display type acquiring processing circuit.

6. The apparatus according to claim 5, wherein
a still image type indicating display of a still image is added as display type;
the display type determining processing circuit is configured to determine the display type as still image type indicating display of a still image; and while
the image processing circuit has the image displayed directly before displayed once again when a section where pictures of the still image type are arranged consecutively is specified by the picture specifying operation bar out of the pictures in time series of the video data.

7. The apparatus according to claim 6, wherein
the picture specifying operation bar is a bar having a movable knob;
the pictures of the video data are assigned to the small sections produced by dividing the movable range where the knob is movable in time series; and while
the image processing circuit is configured to display the picture of the video data assigned to the small section where the knob is located.

8. The apparatus according to claim 7, further comprising:
a move determining processing circuit configured to determine if the knob is moved or not with a cycle period corresponding to the display type of the picture of the video data assigned to the small section where the knob is located, and
when the move determining processing circuit judges that the knob is moved, the image processing circuit is configured to display the picture of the video data assigned to the small section where the knob is located after the move.

9. The apparatus according to claim 7, further comprising:
a move determining processing circuit configured to determine if the knob is moved or not with an image display cycle period corresponding to the display type of the picture of the video data assigned to the small section where the knob is located, and
when the move determining processing circuit judges that the knob is not moved, the image processing circuit is configured to display the picture of the video data displayed directly before.

10. The apparatus according to claim 1, wherein
the image variations include fineness information indicating the extents of spatial change of the pictures of the video data on a picture by picture basis or GOP by GOP basis or movement information indicating the extents of temporal change of the pictures of the video data on a picture by picture basis or GOP by GOP basis; and
one of the fineness information and the movement information is stored in a file as metadata.

11. The apparatus according to claim 1, wherein
the display parameters include the sizes of the image display sections or the images of the video data on the display screen or the display position gaps of the image display sections or the images of the video data on the display screen.

12. The apparatus according to claim 11, wherein
the sizes for displaying pictures of the display types are predefined, and
the image processing circuit is configured to display the pictures of the video data with the sizes predefined for the display types.

13. The apparatus according to claim 1, wherein
the reproduction parameters include at least the resolutions of the display video data, the frame rate and the reproduction speed.

14. The apparatus according to claim 1, wherein
the sound variations include temporal variations relative to the signal levels of the sound data.

15. The apparatus according to claim 1, wherein
the image generating processing circuit is configured to generate the plurality of display video data by executing a decoding process on an encoded stream.

16. The apparatus according to claim 15, further comprising:
a memory configured to store the encoded stream; and
a read processing circuit configured to read out the encoded stream from the memory, wherein
the image generating processing circuit is configured to generate the plurality of display video data by executing a decoding process on the encoded stream read out by the read processing circuit.

17. The apparatus according to claim 1, wherein the spiral is a three-dimensional spiral.

18. The apparatus according to claim 17, wherein
the image processing circuit is configured to display a reference image of the display video data to be displayed in the reference image display section that provides the display reference to the plurality of image display sections contained in the group of spiral image display sections largest among the plurality of images of the display video data.

19. The apparatus according to claim 18, wherein the image processing circuit is configured to display the plurality of images of the display video data except the reference image with respective display sizes that gradually become smaller as a function of the distance from the reference image display section on the three-dimensional spiral.

20. The apparatus according to claim 18, wherein the image processing circuit is configured to display the reference image of the display video data at the most proximal position of the group of spiral image display sections.

21. The apparatus according to claim 18, wherein the image processing circuit is configured to display the plurality of images of the display video data except the reference image with respective resolutions that gradually become lower as a function of the distance from the reference image display section on the three-dimensional spiral.

22. The apparatus according to claim 18, wherein the image processing circuit is configured to display the plurality of images of the display video data except the reference image with gaps of arrangement of the plurality of image display sections that gradually becomes smaller as a function of the distance from the reference image display section on the three-dimensional spiral.

23. The apparatus according to claim 17, wherein the image generating processing circuit is further configured to generate speed display data indicating the speed of flowing the plurality of images of the display video data in time series in the group of spiral image display sections; and
the image processing circuit is configured to display the speed display data as icon on the display screen.

24. The apparatus according to claim 1, wherein the image processing circuit is configured to acquire display information including the display sizes and the display positions of the plurality of image display sections and to display the images of the display video data on the display screen.

25. The apparatus according to claim 1, wherein the image processing circuit is configured to display on the display screen the plurality of images of the display video data in a state where the images of the display video data are displayed at a variable speed.

26. The apparatus according to claim 25, wherein the image processing circuit is configured to display on the display screen the plurality of images of the display video data in a state where the display speeds of the images of the display video data are made equal to each other.

27. The apparatus according to claim 1, wherein the image processing circuit is configured to display the plurality of images of the display video data on the display screen, making the time lags equal to each other among the plurality of image display sections.

28. The apparatus according to claim 1, wherein the image processing circuit is configured to display the plurality of images of the display video data so as to overlap adjacent ones in the respective image display sections and also displays the overlapping parts in the image display sections in a translucent condition.

29. The apparatus according to claim 1, wherein the image processing circuit is configured to display the plurality of image display sections with display angles that changes as a function of the speed of flowing the plurality of images of the display video data in time series in the group of spiral image display sections.

30. The apparatus according to claim 1, wherein the sound processing circuit is configured to output, in response to an instruction to output only main sound, only sound corresponding to a section of the plurality of image display sections that is farthest from the origin of the spiral.

31. An image processing method comprising:
an image generating step of generating display video data of a plurality of images to be displayed respectively in a plurality of image display sections on a display screen from video data;
a display type determining step of determining display types indicating display modes of displaying the pictures of the video data on a picture by picture basis or Group of Pictures (GOP) by GOP basis according to variations expressing extents of change of the image data of the video data;
a parameter altering step of altering the display parameters or the reproduction parameters corresponding to the display video data according to the type information expressing the display types on a picture by picture basis or GOP by GOP basis as determined in the display type determining step;
an image processing step of displaying the images to be displayed in the form of moving image on the display screen with time lags in the display sequence, using the display parameters or the reproduction parameters altered in the parameter altering step, the image processing step displaying the display video data on the display screen as a group of spatial image display sections, a plurality of image display sections being arranged and displayed in a form of a spiral on the display screen and linked in the displaying order, a diameter at a section of the spiral that is closer to an origin of the spiral being smaller than a diameter at another section of the spiral that is farther from the origin; and
a sound processing step of outputting, in response to an instruction to output sound, sound corresponding to the plurality of image display sections such that a volume of sound at the section of the spiral that is closer to the origin of the spiral is lower than a volume of sound at the another section of the spiral that is farther from the origin.

32. An image processing apparatus comprising:
image generating means for generating display video data of a plurality of images to be displayed respectively in a plurality of image display sections on a display screen from video data,
display type determining means for determining display types indicating display modes of displaying the pictures of the video data on a picture by picture basis or Group of Pictures (GOP) by GOP basis according to image variations expressing the extents of change of the video data,
parameter altering means for altering the display parameters or the reproduction parameters corresponding to the display video data according to the type information expressing the display type on a picture by picture basis or GOP by GOP basis,
image processing means for displaying the images to be displayed in the form of moving image on the display screen with time lags in the display sequence, using the altered display parameters or the reproduction parameters, the image processing means being for displaying the display video data on the display screen as a group of spatial image display sections, a plurality of image display sections being arranged and displayed in a form of a spiral on the display screen and linked in the displaying order, a diameter at a section of the spiral that is closer to an origin of the spiral being smaller than a diameter at another section of the spiral that is farther from the origin, and sound processing means for outputting, in response to an instruction to output sound, sound corresponding to the plurality of image display sections such that a volume of sound at the section of the spiral that is closer to the origin of the spiral is lower than a volume of sound at the another section of the spiral that is farther from the origin.

* * * * *